US012767736B2

(12) United States Patent
Chung et al.

(10) Patent No.: US 12,767,736 B2
(45) Date of Patent: Oct. 20, 2026

(54) CLAY COMPOSITE SUPPORT-ACTIVATORS AND CATALYST COMPOSITIONS

(71) Applicant: Formosa Plastics Corporation, U.S.A., Livingston, NJ (US)

(72) Inventors: Kevin Chung, Port Lavaca, TX (US); Michael D. Jensen, Palacios, TX (US); Yiqun Fang, Port Lavaca, TX (US); Casey Zamzow, Victoria, TX (US); Charles R. Johnson, II, Port Lavaca, TX (US); Mary Lou Cowen, Port Lavaca, TX (US); Jenny Chun-Yu Chen, Port Lavaca, TX (US)

(73) Assignee: FORMOSA PLASTICS CORPORATION, U.S.A., Livingston, NJ (US)

( * ) Notice: Subject to any disclaimer, the term of this patent is extended or adjusted under 35 U.S.C. 154(b) by 632 days.

(21) Appl. No.: 18/323,212

(22) Filed: May 24, 2023

(65) Prior Publication Data

US 2023/0399420 A1 Dec. 14, 2023

Related U.S. Application Data

(60) Provisional application No. 63/366,077, filed on Jun. 9, 2022.

(51) Int. Cl.

*C08F 4/02* (2006.01)
*C08F 4/6592* (2006.01)
*C08F 10/02* (2006.01)

(52) U.S. Cl.

CPC ............ *C08F 4/02* (2013.01); *C08F 4/65922* (2013.01); *C08F 10/02* (2013.01)

(58) Field of Classification Search

USPC ...................................................... 502/62, 80

See application file for complete search history.

(56) References Cited

U.S. PATENT DOCUMENTS 2,196,016 A 4/1940 Huehn et al.
3,242,099 A 3/1966 Manyik et al.
(Continued)

FOREIGN PATENT DOCUMENTS

BE 839380 A 9/1976
EP 1242478 B1 11/1989
(Continued)

OTHER PUBLICATIONS

Notification of Transmittal of the International Preliminary Report on Patentability, PCT/US2023/023644, dated Jul. 29, 2024 (8 pp.).
(Continued)

*Primary Examiner* — Fred M Teskin
(74) *Attorney, Agent, or Firm* — Eversheds Sutherland (US) LLP

(57) ABSTRACT

Disclosed are support-activators and catalyst compositions comprising the support-activators for polymerizing olefins in which the support-activator includes a clay heteroadduct, also termed a composite, prepared from a colloidal phyllosilicate such as a colloidal smectite clay, which is chemically-modified with a surfactant. In an aspect, the clay composite can comprise the contact product of a colloidal smectite clay and a surfactant in a liquid carrier, but in the absence of any other reactant such as a cationic polymetallate, and their use as support-activators for metallocene precatalysts is also described. The use of surfactants with cationic polymetallates in forming clay-composites is also described.

59 Claims, 25 Drawing Sheets

(56) References Cited

U.S. PATENT DOCUMENTS 3,248,179 A 4/1966 Norwood
3,790,853 A 2/1974 Pankove
4,003,712 A 1/1977 Miller
4,011,382 A 3/1977 Levine et al.
4,169,926 A 10/1979 McDaniel
4,176,090 A 11/1979 Vaughan et al.
4,302,566 A 11/1981 Karol et al.
4,424,341 A 1/1984 Hanson et al.
4,501,885 A 2/1985 Sherk et al.
4,543,399 A 9/1985 Jenkins, III et al.
4,588,790 A 5/1986 Jenkins, III et al.
4,613,484 A 9/1986 Ayres et al.
4,637,992 A 1/1987 Lewis et al.
4,737,280 A 4/1988 Hanson
4,794,096 A 12/1988 Ewen
4,808,561 A 2/1989 Welborn, Jr.
4,882,400 A 11/1989 Dumain et al.
4,939,217 A 7/1990 Stricklen
5,028,670 A 7/1991 Chinh et al.
5,059,568 A 10/1991 McCauley
5,135,756 A 8/1992 Shi et al.
5,191,132 A 3/1993 Patsidis et al.
5,202,295 A 4/1993 McCauley
5,210,352 A 5/1993 Alt et al.
5,308,811 A 5/1994 Suga et al.
5,317,036 A 5/1994 Brady, III et al.
5,347,026 A 9/1994 Patsidis et al.
5,352,749 A 10/1994 DeChellis et al.
5,399,636 A 3/1995 Alt et al.
5,401,817 A 3/1995 Palackal et al.
5,405,922 A 4/1995 DeChellis et al.
5,420,320 A 5/1995 Zenk et al.
5,436,304 A 7/1995 Alt et al.
5,436,305 A 7/1995 Alt et al.
5,451,649 A 9/1995 Zenk et al.
5,462,999 A 10/1995 Griffin et al.
5,480,848 A 1/1996 Geerts
5,496,781 A 3/1996 Geerts et al.
5,498,581 A 3/1996 Welch et al.
5,541,270 A 7/1996 Chinh et al.
5,541,272 A 7/1996 Schmid et al.
5,543,471 A 8/1996 Sun et al.
5,554,795 A 9/1996 Frey et al.
5,563,284 A 10/1996 Frey et al.
5,565,592 A 10/1996 Patsidis et al.
5,571,880 A 11/1996 Alt et al.
5,576,259 A 11/1996 Hasegawa et al.
5,594,078 A 1/1997 Welch et al.
5,597,892 A 1/1997 Hanson
5,616,661 A 4/1997 Eisinger et al.
5,616,872 A 4/1997 O'Brien
5,627,242 A 5/1997 Jacobsen et al.
5,631,203 A 5/1997 Welch et al.
5,631,335 A 5/1997 Alt et al.
5,654,454 A 8/1997 Peifer et al.
5,665,818 A 9/1997 Tilston et al.
5,668,228 A 9/1997 Chinh et al.
5,668,230 A 9/1997 Schertl et al.
5,677,375 A 10/1997 Rifi et al.
5,705,478 A 1/1998 Boime
5,705,579 A 1/1998 Hawley et al.
5,753,577 A 5/1998 Hamura et al.
5,807,938 A 9/1998 Kaneko et al.
5,906,955 A 5/1999 Hamura et al.
5,919,983 A 7/1999 Rosen et al.
5,973,084 A 10/1999 Suga et al.
6,034,187 A 3/2000 Machama et al.
6,107,230 A 8/2000 McDaniel et al.
6,117,955 A 9/2000 Agapiou et al.
6,140,432 A 10/2000 Agapiou et al.
6,262,162 B1 * 7/2001 Lan ........................ C01B 33/44 428/338
6,271,325 B1 8/2001 McConville et al.
6,281,306 B1 8/2001 Oskam et al.
6,346,584 B1 2/2002 Wenzel et al.
6,521,690 B1 2/2003 Ross et al.
6,531,552 B2 3/2003 Nakano et al.
6,632,769 B2 10/2003 Wenzel et al.
6,632,894 B1 * 10/2003 McDaniel ............... C08F 10/02 502/118
6,653,416 B2 11/2003 McDaniel et al.
6,713,573 B2 3/2004 Wenzel et al.
6,825,371 B2 11/2004 Sugano et al.
6,833,338 B2 12/2004 McDaniel et al.
6,838,507 B2 1/2005 Chou et al.
6,927,261 B2 8/2005 Shih
6,984,603 B2 1/2006 McDaniel et al.
6,992,032 B2 1/2006 McDaniel et al.
7,148,298 B2 12/2006 Jensen et al.
7,211,613 B2 5/2007 Lorah et al.
7,220,695 B2 5/2007 Casty et al.
7,291,665 B2 11/2007 Lorah et al.
7,732,542 B2 6/2010 Yang et al.
7,772,299 B2 8/2010 Scott et al.
7,776,943 B2 8/2010 Scott et al.
7,919,569 B2 4/2011 Xu et al.
7,928,172 B2 4/2011 Luo et al.
8,501,655 B2 8/2013 Luo et al.
8,642,499 B2 2/2014 Cheng et al.
9,045,504 B2 6/2015 Gao et al.
9,163,100 B2 10/2015 Wassenaar
9,200,093 B2 12/2015 Ochi et al.
9,616,412 B2 4/2017 Goswamee et al.
9,670,296 B2 6/2017 McDaniel et al.
9,751,961 B2 9/2017 Murase et al.
10,059,788 B2 8/2018 Holtcamp et al.
10,364,309 B2 7/2019 Mastroianni
10,370,469 B2 8/2019 Lam et al.
10,940,460 B2 3/2021 Jensen et al.
11,339,229 B2 5/2022 Jensen et al.
12,036,542 B2 7/2024 Cruz et al.
12,152,101 B2 11/2024 Jensen et al.
2015/0159539 A1 6/2015 Reynold et al.
2017/0342175 A1 11/2017 Hagadorn et al.
2018/0142047 A1 5/2018 Jensen et al.
2018/0142048 A1 5/2018 Jensen et al.
2021/0230318 A1 7/2021 Jensen et al.

FOREIGN PATENT DOCUMENTS

| | | | |
|---|---|---|---|
| EP | 0 794 200 | A | 9/1992 |
| EP | 0 749 992 | A1 | 12/1996 |
| EP | 0 634 421 | B1 | 10/1997 |
| EP | 0 802 202 | A | 10/1997 |
| JP | 03947839 | B2 | 7/2007 |
| JP | 06205920 | A | 10/2017 |
| WO | 2013/085074 | A1 | 6/2013 |
| WO | 2016/183006 | A1 | 11/2016 |
| WO | 2020/107926 | A1 | 6/2020 |
| WO | 2021/154204 | A1 | 8/2021 |

OTHER PUBLICATIONS

Amendment Under PCT Article 34 and Reply to Written Opinion of the International Searching Authority, PCT/US2023/023644, dated Apr. 5, 2024 (35 pp.).

Do Nascimento, A., et al., "Effect of the Acid Treatment of Montmorillonite Clay in the Oleic Acid Esterification Reaction", Materials Research 2015, 18(2), 283-287 (5 pp.).

Komadel, P., "Chemically modified smectites", Clay Minerals 2003, 38, 127-138 (12 pp.).

Tavani et al., "Adsorption of sulphuric acid on smectite from acidic aqueous solutions", Cerâmica, 1999, 45(295), 133-136. 961, : https://www.scielo.br/j/ce/a/fDqYDP4LqvFXGh6hdHQmg5F/?lang=en.

Kooli, F., et al., "Effect of the Acid Activation Levels of Montmorillonite Clay on the Cetyltrimethylammoniuim Cations Adsorption", Langmuir 2005, 21(19), 8717-8723 (7 pp.).

Tayano, T., et al., Effect of Acid Treatment of Montmorillonite on "Support-Activator" Performance to Support Metallocene for Propylene Polymerization Catalyst, Macromolecular Reaction Engineering, 2017(11), 1600017 (13 pp.).

(56) References Cited

OTHER PUBLICATIONS

Rouquerol, J., et al., Pure & Appl. Chem., 1994, 66, 1739-1758.
Klobes, P., et al., "Porosity and Specific Surface Area Measurements for Solid Materials", National Institute of Standards and Technology Special Publication 960-17 (96 pp.).
Sanchez, R.M. Torres, et al., "Colloids and Surfaces A: Physicochemical and Engineering Aspects", Elsevier, 2013, 423, 1-10 (10 pp.).
Kawamura, K., "Swelling Behavior of Na- and Ca-Montmorillonite up to 150° C. by In Situ X-Ray Diffraction Experiments", Clay and Clay Minerals, vol. 57, No. 2, 150-160 (2009) (11 pp.).
McAtee, Jr., James L., "Heterogeneity in Montmorillonite", Fifth National Conference on Clays and Clay Minerals, National Academy of Sciences, National Research Council, Publication 566, 1958 (10 pp.).
Pillared Clays and Pillared Layered Solids, R. A. Schoonheydt et al., Pure Appl. Chem., 71(12), 2367-2371, (1999).
Kirk-Othmer, Encyclopedia of Chemical Technology, Second Edition, vol. 10, "Food Additives to Heterocyclic Compounds", pp. 638-674, 1966 (44 pp.).
Perry, C.C., et al., "The Systematic Study of Aluminum Speciation in Medium Concentrated Aqueous Solutions," Journal of Inorganic Biochemistry, 2001, 87, 115-124 (10 pp.).
Abend, S., et al., "Stabilization of Emulsions by Heterocoagulation of Clay Minerals and Layered Double Hydroxides," Colloid Polym. Sci. 1998, 276, 730-737 (8 pp.).
Oades, J.M., "Interactions of Polycations of Aluminum and Iron with Clays," Clay and Clay Minerals, 1984, 32(1), 49-57 (9 pp.).
Occelli, M.L., et al., Effects of Synthesis Conditions on the Thermal Stability of a Texas Montmorillonite Expaned with [A113O4(OH)24(H2O)12]7+ Cations, Clay and Clay Minerals, 2000, vol. 48, No. 2, 304-308 (2000) (5 pp.).
Kooli, F., "Pillared Montmorillontes from Unusual Antiperspirant Aqueous Solutions: Characterization and Catalytic Tests," Microporous and Mesoporous Materials; 2013, 167, 228-236 (9 pp.).
Bertella, Francine and Sibele B.C. Pergher, "Scale up Pillaring: A Study of the Parameters that Influience the Process", Materials, 2017, 10, 712 (12 pp.).
G.-C. Cho, J. Dodds, and J. C. Santamarina, Journal of Geotechnical and Geoenvironmental Engineering, 2006, 132 (5), 591-602.
Cruz-Matías, I., et al., "Sphericity and roundness computation for particles using the extreme vertices model", Journal of Computational Science 30 (2019) 28-40 (13 pp.).
Arpagaus, C., A"Short Review on Nano Spray Drying of Pharmaceuticals", J. Nanomed. Nanosci.: JNAN-149. DOI: 10.29011/2577-1477.100049 (2018) (5 pp.).
Brunauer, Stephen, et al., "Adsorption of Gases in Multimolecular Layers", J. Am. Chem. Soc., 1939, 60, 309 (11 pp.).
Barrett, Elliott P., et al., "The Determination of Pore vol. and Area Distributions in Porous Substances. I> Computations from Nitrogent Isotherms", J. Am. Chem. Soc., 1951, 73(1), 373-380 (8 pp.).
Busico, Vincenzo, et al., "C NMR Evidence of the Copresence of m-Rich and r-Rich Sequences (Stereoblocks) in Polypropene Molecules", Macromolecules, 1994, 27, 4521-4524 (4 pp.).
Abedlbagi, M.E.M., J. Organometallic chem. 854, 76-86 (2018).
International Search Report and Written Opinion, PCT/US2023/023644, dated Aug. 31, 2023 (10 pp.).

* cited by examiner

| | |
|---|---|
| x(Q3 = 10.0%) | 256.21 μm |
| x(Q3 = 50.0%) | 885.44 μm |
| x(Q3 = 90.0%) | 1,503.40 μm |
| SPAN3 | 1.409 |
| Mean Value SPHT3 | 0.6619 |
| Mean Value SPHT0 | 0.7787 |

| | |
|---|---|
| x(Q3 = 10.0%) | 308.12 μm |
| x(Q3 = 50.0%) | 1,078.27 μm |
| x(Q3 = 90.0%) | 2,528.26 μm |
| SPAN3 | 2.059 |
| Mean Value SPHT3 | 0.6538 |
| Mean Value SPHT0 | 0.7928 |

| | |
|---|---|
| x(Q3 = 10.0%) | 478.79 µm |
| x(Q3 = 50.0%) | 723.03 µm |
| x(Q3 = 90.0%) | 993.07 µm |
| SPAN3 | 0.711 |
| Mean Value SPHT3 | 0.8812 |
| Mean Value SPHT0 | 0.8385 |

CLAY COMPOSITE SUPPORT-ACTIVATORS AND CATALYST COMPOSITIONS

CROSS REFERENCE TO RELATED APPLICATIONS

This applications claims the benefit of U.S. Provisional Application No. 63/366,077, filed Jun. 9, 2022, which is incorporated by reference in its entirety.

TECHNICAL FIELD OF THE DISCLOSURE

This disclosure relates to catalyst compositions including support-activators for producing polyethylene and processes for preparing and using the same.

BACKGROUND OF THE DISCLOSURE

Support-activators are commonly employed with metallocene precatalysts in the industrial heterogeneous polymerization of olefins. Generally, support-activators serve the dual role of activating the metallocene and functioning as a template upon which the growing polymer chain can precipitate. Widely used support-activators include an inorganic metal oxide support such as silica or alumina treated with a co-catalyst or an activator. One such support-activator is methylaluminoxane (MAO) on silica. However, MAO is expensive to procure or make, and MAO/silica requires multiple subsequent processing steps such as washings before it can be used.

Various clay support-activators have been investigated in an attempt to reduce the costs and time required to make and use materials such as MAO/silica for metallocene activation. For example, U.S. Pat. No. 6,531,552 (Japan Polychem Corporation), U.S. Pat. No. 6,825,371 (Mitsubishi Chemical Corporation), and U.S. Pat. No. 7,220,695 (ExxonMobil) describe the treatment of clay-based supports such as smectites with mineral acids, in some cases with additional components such as surfactants. However, the reaction of acids with ion-exchanged clays can cause replacement of interlayer ions with protons, thereby destroying its porous structure which provided its catalytic activity. See, for example, in Nascimento et al., *Materials Research,* 2015, 18(2), 283-287, Tavani et al., *Cerâmica,* 1999, 45(295), 133-136, Kooli et al., *Langmuir* 2005, 21(19), 8717-8723, and Tayano et al., *Macromolecular Reaction Engineering,* 2017, 11(2), 1600017. Other limitations to acid-treatment approaches include the difficulty in isolating the modified clay. Other efforts to make support-activators include treating a clay or organic polymer particle with a surfactant in combination with other components such as organic amides (U.S. Pat. No. 9,200,093 to Sumitomo Chemical Company), but these process and components are also complex and expensive. Moreover, merely using a clay starting material in these approaches which exhibits a desirable particle size and morphology may not provide a support-activator having these properties.

Therefore, there remains a need for highly active support-activators which are economical to prepare and isolate. This need is particularly evident in the production of metallocene-based polyolefins such as high clarity film resins. Such support-activators would present significant cost advantages over currently used aluminoxane-based activators. It would also be desirable to develop methods of producing support-activator particles with a uniform spherical morphology, which is highly advantageous for producing desirable polymer morphologies, ensuring reactor operability, and maintaining the activity of the support-activator.

SUMMARY OF THE DISCLOSURE

Aspects of this disclosure provide new clay-based support-activators and processes for their preparation, catalyst compositions comprising the new support-activators, methods for making the catalyst compositions, and processes for polymerizing olefins. In an aspect, the chemically-modified clay support-activators can readily activate metallocene compounds toward polymerization of olefins, they are surprisingly easy and cost-effective to prepare and recover in high yield. The support-activators of this disclosure can demonstrate high polymerization activities and processability relative to acid-treated clay activators, in which clay structure degradation and pore collapse (often resulting in leaching of clay into solution) can occur during the activation process and preclude facile isolation and high polymerization activity of the resulting activators. Furthermore, the support-activators of this disclosure retain their desirable structural properties (for example, high pore volume, shape, and size) under granulation/drying conditions which often result in a high degree of pore collapse in other support-activators.

The Applicant's International Patent Application publication WO 2021/154204, which is incorporated herein by reference in its entirety, discloses new clay-based support-activators prepared by contacting a colloidal smectite clay in a liquid carrier with a heterocoagulation reagent comprising at least one cationic polymetallate, in which a surfactant can be present if desired. The clay heteroadducts described in this publication are efficient support-activators for metallocenes for olefin polymerization. When the cationic polymetallate is used in an amount relative to the colloidal smectite clay within a specific range, the smectite heteroadduct can be easily isolated from the resulting slurry by a conventional filtration process. This ease of filtration contrasts with the difficult isolation of previous chemically-modified clay support-activators, which may require filtration over several days, or multiple washing and centrifugation steps.

It now has been unexpectedly discovered that when a colloidal smectite clay in a liquid carrier is contacted with a surfactant reagent, but in the absence of a cationic polymetallate, a clay-based support-activator can be prepared having a desirable spherical shape and size and activity for metallocene activation for olefin polymerization. These clay-based support-activators are termed clay or smectite "heteroadducts" or "composites", or more specifically "clay (or smectite)-surfactant heteroadducts (or composites)". The isolation of these smectite-surfactant heteroadducts can be achieved using a conventional filtration, without the need for centrifugation or high dilution of reaction mixtures, and without extensive washing of the solid thus obtained. This process provides the solid clay heteroadduct exhibiting better activity than the corresponding untreated clay, comparable activities to the more difficult-to-prepare pillared clay supports, and comparable activities to the heterocoagulated clays prepared using a cationic polymetallate, thereby fulfilling a need.

It has been further discovered that a wide range of reagents used for preparing clay-based support-activators can be eliminated from the preparative method and still provide an active support-activator, providing significant advantages in their production. Moreover, these clay heteroadducts can be spray-dried from a suspension of the heteroadduct in a dispersion medium consisting essentially of water to form the support-activator, which provides economic and environmental advantages over prior methods requiring an organic liquid carrier.

Therefore, the present disclosure provides a method of making a support-activator comprising a smectite heteroadduct, the method comprising or consisting essentially of contacting in a first liquid carrier:

(a) a colloidal smectite clay; and (b) a surfactant, wherein the surfactant comprises or is selected from a cationic surfactant, a nonionic surfactant, an amphoteric surfactant, or any combination thereof to provide a slurry of the smectite heteroadduct in the first liquid carrier; wherein the contacting step may occur in absence of specific reactants.

In aspects of this disclosure, the contacting step may be carried out [i] in the absence of: [A] a cationic polymetallate; [B] a non-layered silicate, a soluble silicate (for example, sodium silicate), a charged inorganic component, a metal oxide, an organic amide, an anionic surfactant, an inorganic acid, an organic acid, an inorganic base, an organic base, an oxidizing agent, or any combination thereof; [C] any one or any two of a cationic surfactant, a nonionic surfactant, or an amphoteric surfactant; or [D] any combination thereof; [ii] in the absence of any other cationic reactant, except for cationic surfactant when present; or [iii] in the absence of any other reactant, except for the surfactant.

This method of contacting in a first liquid carrier (a) a colloidal smectite clay; and (b) a surfactant, can further comprise the step of: isolating the smectite heteroadduct from the slurry in the first liquid carrier. In some embodiments, the colloidal smectite clay and the surfactant can be contacted in a ratio of from 0.5 millimoles to 5 millimoles of surfactant per gram of colloidal smectite clay which works well in forming the smectite heteroadduct having the disclosed favorable features, for example, in providing the colloidal smectite clay which is readily filterable.

The present disclosure further provides a method of making a support-activator comprising a smectite heteroadduct, the method comprising or consisting essentially of contacting in a first liquid carrier:

(a) a colloidal smectite clay; and (b) a surfactant, wherein the surfactant comprises or is selected from a cationic surfactant, a nonionic surfactant, an amphoteric surfactant, or any combination thereof to provide a slurry of the smectite heteroadduct in the first liquid carrier;

wherein the first liquid carrier consists essentially of water, an organic liquid, or a combination thereof.

This method also can further comprise the step of: isolating the smectite heteroadduct from the slurry in the first liquid carrier.

Once the smectite heteroadduct has been isolated from the slurry in the first liquid carrier as disclosed herein, the method of making a support-activator can further comprise the steps of: suspending (or re-suspending) the smectite heteroadduct in a dispersion medium to provide a suspension of the smectite heteroadduct in the dispersion medium; and spray-drying the smectite heteroadduct from the suspension to provide the support-activator in particulate form. In an aspect, the dispersion medium can comprise or consist essentially of water. This latter spray-drying step may be referred to herein as "granulating" the smectite heteroadduct.

It has also been realized that when a colloidal smectite clay in a liquid carrier is contacted with a heterocoagulation reagent comprising both a cationic polymetallate and a surfactant reagent, the resulting clay-cationic polymetallate-surfactant heteroadducts can show unexpectedly improved polymerization activities in combination with metallocenes. Therefore, this disclosure also demonstrates a method of making a support-activator comprising a smectite heteroadduct, the method comprising or consisting essentially of contacting in any order in a first liquid carrier:

(a) a colloidal smectite clay;

(b) a cationic polymetallate; and (c) a surfactant comprising or selected from a cationic surfactant, a nonionic surfactant, an amphoteric surfactant, or any combination thereof, to provide a slurry of the smectite heteroadduct in the first liquid carrier.

If desired, this contacting step also may occur in absence of specific reactants. In aspects, for example, the contacting step may be carried out [i] in the absence of: [A] a non-layered silicate, a soluble silicate (for example, sodium silicate), a charged inorganic component, a metal oxide, an organic amide, an anionic surfactant, an inorganic acid, an organic acid, an inorganic base, an organic base, an oxidizing agent, or any combination thereof; [B] any one or any two of a cationic surfactant, a nonionic surfactant, or an amphoteric surfactant; or [C] any combination thereof; [ii] in the absence of any other cationic reactant, except for the cationic polymetallate and the cationic surfactant when present; or [iii] in the absence of any other reactant, except for the cationic polymetallate and the surfactant. This method of making the clay-cationic polymetallate-surfactant heteroadducts can further comprise the step of: isolating the heteroadduct from the slurry in the first liquid carrier. In an aspect, the method can further comprise the steps of: suspending (or re-suspending) the smectite heteroadduct in a dispersion medium to provide a suspension of the smectite heteroadduct in the dispersion medium; and spray-drying the smectite heteroadduct from the suspension to provide the support-activator in particulate form. In an aspect, the dispersion medium can comprise or consist essentially of water.

Compared with the corresponding clay-cationic polymetallate heteroadducts disclosed in Applicant's U.S. Patent Appl. Publ. No. 2021/0230318, which is incorporated herein by reference in its entirety, the clay-cationic polymetallate-surfactant heteroadducts can exhibit improvements in polymerization activity. Moreover, these clay-cationic polymetallate-surfactant heteroadducts are convenient to make, readily filterable, and can be spray-dried from an aqueous slurry in the absence of an organic liquid to provide highly spherical support-activators.

In another aspect, providing the clay-cationic polymetallate-surfactant heteroadducts by spray drying also may be achieved by forming an aqueous spray-drying slurry of a preformed or isolated clay-cationic polymetallate heteroadduct, which includes a surfactant in the aqueous spray-drying slurry. That is, the clay-cationic polymetallate heteroadduct can be formed as disclosed in Applicant's U.S. Patent Appl. Publ. No. 2021/0230318. The clay-cationic polymetallate heteroadduct can then be isolated and re-suspended in an aqueous dispersion medium which includes a surfactant to form a spray-drying suspension and spray dried. Preparing heteroadducts in this fashion is convenient and provides readily filterable clay-cationic polymetallate heteroadducts, which can be spray-dried from an aqueous slurry in the absence of an organic liquid, to provide highly spherical support-activators. Therefore, the order of addition of the components, particularly with respect to when the surfactant is added relative to the isolation of the heteroadduct, can be altered and an active and useful product can be produced with either order of addition.

This disclosure also provides the smectite heteroadducts themselves. For example, there is provided a smectite heteroadduct or a support-activator comprising a smectite heteroadduct, in which the smectite heteroadduct can comprise or consist essentially of a contact product in a first liquid carrier and in the absence of specific reactants, of:

(a) a colloidal smectite clay; and (b) a surfactant, wherein the surfactant comprises or is selected from a cationic surfactant, a nonionic surfactant, an amphoteric surfactant, or any combination thereof.

According to aspects of this disclosure, the contact product can occur or can be [i] in the absence of: [A] a cationic polymetallate; [B] a non-layered silicate, a soluble silicate (for example, sodium silicate), a charged inorganic component, a metal oxide, an organic amide, an anionic surfactant, an inorganic acid, an organic acid, an inorganic base, an organic base, an oxidizing agent, or any combination thereof; [C] any one or any two of a cationic surfactant, a nonionic surfactant, or an amphoteric surfactant; or [D] any combination thereof; [ii] in the absence of any other cationic reactant, except for cationic surfactant when present; or [iii] in the absence of any other reactant, except for the surfactant.

According to a further aspect, there is provided a smectite heteroadduct or a support-activator comprising a smectite heteroadduct, wherein the smectite heteroadduct comprises or consists essentially of a contact product in a first liquid carrier of:

(a) a colloidal smectite clay; and (b) a surfactant comprising or selected from a cationic surfactant, a nonionic surfactant, an amphoteric surfactant, or any combination thereof;

wherein the first liquid carrier consists essentially of water, an organic liquid, or a combination thereof.

Yet another aspect of this disclosure provides a support-activator comprising a smectite heteroadduct, the smectite heteroadduct comprising or consisting essentially of a contact product in a first liquid carrier of:

(a) a colloidal smectite clay;

(b) a cationic polymetallate; and (c) a surfactant comprising or selected from a cationic surfactant, a nonionic surfactant, an amphoteric surfactant, or any combination thereof.

In aspects of the disclosure, if desired, the contact product can occur or can be [i] in the absence of: [A] a non-layered silicate, a soluble silicate (for example, sodium silicate), a charged inorganic component, a metal oxide, an organic amide, an anionic surfactant, an inorganic acid, an organic acid, an inorganic base, an organic base, an oxidizing agent, or any combination thereof; [B] any one or any two of a cationic surfactant, a nonionic surfactant, or an amphoteric surfactant; or [C] any combination thereof; [ii] in the absence of any other cationic reactant, except for the cationic polymetallate and the cationic surfactant when present; or [iii] in the absence of any other reactant, except for the cationic polymetallate and the surfactant.

These surfactant-treated clays (smectite clay heteroadducts) of this disclosure, whether clay-surfactant heteroadducts or clay-cationic polymetallate-surfactant heteroadducts, when subjected to the granulation and drying process of spray drying followed by calcination, constitute particles possessing higher sphericity, porosity, and particle uniformity relative to clay activators dried through other methods. Once granulated and dried as described herein, the clay heteroadducts also retain a high olefin polymerization activity when activating metallocene compounds. This desirable performance contrasts with that of the cationic polymetallate only-treated clay activators in the absence of surfactants, which can lose polymerization activity and/or particle porosity when spray dried. Because the disclosed spray drying process can be carried out on the clay-surfactant heteroadducts and clay-cationic polymetallate-surfactant heteroadducts dispersed in a water dispersion medium, as opposed to requiring an organic liquid or a mixture of an organic liquid and water dispersion medium, the economic viability, safety, and environmental sustainability of this process is substantially improved over processes requiring organic-liquid containing dispersion media.

The smectite heteroadducts prepared in this manner can be used very effectively in combination with co-catalysts such as alkyl aluminum compounds for transition metal-based olefin polymerization processes. This smectite heteroadduct-co-catalyst combination can afford very active support-activators for metallocene olefin polymerizations when compared with traditional MAO-$SiO_2$ or borane-derived support-activators. Further, the surfactant agents used in this process also can be very inexpensive and can be used with relatively inexpensive co-catalysts such as alkyl aluminum compounds, particularly compared to aluminoxane and borane-based activators.

Also disclosed herein is a catalyst system for olefin polymerization, the catalyst system comprising:

(a) at least one metallocene compound; and (b) at least one support-activator according to any aspect of this disclosure.

This catalyst system can further comprise additional components, for example, at least one co-catalyst such as an alkyl aluminum compound and/or at least one co-activator such as methyl aluminoxane (MAO). The support-activator of the catalyst system also can be absent any of the specific reactants which are absent from the contact product as described herein.

This disclosure also provides a method of making a catalyst system, in which the method comprising contacting in a second liquid carrier:

(a) at least one metallocene compound; and (b) at least one support-activator comprising a smectite heteroadduct according to this disclosure.

The at least one support-activator can comprise a smectite heteroadduct prepared according to any method provided in this disclosure. In this method of making a catalyst system, the method can further comprise contacting in the second liquid carrier at least one co-catalyst such as an alkyl aluminum compound and/or at least one co-activator such as methyl aluminoxane (MAO), in which the contacting can occur in any order. The support-activator also may be absent any of the specific reactants which are absent from the contact product as described herein.

In still another aspect, this disclosure provides for a process for polymerizing olefins comprising contacting at least one olefin monomer and a catalyst system under polymerization conditions to form a polyolefin, wherein the catalyst system comprises:

(a) at least one metallocene compound; and (b) at least one support-activator comprising a smectite heteroadduct according to this disclosure.

As disclosed herein, the at least one support-activator also can comprise a smectite heteroadduct prepared according to any method provided in this disclosure, and the catalyst system can further comprise additional components, for example, at least one co-catalyst such as an alkyl aluminum compound and/or at least one co-activator such as methyl aluminoxane (MAO). The support-activator also may be absent any of the specific reactants which are absent from the contact product as described herein.

These and other aspects, features, and embodiments of the support-activator, the catalyst compositions, the methods of making the compositions, and the polymerization processes, and associated compositions and methods are more fully described in the Detailed Description, the Figures, the Examples, and the claims which are provided herein.

BRIEF DESCRIPTION OF THE FIGURES

FIG. 37 and FIG. 37 each plot the volume-weighted sphericities (SPHT3) versus polymer particle size for a sample of the polymer particles from Example 2-A1 and Example 30-E2, respectively. Particle size distribution data and number-weighted average sphericity of the entire particle distribution (SPHT0) are also tabulated.

DETAILED DESCRIPTION OF THE DISCLOSURE

Figure 1:
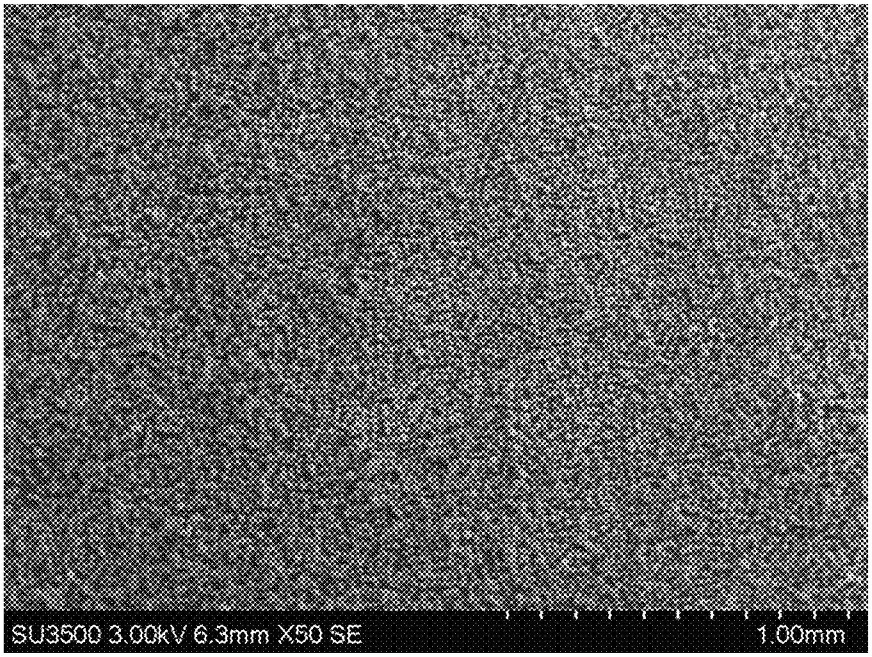
FIG. 1 and FIG. 2 illustrate an embodiment of this disclosure, showing a scanning electron microscope (SEM) image of the powdered product formed by spray-drying an aqueous slurry in which the solid component is the filtered adduct obtained by contacting tetramethylammonium bromide and Volclay® HPM-20 montmorillonite in deionized water in the process described in Example 21-E1.
Figure 2:
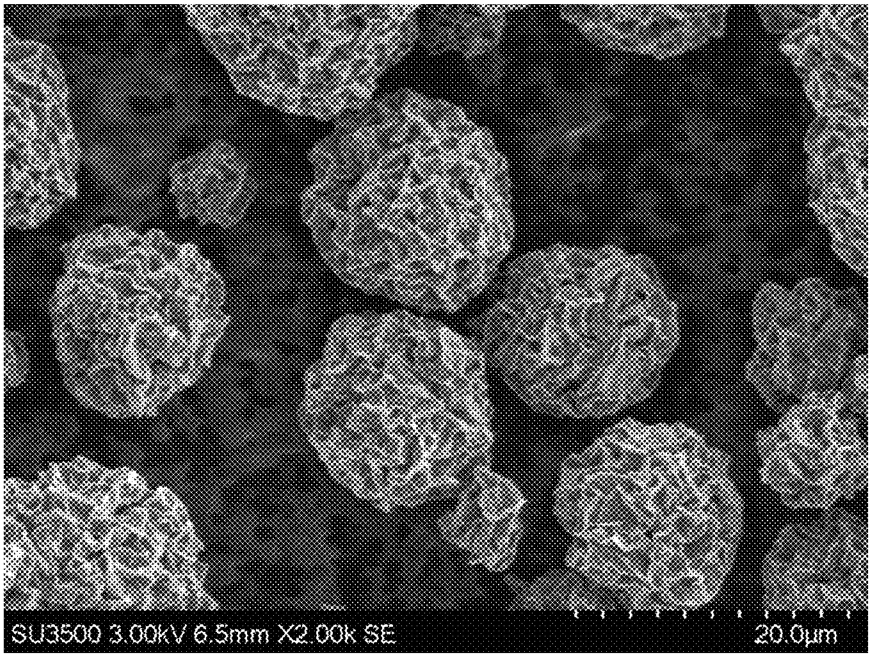
Figure 3:
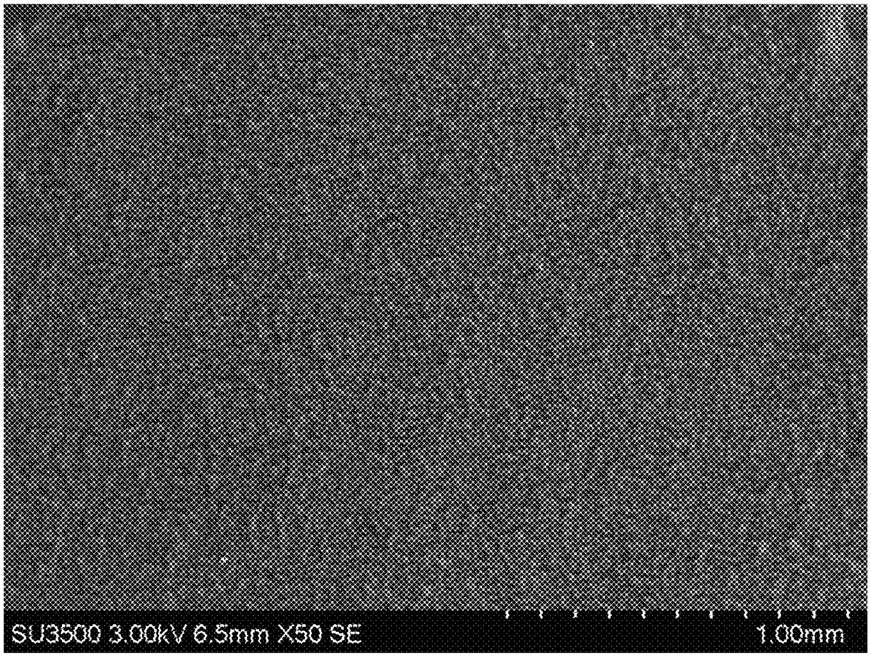
FIG. 3 and FIG. 4 illustrate an embodiment of this disclosure, showing an SEM image of the powdered product formed by spray-drying an aqueous slurry in which the solid component is the filtered adduct obtained by contacting aluminum chlorohydrate and Volclay® HPM-20 montmorillonite in the process described in Example 20-D1.
Figure 4:
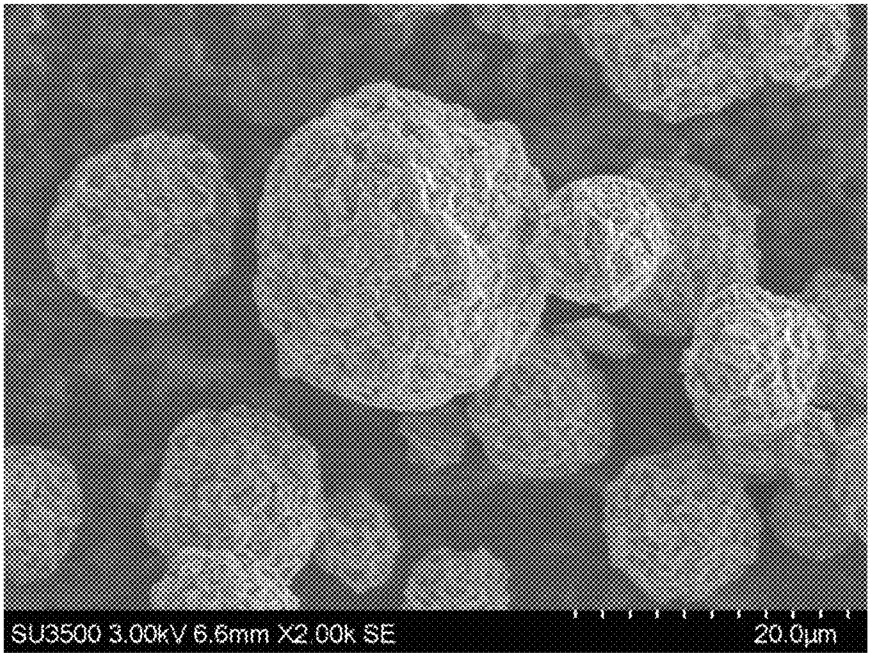
Figure 5:
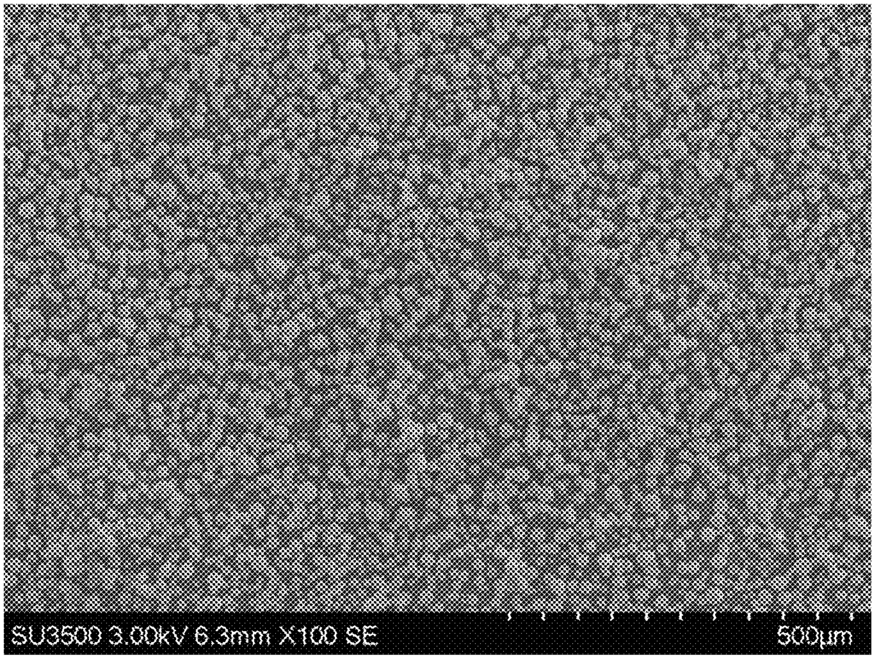
FIG. 5 and FIG. 6 illustrate an embodiment of this disclosure, showing an SEM image of the powdered product formed by spray-drying an aqueous slurry in which the solid component is the filtered adduct obtained by contacting tetrabutylammonium bromide and Volclay® HPM-20 montmorillonite in the process described in Example 22-E2.
Figure 6:
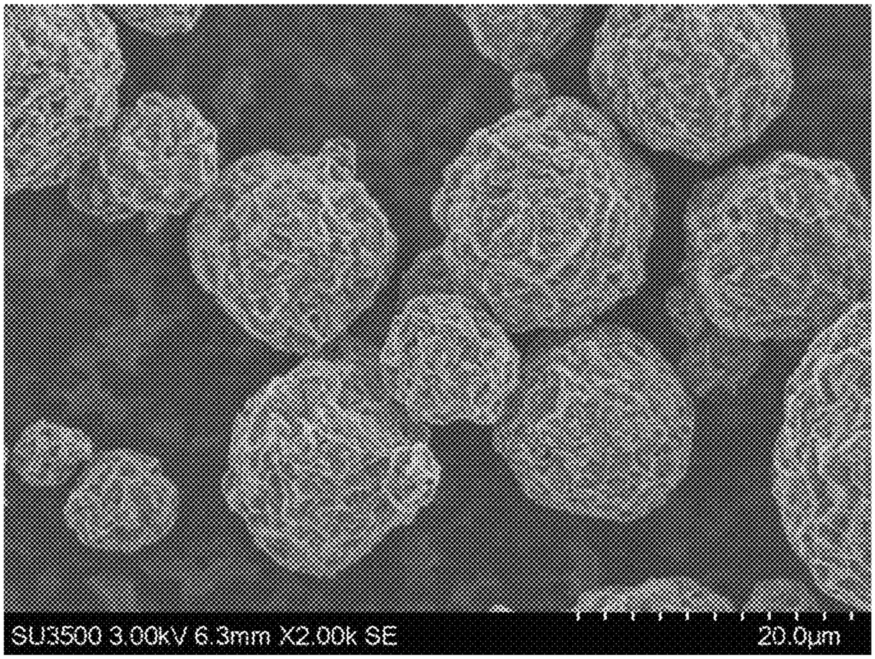

In order to more clearly define the terms and phrases used herein, the following definitions are provided. To the extent that any definition or usage provided by any document incorporated herein by reference conflicts with the definition or usage provided herein, the definition or usage provided herein controls.

A. Definitions and Explanation of Terms

Surfactant. The term "surfactant" and similar terms such as "surfactant agent", "surfactant compound", "surfactant component", or "surface active agent" and the like refer to chemical compounds or reagents capable of reducing surface tension between phases, for example, two liquid phases, a gas and a liquid phase, or a liquid and a solid phase. Many surfactant compounds contain a hydrophobic section or region and a hydrophilic section or region, for example, a polar region and a non-polar region, respectively. The hydrophilic section may include, but not necessarily, a negatively charged moiety, a positively charged moiety, or hydrogen bonding moiety (such as a hydroxyl, other oxygen-containing group, and the like), while the hydrophobic section may include, but not necessarily, an alkyl or an aromatic group. Surfactants are often characterized by the terms anionic, cationic, or nonionic, based upon whether their hydrophilic section includes a negatively charged moiety, a positively charged moiety, or hydrogen bonding moiety, respectively. Unless otherwise specified or excluded, reference to a "surfactant" in this disclosure can include cationic surfactants, nonionic surfactants, and amphoteric surfactants, and in some cases anionic surfactants which can be used in combination with a cationic surfactant, a nonionic surfactant, or amphoteric surfactant as explained herein, all of which are further described.

An "amphoteric" surfactant refers to surfactants which can include a positively charged moiety (or a moiety which can readily become positively charged by accepting a proton) and a negatively charged moiety (or a moiety which can readily become negatively charged by releasing a proton) in the same molecule. The term "zwitterionic" surfactant is used interchangeably with "amphoteric" surfactants based on the inclusion of both cationic and anionic moieties in the same molecule. In an aspect, an "amphoteric" surfactant includes a portion which can react with an acid and a portion which can react with a base. An "amphiprotic" surfactant is a type of amphoteric surfactant which either donate a proton ($H^+$) or accept a proton, examples of which is amino acids. Unless otherwise excluded, reference to an amphoteric or zwitterionic surfactant includes amphiprotic surfactants. "Amphoteric" surfactants such as amino acids may be considered a type of nonionic surfactant, however in this disclosure, the term "nonionic" surfactant is reserved for molecules which are not zwitterionic, such as poly(ethylene) glycol, poly(propylene)glycol, or cyclodextrins, whereas the term "amphoteric" surfactant is used for zwitterionic surfactants.

Heterocoagulation reagent. The terms "heterocoagulation reagent", "heterocoagulation agent", and the like are used herein to describe a compound or a composition comprising monomeric, oligomeric, or polymeric species existing in solution or as a colloidal suspension which, when combined with a colloidal clay dispersion in an appropriate ratio, forms a readily filterable solid (as defined herein). Therefore the term heterocoagulation reagent is used herein to refer to the cationic surfactants, nonionic surfactants, and amphoteric surfactants described in this disclosure, as well as to the positively charged oligomeric or polymeric metal oxide containing species termed "polymetallates" or "polyoxometallates" such as aluminum chlorhydrate (ACH) described in detail in Applicant's U.S. Patent Appl. Publ. No. 2021/0230318, which is incorporated herein by reference in its entirety. These polymetallates are also termed "cationic polymetallates". "Heterocoagulation" is a term in the art described by Lagaly in Ullmann's Encyclopedia of Chemistry 2012. Therefore, the heterocoagulation reagent may include a surfactant only, a cationic polymetallate only, or a combination of a surfactant and a cationic polymetallate.

Within the context of this disclosure, "heterocoagulation" is defined as the process by which negatively charged colloidal clay particles are combined with a heterocoagulation reagent to form a readily filterable solid, unless otherwise specified. Most, but not all, of the heterocoagulation reagents described in this disclosure are positively charged species which combine with the negatively charged colloidal clay particles to form a readily filterable solid heteroadduct. Heterocoagulation is also sometimes referred to in the art and herein as heteroaggregation, such as described by Cerbelaud et al. *Advances in Physics*: X, 2017, vol. 2, 35-53.

Heteroadduct or heterocoagulate. The terms "heteroadduct", "heterocoagulate", "coagulate", "heterocomposite", "composite", and similar terms such as "clay composite", "heterocoagulated clay" or "smectite heteroadduct" and the like refer to the contact product obtained from combining a heterocoagulation reagent disclosed herein and a colloidal clay such as a colloidal smectite clay. That is, the agglomerate formed by the attraction of negatively charged colloidal clay particles with the heterocoagulation reagents of this disclosure, such as cationic polymetallate, a surfactant as disclosed herein, or both a cationic polymetallate and a surfactant, is referred to as a "heteroadduct" or "heterocoagulate", or sometimes referred to simply as an "adduct" or "coagulate". Reference is made to Wu Cheng et al. in U.S. Pat. No. 8,642,499, which is incorporated herein by reference, who uses the term "heterocoagulation". In one aspect, these terms refer to the "readily filterable" contact product of a heterocoagulation reagent and a colloidal clay, as defined herein. These terms are used to distinguish the readily filterable heterocoagulate from the contact product of a heterocoagulation reagent and a colloidal clay which are combined in a ratio that provides a product which is not readily filterable, for example, the product formed when following a pillared clay synthesis.

The terms "heteroadduct" and "heterocoagulate" and similar terms are also used when describing the formation of a heterocoagulated clay formed from contacting a clay with a cationic polymetallate, whether contact occurs in the presence of a surfactant or in the absence of a surfactant. These heteroadducts comprising the contact product of a clay with a cationic polymetallate are described in detail in U.S. Patent Appl. Publ. No. 2021/0230318. Other heterocoagulates of this disclosure can be prepared by contacting a colloidal clay and a surfactant in the absence of a cationic polymetallate.

Accordingly, when not specified otherwise and as the context allows or requires, a "heteroadduct" or "heterocoagulate" can be a smectite clay-surfactant heteroadduct, a smectite clay-cationic polymetallate-surfactant heteroadduct, or simply a smectite clay-cationic polymetallate heteroadduct.

Polymetallate. The term "polymetallate", "cationic polymetallate", and similar terms such as "polyoxometallate", are used interchangeably in this disclosure as they are in U.S. Patent Appl. Publ. No. 2021/0230318 to refer to the water-soluble polyatomic cations that include two or more metal atoms (for example, aluminum, silicon, titanium, zirconium, or other metals) along with at least one bridging ligand between metals such as oxo, hydroxy and/or halide ligands. For clarity, the "polymetallates" of this disclosure are usually referred to herein as "cationic polymetallates". The specific ligands can depend upon the precursor and other factors, such as the process for generating the polymetallate, the solution pH, and the like. For example, the polymetallates of this disclosure can be hydrous metal oxides, hydrous metal oxyhydroxides, and the like, including combinations thereof. Bridging ligands such as oxo ligands which bridge two or more metals can occur in these species, however, polymetallates can also include terminal oxo, hydroxyl, and/or halide ligands.

While many known polymetallate species are anionic, and the suffix "-ate" is often used to reflect an anionic species, the polymetallate (polyoxometallate) species used according to this disclosure are cationic. These materials may be referred to as compounds, species, or compositions, but the person of ordinary skill in the art will understand that polymetallate compositions can contain multiple species in a suitable carrier such as in aqueous solution, depending upon, for example, the solution pH, the concentration, the starting precursor from which the polymetallate is generated in aqueous solution, and the like. For clarity and convenience, these multiple species are referred to collectively as "polymetallates" or "polyoxometallates", regardless of whether the compositions include or consist primarily of cationic polyoxometallates, polyhydroxymetallates, polyoxohydroxymetallate, or species that include other ligands such as halides, or mixtures of compounds. Examples of polymetallates include but are not limited to polyaluminum oxyhydroxychlorides, aluminum chlorhydrate (ACH), polyaluminum chloride (PAC), or aluminum sesquichlorohydrate compositions, which can include linear, cyclic or cluster compounds. These compositions are referred to collectively as polymetallates, although the term "polymetallate" or "polyoxometallate" are also used to described a composition substantially comprising a single species.

Both isopolymetallates, which contain a single type of metal, and heteropolymetallates, which contain more than one type of metal (or electropositive atoms such as phosphorus) are included in the general terms polymetallate or polyoxometallate. In a further aspect, the polymetallates according to this disclosure can be non-alkylating toward transition metal compounds such as metallocene compounds. That is, the subject polymetallates can be absent direct metal-carbon bonds as would be found in aluminoxanes or other organometallic species.

In another aspect, the polymetallate can be at least one aluminum polymetallate. Examples include, but are not limited to, aluminum chlorhydrate (ACH), also termed aluminum chlorohydrate, which encompasses multiple water soluble aluminum species, usually considered as having the general formula $Al_nCl_{3n-m}(OH)_m$. These polymetallate species can be referred to as aluminum oxyhydroxychloride compounds or compositions. Another polymetallate that can be used according to this disclosure is polyaluminum chloride (PAC), which is also not a single species, but a collection of multiple aluminum polymeric species which can include linear, cyclic, or cluster compounds, examples of which can contain from 2 to about 30 aluminum atoms, oxo, chloride, and hydroxyl groups. Other examples of aluminum polymetallates include, but are not limited to, compounds having the general formula $[Al_mO_n(OH)_xCl_y]\cdot{}_zH_2O$ such as aluminum sequichlorohydrate, and cluster-type species such as Keggin ions, for example, $[AlO_4Al_{12}(OH)_{24}(H_2O)_{12}]^{7+}\cdot 7[Cl]^-$, sometimes referred to as "$Al_{13}$-mer" polycation. Polyaluminum chloride (PAC), for example, can be produced by combining aqueous hydroxide with $AlCl_3$, and the resulting mixture of aluminum species has a range of basicities. Aluminum chlorhydrate (ACH) is generally considered the most basic, and polyaluminum chloride (PAC) being less basic.

Readily Filterable. The terms "readily filterable", "readily filtered", "easily filterable", "easily filtered or separated" and the like are used herein to describe a composition according to this disclosure in which the solids in a mixture containing a liquid phase can be separated by filtration from the liquid phase without resorting to centrifugation, ultracentrifugation, or dilute solutions of less than about 2 wt. % solids, long settling times followed by decanting the liquid away from solids, and other such techniques. The terms are generally used herein to describe the clay heteroadducts which do not require isolation by centrifugation, high dilution and settling or sedimentation tanks, or ultrafiltration. Thus, a readily filterable clay heteroadduct can be isolated or separated in good yield in a matter of minutes or less, or time periods of less than about one hour, from the soluble salts and byproducts of the synthesis, by passing a slurry comprising the heteroadduct through conventional filtering materials, such as sintered glass, metal or ceramic frits, paper, natural or synthetic matte-fiber and the like, under gravity or vacuum filtration conditions.

This disclosure provides some specific experimental and quantitative methods by which "readily filterable" can be assessed. Colloids or suspensions as described by Lagaly in *Ulmmann's Encyclopedia of Chemistry* 2012, that require long sedimentation times or ultrafiltration are not considered to be "filterable" in the context of this disclosure. For example, the readily filterable suspensions or slurries of this disclosure can afford clear filtrates upon filtration, while "non-readily-filterable" suspensions which take substantially longer to filter can contain particulate matter that is observable as a cloudy or non-clear filtrate to the naked eye, indicative of colloidal clay dispersions.

Colloid. The term "colloid", "colloidal clay", "colloidal solution", "colloidal suspension" and similar terms are used as defined by Gerhard Lagaly in *Ullmannn's Encyclopedia of Industrial Chemistry*, in the chapter entitled "Colloids", which published 15 Jan. 2007. These terms are used interchangeably.

Catalyst composition and catalyst system. Terms such as "catalyst composition," "catalyst mixture," "catalyst system," and the like are used to represent the combination of recited components which ultimately form, or are used to form, the active catalyst according to this disclosure. The use of these terms does not depend upon any specific contacting steps, order of contacting, whether any reaction may occur between or among the components, or any product which may form from any contact of any or all of the recited components. The use of these terms also does not depend upon the nature of the active catalytic site, or the fate of any co-catalyst, the metallocene compound(s), or support-activator, after contacting or combining any of these components in any order. Therefore, these and similar terms encompass the combination of initial recited components or starting components of the catalyst composition, as well as any product(s) which may result from contacting these initial recited starting components, regardless of whether the catalyst composition is heterogeneous or homogenous or includes soluble and insoluble components. The terms "catalyst" and "catalyst system" or "catalyst composition" may be used interchangeably, and such use will be apparent to the skilled person from the context of the disclosure.

Catalyst activity. Unless otherwise specified, the terms "activity", "catalyst activity", "catalyst composition activity" and the like refer to the polymerization activity of a catalyst composition comprising a dried or calcined clay heteroadduct as disclosed herein, which is typically expressed as weight of polymer polymerized per weight of catalyst clay support-activator only, absent any transition metal catalyst components such as a metallocene compound, any co-catalyst such as an organoaluminum compound, or any co-activators such as an aluminoxane, per hour of polymerization. In other words, the weight of polymer produced divided by the weight of calcined clay heteroadduct per hour, in units of g/g/hr (grams per gram per hour).

Activity of a reference or comparative catalyst composition refers to the polymerization activity of a catalyst composition comprising a comparative catalyst composition and is based upon the weight of a comparative ion-exchanged or pillared clay or other support-activator, or the weight of the clay component by itself that is used to prepare clay heteroadducts. Terms such as "increased activity" or "improved activity" describe the activity of a catalyst composition according to this disclosure which is greater than the activity of a comparative catalyst composition that uses the same catalyst components such as metallocene compound and co-catalyst, except that the comparative catalyst composition utilizes a different support-activator or activator generally, such as a pillared clay, or the clay component used in the catalytic reaction is not a heterocoagulated clay. A standard set of ethylene homopolymerization conditions which can be used to compare activities is described in the Examples.

Contact product. The term "contact product" is used herein to describe compositions wherein the components are combined together or "contacted" in any order, unless a specific order is stated or required or implied by the context of the disclosure, in any manner, and for any length of time. Although "contact product" can include reaction products, it is not required for the respective components to react with one another, and this term is used regardless of any reaction which may or may not occur upon contacting the recited components. To form a contact product, for example, the recited components can be contacted by blending or mixing or the components can be contacted by adding or combining the components in any order or simultaneously into or with a liquid carrier.

Unless otherwise stated or required, or implied by the context in which the term is used, the contacting of any components can occur in the presence or absence of any other component of the compositions described herein. Examples of contact products which would exclude certain components being used to form the contact product include the following. In some aspects, the present disclosure describes a smectite heteroadduct comprising the contact product in a first liquid carrier and specifically in the absence of various reagents, or in the absence of other specified reagents or in the absence of any other reagent, of (a) a colloidal smectite clay, and (b) a surfactant. In another example, the smectite heteroadduct can comprise the contact product in a first liquid carrier of (a) a colloidal smectite clay and (b) a surfactant, wherein the first liquid carrier consists essentially of water, an organic liquid, or a combination thereof. By describing the contact product in the first liquid carrier which consists essentially of water or an organic liquid or a combination thereof, once the smectite heteroadduct forms, additional reagents could be contacted with the smectite heteroadduct or additional reagents could be excluded from contact with the smectite heteroadduct as specified.

Combining or contacting the recited components or any additional materials can be carried out by any suitable method. Therefore, the term "contact product" includes mixtures, blends, solutions, slurries, reaction products, and the like, or combinations thereof. Similarly, the term "contacting" is used herein to refer to materials which may be blended, mixed, slurried, dissolved, reacted, treated, or otherwise contacted in some manner and in any order unless specified otherwise.

Pore diameter (pore size) and pore volume. Nitrogen adsorption/desorption measurements were used to determine pore size and pore volume distributions using the BJH (Barrett, Joyner, and Halenda) pore volume analysis method. Based upon the International Union of Pure and Applied Chemistry (IUPAC) system for classifying porous materials (see Pure & Appl. Chem., 1994, 66, 1739-1758), and Klobes et al., National Institute of Standards and Technology Special Publication 960-17, pore sizes are defined as follows. "Micropore" and "microporous" as used herein refers to pores present in catalysts or catalyst supports produced according to processes of the disclosure having a diameter of less than 20 Å. "Mesopore" and "mesoporous" as used herein refers to pores present in catalysts or catalyst supports produced according to processes of the present disclosure having a diameter in a range of from 20 Å to less than 500 Å (that is from 2 nm to <50 nm). "Macropore" and "macroporous" as used herein refers to pores present in catalysts or catalyst supports produced according to processes of the present disclosure having a diameter equal to or greater than 500 Å (50 nm).

Each of the above definitions of micropore, mesopore and macropore are considered distinct and non-overlapping, such that pores are not counted twice when summing up percentages or values in a distribution of pore sizes (pore diameter distribution) for any given sample.

The term "d50" or "D50" means the median pore diameter as measured by porosimetry. Thus, "d50" corresponds to the median pore diameter calculated based on pore size distribution and is the pore diameter above which half of the pores have a larger diameter. The d50 values reported herein are based on nitrogen desorption using the well-known calculation method described by E. P. Barrett, L. G. Joyner and P. P. Halenda ("BJH"), "The Determination of Pore Volume and Area Distributions in Porous Substances. I. Computations from Nitrogen Isotherms," *J. Am. Chem. Soc.,* 1951, 73 (1), pp 373-380.

The "median pore diameter" (MPD) can be calculated based upon, for example, volume, surface area or based on pore size distribution data. Median pore diameter calculated by volume means the pore diameter above which half of the total pore volume exists. Median pore diameter calculated by surface area means that pore diameter above which half of the total pore surface area exists. Similarly, median pore diameter calculated based on pore size distribution means the pore diameter above which half of the pores have a larger diameter according to the pore size distribution determined as described elsewhere herein, for example, through derivation from nitrogen adsorption-desorption isotherms.

Transition metal catalyst. A "transition metal catalyst" refers to a transition metal compound or composition which can function as, or be transformed into, an active olefin polymerization catalyst when contacted with the support-activator of this disclosure, either in its current form or when contacted with a co-catalyst which is capable of transferring or imparting a polymerization-activatable ligand to the transition metal catalyst. Therefore, "transition metal catalyst" includes transition metal species which can function as a catalyst and transition metal species which are "precatalysts" or "procatalyts" in that they can be transformed into a composition which can function as a catalyst.

The use of the term "catalyst" is not intended to reflect any specific mechanism or that the "transition metal catalyst" itself represents an active site for catalytic polymerization when it is activated or when it has been imparted with a polymerization-activatable ligand. The transition metal catalyst is described according to the transition metal compound or compounds used in the process for preparing a polymerization catalyst, and can include metallocene compounds and defined herein, and related compounds.

Co-catalyst. A "co-catalyst" is used herein to refer to a chemical reagent, compound, or composition which is capable of imparting a ligand to the transition metal compound such as a metallocene which can initiate polymerization when the metallocene is otherwise activated with the support-activator. In other words, the "co-catalyst" is used herein to refer to a chemical reagent, compound, or composition which is capable of providing a polymerization-activatable ligand to a metallocene compound. Polymerization-activatable ligands include, but are not limited to, hydrocarbyl groups such as alkyls such as methyl or ethyl, aryls and substituted aryls such as phenyl or tolyl, substituted alkyls such as benzyl or trimethylsilylmethyl ($—CH_2SiM_3$), hydride, silyl and substituted groups such as trimethylsilyl, and the like. Therefore, in an aspect, a co-catalyst can be an alkylating agent, a hydrating agent, a silylating agent, and the like. There are no limitations as to the mechanism by which the co-catalyst provides a polymerization-activatable ligand to the metallocene compound. For example, the co-catalyst can engage in a metathesis reaction to exchange an exchangeable ligand such as a halide or alkoxide on the metallocene compound with a polymerization-activatable/initiating ligand such as methyl or hydride. In an aspect, the co-catalyst is an optional component of the catalyst composition, for example, when the metallocene compounds already includes a polymerization-activatable/initiating ligand such as methyl or hydride. In another aspect, and as understood by the person skilled in the art, even when the metallocene compound includes a polymerization-activatable ligand, a co-catalyst can be used for other purposes, such as to scavenge moisture from the polymerization reactor or process. According to a further aspect and as the context requires or allows, the term "co-catalyst" may refer to an "activator" which may be used interchangeably with "co-catalyst" as explained herein.

Activator. An "activator", as used herein, refers generally to a substance that is capable of converting a metallocene component into an active catalyst system which can polymerize olefins, and is intended to be independent of the mechanism by which such activation occurs. An "activator" can convert the contact product of a metallocene component and a component that provides an activatable ligand (such as an alkyl or a hydride) to the metallocene, for example, when the metallocene compound does not already comprise such a ligand, into a catalyst system which can polymerize olefins. This term is used regardless of the actual activating mechanism. Illustrative activators can include, but are not limited to a support-activator, aluminoxanes, organoboron or organoborate compounds, ionizing compounds such as ionizing ionic compounds, and the like. Aluminoxanes, organoboron or organoborate compounds, and ionizing compounds may be referred to as "activators" or "co-activators” when used in a catalyst composition in which a support-activator is present, but the catalyst composition is supplemented by one or more aluminoxane, organoboron, organoborate, ionizing compounds, or other co-activators.

Support-Activator. The term “support-activator” as used herein, refers to an activator in a solid form, such as ion-exchanged-clays, protic-acid-treated clays, or pillared clays, and similar insoluble activators which also functions as a support. When the support-activator is combined with a metallocene with an activatable ligand or optionally with a metallocene and a co-catalyst which can provide an activatable ligand, provides a catalyst system which can polymerize olefins. Therefore, the smectite heteroadducts according to this disclosure are support-activators.

Ion-exchanged clay. The term “ion-exchanged clay” as used herein and as understood by the person skilled in the art refers to a clay in which the exchangeable ions of a naturally-occurring or synthetic clay have been replaced by or exchanged with another selected ion or ions. Ion exchange can occur by treatment of the naturally-occurring or synthetic clay with a source of the selected cation, usually from concentrated ionic solutions such as 2 N aqueous solutions of the cation, including through multiple exchange steps, for example, three exchange steps. The exchanged clay can be subsequently washed several times with deionized water to remove excess ions produced by the treatment process, for example as described in Sanchez, et al., Colloids and Surfaces A: Physicochemical and Engineering Aspects, 2013, 423, 1-10, and Kawamura et al., *Clay and Clay Minerals,* 2009, 57(2), 150-160. Generally, centrifugation is used to isolate the clay from solution between ion treatments and washings.

Metallocene compound. The term “metallocene” or “metallocene compound” as used herein, describes a transition metal or lanthanide metal compound comprising at least one substituted or unsubstituted cycloalkadienyl-type ligand or alkadienyl-type ligand, including heteroatom analogs thereof, regardless of the specific bonding mode, for example, regardless of whether the cycloalkadienyl-type ligand or alkadienyl-type ligand are bonded to the metal in an $\eta^5$-, $\eta^3$-, or $\eta^1$-bonding mode, and regardless of whether more than one of these bonding modes is accessible by such ligands. In this disclosure, the term “metallocene” is also used to refer to a compound comprising at least one pi-bonded allyl-type ligand in which the $\eta^3$-allyl is not part of a cycloalkadienyl-type or alkadienyl-type ligand, which can be used as the transition metal compound component of the catalyst composition described herein. Therefore, “metallocene” includes compounds with substituted or unsubstituted $\eta^3$ to $\eta^5$-cycloalkadienyl-type and $\eta^3$ to $\eta^5$-alkadienyl-type ligands, $\eta^3$-allyl-type ligands, including heteroatom analogs thereof, and including but not limited to cyclopentadienyl ligands, indenyl ligands, fluorenyl ligands, $\eta^3$-allyl ligands, pentadienyl ligands, boratabenzenyl ligands, 1,2-azaborolyl ligands, 1,2-diaza-3,5-diborolyl ligands, substituted analogs thereof, and partially saturated analogs thereof. Partially saturated analogs include compounds comprising partially saturated $\eta^5$-cycloalkadienyl-type ligands, examples of which include but are not limited to tetrahydroindenyl, tetrahydrofluorenyl, octahydrofluorenyl, partially saturated indenyl, partially saturated fluorenyl, substituted analogs thereof, and the like. In some contexts, the metallocene is referred to simply as the “catalyst,” in much the same way the term “co-catalyst” is used herein to refer to, for example, an organoaluminum compound. Therefore, a metallocene ligand can be considered in this disclosure to include at least one substituted or at one unsubstituted cyclopentadienyl, indenyl, fluorenyl, tetrahydroindenyl, tetrahydrofluorenyl, octahydrofluorenyl, pentadienyl, allyl, boratabenzenyl, 1,2-azaborolyl, or 1,2-diaza-3,5-diborolyl ligand, including substituted analogs thereof. For example, any substituent can be selected independently from a halide, a $C_1$-$C_{20}$ hydrocarbyl, a $C_1$-$C_{20}$ heterohydrocarbyl, a $C_1$-$C_{20}$ organoheteryl, a fused $C_4$-$C_{12}$ carbocyclic moiety, or a fused $C_4$-$C_{11}$ heterocyclic moiety having at least one heteroatom selected independently from nitrogen, oxygen, sulfur, or phosphorus.

Organoaluminum compounds and organoboron compounds. The terms organoaluminum compound and an organoboron compounds as used herein include neutral compounds such as $AlMe_3$ and $BEt_3$ and also include anionic complexes such as $LiAlMe_4$, $LiAlH_4$, $NaBH_4$, and $LiBEt_4$, and the like. Thus, unless otherwise specified, hydride compounds of aluminum and boron are included in the definitions of organoaluminum and organoboron compounds, respectively, whether the compound is neutral or anionic.

Pillared clay. In this disclosure, a “pillared clay” is defined as a clay species in which ordered layers with basal spacing are substantially greater than 9 Å to 13 Å. When a powder clay sample is analyzed using an X-ray diffraction apparatus capable of scanning 2θ angles of 2° or greater, species containing such pillared ordering are typically observed to possess a substantial peak at 2θ values between 2° to 9°. These are typically prepared by introduction of a pillaring agent, for example, an oxygen-containing inorganic cation such as an oxygen-containing cation of lanthanum, aluminum, or iron. Aluminum pillared clays are often prepared by contacting the pillaring agent with the clay in an amount ranging from about 5 mmol Al/g clay or 6 mmol Al/g clay, up to about 30 mmol Al/g clay.

Intercalated. The terms “intercalated” or “intercalation” are terms of the art which indicate insertion of a material into the interlayers of a clay substrate. The terms are used herein in the manner understood by the person of skill in the art, and as described in U.S. Pat. No. 4,637,992, unless otherwise noted.

Basal spacing. The term “basal spacing”, “basal d001 spacing”, or “d001 spacing” when used in the context of smectite clays such as montmorillonite, refers to the distance, usually expressed in angstroms or nanometers, between similar faces of adjacent layers in the clay structure. Thus, for example, in the 2:1 family of smectite clays, including montmorillonite, the basal distance is the distance from the top of a tetrahedral sheet to the top of the next tetrahedral sheet of an adjacent 2:1 layer and including the intervening octahedral sheet, with or without modification or pillaring. Basal spacing values are measured using X-ray diffraction analysis (XRD) of the d001 plane. Natural montmorillonite as found for example in bentonite, has a basal spacing range of from about 12 Å to about 15 Å. (See, for example, Fifth National Conference on Clays and Clay Minerals, National Academy of Sciences, National Research Council, Publication 566, 1958: Proceedings of the Conference: “Heterogeneity In Montmorillonite”, J. L. McAtee, Jr., pp. 279-88 and Table 1 at p. 282.) The XRD test method for determining basal spacing is described in: Pillared Clays and Pillared Layered Solids, R. A. Schoonheydt et al., *Pure Appl. Chem.,* 71(12), 2367-2371, (1999); and U.S. Pat. No. 5,202,295 (McCauley) at column 27, lines 22-43.

Zeta potential. The term “zeta potential” as used herein refers to the difference in electrical potential between the juncture of the Stern layer (a layer of firmly-attached counterions which forms to neutralize the surface charge of a colloidal particle) and diffuse layer (a cloud of loosely attached ions residing farther from the particle surface than the Stern layer), and the bulk solution or slurry. This property is expressed in units of voltage, for example millivolts (mV). Zeta potential can be derived by quantifying the "Electrokinetic Sonic Amplitude Effect" (ESA), which is the generation of ultrasound waves as a result of applying an electric potential across a colloidal suspension, as described in U.S. Pat. No. 5,616,872, which is incorporated herein by reference.

Hydrocarbyl group. As used herein, the term "hydrocarbyl" group is used according to the art-recognized IUPAC definition, as a univalent, linear, branched, or cyclic group formed by removing a single hydrogen atom from a parent hydrocarbon compound. Unless otherwise specified, a hydrocarbyl group can be aliphatic or aromatic; saturated or unsaturated; and can include linear, cyclic, branched, and/or fused ring structures; unless any of these are otherwise specifically excluded. See IUPAC *Compendium of Chemical Terminology,* $2^{nd}$ Ed (1997) at 190. Examples of hydrocarbyl groups include, but are not limited to, aryl, alkyl, cycloalkyl, alkenyl, cycloalkenyl, cycloalkadienyl, alkynyl, aralkyl, aralkenyl, and aralkynyl groups and the like.

Heterohydrocarbyl group. The term "heterohydrocarbyl" group is used in this disclosure to encompass a univalent, linear, branched, or cyclic group, formed by removing a single hydrogen atom from a carbon atom of a parent "heterohydrocarbon" molecule in which at least one carbon atom is replaced by a heteroatom. The parent heterohydrocarbon can be aliphatic or aromatic. Examples of "heterohydrocarbyl" groups include halide-substituted, nitrogen-substituted, phosphorus-substituted, silicon-substituted, oxygen-substituted, and sulfur-substituted hydrocarbyl groups in which a hydrogen has been removed form a carbon atom to generate a free valence. Examples of heterohydrocarbyl groups include, but are not limited to, $—CH_2OCH_3$, $—CH_2SPh$, $—CH_2NHCH_3$, $—CH_2CH_3NMe_2$, $—CH_2SiMe_3$, $—CMe_2SiMe_3$, $—CH_2(C_6H_4\text{-}4\text{-}OMe)$, $—CH_2(C_6H_4\text{-}4\text{-}NHMe)$, $—CH_2(C_6H_4\text{-}4\text{-}PPh_2)$, $—CH_2CH_3PEt_2$, $—CH_2Cl$, $—CH_2(2,6\text{-}C_6H_3Cl_2)$, and the like.

Heterohydrocarbyl encompasses both heteroaliphatic groups (including saturated and unsaturated groups) and heteroaromatic groups. Therefore, heteroatom-substituted vinylic groups, heteroatom-substituted alkenyl groups, heteroatom-substituted dienyl groups, and the like are all encompassed by heterohydrocarbyl groups.

Organoheteryl group. The term "organoheteryl" group is also used in accordance with its art-recognized IUPAC definition, as univalent group containing carbon, which is thus organic, but which has its free valence at an atom other than carbon. See IUPAC *Compendium of Chemical Terminology,* $2^{nd}$ Ed (1997) at 284. An organoheteryl group can be linear, branched, or cyclic, and includes such common groups as alkoxy, aryloxy, organothio (or organylthio), organogermanium (or organylgermanium), acetamido, acetonylacetanato, alkylamido, dialkylamido, arylamide, diarylamido, trimethylsilyl, and the like. Groups such as —OMe, —OPh, —S(tolyl), —NHMe, $—NMe_2$, $—N(aryl)_2$, $—SiMe_3$, $—PPh_2$, $—O_3S(C_6H_4)Me$, $—OCF_2CF_3$, $—O_2C(alkyl)$, $—O_2C(aryl)$, —N(alkyl)CO(alkyl), —N(aryl)CO(aryl), $—N(alkyl)C(O)N(alkyl)_2$, hexafluoroacetonylacetanato, and the like.

Organyl group. An organyl group is used in this disclosure in accordance with the IUPAC definition to refer to any organic substituent group, regardless of functional type, having one free valence at a carbon atom, e.g. $CH_3CH_2—$, $ClCH_2C—$, $CH_3C(=O)—$, 4-pyridylmethyl, and the like. An organyl group can be linear, branched, or cyclic, and the term "organyl" may be used in conjunction with other terms, as in organylthio- (for example, MeS—) and organyloxy.

Heterocyclyl group. The IUPAC Compendium compares organyl groups to other groups such as heterocyclyl groups and organoheteryl groups. These terms are set out in the IUPAC *Compendium of Chemical Terminology,* $2^{nd}$ Ed (1997) as follows, which demonstrates the convention to associate the "-yl" suffix on the portion of the molecule or group that bears the valence from the missing hydrogen. Thus, heterocyclyl groups are defined as univalent groups formed by removing a hydrogen atom from any ring atom of a heterocyclic compound. For example, both a piperidin-1-yl group and a piperidin-2-yl group shown below, wherein the lines drawn from the nitrogen atom or carbon atom represent an open valence and not a methyl group, are heterocyclyl groups.

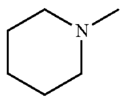

piperidin-1-yl

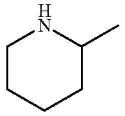

piperidin-2-yl

However, the piperidin-1-yl group is also considered an organoheteryl group, whereas the piperidin-2-yl group is also considered a heterohydrocarbyl group. Thus, the valence of a "heterocyclyl" can occur on any appropriate cyclic atom, whereas the valence of a "organoheteryl" occurs on a heteroatom and the valence of a heterohydrocarbyl occurs on a carbon atom.

Hydrocarbylene group and hydrocarbylidene group. A "hydrocarbylene" group is also defined according to its ordinary and customary meaning, as set out in the IUPAC *Compendium of Chemical Terminology,* $2^{nd}$ Ed (1997), as a divalent group formed by removing two hydrogen atoms from a hydrocarbon, the free valencies of which are not engaged in a double bond. Examples of hydrocarbylene groups include, for example, 1,2-phenylene, 1,3-phenylene, 1,3-propandiyl ($—CH_2CH_2CH_2—$), cyclopentylidene ($=CC_4H_8$), or methylene which is bridging ($—CH_2—$) and does not form a double bond. A hydrocarbylene group in which the free valencies are not engaged in a double bond is distinguished from a hydrocarbylidene group such as an alkylidene group.

A "hydrocarbylidene" group is a divalent group formed upon a hydrocarbon by removing two hydrogen atoms from the same carbon atom, the free valencies of which are part of a double bond. An alkylidene group is an exemplary hydrocarbylidene and is defined as a divalent group formed upon an alkane by removing two hydrogen atoms from the same carbon atom, the free valencies of which are part of a double bond. Examples of alkylidene groups such as =CHMe, CHEt, $=CMe_2$, =CHPh, or methylene in which the methylene carbon forms a double bond ($=CH_2$).

Heterohydrocarbylene group and heterohydrocarbylidene group. The term "heterohydrocarbylene" group, by analogy to hydrocarbylene group, is used to refer to a divalent group formed by removing two hydrogen atoms from a parent heterohydrocarbon molecule, the free valencies of which are not engaged in a double bond. The hydrogen atoms can be removed from two carbon atoms, two heteroatoms, or one carbon and one heteroatom, such that the free valencies are not engaged in a double bond. Examples of "heterohydrocarbylidene" groups include but are not limited to $—CH_2OCH_2—$, $—CH_2NPhCH_2—$, $—SiMe_2(1,2\text{-}C_6H_4)SiMe_2\text{-}$, $—CMe_2SiMe_2\text{-}$, $—CH_2NCMe_3\text{-}$, $—CH_2CH_2PMe\text{-}$, $—CH_2[1,2\text{-}C_6H_3(4\text{-}OMe)]CH_2—$, —and the like.

By analogy to a hydrocarbylidene, a "heterohydrocarbylidene" group is a divalent group formed upon a heterohydrocarbon by removing two hydrogen atoms from the same carbon atom, the free valencies of which are part of a double bond. Examples of heterohydrocarbylidene groups include, but are not limited to groups such as $=CHNMe_2$, $=CHOPh$, $=CMeNMeCH_2Ph$, $=CHSiMe_3$, $=CHCH_2Cl$, and the like.

Halide and halogen. The terms "halide" and "halogen" are used herein to refer to the ions or atoms of fluorine, chlorine, bromine, or iodine, individually or in any combination, as the context and chemistry allows or dictates. These terms may be used interchangeably regardless of charge or the bonding mode of these atoms.

Polymer. The term "polymer" is used herein generically to include olefin homopolymers, copolymers, terpolymers, and so forth. A copolymer is derived from an olefin monomer and one olefin comonomer, while a terpolymer is derived from an olefin monomer and two olefin comonomers. Accordingly, "polymer" encompasses copolymers, terpolymers, and the like, derived from any olefin monomer and comonomer(s) disclosed herein. Similarly, an ethylene polymer would include ethylene homopolymers, ethylene copolymers, ethylene terpolymers, and so forth. Therefore, an olefin copolymer, such as an ethylene copolymer, can be derived from ethylene and a comonomer, such as propylene, 1-butene, 1-hexene, or 1-octene. If the monomer and comonomer were ethylene and 1-hexene, respectively, the resulting polymer would be categorized an as ethylene/1-hexene copolymer. In like manner, the term "polymerization" includes homopolymerization, copolymerization, terpolymerization, and so forth. For example, a copolymerization process includes contacting one olefin monomer such as ethylene and one olefin comonomer such as 1-hexene to produce a copolymer. Well-known abbreviations for polyolefin types, such as "HDPE" for high density polyethylene, may be used herein. Furthermore, unless otherwise expressly stated, the term polymer is not limited by molecular weight and therefore encompasses both lower molecular weight polymers, sometimes referred to as oligomers, as well as higher molecular weight polymers.

Procatalyst or Precatalyst. The term "procatalyst" or "precatalyst" as used herein means a compound that is capable of polymerizing, oligomerizing or hydrogenating olefins when activated by an aluminoxane, borane, borate or other acidic activator, whether a Lewis acid or a Brønsted acid, or when activated by a support-activator as disclosed herein.

Additional Explanations of Terms. The following additional explanations of terms are provided to fully disclosed aspects of the disclosure and claims.

Several types of numerical ranges are disclosed herein, including but not limited to, numerical ranges of a number of atoms, basal spacings, weight ratios, molar ratios, percentages, temperatures, and so forth. When disclosing or claiming a range of any type, Applicant's intent is to disclose or claim individually each possible number that such a range could reasonably encompass, consistent with the written description and the context, and including the end points of the range and any sub-ranges and combinations of sub-ranges encompassed therein. For example, when the Applicant discloses or claims a chemical moiety that has a certain number of carbon atoms, such as a C1 to C12 (or $C_1$ to $C_{12}$) alkyl group, or in alternative language having from 1 to 12 carbon atoms, the Applicant's intent is to refer to a moiety that can be selected independently from an alkyl group having 1, 2, 3, 4, 5, 6, 7, 8, 9, 10, 11, or 12 carbon atoms, as well as any range between these two numbers (for example, a $C_1$ to $C_6$ alkyl group), and also including any combination of ranges between these two numbers (for example, a $C_2$ to $C_4$ and $C_6$ to $C_8$ alkyl group). Applicants reserve the right to proviso out or exclude any individual members of any such range or group, including any sub-ranges or combinations of sub-ranges within the group, that can be claimed according to a range or in any similar manner, if for any reason Applicants choose to claim less than the full measure of the disclosure, for example, to account for a reference that Applicants may be unaware of at the time of the filing of the application.

In another aspect, any range of numbers recited in the specification or claims, such as that representing a particular set of properties, units of measure, conditions, physical states or percentages, is intended to literally incorporate expressly herein by reference or otherwise, any number falling within such range, including any subset of numbers within any range so recited. For example, whenever a numerical range with a lower limit, RL, and an upper limit RU, is disclosed, any number R falling within the range is specifically disclosed. In particular, the following numbers R within the range are specifically disclosed:

$$R=RL+k(RU-RL),$$

wherein k is a variable ranging from 1% to 100% with a 1% increment, e.g., k is 1%, 2%, 3%, 4%, 5% . . . 50%, 51%, 52% . . . 0.95%, 96%, 97%, 98%, 99%, or 100%. Moreover, any numerical range represented by any two values of R, as calculated above is also specifically disclosed.

For any particular compound disclosed herein, any general or specific structure presented also encompasses all conformational isomers, regioisomers, and stereoisomers that may arise from a particular set of substituents, unless stated otherwise. Similarly, unless stated otherwise, the general or specific structure also encompasses all enantiomers, diastereomers, and other optical isomers whether in enantiomeric or racemic forms, as well as mixtures of stereoisomers, as would be recognized by a skilled artisan.

Unless otherwise stated, values or ranges may be expressed in this disclosure using the term "about", for example, "about" a stated value, greater than or less than "about" a stated value, or in a range of from "about" one value to "about" another value. When such values or ranges are expressed, other embodiments disclosed include the specific recited value, a range between specific recited values, and other values close to the specific recited value. In an aspect, use of the term "about" means ±15% of the stated value, ±10% of the stated value, ±5% of the stated value, or +3% of the stated value. For example, when the term "about" is used as a modifier for, or in conjunction with, a variable, characteristic or condition, it is intended to convey that the numbers, ranges, characteristics and conditions disclosed herein are sufficiently flexible that practice of this disclosure by those skilled in the art using temperatures, rates, times, concentrations, amounts, contents, properties such as basal spacing, size, including pore size, pore volume, surface area, and the like that are somewhat outside of the stated range or different from a single stated value, may achieve the desired results as described in the application, such as the preparation of porous catalyst carrier particles having defined characteristics and their use in preparing active olefin polymerization catalysts and olefin polymerization processes using such catalysts.

The terms "a," "an," "the", and the like (such as "this") are intended to include plural alternatives such as at least one, unless otherwise specified. For example, the disclosures of "a support-activator," "an organoaluminum compound," or "a metallocene compound" are meant to encompass one, or mixtures or combinations of more than one ("at least one"), catalyst support-activator, organoaluminum compound, or metallocene compound, respectively.

The term "comprising" and variations thereof such as "comprises", "comprised of", "having", "including," and the like, as recited in transitional phrases or the specification, are inclusive and open-ended and do not exclude additional, unrecited elements or method steps. The transitional phrase "consisting of" and variations thereof exclude any element, step, or ingredient not specified in the claim. The transitional phrase "consists essentially of" limits the scope of the claim to the specified components or steps and those that do not materially affect the basic and novel characteristics of the claimed invention. Unless otherwise indicated, describing a compound or composition as "consisting essentially of" should not be construed as "comprising," as this phrase is intended to describe the recited component that includes materials which do not significantly alter composition or method to which the term is applied. For example, a precursor or catalyst component can consist essentially of a material which can include impurities commonly present in a commercially produced sample of the material when prepared by a certain procedure.

When compositions or processes are described in terms of "comprising" various components or steps, the compositions and processes can also "consist essentially of" or "consist of" the various components or process steps.

When a claim includes different features and/or feature classes (for example, a method step, feedstock features, and/or product features, among other possibilities), the transitional terms comprising, consisting essentially of, and consisting of apply only to feature class to which is utilized and it is possible to have different transitional terms or phrases utilized with different features within a claim. For example a method can comprise several recited steps (and other non-recited steps) but utilize a catalyst system preparation consisting of specific or alternatively consisting essentially of specific steps but utilize a catalyst system comprising recited components and other non-recited components.

Unless otherwise defined with respect to a specific property, characteristic or variable, the terms "substantial" and "substantially" as applied to any criteria such as a property, characteristic or variable, means to meet the stated criteria in sufficient measure that one skilled in the art would understand that the benefit to be achieved, or the condition or property value desired is met. For example, the term "substantially" may be used when describing a metallocene catalyst or catalyst system which is substantially free of or substantially absent an aluminoxane, a borate activator, a protic-acid-treated clay, or a pillared clay. In other words, the terms "substantial" and "substantially" serve reasonably to describe the subject matter so that its scope will be understood by persons skilled in the relevant art and to distinguish the claimed subject matter from any prior art. In one aspect, "substantially free" can be used to describe a composition in which none of the recited component the composition is substantially free of was added to the composition, and only impurity amounts such as amounts derived from the purity limits of the other components or generated as a byproduct are present. In a further aspect, when a composition is said to be "substantially free" of a particular component, the composition may have less than 10 wt. % of the component, less than 5 wt. % of the component, less than 3 wt. % of the component, less than 2 wt. % of the component, less than 1 wt. % of the component, less than 0.5 wt. % of the component, or less than 0.1 wt. % of the component.

The terms "optionally", "optional" and the like with respect to a claim element are intended to mean that the subject element is required, or alternatively, is not required, and both alternatives are intended to be within the scope of the claim, and it is envisioned that the claim can encompass either or both alternatives.

References to the Periodic Table or groups of elements within the Periodic Table refer to the Periodic Table of the Elements, published by the International Union of Pure and Applied Chemistry (IUPAC), published on-line at http://old.iupac.org/reports/periodic_table/; version dated 19 Feb. 2010. Reference to a "group" or "groups" of the Periodic Table as reflected in the Periodic Table of Elements using the IUPAC system for numbering groups of elements as Groups 1-18. To the extent that any Group is identified by a Roman numeral according, for example, to the Periodic Table of the Elements as published in "Hawley's Condensed Chemical Dictionary" (2001) (the "CAS" system) it will further identify one or more element of that Group so as to avoid confusion and provide a cross-reference to the numerical IUPAC identifier.

Various patents, publications and documents are disclosed and referenced herein. Each reference cited in this disclosure is incorporated herein by reference in its entirety, whether a patent, a publication, or other document, and unless otherwise indicated.

References which may provide some background information related to this disclosure include, for example, U.S. Pat. Nos. 4,169,926; 5,135,756; 5,308,811; 6,034,187; 6,531,552; 6,825,371; 6,838,507; 6,927,261; 7,220,695; 7,732,542; 8,642,499; and 9,200,093; each of which is incorporated by reference herein in its entirety. Additional publications which may provide some background information related to this disclosure include: *Materials Research* 2015, 18(2), 283-287; *Ceramica,* 1999, 45(295), 133-136; *Langmuir* 2005, 21(19), 8717-8723; *Macromolecular Reaction Engineering* 2017, 11(2), 1600017; and *Clay Minerals* 2003, 38(1), 127-138; each of which is incorporated by reference herein in its entirety.

B. General Description

The support-activators of this disclosure can be formed by contacting an expanding-type clay such as smectite or dioctahedral smectite clay or a preformed smectite clay-cationic polymetallate heteroadduct with a surfactant in a liquid carrier, and there are several embodiments or aspects for the method and the resulting heteroadducts. For example, there is provided a method of making a support-activator comprising a smectite heteroadduct, the method comprising or consisting essentially of contacting in a first liquid carrier: (a) a colloidal smectite clay; and (b) a surfactant, wherein the surfactant comprises or is selected from a cationic surfactant, a nonionic surfactant, an amphoteric surfactant, or any combination thereof to provide a slurry of the smectite heteroadduct in the first liquid carrier. This process can optionally involve the further addition of other reagents such as cationic polymetallates or metal oxides, however, the contacting step also may occur in absence of specific reactants as described hereinabove. For example, the contacting step may be carried out in the absence of a cationic polymetallate and other reactants, or the contacting step can be carried out in the absence of any other reactant, except for the surfactant. An unexpected advantage of the disclosed method for making a support-activator is the observation that it provides the smectite heteroadduct in the form of desirable, highly spherical particles that are used to form highly spherical catalyst particles.

In another aspect, this disclosure provides a method of making a support-activator comprising a smectite heteroadduct, the method comprising or consisting essentially of contacting in any order in a first liquid carrier: (a) a colloidal smectite clay; (b) a cationic polymetallate; and (c) a surfactant comprising or selected from a cationic surfactant, a nonionic surfactant, an amphoteric surfactant, or any combination thereof, to provide a slurry of the smectite heteroadduct in the first liquid carrier. This process can optionally involve the further addition of other reagents if desired, however, this contacting step also may occur in absence of specific reactants as described herein or in the absence of any other reactant if desired.

According to a further aspect, this disclosure provides for preforming a clay-cationic polymetallate heteroadduct, preparing an aqueous spray-drying slurry of a preformed or isolated clay-cationic polymetallate heteroadduct, which includes a surfactant in the aqueous spray-drying slurry. The resulting heteroadducts can be spray-dried from an aqueous slurry in the absence of an organic dispersion medium or in the absence of an organic liquid (except for the surfactant), to provide highly spherical support-activators. This process also may optionally involve the addition of other reagents if desired, however, this contacting step also may occur in absence of specific reactants as described herein or in the absence of any other reactant if desired.

The heterocoagulates produced according to the disclosed process can be conveniently isolated through simple filtration, and subsequently dried and calcined to provide a support-activator that is useful to support and activate metallocene catalysts towards olefin polymerization. It has been unexpectedly discovered that the calcined surfactant supports described herein possess improved porosity relative to calcined clays and calcined clay-polymetallate mixtures, even when dried by spray-drying from an aqueous slurry. When attempting to maintain the porosity of an isolated contact product of a clay and a polymetallate during the drying process, methods such as azeotropically removing the water using an organic liquid are often required to maintain porosity. However, in the present clay-surfactant heteroadducts, substantial BJH porosity remains when spray dried in the absence of an organic dispersion liquid.

Conventional treatments to activate the aforementioned clays to provide a clay-based support-activator include contacting the clay with mineral acids such as hydrochloric acid or sulfuric acid, which can include a surfactant treatment (see, for example, U.S. Pat. No. 7,220,695). However, these treatments can reduce the structural integrity of the clay, likely because in the process of acidifying the clay, the clay structure itself is destroyed through peptization, such as is described in *Clay Minerals,* 2003, 38(1), 127-138. However, acids are generally believed to be necessary to activate the clay, therefore previous approaches to addressing the stability of the resulting support-activator have not entirely removed the acid treatment. The Applicant has unexpectedly discovered that acids are unnecessary and even undesirable, as the subject clays can be activated entirely in the absence of acids such as hydrochloric acid or sulfuric acid, to provide highly active support-activators having greater structural integrity.

In the Applicant's previous patent applications, published as U.S. Patent Appl. Publ. No. 2021/0230318 and International Appl. Publ. No. WO 2021/154204, smectite clays were contacted with cationic polymetallates, including in the presence of surfactants, to form heteroadducts which when calcined function as highly active support-activators for metallocenes. In an aspect, the Applicant has unexpectedly discovered that cationic polymetallates are also unnecessary, as the subject clays can be activated in the presence of surfactants but in the absence of cationic polymetallates such as aluminum chlorhydrate (ACH), polyaluminum chloride (PAC), or aluminum sesquichlorohydrate compositions, and still provide highly active support-activators having desirable structural properties. The resulting support-activators have a high porosity, particle uniformity, and high particle sphericity.

To provide a measure of consistency and uniformity to a catalyst prepared from the support-activator and any resulting polymer, and due to the sensitivity of supported metallocene catalysts to moisture, the support-activators can be calcined or otherwise dried to control any residual moisture present in the support. However, calcination of prior support-activators have been known to result in a significant reduction in the support-activator porosity. While not intending to be theory-bound, it is thought that as the clay layers become swollen with liquid carrier molecules under the support-activator preparation conditions, but they subsequently tend to collapse as the liquid molecules are removed under high temperature.

In this disclosure, the introduction of bulky ionic or nonionic surfactant molecules as described herein imparts improved thermal stability to these clay-based support-activators. While not intending to be bound by any theory of the mechanism by which this occurs, it is thought that the surfactant molecules or surfactant cations can intercalate between the clay layers, acting as pillars to support the layered structure, even in the absence of other prior activating components such as acids or polymetallates.

It has further been unexpectedly discovered that the calcined surfactant-clay supports described herein possess improved olefin polymerization activity relative to their calcined clay or calcined clay-polymetallate analogs. Again, while not wishing to be bound by theory, the enhanced porosity obtained by combination of surfactants and clay is thought to enable the metallocene to access and form more catalytically active sites. These improved activities and properties of the surfactant-clay support-activators are economically desirable and provide a substantial advantage towards using them in olefin catalysis processes.

Accordingly, in one aspect, this disclosure provides a support-activator comprising a smectite heteroadduct which can be calcined, in which the smectite heteroadduct comprises or consists essentially of the isolated contact product in a first liquid carrier of (a) a colloidal smectite clay and (b) a surfactant reagent comprising or selected from [i] a cationic surfactant, [ii] a nonionic surfactant, or [iii] an amphoteric surfactant, or any combination thereof.

C. Colloidal Smectite Clays

In addition to the Definitions section, the following disclosure provides additional information related to the smectite clays.

An expanding-type clay, such as smectite or the 2:1 dioctahedral smectite clay, or a combination of expanding-type clays, can be used in the preparation of the support-activator described herein. These expanding-type clays may be described as phyllosilicates or phyllosilicate clays, because certain members of the clay minerals group of the phyllosilicates can be used. Suitable starting clays can include layered, naturally occurring or synthetic smectites. Starting clays can also include the dioctahedral smectite clays. Further, suitable starting clays may also include clays such as montmorillonites, sauconites, nontronites, hectorites, beidellites, saponites, bentonites, or any combination thereof. Smectites are 2:1 layered clay minerals that carry a lattice charge and can expand when solvated with water and alcohols. Therefore, suitable starting clays can include, for example, the monocation exchanged, dioctahedral smectites, such as the lithium-exchanged clays, sodium-exchanged clays, or potassium-exchanged clays, or a combination thereof.

Water can also be coordinated to the layered clay structural units, either associated with the clay structure itself or coordinated to the cations as a hydration shell. When dehydrated, the 2:1 layered clays have a repeat distance or d001 basal spacing of from about 9 Å (Angstrom) to about 12 Å (Angstrom) in the powder X-ray Diffraction (XRD); or alternatively, in a range of from about 10 Å (Angstrom) to about 12 Å (Angstrom) in the powder X-ray Diffraction (XRD).

The layered smectite clays are termed 2:1 clays, because their structures are "sandwich" structures which include two outer sheets of tetrahedral silicate and an inner sheet of octahedral alumina which is sandwiched between the silica sheets. Therefore, these structures are also referred to as "TOT" (tetrahedral-octahedral-tetrahedral) structures. These sandwich structures are stacked one upon the other to yield a clay particle. This arrangement can provide a repeated structure about every nine and one-half angstroms (Å), as compared with the pillared or intercalated clays produced by the insertion of "pillars" of inorganic oxide material between these layers to provide a larger space between the natural clay layers.

In an aspect, the clay used to prepare the clay-heterocoagulate and support-activator can be a colloidal smectite clay. Thus, the colloidal smectite clay can have an average particle size of greater than or equal to 10 μm (microns), greater than or equal to 5 μm, greater than or equal to 3 μm, greater than or equal to 2 μm, or greater than or equal to 1 μm, wherein the average particle size can also be less than or equal to 15 μm, less than or equal to 25 μm, less than or equal to 50 μm, less than or equal to 75 μm, less than or equal to 100 μm, less than or equal to 125 μm, less than or equal to 150 μm, less than or equal to 175 μm, less than or equal to 200 μm, less than or equal to 225 μm, or less than or equal to 250 μm. That is, any ranges of clay particle sizes between these recited numbers are disclosed. If not specifically stated otherwise, any particle size recited herein for the smectite clay itself is the particle size designated by the supplier of the clay. While clays that are unable to give colloidal suspensions can be used, the use of these non-colloidal clays present additional processing and separation issues that are avoided by the use of colloidal clays. These upper and lower limits of average particle sizes of the colloidal smective clay are also applicable to the clay-surfactant heteroadduct (dry or calcined), and the supported metallocene catalysts (dry), as described herein.

In another aspect, the colloidal smectite clay can have an average particle size of, for example, from 1 m (micron) to 250 m. For example, the colloidal smectite clay can have an average particle size of about 1 m (microns), about 2 m, about 3 m, about 5 m, about 7 m, about 10 m, about 12 μm, about 15 μm, about 18 μm, about 20 μm, about 25 μm, about 30 μm, about 35 μm, about 40 μm, about 45 μm, about 50 μm, about 55 μm, about 60 μm, about 65 μm, about 70 μm, about 75 μm, about 80 μm, about 85 μm, about 90 μm, about 95 μm, about 100 μm, about 110 μm, about 120 μm, about 125 μm, about 130 μm, about 140 μm, about 150 μm, about 160 μm, about 170 μm, about 175 μm, about 185 μm, about 200 μm, about 225 μm, or about 250 μm, or any ranges of particle sizes between these recited numbers. For example, the colloidal smectite clay can have an average particle size of from 1 μm to 250 m, from 2 μm to 125 μm, from 3 μm to 100 μm, from 5 μm to 150 μm, from 5 μm to 80 μm, from 7 μm to 70 μm, from 10 μm to 100 μm, from 10 μm to 60 μm, from 15 μm to 80 μm, from 15 μm to 50 μm, or from 20 μm to 75 μm.

According to another aspect, the particles sizes of commercial Volclay® HPM-20 bentonite provide suitable particle sizes for use according to this disclosure. For example, the colloidal smectite clay used according to this disclosure can be characterized by a minimum 99.00% finer than 200 mesh (74 microns) particle sizes. In another aspect, the colloidal smectite clay used according to this disclosure can be characterized by a minimum 99.75% finer than 200 mesh (74 microns), and a minimum 99.00% finer than 325 mesh (44 microns) for the particle sizes.

In one aspect, the clay used to prepare the support-activator can be absent a bivalent or trivalent ion exchanged smectite, for example, Mg-exchanged or Al-ion exchanged montmorillonite which are described in U.S. Pat. No. 6,531,552. In another aspect, the clay used to prepare the support-activator can be absent mica or synthetic hectorite, as described in U.S. Pat. Nos. 6,531,552 and 5,973,084. In a further aspect, the clay used to prepare the support-activator can be absent a trioctahedral smectite or can be absent vermiculite.

In an aspect, the smectite clay can also comprise structural units characterized by the following formula:

$(M^{A}IV)_{s}(M^{B}VI)_{p}O_{20}(OH)_{4}$; wherein a) $M^{A}IV$ is a four-coordinate $Si^{4+}$, wherein the $Si^{4+}$ is optionally partially substituted by a four-coordinate cation that is not $Si^{4+}$ (for example, the cation that is not $Si^{4+}$ can be selected independently from $Al^{3+}$, $Fe^{3+}$, $P^{5+}$, $B^{3+}$, $Ge^{4+}$, $Be^{2+}$, $Sn^{4+}$, and the like);

b) $M^{B}VI$ is a six-coordinate $Al^{3+}$ or $Mg^{2+}$, wherein the $Al^{3+}$ or $Mg^{2+}$ is optionally partially substituted by a six-coordinate cation that is not $Al^{3+}$ or $Mg^{2+}$ (for example, the cation that is not $Al^{3+}$ or $Mg^{2+}$ can be selected independently from $Fe^{3+}$, $Fe^{2+}$, $Ni^{2+}$, $Co^{2+}$, $Li^{+}$, $Zn^{2+}$, $Mn^{2+}$, $Ca^{2+}$, $Be^{2+}$, and the like);

c) p is four for cations with a +3 formal charge, or p is 6 for cations with a +2 formal charge; and d) any charge deficiency that is created by the partial substitution of a cation that is not $Si^{4+}$ at $M^{A}IV$ and/or any charge deficiency that is created by the partial substitution of a cation that is not $Al^{3+}$ or $Mg^{2+}$ at $M^{B}VI$ is balanced by cations intercalated between structural units (for example, the cations intercalated between structural units can be selected from monocations, dications, trications, other multications, or any combination thereof.

In another aspect, the smectite clay can be monocation exchanged with at least one of lithium, sodium, or potassium. The Examples, data, and Aspects of the Disclosure section provide additional detailed information of the various aspects and embodiments of the smectite clay.

D. Surfactants

The step of contacting the clay and the surfactant can be carried out using any suitable surfactant, which can include cationic surfactants, nonionic surfactants, amphoteric surfactants (including amphiprotic surfactants), and can include combinations thereof. In an aspect, the contact product and the method of making a support-activator can be absent any one or any two of a cationic surfactant, a nonionic surfactant, or an amphoteric surfactant.

According to an aspect, the colloidal smectite clay and the surfactant can be contacted in a ratio of from 0.5 millimoles to 5 millimoles of surfactant per gram of colloidal smectite clay. For example, the colloidal smectite clay and the surfactant can be provided or contacted in a ratio of from 0.75 millimoles to 4 millimoles, from 1 millimoles to 3.5 millimoles, from 1.25 millimoles to 3 millimoles, or from 1.5 millimoles to 2.75 millimoles of surfactant per gram of colloidal smectite clay.

Cationic Surfactants. In an aspect, the cationic surfactant can comprise or can be selected from a primary, a secondary, a tertiary, or a quaternary ammonium compound or phosphonium compound. When describing cationic surfactants, this disclosure may refer to the cationic surfactant comprising a cationic component and a counterion or anion. In an aspect, the cationic surfactant can comprise or can be selected from an ammonium compound (salt), having the following general formula:

$[R^1R^2R^3R^4N]^+X^-$, wherein each $R^1$, $R^2$, $R^3$, and $R^4$ is selected independently from hydrogen, a substituted or an unsubstituted $C_1$-$C_{25}$ hydrocarbyl group, or a substituted or an unsubstituted $C_1$-$C_{25}$ heterohydrocarbyl group, in which any two or more of $R^1$, $R^2$, $R^3$, and $R^4$ may be part of a ring structure, and wherein at least one of $R^1$, $R^2$, $R^3$, and $R^4$ is a non-hydrogen moiety; and $X^-$ is selected from an organic or an inorganic monoanion, dianion, or trianion.

In a further aspect, the ammonium compound can have the general formula $[R^1R^2R^3R^4N]^+X^-$, wherein: $R^1$, $R^2$, $R^3$, and $R^4$ are selected independently from hydrogen, a substituted or an unsubstituted $C_1$-$C_{25}$ aliphatic group, a substituted or an unsubstituted $C_1$-$C_{25}$ heteroaliphatic group, a substituted or an unsubstituted $C_6$-$C_{25}$ aromatic group, or a substituted or an unsubstituted $C_4$-$C_{25}$ heteroaromatic group, in which any two or more of $R^1$, $R^2$, $R^3$, and $R^4$ may be part of a ring structure, and wherein at least one of $R^1$, $R^2$, $R^3$, and $R^4$ is a non-hydrogen moiety; and $X^-$ is selected from any suitable anion, such as fluoride, chloride, bromide, iodide, formate, acetate, oxalate, nitrate, sulfate, sulfite, perchlorate, carbonate, bromate, chlorate, chlorite, hypochlorite, or phosphate.

According to another aspect, the cationic surfactant can comprise or can be selected from a phosphonium compound (salt), having the following general formula:

$[R^1R^2R^3R^4P]^+X^-$, wherein each $R^1$, $R^2$, $R^3$, and $R^4$ is selected independently from hydrogen, a substituted or an unsubstituted $C_1$-$C_{25}$ hydrocarbyl group, or a substituted or an unsubstituted $C_1$-$C_{25}$ heterohydrocarbyl group, in which any two or more of $R^1$, $R^2$, $R^3$, and $R^4$ may be part of a ring structure, and wherein at least one of $R^1$, $R^2$, $R^3$, and $R^4$ is a non-hydrogen moiety; and $X^-$ is selected from an organic or an inorganic monoanion, dianion, or trianion.

In still a further aspect, the phosphonium compound can have the general formula $[R^1R^2R^3R^4P]^+X^-$, wherein $R^1$, $R^2$, $R^3$, and $R^4$ are selected independently from hydrogen, a substituted or an unsubstituted $C_1$-$C_{25}$ aliphatic group, a substituted or an unsubstituted $C_1$-$C_{25}$ heteroaliphatic group, a substituted or an unsubstituted $C_6$-$C_{25}$ aromatic group, or a substituted or an unsubstituted $C_4$-$C_{25}$ heteroaromatic group, in which any two or more of $R^1$, $R^2$, $R^3$, and $R^4$ may be part of a ring structure, and wherein at least one of $R^1$, $R^2$, $R^3$, and $R^4$ is a non-hydrogen moiety; and the counterion $X^-$ is selected from any suitable anion, such as fluoride, chloride, bromide, iodide, formate, a carboxylate such as acetate, oxalate, nitrate, sulfate, sulfite, perchlorate, carbonate, bromate, chlorate, chlorite, hypochlorite, or phosphate.

In embodiments, the cationic surfactant can comprise a cation selected from lauryltrimethylammonium, stearyltrimethylammonium, trioctylammonium, distearyldimethylammonium, distearyldibenzylammonium, cetyltrimethylammonium, benzylhexadecyldimethylammonium, dimethyldi-(hydrogenated tallow)ammonium, dimethylbenzyl-(hydrogenated tallow)ammonium, or any combination thereof.

According to some aspects, the cation of the cationic surfactant can comprise or be selected from tetramethylammonium, tetraethylammonium, tetrabutylammonium, tetrapentylammonium, tetrahexylammonium, tetraoctylammonium, tetrabenzylammonium, cetylammonium, decylammonium, dodecylammonium, methyloctadecylammonium, ethyloctadecylammonium, butyloctadecylammonium, dimethyloctadecylammonium, diethyloctadecylammonium, dibutyloctadecylammonium, trimethyloctadecylammonium, triethyloctadecylammonium, tributyloctadecylammonium, methyltridecylammonium, ethyltridecylammonium, butyltridecylammonium, N,N-dimethylanilinium, N,N-diethylanilinium, N,N-2,4,5-pentamethylanilinium, N,N-dimethyloctadecylammonium, N,N-dimethyl-N,N-dipropylammonium, N,N-dimethyl-N,N-dihexyl ammonium, N,N-dipropyl-N,N-dihexyl ammonium, trimethyl phosphonium, triethyl phosphonium, tributyl phosphonium, trihexyl phosphonium, tetramethyl phosphonium, tetraethyl phosphonium, tetrapropyl phosphonium, tetrabutyl phosphonium, tetrahexyl phosphonium, tetrabenzyl phosphonium, trihexyltetradecyl phosphonium, diallyldimethyl ammonium, triethylmethyl ammonium, tributyl ethyl ammonium, trimethylsulfonium ammonium, N,N-diethyl-N-methyl-N-(2-methoxyethyl)-ammonium, glycidyl trimethylammonium, N,N-dimethyl-N-ethyl-N-propylammonium, N,N-dimethyl-N-ethyl-N-butylammonium, N,N-dimethyl-N-ethyl-N-amyl ammonium, N,N-dimethyl-N-ethyl-N-hexylammonium, N,N-dimethyl-N-ethyl-N-heptyl ammonium, N,N-dimethyl-N-ethyl-N-decyl ammonium, N,N-dimethyl-N-propyl-N-butylammonium, N,N-dimethyl-N-propyl-N-amyl ammonium, N,N-dimethyl-N-propyl-N-hexylammonium, N,N-dimethyl-N-propyl-N-heptyl ammonium, N,N-dimethyl-N-butyl-N-hexylammonium, N,N-dimethyl-N-butyl-N-heptyl ammonium, N,N-dimethyl-N-pentyl-N-hexylammonium, trimethylheptyl ammonium, N,N-diethyl-N-methyl-N-propylammonium, N,N-diethyl-N-methyl-N-amyl ammonium, N,N-diethyl-N-methyl-N-heptyl ammonium, N,N-diethyl-N-propyl-N-amyl ammonium, triethylmethylammonium, triethylpropylammonium, triethylammonium ammonium, triethylheptyl ammonium, N,N-dipropyl-N-methyl-N-ethylammonium, N,N-dipropyl-N-methyl-N-amylammonium, N,N-dipropyl-N-butyl-N-hexylammonium, N,N-dibutyl-N-methyl-N-amyl ammonium, N,N-dibutyl-N-methyl-N-hexylammonium, trioctylmethylammonium, N-methyl-N-ethyl-N-propyl-N-amyl ammonium, diethyl dimethyl phosphonium, dibutyl diethyl phosphonium, or any combination thereof.

In various aspects, the counterion $X^-$ for the cationic component of the cationic surfactant can comprise or can be selected from organic anions or inorganic anions such as halides. Exemplary organic anions include but are not limited to formate, carboxylates such as acetate, and oxalate. Exemplary inorganic anions include but are not limited to nitrate, sulfate, perchlorate, carbonate, chlorate, chlorite, hypochlorite, and phosphate. Exemplary halide anions include fluoride, chloride, and bromide. Embodiments of the cationic surfactant include but are not limited to cationic components such as exemplified above, in combination with an anion comprising or selected from a halide ion or an anion of an inorganic Brønsted acid.

In an aspect, examples of cationic surfactants include, but are not limited to, a chloride or a bromide of benzalkonium, benzethonium, methylbenzethonium, cetylpyridinium, alkyl-dimethyl dichlorobenzene ammonium, dequalinium, phenamylinium, cetrimonium, or cethexonium.

In another aspect, examples of cationic surfactants that can be used according to this disclosure include tetrabutylammonium bromide, dioctadecyldimethylammonium chloride, hexadecyltrimethylammonium chloride, octadecylammonium chloride, trimethylstearylammonium chloride, cetyltrimethylammonium bromide, octenidine dihydrochloride, cetyl trimethylammonium bromide (CTAB), cetyl trimethylammonium chloride (CTAC), cetylpyridinium chloride (CPC), benzalkonium chloride (BAC), benzethonium chloride (BZT), dimethyldioctadecylammonium chloride, dioctadecyldimethylammonium bromide (DODAB), or combinations thereof.

In some embodiments, the cationic surfactant can comprise or be selected from an aliphatic dialkyl benzyl ammonium compounds (also termed aliphatic alkyl benzyl ammonium compounds), which describes a class of quaternary ammonium compounds that include alkyl dimethyl benzyl ammonium chloride (ADBAC), in which the alkyl can include, for example, $C_{12}$-$C_{16}$ or $C_{12}$-$C_{14}$ alkyl. This term "aliphatic dialkyl benzyl ammonium" compound may be used to describe a family of quaternary ammonium compounds which may be prepared or are commercially available in the form of compound mixtures. For example, product or safety data sheets for commercially available "ADBAC" state that the commercial product includes includes a mixture of alkyl dimethyl benzyl ammonium chloride and alkyl ($C_{12}$-$C_{14}$) dimethyl (ethylbenzyl) ammonium chloride. Such common commercial ammonium compounds can be used in accordance with this disclosure.

Nonionic Surfactants. In another aspect, the surfactant can comprise, consist essentially of, or be selected from a nonionic surfactant. In this disclosure, amphoteric surfactants (including amphiprotic surfactants) are described along with the non-amphoteric nonionic surfactants for convenience.

In an aspect, examples of nonionic surfactants include but are not limited to a polyhydric alcohol, mono-alkyl and di-alkyl ethers of polyhydric alcohols, or the polyalkylene glycols thereof, and any combinations of more than one such nonionic surfactant can be used. Suitable polyhydric alcohols may contain 2, 3, or more hydroxyl groups. In an aspect, the polyhydric alcohol can have the formula $CH_2OH(CHOH)_nCH_2OH$ wherein n is an integer from 2 to 5. Exemplary polyhydric alcohols, also referred to as sugar alcohols, include glycerol, 1,2,4-butanetriol, erythritol, pentaerythritol, maltitol, xylitol, and sorbitol. Exemplary ethers of polyhydric alcohols include but are not limited to the mono- and di-methyl and the mono- and diethyl ethers of ethylene glycol, propylene glycol, and diethylene glycol. Exemplary polyalkylene glycols include poly(ethylene)glycol and poly(propylene)glycol. These compounds and their manner of preparation are disclosed in Kirk-Othmer, Encyclopedia of Chemical Technology, Second Edition, Vol. 10, pages 638-674, which is incorporated herein by reference. Polyol amines are also suitable nonionic surfactants according to this disclosure. For example, the nonionic surfactant can comprise polyethoxylated tallow amine (also polyoxyethyleneamine or POEA).

In another aspect, the nonionic surfactant reagent can comprise or be selected from saccharides such as monosaccharides, di-saccharides, oligosaccharides, or mixtures thereof such as found in corn syrup solid mixtures derived from hydrolysis of corn starch. Exemplary saccharides include glucose, fructose, mannose, maltose, lactose, sucrose, and the like. Exemplary oligosaccharides include but are not limited to cyclodextrins and maltodextrins. The nonionic surfactants used according to this disclosure can also comprise amino-modified saccharides such as glucosamine, and oxidized sugar acids such as glucoronic acid.

In a further aspect, the nonionic surfactant can comprise a singular fatty acid or a mixture of several fatty acids. These species typically include a carbon chain of 6 to 21 carbons in length, which may optionally contain internal unsaturation, in which the carbon chain is terminated with a carboxylic acid. Exemplary fatty acids include caprylic acid, capric acid, lauric acid, myristic acid, palmitic acid, stearic acid, arachidic acid, ricinoleic acid, behenic acid, lignoceric acid, cerotic acid, myristoleic acid, palmitoleic acid, sapienic acid, oleic acid, elaidic acid, vaccenic acid, linoleic acid, linoelaidic acid, α-linolenic acid, arachidonic acid, eicosapentaenoic acid, erucic acid, docosahexaenoic acid, or any combination thereof. In another aspect, the nonionic surfactant can comprise a fatty acid, examples of which are listed immediately above, condensed with an alcohol having one or multiple hydroxyl groups, such as methanol, ethanol, butanol, hexanol, or glycerol, for example, a monoglyceride, diglyceride, or triglyceride.

In embodiments, the nonionic surfactant can comprise an ethoxylate, a glycol ether, a fatty alcohol polyglycol ether, or combinations thereof, examples of which include but are not limited to octylphenol ethoxylate, polyethylene glycol tert-octylphenyl ether, ethylenediamine tetrakis(ethoxylate-block-propoxylate) tetrol, or ethylenediamine tetrakis (propoxylate-block-ethoxylate) tetrol.

In embodiments, the nonionic surfactant can comprise or can be selected from a hydrocarbyl (hydrocarbon)sulfonate having the formula $R^1SO_2OR^2$, wherein $R^1$ and $R^2$ are selected independently from a substituted or an unsubstituted $C_1$-$C_{25}$ alkyl, $C_6$-$C_{25}$ aryl, $C_7$-$C_{25}$ aralkyl, or $C_7$-$C_{25}$ alkaryl.

According to other embodiments, the nonionic surfactant can comprise or be selected from: (a) a mono-saccharide, a di-saccharide, an oligosaccharide, or any combination thereof; or (b) glucose, fructose, mannose, maltose, lactose, sucrose, a cyclodextrin, a maltodextrin, an amino-modified saccharides such as glucosamine, an oxidized sugar acid such as glucoronic acid, or any combination thereof.

In an aspect, the nonionic surfactant according to this disclosure can comprise or be selected from a silane having the formula $R^1SiX_3$, $R^1R^2SiX_2$, or $R^1R^2R^3SiX$, wherein:

$R^1$, $R^2$, and $R^3$ are selected independently from a substituted or an unsubstituted $C_1$-$C_{25}$ hydrocarbyl group, $C_1$-$C_{25}$ heterohydrocarbyl group, or any other group which is hydrolytically stable when bonded to silicon in the nonionic surfactant; and X is selected independently from a hydrolyzable group which is converted to a hydroxyl group (—OH) upon hydrolysis thereby forming a silanol.

In this aspect, the substituents $R^1$, $R^2$, and $R^3$ can be selected independently from hydrogen, a substituted or an unsubstituted $C_1$-$C_{25}$ aliphatic group, a substituted or an unsubstituted $C_1$-$C_{25}$ heteroaliphatic group, a substituted or an unsubstituted $C_6$-$C_{25}$ aromatic group, or a substituted or an unsubstituted $C_4$-$C_{25}$ heteroaromatic group. Further to this aspect, the X group can be selected from a $C_1$-$C_{25}$ alkoxy, a $C_1$-$C_{25}$ acyloxy, a halogen, or a $C_1$-$C_{25}$ mine. While not intending to be bound by theory, it is believed that silanes of this type can interact with clay hydroxyl groups thereby repelling water from adhering to the interior clay pore surfaces.

According to one aspect, the nonionic surfactant according to this disclosure can comprise or can be selected from a silyl alcohol having the formula $R_{4-n}Si(OH)_n$, wherein n is 1 or 2, and R is selected from a $C_1$ to $C_{20}$ alkyl group or a $C_6$ to $C_{20}$ aryl group. Examples of silanols include, but are not limited to, triphenylsilanol, dimethylphenylsilanol, diphenylsilanediol, triisopropylsilanol, or any combination thereof.

While not intending to be bound by theory, it is thought that high-temperature drying such as the type that occurs during calcination can result in loss of strongly adhered hydrogen-bonded water from clay pore surface hydroxyls and result in collapse of these pores, thereby lowering BJH porosity. When the clay heteroadduct is contacted with a silanol, or with a silane containing a hydrolyzable group which is converted to a hydroxyl upon hydrolysis thereby forming a silanol, replacement of some of this water can occur with these hydroxyl-containing silanol compounds. In this manner, these silanol compounds are thought to reduce the potential collapse of porosity induced by high-temperature treatment of the clay supports.

Amphoteric Surfactants. In an aspect, "amphoteric" surfactants are those surfactants which include a positively charged moiety (or a moiety which can readily become positively charged by accepting a proton) and a negatively charged moiety (or a moiety which can readily become negatively charged by releasing a proton) in the same molecule. The term "zwitterionic" surfactant is used interchangeably with "amphoteric" surfactants based on the inclusion of both cationic and anionic moieties in the same molecule. "Amphiprotic" surfactants which either donate a proton ($H^+$) or accept a proton are included in the scope of "amphoteric" surfactants, unless otherwise excluded. Also unless otherwise excluded, reference to an amphoteric or zwitterionic surfactant includes amphiprotic surfactants.

In an aspect, examples of amphoteric surfactants include an amino acid or a combination of amino acids, a polypeptide, or a protein. When the surfactant includes an amino acid, the contacting step between the clay and the surfactant can be carried out under conditions, including a pH from about 2.5 to 9.5, in which the an amino acid or combination of amino acids are zwitterionic. While not intending to be bound by theory, it is thought that the cationic end of the zwitterionic amino acid can intercalate the clay layers like the aforementioned cationic surfactants. In embodiments the amphoteric surfactant can comprise an amino acid selected from alanine, arginine, asparagine, aspartic acid (aspartate), cysteine, cystine, glutamic acid (glutamate), glutamine, glycine, histidine, isoleucine, leucine, lysine, methionine, phenylalanine, proline, serine, threonine, tryptophan, tyrosine, valine, or any combination thereof.

In a further aspect, the amphoteric (zwitterionic) surfactants of this disclosure have both cationic and anionic moieties or centers attached to the same molecule. Examples of cationic centers of an amphoteric (zwitterionic) surfactant include moieties comprising or selected from a primary amine, a secondary amine, a tertiary amine, or a quaternary ammonium cation. Examples of anionic centers of an amphoteric surfactant include but are not limited to sulfates, sulfonates, phosphates, or carboxylates.

In an aspect, an amphoteric surfactant can comprise or can be selected from a sultaine, such as a hydroxysultaine compounds. Examples of sultaines include, but are not limited to lauramidopropyl hydroxysultaine (ISOTAINE LAPHS); cocamidopropyl hydroxysultaine (ISOTAINE CAPHS); oleamidopropyl hydroxysultaine (ISOTAINE OAPHS); tallowamidopropyl hydroxysultaine (ISOTAINE TAPHS); erucamidopropyl hydroxysultaine (ISOTAINE EAPHS); and lauryl hydroxysultaine (ISOTAINE LHS).

In another aspect, the amphoteric surfactant can comprise or can be selected from a betaines, including the simple betaine N,N,N-trimethylglycine. Other examples of betaines which can be used according to this disclosure include cocamidopropyl betaine.

A further aspect provides amphoteric surfactants which can comprise or be selected from biological amphoteric surfactants, such as compounds having a phosphate anion with an amine or ammonium moiety in the same molecule, examples of which include phospholipids, phosphatidylserine, phosphatidylethanolamine, phosphatidylcholine, and sphingomyelins.

In embodiments, amphoteric surfactants which can comprise or be selected from amino-N-oxides such as tertiary amine N-oxides, examples of which include lauryldimethylamine oxide, myristamine oxide, pyridine-N-oxide, N-methylmorpholine-N-oxide. The amphoteric surfactants of this disclosure can comprise or be selected from a hydrocarbyl amine-N-oxide, such as alkyl amine-N-oxide or an aryl amine-N-oxide.

In a further aspect, the amphoteric surfactant can comprise or can be selected from CHAPS, which is 3-[(3-cholamidopropyl)dimethylammonio]-1-propanesulfonate, also designated as 3-{Dimethyl[3-(3α,7α,12α-trihydroxy-5β-cholan-24-amido)propyl]azaniumyl}-propane-1-sulfonate.

Anionic Surfactants. In a further aspect, the smectite heteroadduct described herein can be prepared by contacting in a first liquid carrier: (a) a colloidal smectite clay; and (b) a surfactant comprising from a cationic surfactant, a nonionic surfactant, an amphoteric surfactant, or any combination thereof to provide a slurry of the smectite heteroadduct in the first liquid carrier; wherein the contacting step further comprises contacting the colloidal smectite clay or the smectite heteroadduct with an anionic surfactant, before, during, or after the colloidal smectite clay is contacted with the cationic surfactant, the nonionic surfactant, the amphoteric surfactant, or the combination thereof. In an aspect, the smectite heteroadduct formed from the smectite clay and the cationic surfactant, nonionic surfactant, and/or amphoteric surfactant can be subsequently contacted with an anionic surfactant. For example, the contact product of the colloidal smectite clay and the cationic surfactant can be further contacted with an anionic surfactant if desired, prior to isolating the heteroadduct, or prior to spray-drying a slurry of the heteroadduct. In another aspect, an anionic surfactant can be used to contact the clay at the same time as the cationic surfactant when forming the heteroadduct. While not intending to be theory-bound, it is thought that the use of an anionic surfactant may enhance the ease of drying the smectite heteroadduct.

In this aspect, the anionic surfactant used according to this disclosure can comprise or be selected from a sulfate surfactant, a sulfonate surfactant, a phosphate surfactant, carboxylate surfactant, or other anionic surfactants, examples of which include but are not limited to dialkyl sulfocarboxylic acid esters, alkaryl sulfonic acid salts, aralkyl sulfonic acid salts, alkyl sulfonic acid salts, aryl sulfonic acid salts, sulfosuccinic acid esters, fatty acid alkali salts, polycarboxylic acid salts, polyoxyethylene alkyl ether phosphoric acid ester salts, alkylnaphthalene sulfonic acid salts, wherein the salts can be selected from salts of an alkali metal such as lithium, sodium or potassium, an alkaline earth metal such as calcium or magnesium, or ammonium or hydrocarbylammonium.

Further aspects and embodiments of the anionic surfactant include, but are not limited to, an alkyl ether sulfate compound or an alkenyl ether sulfate compound having the formula $[RO(C_2H_4O)_xSO_3]M$ wherein R is a $C_8$ to $C_{20}$ alkyl group or a $C_8$ to $C_{20}$ alkenyl group, x an integer from 1 to 30, inclusive, and M is a cation which imparts water solubility to the alkyl ether sulfate or an alkenyl ether sulfate. Embodiments of the alkyl ether sulfates useful in this disclosure include the condensation products of ethylene oxide and monohydric alcohols having from 8 to 20 carbon atoms, for example from about 14 to about 18 carbon atoms. The monohydric alcohols can be derived from natural sources (for example, fats, coconut oil, or tallow), or they can be synthetic. Lauryl alcohol (dodecanol) and straight chain alcohols derived from tallow are examples of useful alcohols. When such alcohols are reacted with ethylene oxide, using from about 1 to about 30 molar proportions of ethylene oxide, for example about 6 moles of ethylene oxide, the resulting mixture of molecular species can have an average of about 6 moles of ethylene oxide per mole of alcohol, can be sulfated and neutralized, and used as the alkyl ether sulfate.

In other aspects, the anionic surfactant can comprise or be selected from a carboxylate compound having the formula [RCOO]M, wherein R is a $C_8$ to $C_{21}$ alkyl group and M is a cation selected from sodium, potassium, or ammonium.

According to another aspect, the anionic surfactant can comprise or can be selected from:

(a) a sulfonate compound having the formula $R'SO_3Na$, wherein R' is a $C_8$ to $C_{21}$ alkyl group, a $C_8$ to $C_{21}$ aralkyl group, or a $C_8$ to $C_{21}$ alkaryl group; or (b) an alkyl sulfate having the formula $R''OSO_3M$, wherein R" is a $C_8$ to $C_{21}$ alkyl group, and M is a cation selected from $NH_4^+$, $Na^+$, $K^+$, ½ $Mg^{2+}$, diethanolammonium, or triethanolammonium.

In another aspect, the anionic surfactant according to this disclosure can comprise or be selected from a sulfated polyoxyethylene alkylphenol with a formula of $R''C_6H_4(OCH_2CH_2)_nOSO_3M$ wherein R" is $C_1$ to $C_9$ alkyl group, M is $NH_4^+$, $Na^+$, or triethanolamine, and n is an integer from 1 to 50, inclusive.

Embodiments of the anionic surfactant of this disclosure can comprise or be selected from:

(a) an alkyl sulfate having the formula $[(R^1O)SO_2O]M$;

(b) an alkyl sulfonate having the formula $[R^1SO_2O]M$;

(c) an alkyl sulfinate having the formula $[R^1S(O)O]M$;

(d) sulfated polyoxyalkylene having the formula $[R^1(OCH_2CH_2)_nOSO_2O]M$ or $[R^1(OCH_2C(CH_3)CH_2)_nOSO_2O]M$; or (e) sulfonated polyoxyalkylene having the formula $[R^1(OCH_2CH_2)_nSO_2O]M$ or $[R^1(OCH_2C(CH_3)CH_2)_nSO_2O]M$; wherein:

$R^1$ is selected independently from a substituted or an unsubstituted $C_1$-$C_{25}$ alkyl-, $C_6$-$C_{25}$ aryl-, $C_7$-$C_{25}$ aralkyl-, or $C_7$-$C_{25}$ alkaryl;

M is a cation such as $NH_4^+$, $Na^+$, $K^+$, ½ $Mg^{2+}$, diethanolammonium, or triethanolammonium; and n is an integer from 1 to 50.

In another aspect, the anionic surfactant can comprise or can be selected from an alkali metal salt of a fatty acid having from about 8 to about 30 carbon atoms. In embodiments, the anionic surfactant can comprise or be selected from an alkali metal salt of a fatty acid selected from caprylic acid, capric acid, lauric acid, myristic acid, palmitic acid, stearic acid, arachidic acid, ricinoleic acid, behenic acid, lignoceric acid, cerotic acid, myristoleic acid, palmitoleic acid, sapienic acid, oleic acid, elaidic acid, vaccenic acid, linoleic acid, linoelaidic acid, α-linolenic acid, arachidonic acid, eicosapentaenoic acid, erucic acid, docosahexaenoic acid, or any combination thereof.

According to other embodiments, the anionic surfactant can comprise or be selected from potassium oleate, dodecyl benzene sulfonate, dioctyl sulfosuccinate, sodium laurylsulfonate, sodium stearate, sodium lauryl sulfate, sodium myristyl sulfate, potassium lauryl sulfate, ammonium lauryl sulfate, triethanolamine lauryl sulfate, sodium cetyl sulfate, sodium stearyl sulfate, polyoxyethylene (POE) lauryl ether sodium sulfate, POE lauryl ether triethanolamine sulfate, POE lauryl ether ammonium sulfate, POE stearyl ether sodium sulfate, sodium stearoylmethyltaurate, triethanolamine dodecylbenzenesulfonate, sodium tetradecenesulfonate, sodium lauryl phosphate, or any combination thereof.

In a further aspect, the anionic surfactant can comprise or be selected from:

(a) a substituted or an unsubstituted alkyl sulfonate selected from methanesulfonate, ethanesulfonate, 1-propanesulfonate, 2-propanesulfonate, 3-methylbutanesulfonate, trifluoromethanesulfonate, trichloromethanesulfonate, chloromethanesulfonate, 1-hydroxyethanesulfonate, 2-hydroxy-2-propanesulfonate, 1-methoxy-2-propanesulfonate, or any combination thereof;

(b) a substituted or an unsubstituted alkyl sulfate selected from methylsulfate, ethylsulfate, 1-propylsulfate, 2-propylsulfate, 3-methylbutylsulfate, trifluoromethanesulfate, trichloromethylsulfate, chloromethylsulfate, 1-hydroxyethylsulfate, 2-hydroxy-2-propylsulfate, 1-methoxy-2-propylsulfate, or any combination thereof;

(c) a substituted or an unsubstituted aryl sulfonate selected from benzenesulfonate, naphthalenesulfonate, p-toluenesulfonate, m-toluenesulfonate, 3,5-xylenesulfonate, trifluoromethoxybenzenesulfonate, trichloro-methoxybenzenesulfonate, trifluoromethylbenzenesulfonate, trichloromethylbenzene-sulfonate, fluorobenzenesulfonate, chlorobenzenesulfonate, 1-hydroxyethane-benzenesulfonate, 3-fluoro-4-methoxybenzenesulfonate, or any combination thereof; or (d) any combination thereof.

Embodiments of the anionic surfactants which can be used according to this disclosure include a sulfate, a sulfonate, a phosphate, carboxylate, or other anionic surfactants, examples of which include but are not limited to dialkyl sulfocarboxylic acid esters, alkyl aryl sulfonic acid salts, alkyl sulfonic acid salts, sulfosuccinic acid esters, fatty acid alkali salts, polycarboxylic acid salts, polyoxyethylene alkyl ether phosphoric acid ester salts, alkylnaphthalene sulfonic acid salts, wherein the salts can be selected from, for example, salts of an alkali metal such as lithium, sodium or potassium, an alkaline earth metal such as calcium or magnesium, or ammonium or hydrocarbylammonium;

In aspect, the anionic surfactants include an anionic functional moiety such as a sulfate, sulfonate, phosphate, or carboxylate, and others described herein. In an aspect, the anionic surfactant further comprises a counter ion, examples of which include, but are not limited to, $NH_4^+$, $Na^+$, $K^+$, ½ $Mg^{2+}$, diethanolammonium, or triethanolammonium.

E. Cationic Polymetallates

In addition to the Definitions section and the Aspects of the Disclosure, the following additional information further describes the cationic polymetallates.

As explained in the Definitions section, the term "polymetallate", and similar terms such as "polyoxometallate" refer to the polyatomic cations that include two or more metals (for example, aluminum, silicon, titanium, zirconium, or other metals) along with at least one bridging ligand between metals such as oxo, hydroxy and/or halide ligands. For example, the polymetallates can be hydrous metal oxides, hydrous metal oxyhydroxides, and the like, and can include bridging ligands such as oxo ligands which bridge two or more metals can occur in these species, and can also include terminal oxo, hydroxyl, and/or halide ligands. While many polymetallate species are anionic, and the suffix "-ate" is often used to reflect an anionic species, the polymetallate (polyoxometallate) compounds used according to this disclosure are cationic.

The heterocoagulation reagents of this disclosure can be positively-charged species that when combined in the appropriate ratio with a colloidal suspension of clay form a coagulate which is readily filtered and easily washed. The positively charged species include soluble polyoxometallate, polyhydroxylmetallate and polyoxohydroxymetallate cations, and related cations partially halide substituted, such as polyaluminum oxyhydroxychlorides or aluminum chlorhydrate or polyaluminum chloride species that are linear, cyclic or cluster compounds. These compounds are referred to collectively as polymetallates. The latter aluminum compounds can contain from about 2 to about 30 aluminum atoms.

Useful heterocoagulation reagents can also include any colloidal species that are characterized by a positive zeta potential when dispersed in an aqueous solvent or in a mixed aqueous and organic (for example, alcohol) solvent. For example, useful dispersions of the heterocoagulation reagents can exhibit greater than (>)+20 mV (positive 20 mV) zeta potential, greater than +25 mV zeta potential, or greater than +30 mV zeta potential. While the starting colloidal clay may include monovalent ions or species such as protons, lithium ions, sodium ions, or potassium ions, it is thought that at least a portion of these ions can be replaced by the heterocoagulation reagents during formation of the readily filterable clay heteroadduct.

In an aspect, the cationic polymetallate heterocoagulation reagent can comprise a colloidal suspension of boehmite (an aluminum oxide hydroxide) or a metal oxide such as a fumed metal oxide which affords a positive zeta potential (for example, fumed alumina). In another aspect, the heterocoagulation reagent can comprise a chemically-modified or chemically-treated metal oxide, for example an aluminum chlorhydrate-treated fumed silica, such that when in suspension, the chemically-treated metal oxide affords a positive zeta potential, as described below. In a further aspect, the heterocoagulation reagent may be generated by treating a metal oxide or metal oxide hydroxide and the like in a fluidized bed with reagents which will afford a positive zeta potential when the agent is dispersed in a suspension. The heterocoagulation agent can exhibit a positive value greater than +20 mV prior to combination with the phyllosilicate clay component.

In an aspect, the cationic polymetallate can include a first metal oxide which is chemically-treated with a second metal oxide, a metal halide, a metal oxyhalide, or a combination thereof in an amount sufficient to provide a colloidal suspension of the chemically-treated first metal oxide having a positive zeta potential, for example, a zeta potential of greater than positive 20 mV (millivolts). That is, the chemically-treated first metal oxide is the contact product of the first metal oxide with [1] a second metal oxide, that is, another different metal oxide, [2] a metal halide, [3] a metal oxyhalide, or [4] a combination thereof. For example, the first metal oxide which is chemically-treated can comprise fumed silica, fumed alumina, fumed silica-alumina, fumed magnesia, fumed zinc oxide, fumed titania, fumed zirconia, fumed ceria, and the like, or any combination thereof. The second metal oxide, the metal halide, or the metal oxyhalide can be obtained from an aqueous solution or suspension of a metal oxide, hydroxide, oxyhalide, or halide, such as $ZrOCl_2$, ZnO, $NbOCl_3$, $B(OH)_3$, $AlCl_3$, or a combination thereof. For example, treatment may consist of dispersing the fumed oxide in a solution of aluminum chlorhydrate. In the case of fumed silica, which in suspension may exhibit a negative zeta potential, after treatment with aluminum chlorhydrate the suspension of the chemically-treated fumed silica exhibits a positive zeta potential of greater than about +20 mV.

In another aspect, the cationic polymetallate composition can comprise or be selected from [1] fumed silica, fumed alumina, fumed silica-alumina, fumed magnesia, fumed zinc oxide, fumed titania, fumed zirconia, fumed ceria, or any combination thereof, which is chemically-treated with [2] polyaluminum chloride, aluminum chlorhydrate, aluminum sesquichlorohydrate, polyaluminum oxyhydroxychloride, or any combination thereof. For example, the cationic polymetallate composition can comprise or be selected from aluminum chlorhydrate-treated fumed silica, aluminum chlorhydrate-treated fumed alumina, aluminum chlorhydrate-treated fumed silica-alumina, or any combination thereof. Some fumed metal oxides, such as fumed alumina, may already exhibit a positive zeta potential before chemical treatment. Nevertheless, fumed metal oxides which possess no zeta potential, or a positive zeta potential less than about +20 mV, may also be chemically treated with species, such as aluminum chlorohydrate and the like, after which treatment, a colloidal suspension having a zeta potential greater than about +20 mV can be obtained.

In another aspect, the heterocoagulation reagent can include a mixture of metal oxides formed in the fuming process, or subsequent to the fuming process, that because of their composition, exhibits a positive zeta potential. An example of this type fumed oxide is fumed silica-alumina.

In another embodiment the heterocoagulation reagent may include any colloidal inorganic oxide particles such as described by Lewis, et al. in U.S. Pat. No. 4,637,992, which is incorporated herein by reference, such as colloidal ceria or colloidal zirconia or any positively charged colloidal metal oxide disclosed therein. In another aspect, the heterocoagulation reagent may comprise magnetite or ferrihydrite. For example, the cationic polymetallate can comprise or be selected from boehmite, fumed silica-alumina, colloidal ceria, colloidal zirconia, magnetite, ferrihydrite, any positively charged colloidal metal oxide, or any combination thereof.

In another aspect, the heterocoagulation reagents can include a cationic oligomeric or polymeric aluminum species in solution, such as aluminum chlorohydrate, also known as aluminum chlorhydrate (ACH), polyaluminum chloride (PAC), aluminum sesquichlorohydrate, or any combination or mixture thereof. For example, the cationic polymetallate heterocoagulation reagent can include or be selected from an aluminum species or any combinations of species having the empirical formula:

$$Al_2(OH)_nCl_m(H_2O)_x,$$

wherein n+m=6, and x is a number from 0 to about 4. In one aspect, the cationic polymetallate can comprises or can be selected from aluminum species having the formula $[AlO_4(Al_2(OH)_{24}(H_2O)_{20}]^{7+}$, which is the so-called "$Al_{13}$-mer" polycation and which is thought to be the precursor to $Al_{13}$ pillared clays.

When aluminum chlorhydrate is used as a heterocoagulation reagent or chemical treatment reagent for treating other metal oxides, aluminum chlorhydrate (ACH) solution or solid powder from commercial sources can be utilized. Aluminum chlorhydrate solutions may be referred to as polymeric cationic hydroxy aluminum complexes or aluminum chlorhydroxides, which refers to the polymers formed from a monomeric precursor having the general empirical formula $0.5[Al_2(OH)_5Cl(H_2O)_2]$. Preparation of aluminum chlorhydrate solution is described in U.S. Pat. Nos. 2,196,016 and 4,176,090, which are incorporated herein by reference, and can involve treating aluminum metal with hydrochloric acid in amounts which produce a composition having the formula indicated above.

Alternatively, the aluminum chlorhydrate solutions may be obtained using various sources of aluminum such as alumina ($Al_2O_3$), aluminum nitrate, aluminum chloride or other aluminum salts and treatment with acid or base. The numerous species that can be present in such solutions, including the tridecameric $[AlO_4(Al_{12}(OH)_{24}(H_2O)_{20}]7$ ($Al_{13}$-mer) polycation, are described in Perry and Shafran, *Journal of Inorganic Biochemistry,* 2001, 87, 115-124, which is incorporated herein by reference. The species disclosed in this study, either individually or in combination, which are present in such solutions can be used as cationic polymetallates for heterocoagulation of the smectite clay.

In one aspect, aqueous aluminum chlorhydrate solutions used according to this disclosure can have an aluminum content, calculated or expressed as the weight percent of $Al_2O_3$, in a range of from about 15 wt. % to about 55 wt. %, although more dilute concentrations can be used. Using more dilute solutions can be accompanied by adjusting other reaction conditions such as time and temperature, as will be appreciated by the person of ordinary skill in the art. Alternative aluminum concentrations in aqueous aluminum polymetallate solutions such as aqueous aluminum chlorhydrate solutions, expressed as the weight percent of $Al_2O_3$, can include: from about 0.1 wt. % to about 55 wt. % $Al_2O_3$; from about 0.5 wt. % to about 50 wt. % $Al_2O_3$; from about 1 wt. % to about 45 wt. % $Al_2O_3$; from about 2 wt. % to about 40 wt. % $Al_2O_3$; from about 3 wt. % to about 37 wt. % $Al_2O_3$; from about 4 wt. % to about 35 wt. % $Al_2O_3$; from about 5 wt. % to about 30 wt. % $Al_2O_3$; or from about 8 wt. % to about 25 wt. % $Al_2O_3$; each range including every individual concentration expressed in tenths (0.1) of a weight percentage encompassed therein, and including any subranges therein. For example, the recitation of from about 0.1 wt. % to about 30 wt. % $Al_2O_3$ includes the recitation of from 10.1 wt. % to 26.5 wt. % $Al_2O_3$. When convenient, solid polymetallate such as solid aluminum chlorhydrate can be used and added to the slurry of the colloidal clay when preparing the heterocoagulate. Therefore, the concentrations disclosed above are not limiting but rather exemplary.

In one aspect, the cationic polymetallate can comprise or can be selected from an oligomer prepared by copolymerizing (co-oligomerizing) soluble rare earth salts with a cationic metal complex of at least one additional metal selected from aluminum, zirconium, chromium, iron, or a combination thereof, according to U.S. Pat. No. 5,059,568, which is incorporated herein by reference, for example, where the at least one rare earth metal can be cerium, lanthanum, or a combination thereof. In an aspect, the heterocoagulation reagent can comprise an aqueous solution of lanthanides and $Al_{13}$ Keggin ions, such as described by McCauley in U.S. Pat. No. 5,059,568. However, the calcined clay-heteroadducts of the present disclosure prepared using the McCauley type polymetallates do not afford a uniform intercalated structure with basal spacings of greater than 13 Å (Angstroms). Though not wishing to be bound by theory, it is thought that this observation may result from the much smaller amount of Ce—Al heterocoagulation reagent-to-colloidal clay ratio used according to this disclosure. This smaller amount arises by the conditions of contacting the smectite clay and the heterocoagulation reagent in an amount sufficient to provide a slurry of the smectite heteroadduct having a zeta potential in a range of from about +25 mV (millivolts) to about −25 mV.

In further aspects, exemplary polymetallates of this disclosure can include: [1] the ε-Keggin cations $[\varepsilon\text{-}PMo_{12}O_{36}(OH)_4\{Ln(H_2O)_4\}4]^5$, wherein Ln can be La, Ce, Nd, or Sm; and [2] the lanthanide-containing cationic heteropolyoxovanadium clusters having the general formula $[Ln_2V_{12}O_{32}(H_2O)_s\{Cl\}]Cl$, wherein Ln can be Eu, Gd, Dy, Tb, Ho, or Er.

In another aspect, the heterocoagulation agent may be a layered double hydroxide, such as a magnesium aluminum hydroxide nitrate as described by Abend et al., *Colloid Polym. Sci.* 1998, 276, 730-731, or synthetic hematite, hydrotalcite, or other positively charged layered double hydroxides, including but not limited to those described in U.S. Pat. No. 9,616,412, which are incorporated herein by reference. Thus, the cationic polymetallate used as a heterocoagulation reagent can be a layered double hydroxide or a mixed metal layered hydroxide. For example, the mixed metal layered hydroxide can be selected from a Ni—Al, Mg—Al, or Zn—Cr—Al type having a positive layer charge. In another aspect, the layered double hydroxide or mixed metal layered hydroxide can comprise or can be selected from magnesium aluminum hydroxide nitrate, magnesium aluminum hydroxide sulfate, magnesium aluminum hydroxide chloride, $Mg_x(Mg,Fe)_3(Si,Al)_4O_{10}(OH)_2(H_2O)_4$ (x is a number from 0 to 1, for example, about 0.33 for ferrosaponite), $(Al,Mg)_2Si_4O_{10}(OH)_2(H_2O)_s$, synthetic hematite, hydrozincite (basic zinc carbonate) $Zn_5(OH)_6(CO_3)_2$, hydrotalcite $[Mg_6Al_2(OH)_{16}]CO_3\cdot 4H_2O$, tacovite $[Ni_6Al_2(OH)_6]CO_3\cdot 4H_2O$, hydrocalumite $[Ca_2Al(OH)_6]OH\cdot 6H_2O$, magaldrate $[Mg_{10}Al_5(OH)_{31}](SO_4)_2\cdot mH_2O$, pyroaurite $[Mg_6Fe_2(OH)_{16}]CO_3\neq 4.5H_2O$, ettringite $[Ca_6Al_2(OH)_{12}](SO_4)_3\cdot 26H_2O$, or any combination thereof.

In still a further aspect, the heterocoagulation reagent can include aqueous solutions of Fe polycations, as described by Oades, *Clay and Clay Minerals,* 1984, 32(1), 49-57, or described by Cornell and Schwertmann in "The Iron Oxides: Structure, Properties, Reactions, Occurrences and Uses", 2003, Second Edition, Wiley VCH. The cationic polymetallate can comprise or can be selected from an iron polycation having an empirical formula $FeO_x(OH)_y(H_2O)_z]^{n+}$, wherein 2x+y is less than (<) 3, z is a number from 0 to about 4, and n is a number from 1 to 3. The use of cations such as protons, lithium ions, sodium ions, or potassium ions and the like do not afford clay heteroadducts as provided by the cationic polymetallates of this disclosure, for example, the proton (acid)-treated clays generally are not readily filterable.

In another aspect, the colloidal smectite clay can comprise or be selected from colloidal montmorillonite, such as Volclay® HPM-20 bentonite. The heterocoagulation reagent can comprise or be selected from aluminum chlorhydrate, polyaluminum chloride, or aluminum sesquichlorohydrate.

According to an aspect, the cationic polymetallate can comprises or be selected from a complex of Formula I or Formula II or any combination of complexes of Formula I or Formula II, according to the following formulas:

$$[M(II)_{1-x}M(III)_x(OH)_2]A_{x/n}\cdot mL \quad (I)$$

$$[LiAl_2(OH)_6]A_{1/n}\cdot mL \quad (II)$$

wherein:

M(II) is at least one divalent metal ion;

M(III) is at least one trivalent metal ion;

A is at least one inorganic anion;

L is an organic solvent or water;

n is the valence of the inorganic anion A or, in the case of a plurality of anions A, is their mean valence; and x is a number from 0.1 to 1; and m is a number from 0 to 10.

In this aspect: M(II) can be, for example, zinc, calcium, strontium, barium, iron, cobalt, nickel, cadmium, manganese, copper, or magnesium; independently, M(III) can be, for example, iron, chromium, manganese, bismuth, cerium, or aluminum; A can be, for example, hydrogencarbonate (bicarbonate), sulfate, nitrate, nitrite, phosphate, chloride, bromide, fluoride, hydroxide, or carbonate; n can be, for example, a number from 1 to 3; and L can be, for example, methanol, ethanol or isopropanol, or water. Further to this aspect, the cationic polymetallate can be selected from a complex of Formula I, wherein M(II) is magnesium, M(III) is aluminum, and A can be carbonate.

In an aspect, the cationic polymetallate can comprises polyaluminum chloride, aluminum chlorhydrate, aluminum sesquichlorohydrate, or polyaluminum oxyhydroxychloride, or a combination thereof. In a further aspect, the cationic polymetallate can include linear, cyclic or cluster aluminum compounds containing, for example, from 2-30 aluminum atoms. The ratio of millimoles (mmol) of aluminum (Al) in the polyaluminum chloride, aluminum chlorhydrate, aluminum sesquichlorohydrate, or polyaluminum oxyhydroxychloride to grams (g) of colloidal smectite clay in recipe for preparing the smectite heteroadduct can be in a range of, for example, from about 0.75 mmol Al/g clay to about 2.0 mmol Al/g clay, from about 0.8 mmol Al/g clay to about 1.9 mmol Al/g clay, from about 1.0 mmol Al/g clay to about 1.8 mmol Al/g clay, from about 1.1 mmol Al/g clay to about 1.8 mmol Al/g clay, or from about 1.1 mmol Al/g clay to about 1.7 mmol Al/g clay. Alternatively, the millimoles (mmol) of aluminum (Al) in the polyaluminum chloride, aluminum chlorhydrate, aluminum sesquichlorohydrate, or polyaluminum oxyhydroxychloride per grams (g) of colloidal smectite clay in recipe for preparing the smectite heteroadduct can be, for example, about 0.75 mmol Al/g clay, about 0.8 mmol Al/g clay, about 0.9 mmol Al/g clay, about 1.0 mmol Al/g clay, about 1.1 mmol Al/g clay, about 1.2 mmol Al/g clay, about 1.3 mmol Al/g clay, about 1.4 mmol Al/g clay, about 1.5 mmol Al/g clay, about 1.6 mmol Al/g clay, about 1.7 mmol Al/g clay, about 1.8 mmol Al/g clay, about 1.9 mmol Al/g clay, or about 2.0 mmol Al/g clay, including any ranges between any of these ratios or combinations of subranges therebetween.

In a further aspect, the ratio of millimoles (mmol) of aluminum (Al) in the polyaluminum chloride, aluminum chlorhydrate, aluminum sesquichlorohydrate, or polyaluminum oxyhydroxychloride to grams (g) of colloidal clay in the recipe to prepare the isolated or calcined smectite heteroadduct can be about 90% or less, about 80% or less, about 70% or less, about 60% or less, about 50% or less, about 45% or less, about 40% or less, or about 35% or less of a comparative ratio of millimoles of aluminum to grams of colloidal clay used for the preparation of a pillared clay using the same colloidal smectite clay and heterocoagulation reagent.

In this aspect, the ratio of aluminum regent to clay in a pillaring recipe is expressed in mmol Al/g clay, indicating the number of millimoles of Al in the aluminum chlorhydrate reagent versus the grams of clay in the recipe. Specifically, this ratio reflects the ratio employed in the synthesis recipe, not the ratio in the final pillared clay product. As an example, considering the $Al_{13}$-type Keggin ions as described by Ocelli, *Clay and Clay Minerals,* 2000, 48(2), 304-308, the amount of Al used in the pillared clay preparation is far in excess of the amount of Al that eventually is intercalated between the layers in the final pillared clay solid. The use of an excess of aluminum reagent is employed to provide a maximum of pillar content in the final product and obtain the desired porosity and surface area of the final calcined material. Kooli in *Microporous and Mesoporous Materials;* 2013, 167, 228-236 discloses that generally, about 6 mmol Al/gram of clay is needed in the recipe in order to optimize pillaring. In a more recent scale-up study and optimization of $Al_{13}$ Keggin ion-pillared clay, Pergher and Bertella in *Materials,* 2017, 10, 712, disclose that 15 mmol Al/g clay and dilute dispersions of about 1 wt. % clay are required for obtaining pillaring with the desired basal spacing and surface areas.

F. Preparation, Isolation, and Filterability of the Clay-Heterocoagulates

According to an aspect of the disclosure, the surfactant reagent can be contacted with the clay in any manner in a first liquid carrier. It has been found that adding the clay to the first liquid carrier and applying shear force to disperse the clay, followed by adding the surfactant to this dispersion works well. The first liquid carrier can comprise or can be water, to which the clay is added and dispersed, followed by surfactant. The surfactant reagent can be contacted with the clay dispersion through direct addition of the solid or neat liquid form of the surfactant reagent to a slurry/dispersion of the clay, or by contacting a liquid mixture in which the reagent is dissolved or slurried in an appropriate solvent with the clay slurry/dispersion. While the solid clay can be added under high shear conditions to a liquid surfactant or a liquid or solid surfactant dissolved or dispersed in a liquid carrier, more consistent results have been achieved by forming a well-dispersed clay suspension in a liquid carrier prior to adding the surfactant to the carrier.

The step of contacting the colloidal smectite clay with a heterocoagulation reagent, whether a surfactant, a cationic polymetallate, or a combination thereof, can be carried out using high shear conditions obtained from high rpm (revolutions-per-minute) to afford a clump-free dispersion. On a laboratory scale, this can be accomplished using a Waring® blender and on an industrial scale, a Cowles type mixer or other high-speed dispersion mixers can be used with suitable mixing speeds and high shear impellers as required.

The smectite heteroadduct can be prepared by contacting a colloidal smectite clay and a surfactant in a "first" liquid carrier. Unless otherwise specified, the term "first" liquid carrier refers to the medium in which the smectite heteroadduct is prepared, whereas the "second" liquid carrier refers to the medium in which the catalyst system is prepared by contacting the smectite heteroadduct and a transition metal or metallocene compound. The organic compounds that can serve as a first liquid carrier can also serve as the second liquid carrier.

In an aspect, the first liquid carrier can comprise, consists essentially of, or be selected from water, an organic liquid, or a combination thereof. For example, the first liquid carrier can comprise or can consist essentially of water, an alcohol, an ether, a ketone, an ester, or any combination thereof. In embodiments, the first liquid carrier can comprise or can consist essentially of water, methanol, ethanol, n-propanol, isopropanol, n-butanol, diethyl ether, di-n-butyl ether, acetone, methyl acetate, ethyl acetate, or any combination thereof. For example, the first liquid carrier can be water absent any organic liquid, so that the colloidal smectite clay and the surfactant are contacted in water only.

In a further aspect, the step of contacting the colloidal smectite clay and the surfactant can comprises: the addition of the surfactant in solid or neat liquid form to a mixture of the colloidal smectite clay in the first liquid carrier; or the addition of a solution or a slurry of the surfactant to a mixture of the colloidal smectite clay in the first liquid carrier. When the smectite heteroadduct is prepared by a process of contacting a colloidal smectite clay, a cationic polymetallate, and a surfactant, the contacting step can comprise:

(a) adding the surfactant and adding the cationic polymetallate, simultaneously or in any order, to a mixture of the colloidal smectite clay in the first liquid carrier; or (b)(1) adding the cationic polymetallate to a mixture of the colloidal smectite clay in the first liquid carrier to form a smectite-cationic polymetallate heteroadduct, (2) isolating the smectite-cationic polymetallate heteroadduct, and (3) re-suspending the smectite-cationic polymetallate heteroadduct in a dispersion medium into which the surfactant is added before, after, or during the re-suspending step.

In embodiments, the step of contacting the colloidal smectite clay with the surfactant and/or the cationic polymetallate can occurs at a range of temperatures, for example: (i) from about 5° C. to about 90° C., from about 10° C. to about 50° C., or from about 15° C. to about 30° C.; or (ii) about 5° C., about 10° C., about 15° C., about 20° C., about 25° C., about 30° C., about 35° C., about 40° C., about 45° C., about 50° C., about 55° C., about 60° C., about 65° C., about 70° C., about 75° C., about 80° C., about 85° C., about 90° C., or any ranges between any of these temperatures.

Accordingly, the result of contacting in the first liquid carrier the clay and the heterocoagulation regent, whether surfactant, cationic polymetallate, or a combination thereof, is the formation of a clay-heteroadduct (or "heterocoagulate"). Depending upon the heterocoagulation regent, the clay-heteroadduct may be referred to as a clay-surfactant heteroadduct, a clay-cationic polymetallate-surfactant heteroadduct, or a clay-cationic polymetallate heterocoagulate if no surfactant is present. Once the clay-heteroadduct forms, the removal of salts and other soluble byproducts of heterocoagulate preparation is readily accomplished by isolating the heterocoagulate product, washing the heterocoagulate with water, followed by simple filtration to isolate the heterocoagulate.

The method of making a support-activator comprising a smectite heteroadduct, can further comprise the step of: (i) isolating the smectite heteroadduct from the slurry in the first liquid carrier. Once isolated, the process can further comprise (ii) washing the smectite heteroadduct with water, an organic liquid, or a combination thereof, and the process may still further comprise (iii) drying or calcining the smectite heteroadduct. Isolating the smectite heteroadduct can comprise gravity filtering the slurry, vacuum filtering the slurry, subjecting the slurry to reduced pressure, heating the slurry, subjecting the slurry to rotary-evaporation, sparging a gas through the slurry, or any combination thereof. The ease of isolating the smectite heteroadducts by filtering the slurry from the contacting step provides an advantage in their preparation and use as support-activators. The isolating the smectite heteroadduct can comprise evaporating the first liquid carrier from the slurry to which an organic liquid azeotroping reagent has been added, or isolating the smectite heteroadduct is conducted in the absence of an azeotroping agent. In any event, the step of isolating the smectite heteroadduct can be carried out without the use of ultrafiltration, centrifugation, or settling tanks.

Once isolated, the smectite heteroadduct can be washed, re-suspended in a liquid carrier and again filtered off, re-suspended in a dispersion medium prior to spray-drying, and the like. For example, the method of making a support-activator can further comprise the step of re-suspending the smectite heteroadduct in water, an organic liquid, or a combination thereof to form a suspension, and evaporating the water from the suspension to isolate the smectite heteroadduct or filtering the suspension to isolate the smectite heteroadduct. The smectite heteroadduct obtained again can be washed water, an organic liquid, or a combination thereof and re-isolated. In one aspect, the method can further comprise the step of measuring a conductivity of the suspension of the smectite heteroadduct in water, and if the conductivity is greater than 300 μS/cm, repeating the steps of washing the smectite heteroadduct and filtering the suspension to provide the washed smectite heteroadduct.

The isolated smectite heteroadduct can then be dried or calcined. For example, drying the smectite heteroadduct can be carried out by an azeotroping process or by a spray-drying process. Drying or calcining the smectite heteroadduct can also occur by heating the smectite heteroadduct in air, in an inert atmosphere, under vacuum, or a combination of these methods.

In an aspect, the heterocoagulate solid may be dried with azeotroping agents if desired. Suitable azeotroping agents can include, but are not limited to, ethanol, 1-propanol, 1-butanol, 2-butanol, benzene, or acetonitrile. In an aspect, the azeotroping agent can be combined with water in any manner, such as before or after the addition to the heterocoagulate solid.

In another aspect, the product can be directly carried through to subsequent calcination/drying steps without the addition of an azeotroping agents. This method constitutes an advantageous embodiment, as it allows the drying steps to be conducted in the absence of organic solvents, providing a substantial economic and safety benefit.

In an aspect, processing of a shape of a clay-surfactant heterocoagulate, that is, altering or fixing/setting a shape of the heterocoagulate, may be carried out by granulating, pulverizing or classifying before calcination. That is, the ion-exchange layered clay (aluminosilicate) having a shape previously processed may be subjected to chemical treatment. Alternatively, a clay-surfactant heterocoagulate may be subjected to processing of a shape following calcination. Processing may occur before or after chemical treatment with an optional co-catalyst such as an organoaluminum compound and/or treatment with a polymerization catalyst.

In an aspect, the shape of a clay-surfactant heterocoagulate may be altered or fixed/set by methods referred to as "granulation" methods. Examples of granulation methods that can be used include, but are not limited to, a stirring granulation process, a spraying (spray-drying) granulation process, a tumbling granulation process, a grinding granulation process, a bricketing granulation process, a compacting granulation process, an extruding granulation process, a fluidized layer granulation process, an emulsifying granulation process, a suspending granulation process, a press-molding granulation process, and the like. In another aspect, granulations methods that work well according to this disclosure include a stirring granulation process, a spraying granulation process, a tumbling granulation process, and a fluidizing granulation process, but the granulation method is not limited to these specific processes.

The clay-surfactant heteroadducts prepared in slurry form according to this disclosure unexpectedly exhibited an improved ease of isolation as compared to, for example, pillared clays which are prepared using the same smectite clay and cationic polymetallate heterocoagulation reagent, but in different amounts. Specifically, the clay heteroadducts could be readily isolated by filtration, unlike the pillared clays.

One method by which the filterability of the heterocoagulated clay-surfactant slurries may be assessed determines if the heterocoagulate is "readily filterable" by comparing the filtrate collected from a slurry of the heteroadduct versus the aqueous carrier in the initial slurry. In one aspect, a slurry of the clay-surfactant heteroadduct is readily or easily filterable if the slurry is characterized by the following filtration behavior:

(a) when filtration of a 2.0 wt. % aqueous slurry of the smectite heteroadduct is initiated from 0 hours to 2 hours after the colloidal smectite clay and the surfactant form the contact product, the proportion of a filtrate obtained at a filtration time of from 2 hours to 12 hours using either vacuum filtration or gravity filtration, based upon the weight of the first liquid carrier in the slurry of the smectite heteroadduct is in a range of (i) from about 30% to about 100% by weight of the first liquid carrier in the slurry before filtration, that is, of the initial slurry water weight, (ii) from about 40% to about 100% by weight of the first liquid carrier in the slurry, (iii) from about 50% to about 100% by weight of the first liquid carrier in the slurry, or (iv) from about 60% to about 100% by weight of the first liquid carrier in the slurry before filtration; and (b) the filtrate from the heteroadduct slurry, when evaporated, yields clay solids comprising less than 20%, less than 15%, or less than 10% of the initial combined weight of the smectite clay and the surfactant.

A small portion of water may be added to the slurry for additional washing and to recover extra slurry. The feature of performing the filtration with 0 to 2 hours after the initial formation is specified because some non-heteroadduct slurries including some pillared clay slurry compositions can be filtered more easily after the slurry is allowed an initial settling period of several days, and this filterability would not be considered "readily filterable" according to these criteria.

In this disclosure, the clay-surfactant heteroadduct slurry could be filtered using a 20 micron filter within several minutes after the contacting step between the colloidal clay and the surfactant. In most cases, essentially all of the water from the heteroadduct slurry had been filtered off at the 10 minute mark after initiating the vacuum filtration. In contrast, essentially none of the water from an analogous pillared clay slurry could be filtered off at 10 minutes after initiating vacuum filtration.

By assessing "readily filterable" using the combination of the two features recited above, it is not necessary to specify either the filter spacings (for example, 20 m) or whether the filtration was conducted by a gravity filtration or vacuum filtration. That is, a filter having a specified opening size can be easily identified by the person of ordinary skill, for example the 20 m filter used in the examples, which allows the clay heteroadduct to meet both of these criteria, but no filter size will allow the pillared clay to meet both of these criteria.

As an example of applying this "readily filterable" test, if a filter having too large of openings between the filter media is used, such that a pillared clay filtration meets the requirement of part (a) of the criteria above, it will fail part (b) and will not be considered readily filterable. The clay heteroadduct would also fail part (b) when using such a large filter size, but reducing the filter size (for example, to about 20 m) will allow the clay heteroadduct to meet both criteria (a) and (b), whereas the pillared clay slurry will fail part (a) when reducing the filter size, because the filter will clog and little or no liquid carrier will be filtered through.

Similarly, either gravity or vacuum filtration can be used in the "readily filterable" test because at the point in time at which the measurements of the filtrates is specified (10 minutes after initiating the filtration), a proper filter size can be easily identified by the person of ordinary skill which will allow the clay heteroadduct to meet both criteria (a) and (b), whereas the pillared clay will fail at least one of criteria (a) and (b).

G. Spray-Drying and Calcining the Smectite Clay-Heteroadducts

Once the smectite heteroadduct has been isolated, the method of making a support-activator can further comprise the steps of:

- suspending the smectite heteroadduct in a dispersion medium to provide a suspension of the smectite heteroadduct in the dispersion medium; and
- spray-drying the smectite heteroadduct from the suspension to provide the support-activator in particulate form.

Examples of a dispersion medium used for a starting slurry to be sprayed include water, an organic liquid, or a combination thereof. For example, water only can be used as the dispersion medium for spray-drying, which can be advantageous from a cost and environmental standpoint. Examples of organic liquids (sometimes referred to herein as organic solvents, even though the clay heteroadduct is not soluble therein), which can be used alone or in combination with water include, but are not limited to, methanol, ethanol, i-propanol, n-propanol, n-butanol, chloroform, methylene chloride, pentane, hexane, heptane, toluene, xylene, and the like, including mixtures thereof. In one aspect, water is used as a dispersion medium, without the presence of an organic liquid. In an aspect, the dispersion medium can comprise or can consist essentially of water, an organic liquid, or a combination thereof, though one substantial advantage of this process is the ability to spray-dry the smectite heterocoagulate from an aqueous slurry in the absence of an organic liquid to obtain highly spherical particles of the smectite heterocoagulate. In embodiments, suspending the smectite heteroadduct in a dispersion medium can occurs under high shear conditions.

In one aspect, once the isolated smectite heteroadduct has been suspended in the dispersion medium to afford the spray-drying dispersion (sometimes referred to herein as a "re-suspending" step, because the smectite heteroadduct itself was isolated from a suspension), the smectite heteroadduct can be maintained in the dispersion medium suspension for a period of time prior to spray-drying. While not intending to be bound by theory, it has been found that improved processing of the smectite heteroadduct may be achieved if it is maintained in dispersion medium suspension for a time. For example, prior to spray drying, the smectite heteroadduct can be suspended in the dispersion medium for a period of time of:

(i) from 0.1 hour to 72 hours, from 0.25 hours to 72 hours, from 1 hour to 72 hours, from 12 hours to 72 hours, from 18 hours to 72 hours, or from 24 hours to 72 hours;

(ii) from 0.1 hour to 48 hours, from 0.25 hours to 48 hours, from 1 hour to 48 hours, from 12 hours to 48 hours, from 18 hours to 48 hours, or from 24 hours to 48 hours; or (iii) about 1 hour, about 2 hours, about 4 hours, about 6 hours, about 9 hours about 12 hours, about 15 hours, about 18 hours, about 21 hours, about 24 hours, about 27 hours, or about 30 hours.

When using a spraying or spray-drying granulation method, the concentration of the clay heteroadduct in the starting slurry to be sprayed can be any concentration that provides a pumpable slurry. In one aspect, the concentration of the clay heteroadduct in the slurry to be sprayed should be high enough to be energy efficient and provide a viable yield but not too high that the slurry cannot be pumped using the spray drying equipment. For example, the concentration of the clay heteroadduct in the starting slurry for the spraying granulation which produces spherical particles can be from 0.1 wt % to 70 wt %, from 1 wt % to 50 wt %, from 5 wt % to 30 wt %, or from 8 wt % to 25 wt %. For example, the concentration of the clay heteroadduct in the starting slurry for the spraying granulation can be about 0.1 wt %, about 0.5 wt %, about 1 wt %, about 2 wt %, about 3 wt %, about 4 wt %, about 5 wt %, about 6 wt %, about 7 wt %, about 8 wt %, about 9 wt %, about 10 wt %, about 12 wt %, about 15 wt %, about 20 wt %, about 25 wt %, about 30 wt %, about 35 wt %, about 40 wt %, about 45 wt %, about 50 wt %, about 55 wt %, about 60 wt %, about 65 wt %, or about 70 wt %, or any ranges between any of these concentrations. In an aspect, the upper limit of the clay heteroadduct concentration in the spray drying slurry may be influenced by the particular spray drying apparatus and the mechanical limits of the spray drying. In another aspect, the lower limit of the clay heteroadduct concentration in the spray drying slurry may be influenced by concentrations which are low enough that insufficient evaporation occurs, leading to wet particles sticking to the spray dryer surface, or not producing the desired morphology such as spherical morphology.

In another aspect, the entrance temperature of hot air used in the spraying granulation method to produce spherical particles can vary depending upon a dispersion medium used. In an aspect, when spray drying the clay heteroadduct from a water only dispersion medium, the entrance temperature of hot air used in the spraying granulation can be from 80° C. to 260° C., from 90° C. to 250° C., or from 100° C. to 220° C. For example, when spray drying the clay heteroadduct from a dispersion medium of water only, the entrance temperature of hot air can be about 80° C., about 90° C., about 100° C., about 110° C., about 120° C., about 130° C., about 140° C., about 150° C., about 160° C., about 170° C., about 180° C., about 190° C., about 200° C., about 210° C., about 220° C., about 230° C., about 240° C., about 250° C., about 260° C., or any ranges between any of these temperatures.

The smectite heteroadducts when isolated or dried by any means can then be subjected to calcining to provide a calcined support-activator which imparts activity to a polymerization catalyst. By calcined the smectite heterocoagulate solid by heating, it is further dried and prepared for further treatment with a metallocene precatalyst and an optional co-catalysts and an optional co-activator. This calcining thermal treatment also dries the clay heterocoagulate sufficiently to impart the high activity to the final catalyst. Calcining treatment can be conducted in an ambient atmosphere (ambient pressure air), or under various conditions which facilitate removal of water.

In an aspect, the smectite heteroadduct can be heated or calcined under (a) an ambient atmosphere (air) which is not dried, or (b) a dry ambient atmosphere, wherein the dry ambient atmosphere includes air which has been passed through a drying column, or air which has a relative humidity of from about 0% to about 60%. In another aspect, the smectite heteroadduct can be heated or calcined under an inert atmosphere such as nitrogen or under vacuum. In a further aspect, calcining can be conducted in a carbon monoxide atmosphere. Calcining in atmospheres such as carbon monoxide can remove surface hydroxyls efficiently, and may allow the calcining to be effected at lower temperatures than would be required in an ambient atmosphere, helping preserve pore volume and surface area during dehydration of the surface, usually at temperatures of at least 100° C.

Calcining the smectite heteroadduct can be carried out, for example, by heating the smectite heteroadduct in air, in an inert atmosphere, or under vacuum. In one aspect, calcining can be conducted in a fluidized bed. In another aspect, the heterocoagulated solid can be calcined by heating at temperatures from: (i) from 100° C. to 900° C., from 200° C. to 800° C., from 200° C. to 750° C., from 225° C. to 700° C., from 225° C. to 650° C., from 250° C. to 650° C., from 250° C. to 600° C., from 250° C. to 500° C., from 225° C. to 450° C., or from 200° C. to 400° C.; or (ii) about 100° C., about 125° C., about 150° C., about 175° C., about 200° C., about 225° C., about 250° C., about 275° C., about 300° C., about 325° C., about 350° C., about 375° C., about 400° C., about 425° C., about 450° C., about 475° C., about 500° C., about 525° C., about 550° C., about 575° C., about 600° C., about 625° C., about 650° C., about 675° C., about 700° C., about 725° C., about 750° C., about 775° C., about 800° C., about 825° C., about 850° C., about 875° C., about 900° C., or any ranges between any of these temperatures.

In another aspect, the calcining temperature can be selected from any single temperature or calcining can be carried out over a range of two temperatures separated by at least 10° C., usually in the range of 110° C. to 800° C. As explained, when calcining in atmospheres such as carbon monoxide, the temperatures used may be lower than those used in ambient air and/or the calcining time may be shorter than when calcining in ambient air.

In a further aspect, calcining can be conducted in an ambient atmosphere (air), or in a dry ambient atmosphere (dry air), at a temperature from 110° C., for example from about 200° C., to 800° C. and for a time period from about 1 minute to about 100 hours. In embodiments, the clay heteroadduct can be calcined in ambient air or dry air at a temperature from about 225° C. to about 700° C. for a time period from about 1 hour to about 10 hours, or at a temperature from about 250° C. to about 500° C. for a time period from about 1 hour to about 10 hours.

In a further aspect, the smectite heteroadduct can calcined using any one of the following conditions: (a) a temperature ranging from about 110° C. to about 600° C. and for a time period ranging from about 1 hour to about 10 hours; (b) a temperature ranging from about 150° C. to about 500° C. and for a time period ranging from about 1.5 hours to about 8 hours; or (c) a temperature ranging from about 200° C. to about 450° C. and for a time period ranging from about 2 hours to about 7 hours.

While not intending to be theory-bound, it is thought that after calcining, the calcined heterocoagulated product can be described as a continuous, non-crystalline combination of clay and inorganic oxide particles, is highly effective towards activating a metallocene for olefin polymerization, and therefore can function as a support-activator, also termed an activator-support.

H. Properties of the Clay Heterocoagulates

Porosity and Particle Size. The heterocoagulation of the clay with a surfactant reagent as described herein can provide support-activators that have substantial porosity, which can enhance their activity as support-activators for metallocenes. In one aspect, the calcined clay-surfactant heteroadduct can exhibit a nitrogen adsorption/desorption BJH porosity of: (i) from 0.1 cc/g to 3.0 cc/g, from 0.15 cc/g to 2.5 cc/g, from 0.25 cc/g to 2.0 cc/g, or from 0.5 cc/g to 1.8 cc/g; or (ii) about 0.10 cc/g, about 0.20 cc/g, about 0.30 cc/g, about 0.50 cc/g, about 0.75 cc/g, about 1.00 cc/g, about 1.25 cc/g, about 1.50 cc/g, about 1.75 cc/g, about 2.00 cc/g, about 2.25 cc/g, about 2.50 cc/g, about 2.75 cc/g, about 3.00 cc/g, about 3.25 cc/g, or about 3.50 cc/g. Calcined clay-surfactant heteroadducts having a porosity as low as about 0.12 cc/g can be used in polymerization processes, as clay heteroadducts possessing <0.1 cc/g BJH porosity typically exhibit low polymerization activity, for example, <200 g PE/g support-activator/hr when combined with metallocenes such as bis(1-butyl-3-methylcyclopentadienyl)zirconium dichloride under polymerization reaction conditions. In this disclosure, polymerization activity is measured using the term "g support-activator", which refers to the grams of the calcined clay-surfactant heteroadduct (or clay-surfactant-cationic polymetallate) used to make the catalyst.

The preparation of calcined heterocoagulates which maintain substantial BJH porosity (≥0.1 cc/g), in which the heterocoagulate is dried as an aqueous slurry, without the addition of azeotroping agents such as 1-butanol, 1-propanol, or other such organic liquids, has been a challenging problem. The data in Table 1, as discussed below, demonstrate this issue. Such a water-only spray drying process is highly desirable to improve the economic viability and environmental sustainability of the process over those requiring organic dispersion media. Surprisingly, the present process achieves the benefit of permitting spray-drying from a water-only slurry to provide a clay heteroadduct which maintains high porosity and activity after calcining, and which is characterized by a desirable, highly spherical morphology which imparts excellent processing characteristics to the support-activator, the supported catalyst, and the resulting polymer.

Table 1 presents the properties and polymerization data for clay-aluminum chlorohydrate (ACH) heterocoagulates prepared in the absence of a surfactant, dried by either an azeotroping or non-azeotroping process, and which have been calcined to form the clay-ACH support-activators. Runs 1 through 4 illustrate that when clay-ACH supports are dried in azeotroping mixtures of 1-butanol and water and subsequently calcined, high BJH porosities in excess of 0.25 cc/g are obtained. However, the calcined clay-ACH heteroadduct of Run 5, which has been dried as an aqueous slurry, without 1-butanol or any organic liquid being added, and subsequently calcined, possesses a low BJH porosity of 0.049 cc/g. Samples illustrated in Runs 1 through 4, when combined with bis(1-butyl-3-methylcyclopentadienyl)zirconium dichloride, also demonstrate excellent polymerization activity (>2000 g PE/table 2 g support-activator/hr), while Run 5 shows minimal polymerization activity (<100 g PE/g support-activator/hr) under analogous conditions.

Figure 25:
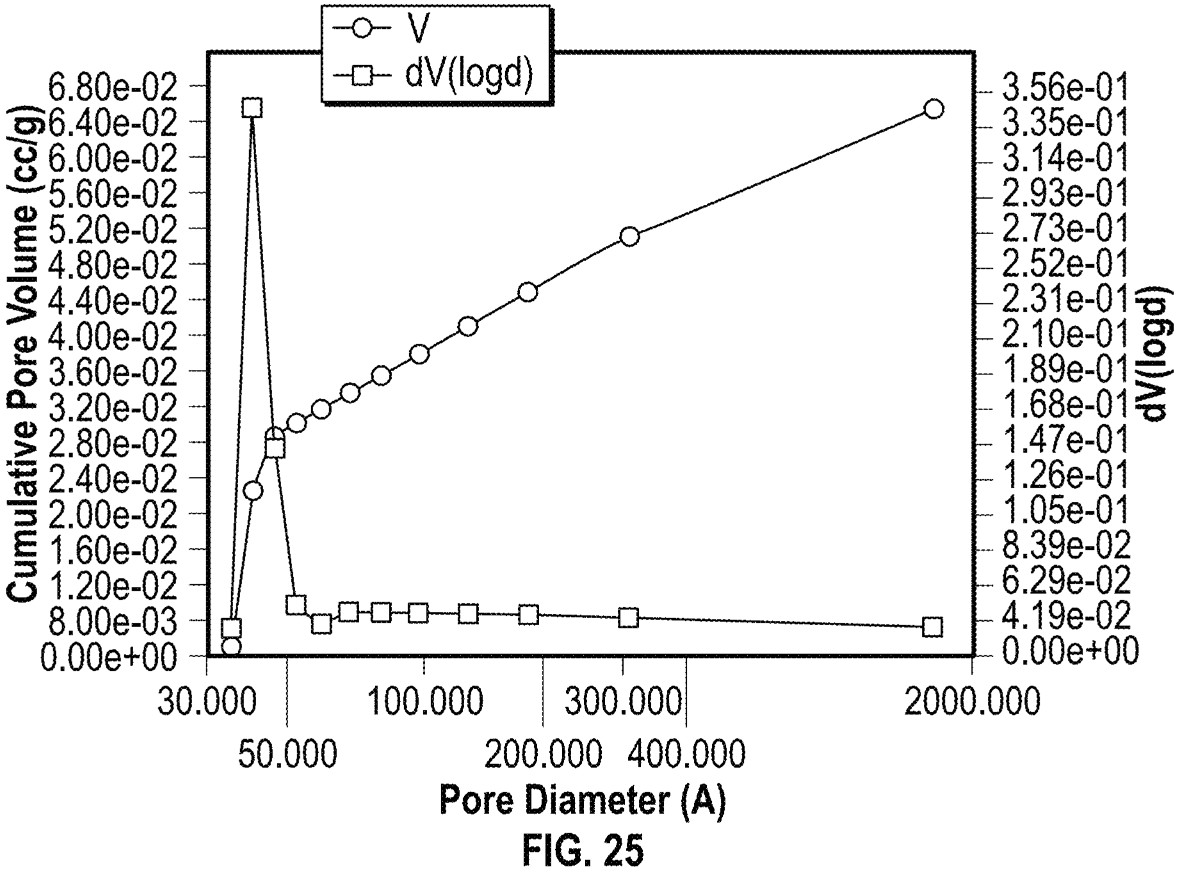
FIG. 25 provides the results of a nitrogen adsorption/desorption BJH pore volume analysis of the rotary evaporated and calcined Volclay® HPM-20 montmorillonite clay prepared according to Example 1, providing a plot of pore diameter (Angstrom, A) versus the cumulative pore volume (cubic centimeters per gram, cc/g) for the clay only, prior to any heteroadduct formation.

The data in Table 2 illustrate embodiments of the present disclosure. In an aspect, the addition of surfactant to a clay dispersion in water and evaporation of the aqueous slurry, without the addition of azeotroping agents (such as 1-butanol, 1-propanol, or other organic solvents), and subsequent calcination of the clay-heteroadduct produces support-activators with substantial BJH porosities relative to the calcined clay prepared under analogous conditions without the surfactant species. For example, FIG. 25 provides the results of a nitrogen adsorption/desorption BJH pore volume analysis of the rotary evaporated and calcined Volclay® HPM-20 montmorillonite clay prepared according to Example 1, by drying a 5 wt. % dispersion of HPM-20. Specifically, this figure provides a plot of pore diameter (Angstrom, A) versus the cumulative pore volume (cubic centimeters per gram, cc/g) for the clay only, prior to any heteroadduct formation. The total BJH porosity of this sample is 0.06 cc/g. Accordingly, in the absence of a surfactant reagent, the calcined smectites such as bentonites that are used in this disclosure may have BJH porosities from about 0 cc/g to about 0.1 cc/g.

In contrast, embodiments of the clay-surfactant heteroadduct support-activators can have BJH porosities greater than about 0.1 cc/g, for example, from 0.1 cc/g to 0.3 cc/g. In other embodiments or aspects of the disclosure, the BJH porosity of the clay-surfactant heteroadduct support-activator can be about 0.15-0.3 cc/g. Table 2 reports the porosity properties of such calcined clay-surfactant heterocoagulates, such as in Runs 2, 5, 7-14, and 18-21, with BJH porosities of from 0.1 cc/g to 0.3 cc/g. Thus, the calcined clay-surfactant heterocoagulate are characterized by BJH porosity that are about 150% (1.5×) to 200% (2×) of the BJH porosity of the corresponding calcined clay lacking the surfactant, and can be characterized by a BJH porosity that exceeds 200% of the corresponding calcined clay species lacking surfactant. In embodiments, the spray-dried clay-surfactant support-activators typically exhibit a BHJ porosity of around 0.1-0.3 cc/g total BHJ porosity, and there are some high activity examples toward the lower end of this porosity range, even as low as 0.12 cc/g. In contrast, the clay-ACH support-activators can have BJH porosities as high as about 0.5-0.7 cc/g.

These clay-surfactant support-activator porosities can be compared with those of other clay heteroadducts. For example, tests were examined using heteroadducts (support-activators) prepared using a cationic polymetallate only, a surfactant only at different surfactant concentrations, and a combination of a cationic polymetallate and a surfactant, as follows.

The porosity data were obtained for the calcined, non-azeotroped (rotary evaporated) clay-aluminum chlorohydrate (ACH)-surfactant heteroadduct prepared according to Example 7-B2, in which the heterocoagulate is prepared through contacting the clay slurry with ACH followed by 0.5 wt % trihexyl tetradecyl phosphonium bromide. The total BJH porosity of this species is 0.148 cc/g.

Porosity data were also obtained for the calcined, non-azeotroped (rotary evaporated) clay-surfactant heteroadduct prepared according to Example 13-B8, in which the clay heterocoagulate is prepared by contacting the clay with 1 wt. % tetrabutylammonium bromide (TBABr) in the absence of a cationic polymetallate (0.62 mmol TBABr/g clay). The total BJH porosity of this species is 0.126 cc/g.

Porosity data were also obtained for the calcined, non-azeotroped (rotary evaporated) clay-surfactant heteroadduct prepared according to Example 14-B9, in which the clay heterocoagulate is prepared by contacting the clay with 2 wt. % tetrabutylammonium bromide in the absence of a cationic polymetallate. The total BJH porosity of this species is 0.162 cc/g.

In a further aspect, the measured BJH porosity of the calcined heterocoagulate prepared by combination of clay, a surfactant agent, and additional heterocoagulating agent such as aluminum chlorhydrate or polyaluminum chloride (cationic polymetallates) substantially exceeds the measured BJH porosity of the calcined heterocoagulate prepared by combination of the clay and additional heterocoagulating agent alone. As a baseline measurement, the calcined, non-azeotroped (rotary evaporated) clay heterocoagulate prepared through contacting clay with an aqueous aluminum chlorhydrate (ACH) dispersion according to Example 5-A4, was found to have a total BJH porosity of 0.049 cc/g. However, when both a cationic polymetallate and a surfactant are used, porosity can substantially increase. This increase is depicted in the calcined, non-azeotroped (rotary evaporated) clay-ACH-surfactant heteroadduct prepared according to Example 6-B1, in which the calcined clay heterocoagulate was prepared through contacting clay with an aqueous aluminum chlorhydrate dispersion and 2 wt % of tetraoctylammonium bromide. The total BJH porosity of this sample was found to be 0.287 cc/g.

Notably, calcined heterocoagulates prepared by combination of clay and surfactants (and optionally other heterocoagulating agents such as aluminum chlorhydrate or polyaluminum chloride) can also exhibit high BJH porosity (>0.15 cc/g), even when pre-calcination drying is conducted in the absence of azetroping agents. This unexpected result can be demonstrated, for example, in Table 2 (Run 2) and in Table 3 (Runs 7-10). Thus, the addition of an azeotroping agent is not necessary to preserve the porosity of clay surfactant supports. The ability to use pure water in lieu of alcoholic-water mixtures (or other organic liquids with water) during the processing of these support-activators confers a number of practical economical and safety benefits for the use of these clay surfactant supports.

The Table 2 data also indicate that, while tetramethylammonium bromide in combination with clay provides a heteroadduct that exhibits good activity, relatively high concentrations of the tetramethylammonium bromide are usually needed to achieve desirable activities. When using the long chain tetralkyl ammonium, long chain alkyl trimethylammonium, or long chain alkyl ammonium surfactants in combination with a smectite clay, excellent activities of the support-activator are observed at lower relative surfactant concentrations.

In another aspect, the smectite clay heteroadduct (heterocoagulate) can have an average particle size of, for example, from 1 m (micron) to 250 m, which is the average dry or calcined particle size. Unless stated otherwise, particle sizes recited for the smectite clay heteroadduct are for the dried or calcined clay-heteroadduct particles measured as described herein. For example, the smectite clay heteroadduct can have an average particle size of about 1 μm (microns), about 2 μm, about 3 μm, about 5 μm, about 7 μm, about 10 μm, about 12 μm, about 15 μm, about 18 μm, about 20 μm, about 25 μm, about 30 μm, about 35 μm, about 40 μm, about 45 μm, about 50 μm, about 55 μm, about 60 μm, about 65 μm, about 70 μm, about 75 μm, about 80 μm, about 85 μm, about 90 μm, about 95 μm, about 100 μm, about 110 μm, about 120 am, about 125 μm, about 130 μm, about 140 μm, about 150 μm, about 160 μm, about 170 μm, about 175 μm, about 185 μm, about 200 μm, about 225 μm, or about 250 μm, or any ranges of particle sizes between these recited numbers. For example, the smectite clay heteroadduct can have an average particle size of from 1 μm (micron) to 250 μm, from 2 μm to 125 μm, from 3 μm to 100 μm, from 5 μm to 150 μm, from 5 μm to 80 μm, from 7 μm to 70 μm, from 10 μm to 100 μm, from 10 μm to 60 μm, from 15 μm to 80 μm, from 15 μm to 50 μm, or from 20 μm to 75 μm.

Figure 29:
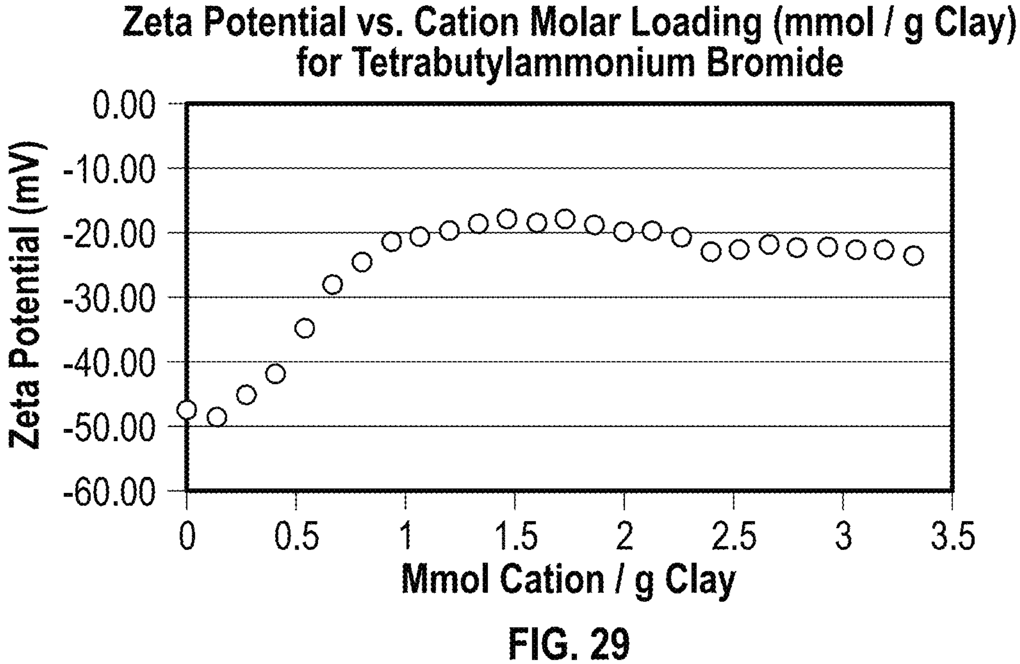
FIG. 29 illustrates a zeta potential titration for the volumetric addition of a 10.7 wt. % (weight percent) aqueous solution of tetrabutylammonium bromide into a 1 wt. % Volclay® HPM-20 bentonite aqueous dispersion, plotting the measured zeta potential versus the versus the mmol cation/g clay (millimoles of cation per gram of clay). An equilibration delay of 30 seconds was allowed after each titrant aliquot. The mmol cation/g clay indicates the cumulative millimoles of aqueous tetrabutylammonium bromide solution added during the titration.
Figure 30:
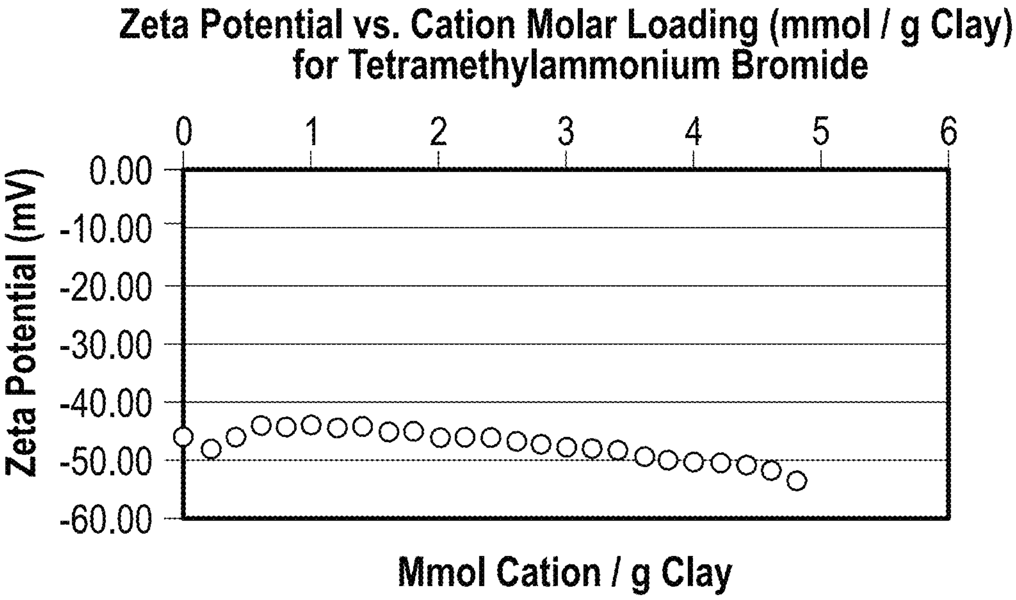
FIG. 30 illustrates a zeta potential titration for the volumetric addition of a 7.9 wt. % (weight percent) aqueous solution of tetramethylammonium bromide into a 1 wt. % Volclay® HPM-20 bentonite aqueous dispersion, plotting the measured zeta potential versus the mmol cation/g clay (millimoles of cation per gram of clay). An equilibration delay of 30 seconds was allowed after each titrant aliquot. The mmol cation/g clay indicates the cumulative millimoles of the aqueous tetramethylammonium bromide solution added.

Zeta Potential. The zeta potentials of slurries of the clay-surfactant heteroadducts were measured as a function of the millimoles of surfactant added to a slurry of the smectite clay and compared with the zeta potentials of slurries of the clay-cationic polymetallate heteroadducts. FIG. 29 and FIG. 30 illustrate the zeta potential data for a slurry of smectite clay which was titrated with an aqueous solution of tetrabutylammonium bromide and tetramethylammonium bromide, respectively, which plot the slurry zeta potential vs. the millimoles of the specific tetraalkylammonium bromide added per gram of clay. The mmol cation/g clay reflects the cumulative millimoles of the aqueous tetraalkylammonium bromide solution added.

As illustrated in these figures, the surfactant titration never provides a zeta potential (millivolts) which is zero or positive(+). For the tetrabutylammonium bromide titration (FIG. 29), a zeta potential of about negative (−)18 mV is the most positive potential observed, and for the tetramethylammonium bromide titration (FIG. 30), a zeta potential of about negative (−)43 mV is the most positive potential observed. When a slurry of the smectite clay is titrated with an ammonium bromide solution (not shown), a zeta potential of about negative (−)50 mV is the most positive potential observed. This behavior contrasts with the zeta potential titration using aluminum chlorhydrate as the titrant, where the zeta potential curve passes from a negative (−) mV potential through neutral to positive (+)mV potential, as the titrant amount increases.

The highest polymerization activity observed for the smectite clay-tetraalkylammonium heteroadducts depended upon the particular tetraalkylammonium surfactant employed. For example, the highest polymerization activity observed for the smectite clay-tetrabutylammonium bromide heteroadducts occurs for those prepared using from about 1.25 mmol surfactant/g clay to about 2.5 mmol surfactant/g clay (see Table 2).

I. Powder XRD Structure of the Spray-Dried Clay-Surfactant Heterocoagulates

Figure 26:
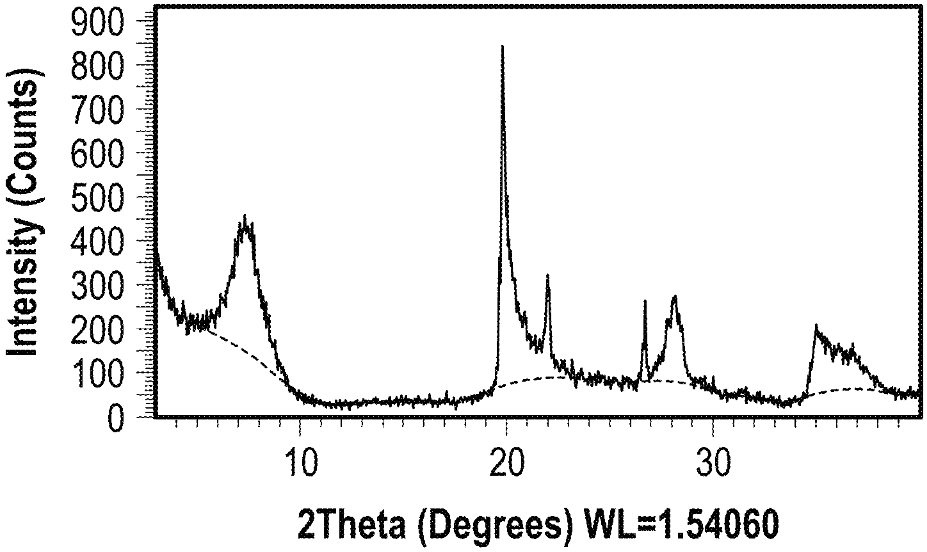
FIG. 26 provides a powder XRD (X-ray diffraction) pattern of the calcined, spray-dried product from combining Volclay® HPM-20 montmorillonite clay and tetramethylammonium bromide (TMABr) absent a cationic polymetallate, prepared according to Example 21-E1.
Figure 27:
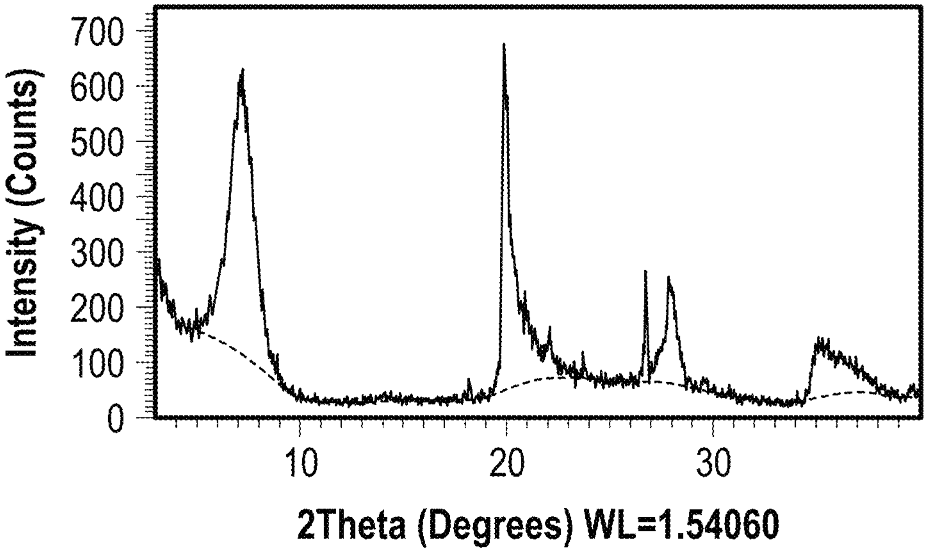
FIG. 27 provides a powder XRD pattern of the calcined spray-dried product from combining Volclay® HPM-20 montmorillonite and tetrabutylammonium bromide (TBABr) absent a cationic polymetallate, prepared according to Example 22-E2.
Figure 28:
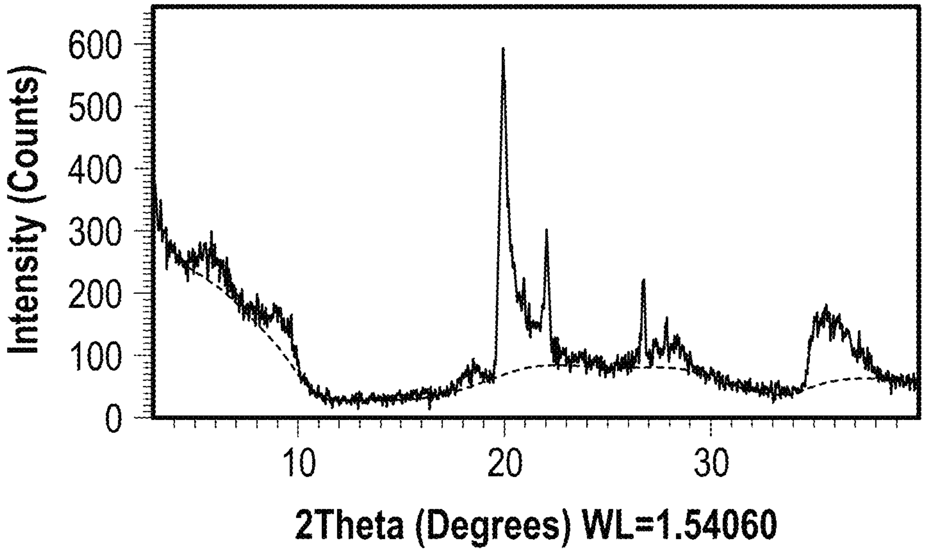
FIG. 28 provides a powder XRD pattern of the calcined spray-dried product from combining Volclay® HPM-20 montmorillonite and aluminum chlorhydrate (ACH), absent a surfactant, prepared according to Comparative Example 20-D1.

The powder XRD (x-ray diffraction) patterns of a series of spray-dried calcined products are presented in FIGS. 26-28. These samples were not dried by either azeotropically or non-azeotropically rotary evaporating the liquid carrier, but rather spray-drying and calcining the samples. FIG. 26 illustrates the powder XRD of the calcined, spray-dried product from combining Volclay® HPM-20 montmorillonite clay and tetramethylammonium bromide (TMABr) absent a cationic polymetallate, as in Example 21-E1. FIG. 27 illustrates the powder XRD of the calcined spray-dried product from combining Volclay® HPM-20 montmorillonite and tetrabutylammonium bromide (TBABr) absent a cationic polymetallate, according to Example 22-E2. FIG. 28 illustrates the powder XRD of the calcined spray-dried product from combining Volclay® HPM-20 montmorillonite and aluminum chlorhydrate (ACH), absent a surfactant, according to comparative Example 20-D1. In these XRD patterns, the peaks in the range of between 20-30 degrees 2 theta (2θ) (20-30° 2θ) arise from the mineral impurities that exist in the starting colloidal clay.

In contrast to other clay-based materials such as those described by Jensen et al. in U.S. Patent Appl. Publication Nos. 2018/0142047 and 2018/0142048 (assigned to W. R. Grace) and those described in International Publication No. WO 2021/154204, the clay-surfactant heterocoagulates of this disclosure, after filtration and calcination at 300° C. or higher, can exhibit a substantial d001 peak of between 6-9 degrees 2 theta (2θ) (6-9° 2θ), for example between 7-8 degrees 2 theta (2θ) (7-8° 2θ) in the powder XRD scan. This feature is illustrated in the examples of FIG. 26 and FIG. 27, which present the powder XRD patterns of spray-dried and calcined products from combining either tetramethylammonium bromide (FIG. 26) or tetrabutylammonium bromide (FIG. 27), respectively, with Volclay® HPM-20 montmorillonite, the samples differing only in the tetraalkylammonium surfactant used.

These features stand in contrast to calcined pillared adducts consisting of clay and aluminum chlorhydrate (in which aluminum chlorhydrate is added to clay in molar ratios in excess of 6 mmol Al/g clay), which tend to have a well-defined substantial d001 peak between 4-6 degrees 2θ (4-6° 2θ) in the powder XRD scan. They are also distinct from the cationic polymetallate-heteroadducts such as the type prepared using aluminum chlorhydrate (ACH) and montmorillonite according to comparative Example 20-D1, for which a powder XRD scan is provided in FIG. 28. In this heteroadduct, the powder XRD indicates little or virtually no pillaring (peak between 4.8 degrees 2θ to 5.2 degrees 2θ), and little or virtually no simple ion exchanged clay (peak between 9 degrees 2θ and 10 degrees 2θ) relative to the mineral impurities that exist in the starting colloidal clay in the range of 2 theta between 20-30 degrees 2θ.

The inventive spray-dried calcined clay-surfactant heteroadducts described herein thus have distinctly different microscopic structures than previously disclosed calcined spray-dried clay-aluminum chlorhydrate heterocoagulates and other clay-cationic polymetallate heterocoagulates.

J. Morphology of Spray-Dried Clay-Surfactant Heterocoagulates and the Polymers Produced Therefrom In an aspect, the calcined, spray-dried, clay-surfactant heterocoagulate support-activators and the supported catalysts prepared therefrom were found to be highly spherical in nature and very consistently spherical, that is, highly uniform in their spherical shape. The highly spherical nature can be measured by various means, including sphericity (S), roundness (R), circularity (C), or combinations thereof. Surprisingly, the highly spherical and highly circular properties of the clay-surfactant heterocoagulates could be achieved by spray-drying from an aqueous suspension, in the absence of any organic solvents. The clay heterocoagulates and polymer particles produced using the clay heterocoagulates as support-activators also were found to be significantly more spherical and circular than the corresponding clay heterocoagulates or polymer particles produced when the clay heterocoagulate was azeotropically dried (1-butanol/water, rotatory evaporation) or non-azeotropically dried (water only, rotatory evaporation).

Figure 9:
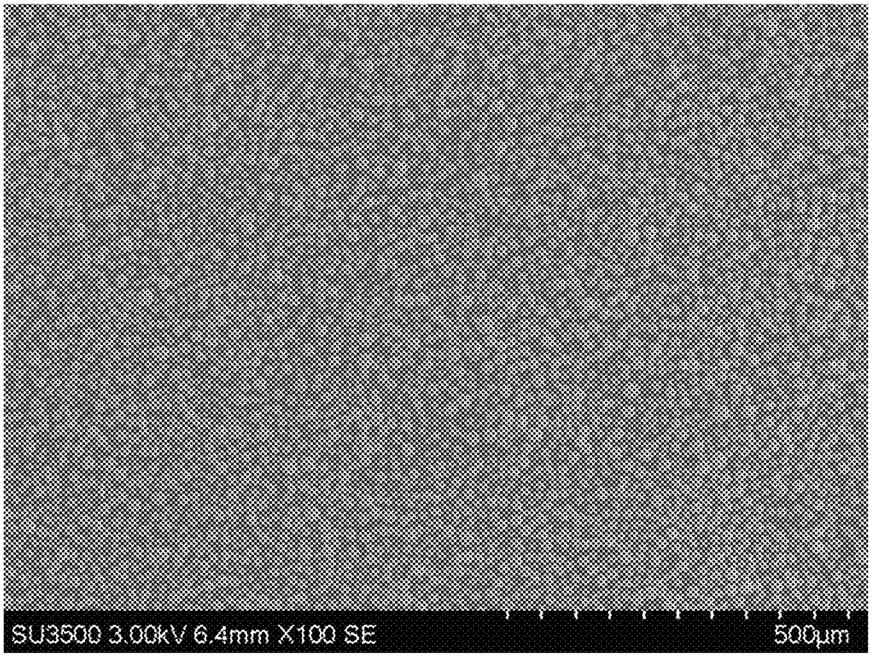
FIG. 9 and FIG. 10 illustrate an embodiment of this disclosure, showing an SEM image of the support-activator formed by spray-drying an aqueous slurry in which the solid component is the filtered adduct obtained by contacting tetramethylammonium bromide and Volclay® HPM-20 montmorillonite in the process described in Example 21-E1, in which the spray-dried adduct was subsequently calcined.
Figure 10:
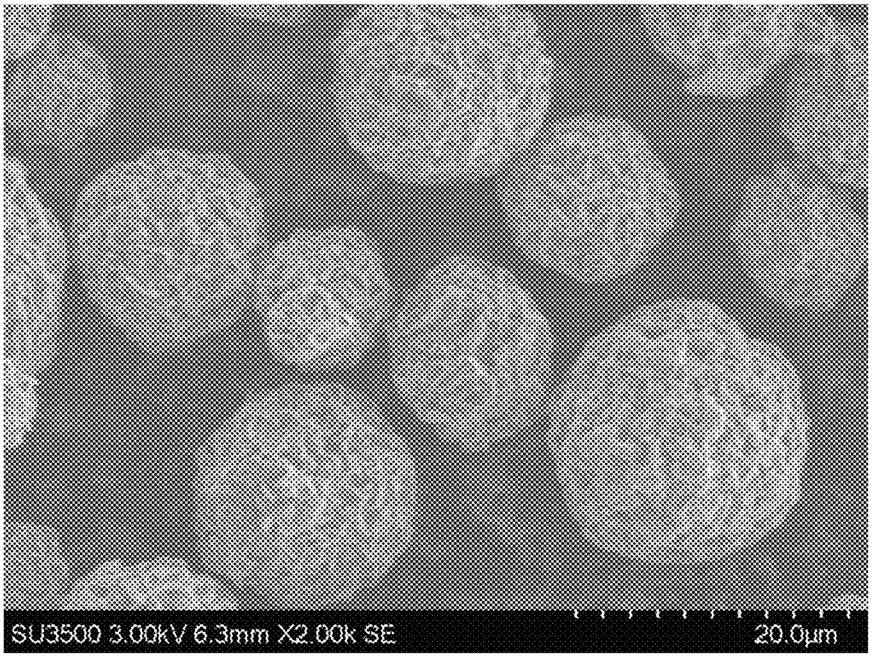
Figure 13:
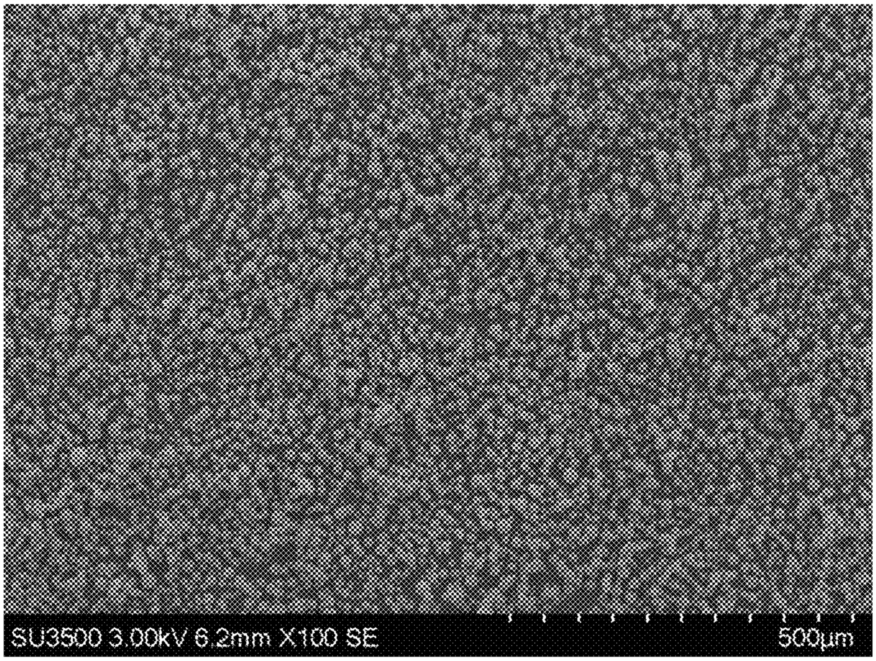
FIG. 13 and FIG. 14 illustrate an embodiment of this disclosure, showing an SEM image of the support-activator formed by spray-drying an aqueous slurry in which the solid component is the filtered adduct obtained by contacting tetrabutylammonium bromide and Volclay® HPM-20 montmorillonite in the process described in Example 22-E2, and subsequently calcining the spray-dried product.
Figure 14:
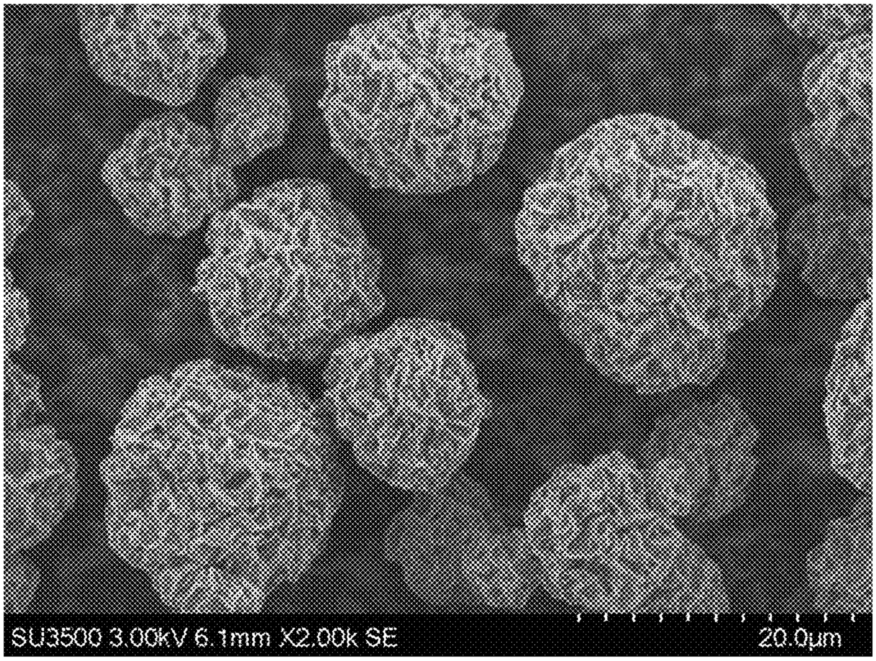

This uniform spherical morphology can be highly advantageous for producing desirable polymer morphologies, as well as for ensuring reactor operability, and maintaining the activity of the support-activator. The morphologies of support-activators according to this disclosure are illustrated in the figures, as follows. FIGS. 9, 10, 13, and 14 present the SEM (scanning electron microscopy or surface electron microscopy) images of calcined support-activators prepared according to this disclosure. FIG. 9 and FIG. 10 illustrate SEM images of the calcined support-activator formed by spray-drying an aqueous slurry of the heteroadduct formed from contacting tetramethylammonium bromide (TMABr) and Volclay® HPM-20 montmorillonite according to Example 21-E1. FIG. 13 and FIG. 14 illustrate SEM images of the calcined support-activator formed by spray-drying an aqueous slurry of the heteroadduct formed from contacting tetrabutylammonium bromide (TBABr) and Volclay® HPM-20 montmorillonite according to Example 22-E2.

Figure 7:
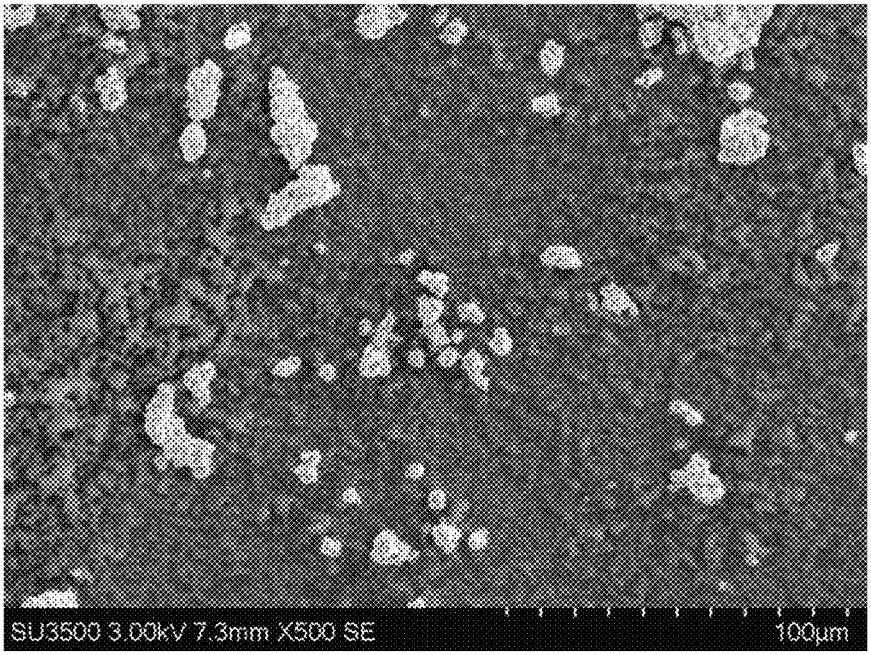
FIG. 7 and FIG. 8 illustrate an embodiment of this disclosure, showing an SEM image of the support-activator formed by azeotropically drying the adduct obtained by contacting aluminum chlorhydrate (ACH) and Volclay® HPM-20 montmorillonite using 1-butanol as the azeotroping agent, and subsequently calcining the dried product in the process described in Example 2-A1.
Figure 8:
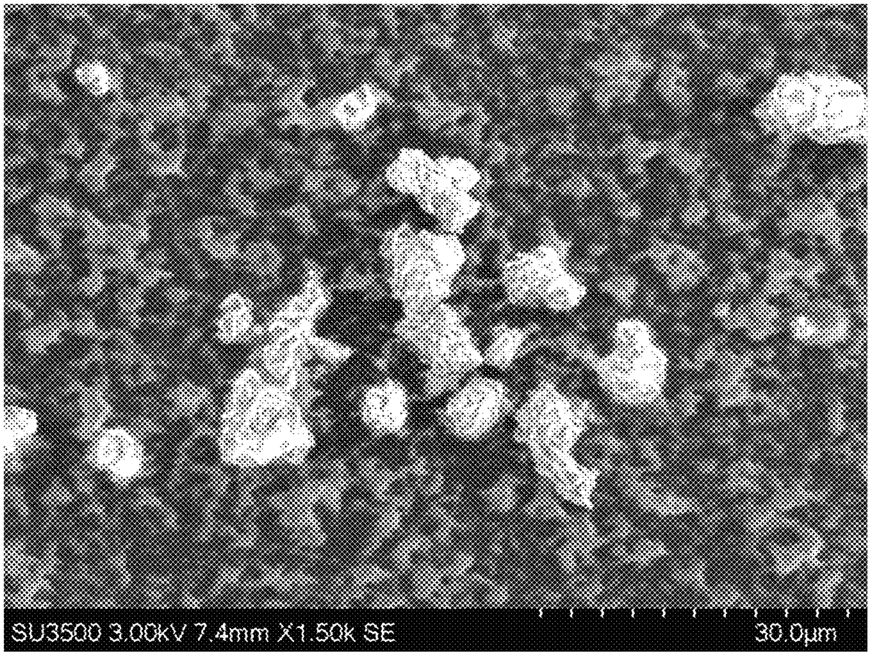
Figure 11:
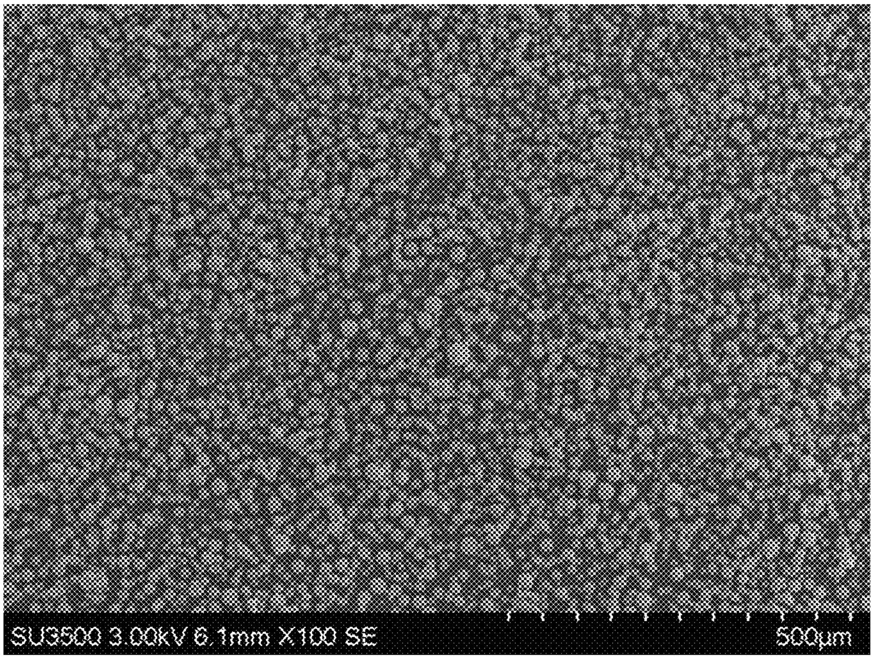
FIG. 11 and FIG. 12 illustrate an embodiment of this disclosure, showing an SEM image of the support-activator formed by spray-drying an aqueous slurry in which the solid component is the filtered adduct obtained by contacting aluminum chlorhydrate and Volclay® HPM-20 montmorillonite in the process described in comparative Example 20-D1, and subsequently calcining the spray-dried product.
Figure 12:
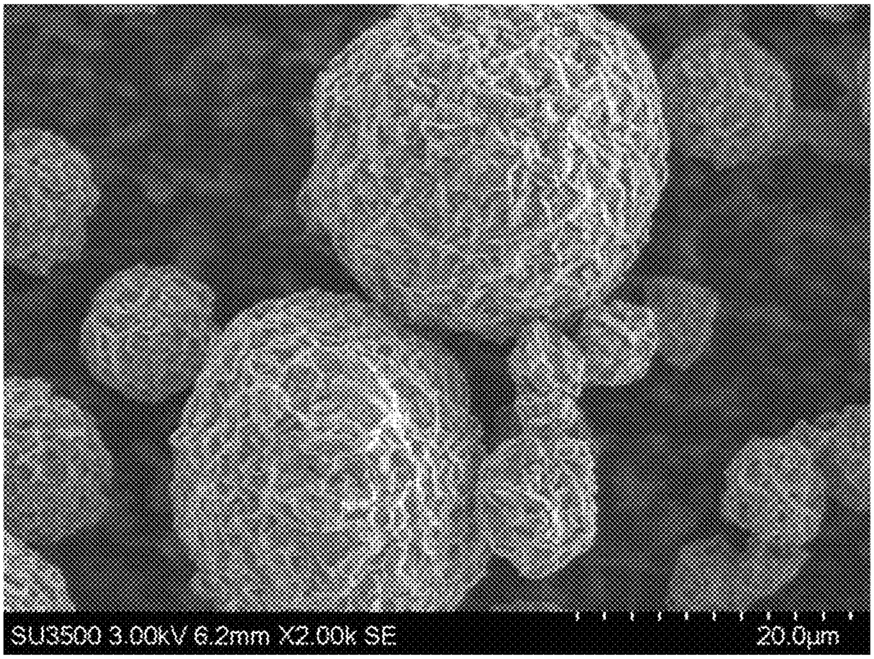

Comparative SEM images are provided as follows. FIG. 11 and FIG. 12 illustrate SEM images of the calcined support-activator formed by spray-drying an aqueous slurry of the heteroadduct formed from contacting aluminum chlorhydrate (ACH) and Volclay® HPM-20 montmorillonite, in the absence of a surfactant, according to comparative Example 20-D1. FIG. 7 and FIG. 8 illustrate SEM images of the calcined support-activator formed by spray-drying an aqueous slurry of the heteroadduct formed from contacting aluminum chlorhydrate (ACH) and Volclay® HPM-20 montmorillonite, which is subsequently azeotropically drying from an aqueous slurry that includes 1-butanol as the azeotroping agent, as described in comparative Example 2-A1.

The prevailing spherical morphology of the calcined, spray-dried clay-surfactant heteroadduct particles (FIGS. 9, 10, 13, and 14) with minimal agglomerate formation, stands in contrast to the SEM images of the calcined—but non-spray-dried—support-activators derived from clay and aluminum chlorhydrate which were dried azeotropically from a water and 1-butanol slurry (FIGS. 7 and 8), in which the clear majority of heteroadduct particles are non-spherical granular particles and/or highly agglomerated. While the spray-dried and calcined heteroadduct from clay and aluminum chlorhydrate (FIGS. 11 and 12) show some highly spherical particles, this heteroadduct is also characterized by many non-spherical and/or highly agglomerated particles.

Additionally, comparing the morphology of calcined support-activators prepared according to this disclosure from FIGS. 9, 10, 13, and 14 with that of the isolated support-activators prior to calcination (which may be referred to as simply clay-heteroadducts) from FIGS. 1, 2, 5 and 6, it is seen that calcination of spray-dried particles does not substantially alter the spherical morphology of the support-activator particles. Accordingly, descriptions of sphericity, roundness, and circularity of the smectite heteroadduct following calcination are likewise applicable to the smectite heteroadduct that has been isolated but has not been calcined.

Therefore, one aspect of this disclosure provides for highly spherical, round, and circular clay-surfactant heteroadducts, support-activators, and supported catalysts, in which these parameters can be measured as follows. Aspects of determining these parameters can be found in the following references, each of which is incorporated herein by reference in its entirety: (1) G.-C. Cho, J. Dodds, and J. C. Santamarina, *Journal of Geotechnical and Geoenvironmental Engineering,* 2006, 132(5), 591-602; (2). Cruz-Matíasa, D. Ayalab, D. Hillerc, S. Gutschd, M. Zachariasd, S. EstradÉe, and F. Peirde, *Journal of Computational Science* 2019, 30, 28-40. While not intending to be theory bound, the concepts of sphericity and roundness may be thought of as 3-dimensional (3-D) concepts that can be adapted to 2-dimensional (2-D) measurements. Again, while not intending to be bound by theory, the concept of circularity may be thought of as a 2-dimensional (2-D) proxy for sphericity.

In an aspect, the clay-surfactant heteroadducts, support-activators, and supported catalysts of this disclosure can be characterized as having an average particle sphericity of 0.60 or greater (≥0.60), wherein the sphericity of each particle can be calculated according to the formula:

$$\text{sphericity } (S) = \frac{r_{max-in}}{r_{min-cir}};$$

wherein $r_{max-in}$ is the radius of the largest inscribed circle of a two-dimensional image of a particle, and $r_{min-cir}$ is the radius of the smallest circumscribed circle of a two-dimensional image of the particle.

The average or mean particle sphericity can be measured as a number-weighted average sphericity designated as "SPHT0", or measured using a volume-weighted average sphericity designated as "SPHT3". Unless designated otherwise, reference to an average sphericity without indicating whether the sphericity is a number-weighted average or a volume-weighted average is intended to refer to a volume-weighted average sphericity SPHT3. As demonstrated herein, such highly spherical particles may be obtained according to this disclosure by spray-drying from a water-only slurry, and high sphericity is maintained when calcining.

In a further aspect, the morphologies of the polyethylene homopolymers and co-polymers prepared using the support-activators were observed to mirror the morphologies of the clay-surfactant heteroadducts, support-activators, or supported catalysts. As a result, the morphology of the polymer particles can serve as a proxy for the morphology of the clay-surfactant heteroadduct, support-activator, or supported catalyst particle. Therefore, the particles of clay-surfactant heteroadducts, support-activators, supported catalysts, and polymer particles may have a volume-weighted average sphericity (SPHT3) or a number-averaged particle sphericity (SPHT0) of 0.60 or greater, 0.65 or greater, 0.70 or greater, 0.75 or greater, 0.80 or greater, 0.85 or greater, 0.87 or greater, 0.90 or greater, 0.92 or greater, or 0.95 or greater. The particles of clay-surfactant heteroadducts, support-activators, supported catalysts, and polymer particles also may have a volume-weighted average sphericity (SPHT3) or a number-averaged particle sphericity (SPHT0) of about 0.60, about 0.65, about 0.70, about 0.75, about 0.80, about 0.85, about 0.87, about 0.90, about 0.92, about 0.95, or any range of sphericities between these values. These sphericity values for mean SPHT0 and mean SPHT3 can be obtained from, among other ways, the multiple image analysis of falling particles through a sensing zone of a CAMSIZER® instrument such as a CAMSIZER® X2 instrument analysis.

In a further aspect, the sphericity of the polymer particles produced by polymerizations employing the supported catalysts comprising clay-surfactant heteroadducts could be analyzed and quantified through particle shape and size analysis using a CAMSIZER® instrument and associated software. As noted above it was surprisingly found that in contrast to the polymers produced from supported catalyst comprising any non-spray dried heteroadduct samples (azeotroped or non-azeotroped), the polymers produced from supported catalyst comprising the spray-dried heteroadduct samples exhibited mean volume-weighted sphericities (SPHT3) from the CAMSIZER® X2 measurements) of 0.75 or greater, 0.80 or greater, 0.85 or greater, or 0.90 or greater. These polymer particles also may have mean volume-weighted sphericities (SPHT3) of about 0.75, about 0.80, about 0.85, about 0.87, about 0.90, about 0.92, about 0.95, or any range of sphericities between these values. In an aspect, these sphericity values also correspond to number-weighted average sphericities (SPHT0) from the CAMSIZER® X2 instrument analysis.

Polymer particles obtained from ethylene-1-hexene copolymerizations were collected using various calcined spray-dried and calcined non-spray-dried clay heteroadduct support-activators and analyzed by a CAMSIZER® X2 Dynamic Image Analyzer to determine particle sphericity and particle size as recorded in Table 6. The corresponding sphericity plots and particle distribution characteristic summaries appear at FIG. 37 through FIG. 40.

Figure 37:
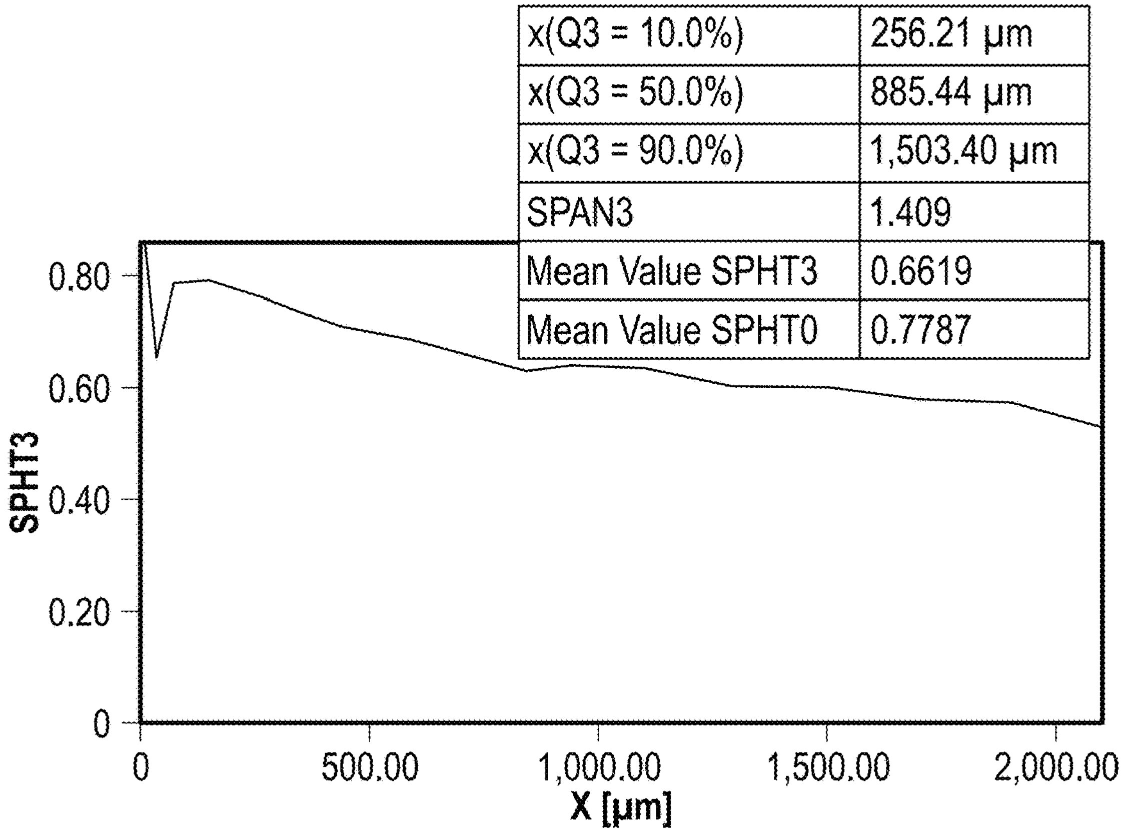
FIG. 37 and FIG. 38 illustrate embodiments of this disclosure, in which support-activators produced by the processes of Example 2-A1 (azeotroped clay-aluminum chlorohydrate heteroadduct) and Example 30-E2 (clay-tetrabutylammonium bromide heteroadduct, non-azeotroped and rotary evaporated), respectively, were combined with (η5-1-n-butyl-3-methyl-cyclopentadienyl)2ZrCl2 and triethylaluminum (TEA) and the resulting catalyst composition used to co-polymerize ethylene and 1-hexene as described in these Examples. Polymer particles obtained from these co-polymerizations were collected and analyzed by a CAMSIZER® X2 to determine particle sphericity.
Figure 38:
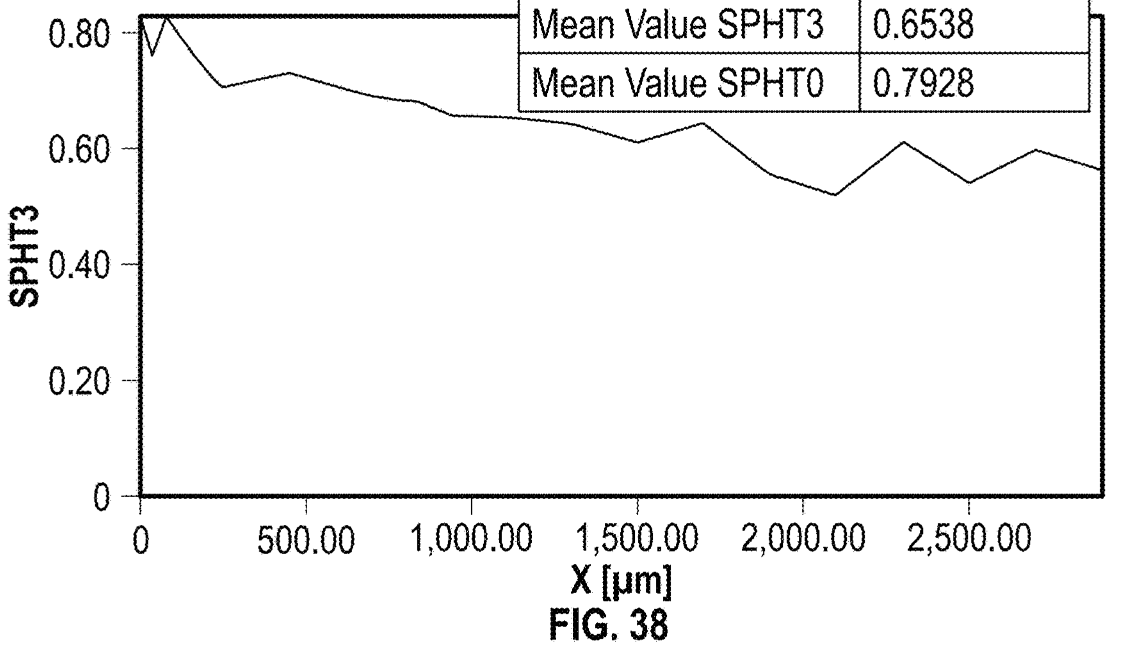
Figure 39:
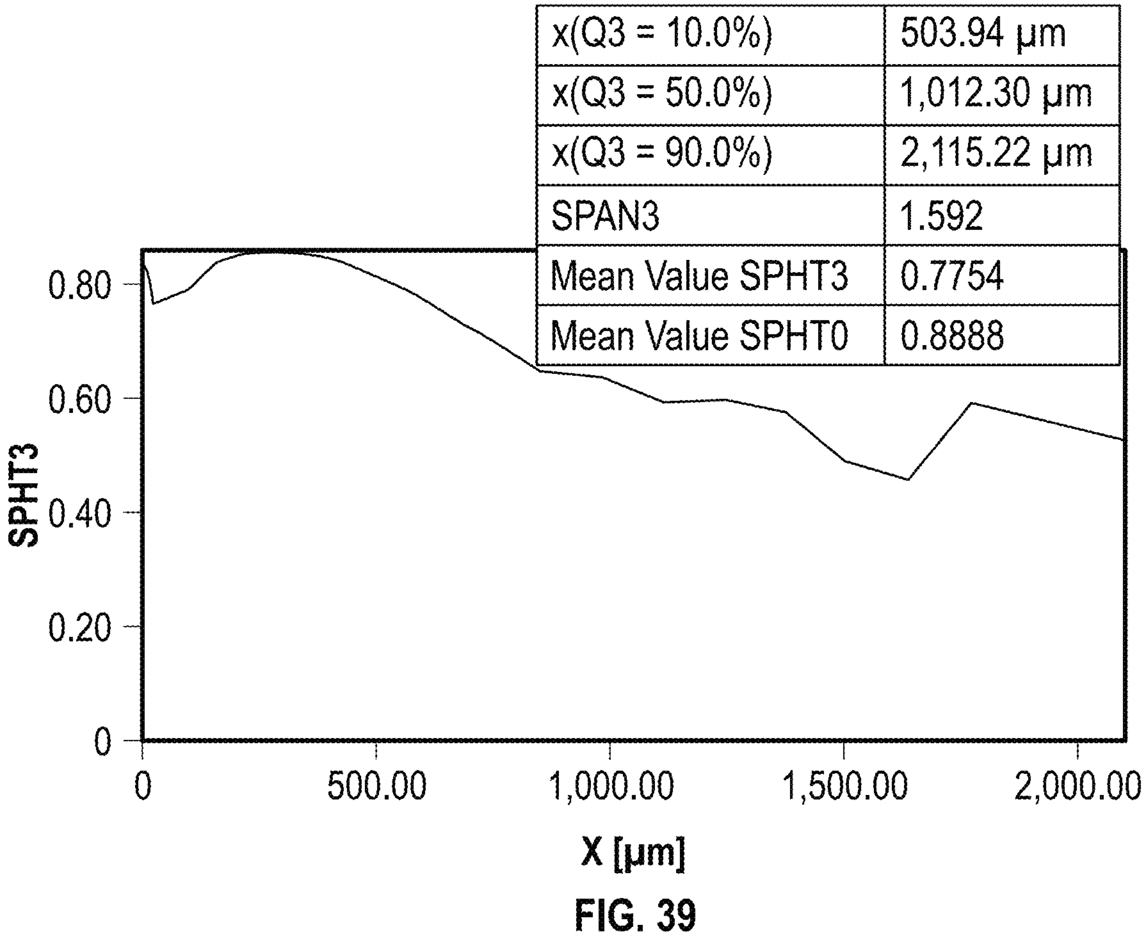
FIG. 39 and FIG. 40 illustrate plots of the volume-weighted sphericity SPHT3 versus polymer particle size for two samples of ethylene-1-hexene co-polymer particles prepared using a metallocene catalyst composition comprising the support-activator from Example 31. The Example 31 support-activator was prepared by spray drying a clay-tetrabutylammonium bromide heteroadduct in the absence of a cationic polymetallate, and these polymer particles were collected and analyzed by a CAMSIZER® X2 to determine particle sphericity. Particle size distribution data and number-weighted average sphericity of the entire particle distribution (SPHT0) are also tabulated.

FIG. 37 presents the sphericity analysis on a polymer sample in which the supported catalyst comprised an azeotropically dried (non-spray dried) and calcined support-activator obtained by contacting aluminum chlorhydrate and montmorillonite in the absence of a surfactant, using 1-butanol as the azeotroping agent, as described in Example 2-A1. The FIG. 38 sphericity analysis was performed on a polymer sample in which the supported catalyst comprised a non-spray dried support-activator as described in Example 30-E2 from contacting tetrabutylammonium bromide and montmorillonite in the absence of a cationic polymetallate, with the isolated product being rotary evaporated in the absence of an azeotroping agent prior to calcining. As seen in Table 6 and FIG. 37 and FIG. 38, both of these polymer samples exhibits low (<0.70) volume-weighted average sphericities (SPHT3).

In contrast, the sphericity analysis of polymers prepared using calcined spray-dried support-activators demonstrated the improved sphericity of the support-activators versus those azeotroped or non-azeotroped, and not spray-dried. The FIG. 39 and FIG. 40 sphericity data of Table 6 were obtained on two different polymer samples produced from two different support-activator samples which were produced under different spray-drying conditions within the ranges set out in Example 31. Adjusting or optimizing the spray-drying parameters within the ranges of Example 31 to achieve the sphericity and span values report in Table 6 are well within the abilities of the person of ordinary skill. See, for example, C. Arpagaus (2018), *A Short Review on Nano Spray Drying of Pharmaceuticals*. J. Nanomed. Nanosci.: JNAN-149. DOI: 10.29011/2577-1477.100049, which is incorporated herein by reference. This reference summarizes how adjusting process parameters such as inlet temperature, drying gas flow rate, spray mesh size, solid concentration, feed rate, and the like affect the droplet size, particle size, and other features. The principal spray-drying parameters adjusted in preparing the subject support-activators were the concentration in the aqueous slurry and the feed rate. The data in FIG. 39 and FIG. 40 and in Table 6 demonstrate a very high average sphericity for these samples.

Figure 40:
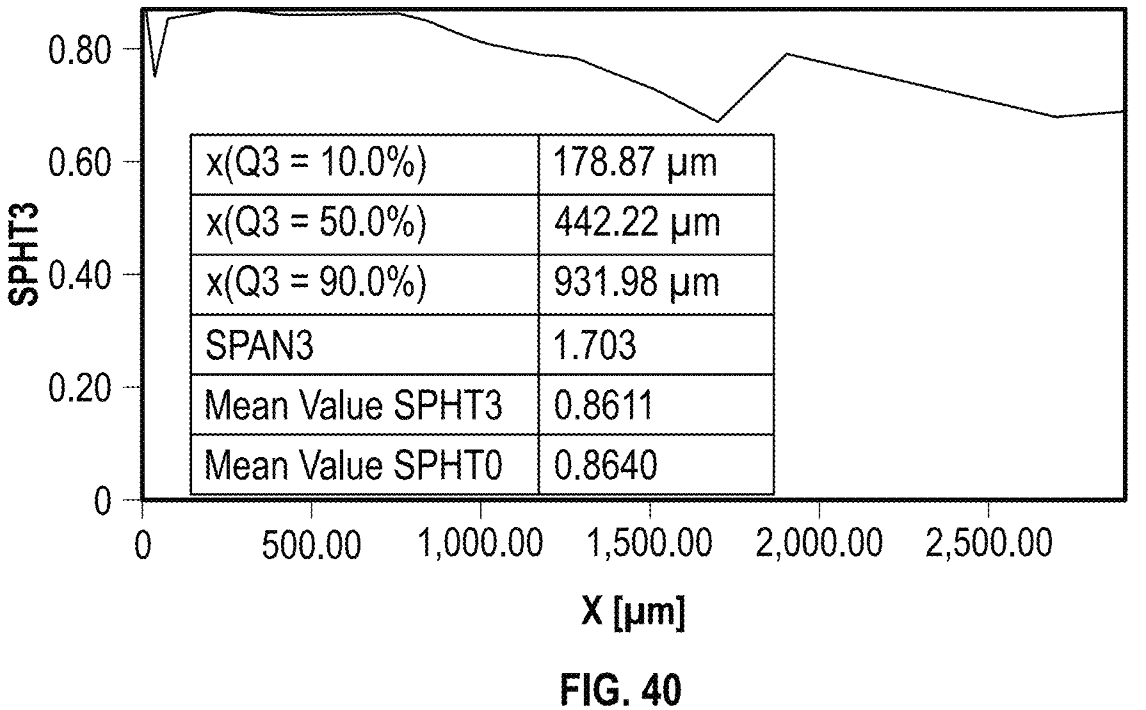
Figure 41:
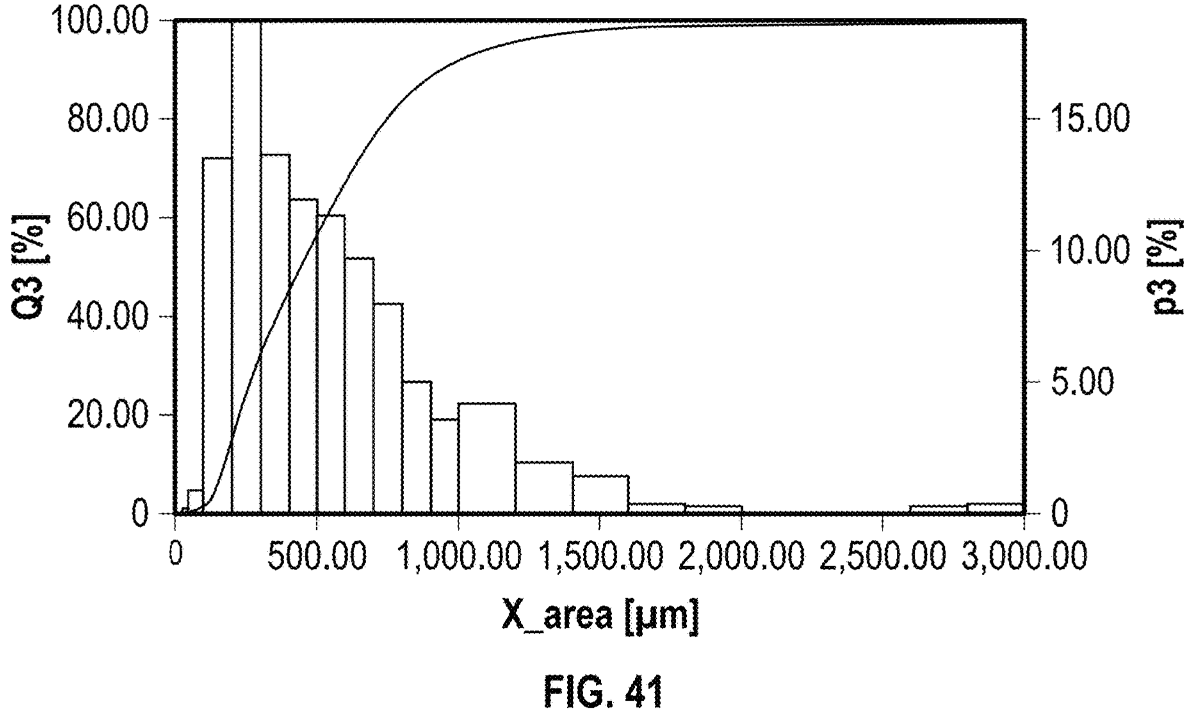
FIG. 41 illustrates the particle size distribution and cumulative volume curve for the sample of ethylene-1-hexene co-polymer particles prepared using a metallocene catalyst composition comprising the support-activator from Example 31. The Q3[%] axis corresponds to the curve-line on the graph and represents the cumulative volume percent value, which is the percent of the total volume of the particles which is below that particle size value. The P3[%] axis corresponds to the bar chart distribution and shows the percent of the total volume corresponding to each bar or "slice" of particle size. The Example 31 support-activator was provided by spray drying a clay-tetrabutylammonium bromide heteroadduct in the absence of a cationic polymetallate, and these polymer particles were collected and analyzed by a CAMSIZER® X2 to determine particle size distribution. The FIG. 41 data are for the same co-polymer sample used to collect the data in FIG. 40.

FIG. 41 shows particle size distribution data and cumulative volume curve for the sample of a polymer powder used to obtain the FIG. 40 data, that is produced using a catalyst prepared from the spray dried, clay-tetrabutylammonium bromide heteroadduct support-activator of Example 31. In the FIG. 41 chart and similar charts, the Q3[%] axis corresponds to the curve-line on the graph and represents the cumulative volume percent value, which is the percent of the total volume of the particles which are below that particle size value. The P3[%] axis corresponds to the bar chart distribution and shows the percent of the total volume corresponding to each bar or "slice" of particle size. The sphericity data of FIG. 39 and FIG. 40 and the particle size distribution data of FIG. 41 obtained on the ethylene-1-hexene co-polymer particles were collected and analyzed by a CAMSIZER® X2 as provided in the Examples.

In a further aspect, sieving can be performed on the smectite clay, the spray-dried clay-surfactant heteroadducts, the support-activators, or the supported catalysts, either prior to or subsequent to a calcination or other drying process. Table 7 presents sphericity and span data for ethylene-1-hexene co-polymers derived from metallocene-catalyzed polymerizations using calcined support-activators from spray-dried unsieved clay-surfactant support-activator of Example 31, and from spray-dried sieved clay-surfactant support-activator of the sieved samples in Examples 33-35. Table 7 demonstrates that the smaller particle size support-activators benefit from sieving more than the larger particle size support-activators in terms of producing more spherical ethylene-1-hexene co-polymers as compared to the unsieved support-activator. Therefore, by using certain sieved samples, the sphericity can be improved even more if desired. Such a process may produce particles of clay, clay-surfactant heteroadduct, support-activator, or supported catalyst having a more narrow size distribution then the unsieved materials, and having number-weighted or volume-weighted average particle sphericity of 0.65 or greater, 0.70 or greater, 0.75 or greater, 0.80 or greater, 0.85 or greater, 0.87 or greater, 0.90 or greater, 0.92 or greater, or 0.95 or greater. These sieved samples of clay, clay-surfactant heteroadduct, support-activator, or supported catalyst particles also may have mean volume-weighted sphericities (SPHT3) of about 0.75, about 0.80, about 0.85, about 0.87, about 0.90, about 0.92, about 0.95, or any range of sphericities between these values. Additionally, polymer powder produced from supported catalyst comprising such sieved spray-dried heteroadduct samples also may exhibit volume-weighted average sphericities of 0.75 or greater, 0.80 or greater, or 0.85 or greater, and furthermore possess improved sphericity relative to polymer powder produced from supported catalyst comprising the unsieved precursor spray-dried heteroadduct, support-activator, or supported catalyst.

In another aspect, sieving also may be used to improve the size uniformity of the clay-surfactant heteroadduct, support-activator, or supported catalyst relative to the precursor un-sieved material. Sieving can be performed on the spray-dried clay-surfactant heteroadducts, support-activators, or the supported catalysts, either prior to or subsequent to a calcination or other drying process, in order to provide particles with more uniform particle size distribution, that is having a lower span (=[d(0.9)−d(0.1)]/d(0.5)) relative to the precursor unsieved material. For example, the sieving process may produce spray-dried clay-surfactant heteroadducts, support-activators, or supported catalyst with a particle size distribution possessing a span of 2 or lower, 1.5 or lower, 1.25 or lower, 1 or lower, or 0.75 or lower. Additionally, the particle size distribution of polymer powder produced from supported catalyst comprising such sieved spray-dried heteroadduct samples may exhibit a span of 2 or lower, 1.5 or lower, 1.25 or lower, 1 or lower, or 0.75 or lower, and furthermore exhibit lower span relative to the particle size distribution of polymer powder produced from supported catalyst comprising the precursor unsieved spray-dried heteroadduct, support-activator, or supported catalyst. In a further aspect, the sieving process may produce spray-dried clay-surfactant heteroadducts, support-activators, or the supported catalysts, either prior to or subsequent to a calcination or other drying process, or the of polymer powder produced therefrom may exhibit a span of about 0.4, about 0.5, about 0.6, about 0.7, about 0.8, about 0.9, about 1.0, about 1.1, about 1.2, about 1.3, about 1.4, about 1.5, about 1.6, about 1.7, about 1.8, about 1.9, about 2.0, or any ranges between any of the span values.

Figure 42:
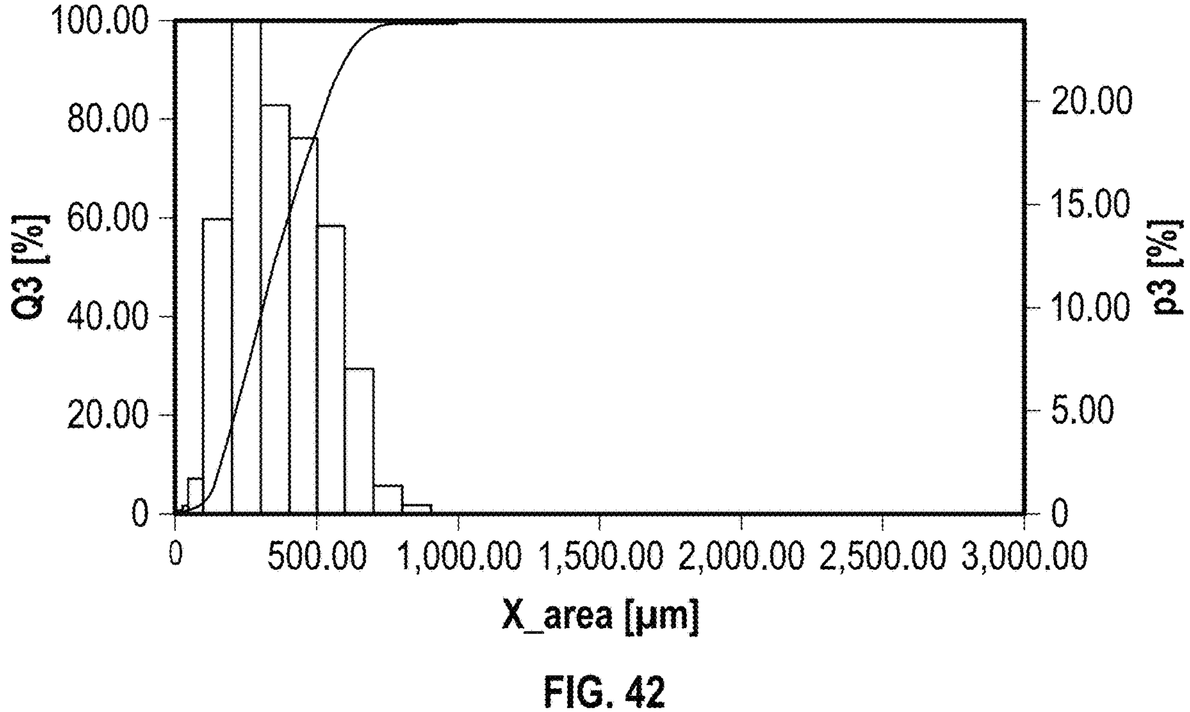
FIG. 42, FIG. 44, and FIG. 46 illustrate particle size distribution and cumulative volume curves for three different samples of ethylene-1-hexene co-polymer particles prepared using a metallocene catalyst composition comprising the support-activators from Example 33 (FIG. 42), Example 34 (FIG. 44), and Example 35 (FIG. 46). These Examples derive from spray-drying a sample of the Example 31 support-activator (clay-tetrabutylammonium bromide heteroadduct), sieving this sample into three different size ranges, and calcining each sample, which was then used to prepare the catalyst compositions and co-polymers. The support-activator sieved fractions used to produce the co-polymer are 19 μm (microns) to 37 μm (FIG. 42), 37 μm to 50 μm (FIG. 44), and 50 μm to 74 μm (FIG. 46). Polymer particle size distributions were obtained using a CAMSIZER® X2.
Figure 44:
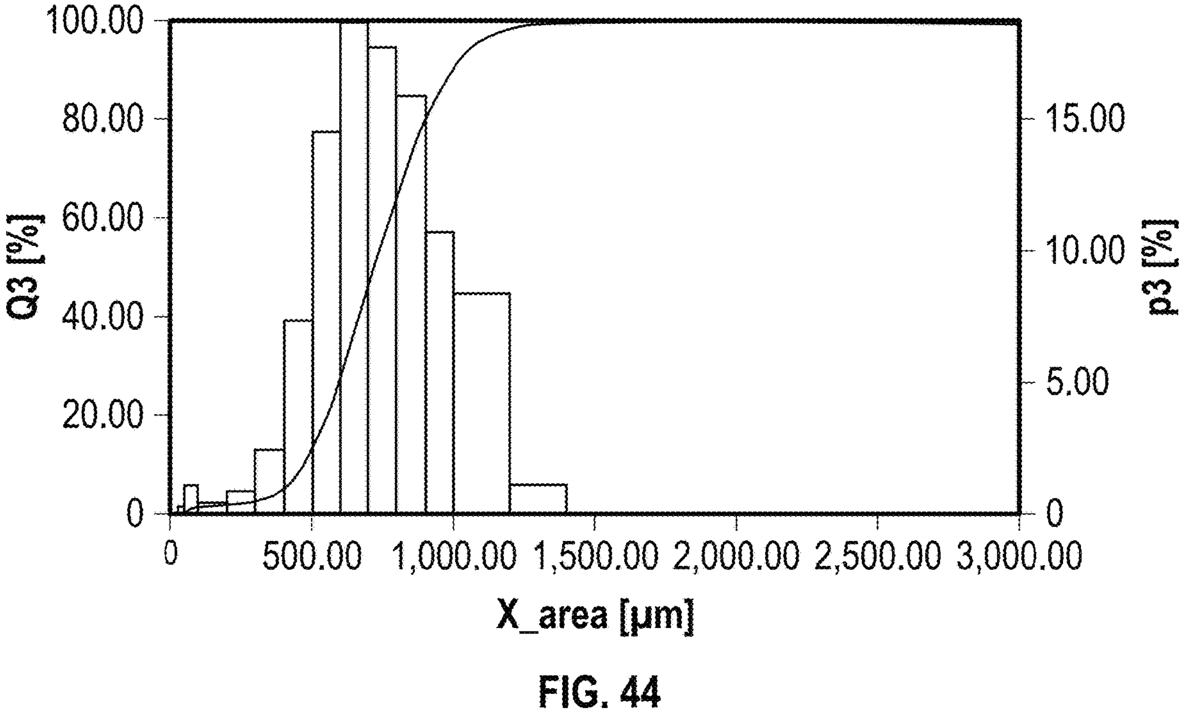
Figure 45:
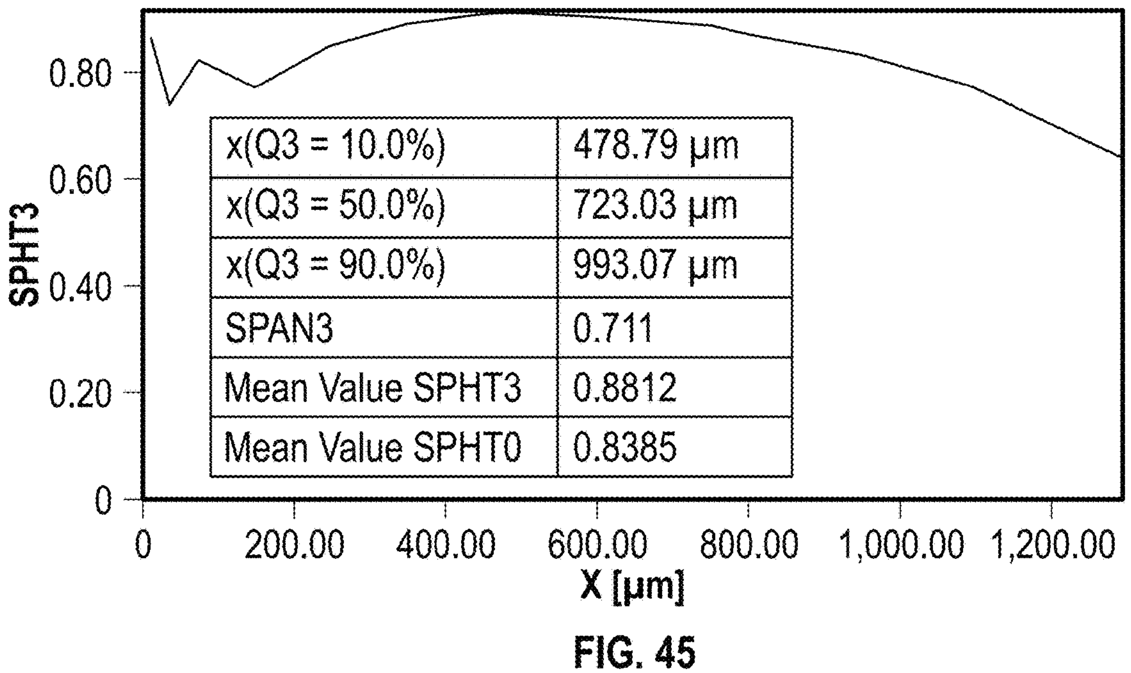
Figure 46:
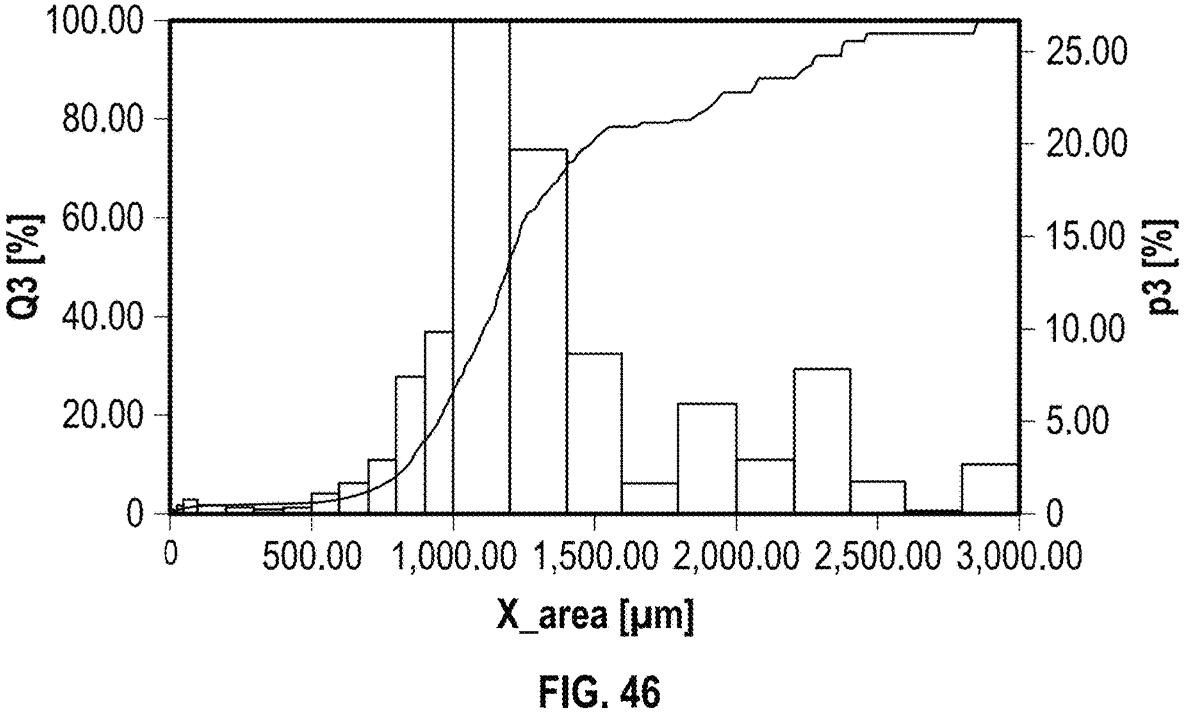
Figure 47:
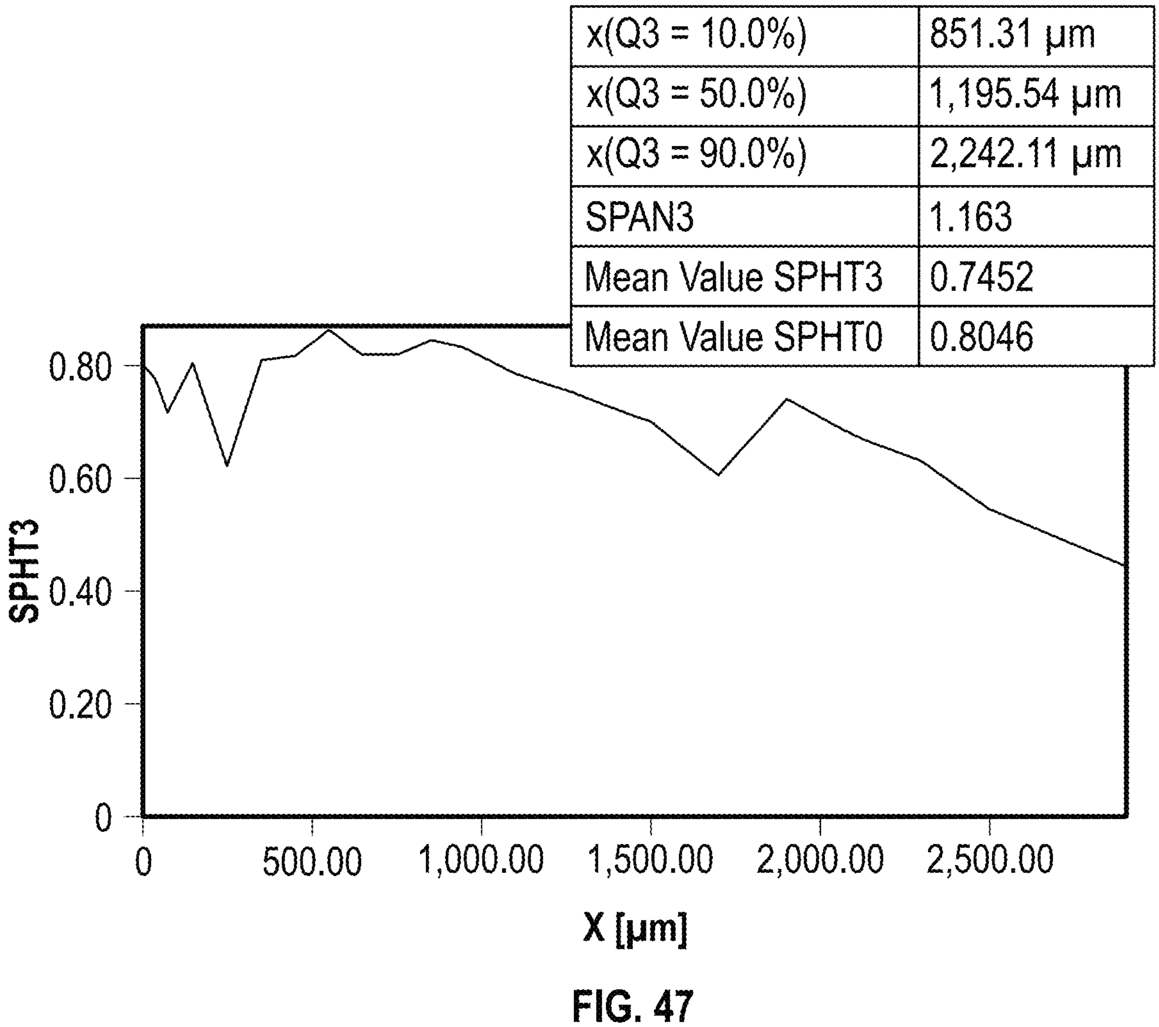

In order to more closely examine how the morphology and particle size distribution of clay-surfactant heteroadduct or support-activator varied across more narrow particle size distributions, a sample of support-activator was prepared according to Example 31, spray-dried, then sieved into three separate fractions, and catalysts and polymer were prepared from the three fractions as set out in Examples 33-35. These data are provided in Table 7 and in FIGS. 42-47 as follows. FIG. 42, FIG. 44, and FIG. 46 present the particle size distribution and cumulative volume curve for co-polymer powder samples, and FIG. 43, FIG. 45, and FIG. 47 plot the volume-weighted sphericities (SPHT3) versus polymer particle size for the samples of the polymer particles in FIG. 42, FIG. 44, and FIG. 46, respectively.

Figure 43:
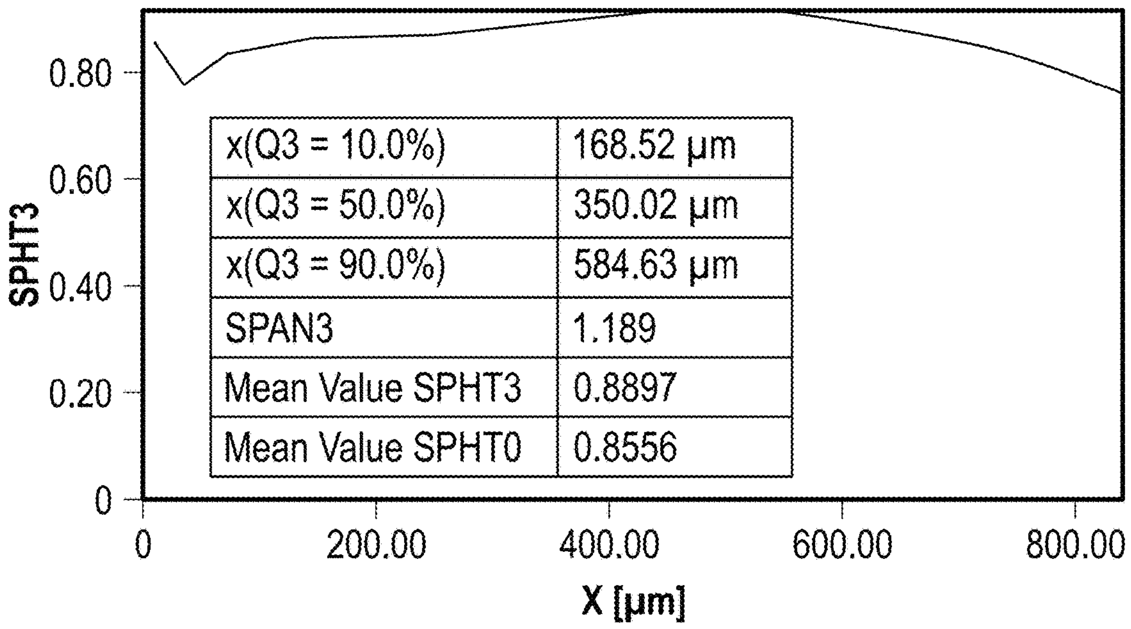
FIG. 43, FIG. 45, and FIG. 47 present plots of the volume-weighted sphericities (SPHT3) versus polymer particle size for samples of the ethylene-1-hexene co-polymer particles prepared using metallocene catalyst compositions comprising the support-activators from Example 33 (FIG. 43), Example 34 (FIG. 45), and Example 35 (FIG. 47). These Examples derive from spray-drying a sample of the Example 31 support-activator (clay-tetrabutylammonium bromide heteroadduct), sieving this sample into three different size ranges, and calcining each sample, which was then used to prepare the catalyst compositions and co-polymers. The support-activator sieved fractions used to produce the co-polymer are 19 μm (microns) to 37 μm (FIG. 43), 37 μm to 50 μm (FIG. 45), and 50 μm to 74 μm (FIG. 47). Polymer particle size distributions were obtained using a CAMSIZER® X2.

Specifically, FIG. 42 and FIG. 43 illustrate particle size distribution and sphericity data for co-polymer powder samples produced from a spray dried clay-tetrabutylammonium bromide support-activator of Example 31 with particles sizes between 19 μm (micron) and 37 μm. That is, the support-activator used to produce the FIG. 42 and FIG. 43 data pass through a 37 μm sieve but were captured on a 19 μm sieve. Similarly, FIG. 44 and FIG. 45 illustrate particle size distribution and sphericity data for co-polymer powder samples produced from the Example 31 spray dried clay-tetrabutylammonium bromide support-activator having particles sizes between 37 μm (micron) and 50 μm. Finally, FIG. 46 and FIG. 47 illustrate particle size distribution and sphericity data for co-polymer powder samples produced from the Example 31 spray dried clay-tetrabutylammonium bromide support-activator having particles sizes between 50 μm (micron) and 74 μm. These sieved samples were collected, calcined, and combined with ($\eta^5$-1-n-butyl-3-methyl-cyclopentadienyl)$_2$ZrCl$_2$ and triethylaluminum (TEA) to form the catalyst composition, which was used to co-polymerize ethylene and 1-hexene as described herein. Polymer particles obtained from these copolymerizations using each size fraction of the support-activator were collected and analyzed using a CAMSIZER® X2 to determine particle size distribution.

These Table 7 data reveal that all of the narrow size range samples of Examples 33-35 show mean volume-weighted sphericities SPHT3 of greater than or equal to 0.65, with SPHT3 sphericity increasing with increasing particle size. The polymer made using largest fraction clay heteroadduct between 50 μm and 74 μm in size (Example 35 and FIG. 47) had the highest SPHT3 sphericity of 0.86. When comparing the initial 17-gram sample of clay-heteroadduct used for the sieving process, these three fractions accounted for some 16.76 g of the total 17 g starting sample. Therefore, 98.6 wt % of the Example 31 sample was accounted for in these three size fractions.

In a further aspect, the clay-surfactant heteroadducts, support-activators, and supported catalysts of this disclosure can be characterized as having an average particle roundness of 0.60 or greater, wherein roundness is calculated according to the formula:

$$\text{roundness } (R) = \frac{\frac{1}{n}\left(\sum_{i=1}^{n} r_i\right)}{r_{max-in}};$$

wherein $r_i$ is the radius of the inscribed circle of the $i^{th}$ corner curvature of a two-dimensional image (silhouette) of a particle, n is the number of corners; and $r_{max-in}$ is the radius of the largest inscribed circle of the two-dimensional image of the particle.

In a further aspect, the clay-surfactant heteroadducts, the support-activators, the supported catalysts, and the polymer particles prepared therefrom also may an average particle roundness of 0.65 or greater, 0.70 or greater, 0.75 or greater, 0.80 or greater, 0.85 or greater, 0.87 or greater, 0.90 or greater, 0.92 or greater, or 0.95 or greater. The clay-surfactant heteroadducts, support-activators, and supported catalysts, and the polymer particles prepared therefrom also may an average particle roundness of about 0.65, about 0.70, about 0.75, about 0.80, about 0.85, about 0.87, about 0.90, about 0.92, about 0.95, or any ranges between any of these particle roundness values.

According to a further aspect, the clay-surfactant heteroadducts, support-activators, and supported catalysts of this disclosure can be characterized as having an average particle circularity of 0.60 or greater, wherein circularity is calculated according to the formula:

$$\text{circularity } (C) = \frac{4\pi A}{(\text{perimeter})^2};$$

wherein

A is the area of a two-dimensional image (silhouette) of a particle, and perimeter is the length of the path encompassing the two-dimensional image of a particle. According to another aspect, the clay-surfactant heteroadducts, the support-activators, the supported catalysts, and the polymer particles prepared therefrom also may an average particle circularity of 0.65 or greater, 0.70 or greater, 0.75 or greater, 0.80 or greater, 0.85 or greater, 0.87 or greater, 0.90 or greater, 0.92 or greater, or 0.95 or greater. The clay-surfactant heteroadducts, support-activators, supported catalysts, and the polymer particles prepared therefrom also may an average circularity of about 0.65, about 0.70, about 0.75, about 0.80, about 0.85, about 0.87, about 0.90, about 0.92, about 0.95, or any ranges between any of these circularity values.

In further aspects related to the morphology of the clay-surfactant heteroadducts, support-activators, and supported catalysts of this disclosure, the clay-surfactant heteroadducts, support-activators, and supported catalysts, when spray-dried or when spray-dried and calcined, can be characterized by any one of, or any combination of, the following properties:

(a) an average particle sphericity of 0.65 or greater;

(b) an average particle roundness of 0.65 or greater; and (c) an average particle circularity of 0.65 or greater.

Further, the clay-surfactant heteroadducts, support-activators, and supported catalysts of this disclosure, the clay-surfactant heteroadducts, support-activators, and supported catalysts, when spray-dried or when spray-dried and calcined, can be characterized by any one of, or any combination of, the following properties:

(a) an average particle sphericity of 0.75 or greater;

(b) an average particle roundness of 0.75 or greater; and (c) an average particle circularity of 0.75 or greater.

In addition, the clay-surfactant heteroadducts, support-activators, and supported catalysts of this disclosure, the clay-surfactant heteroadducts, support-activators, and supported catalysts, when spray-dried or when spray-dried and calcined, can be characterized by any one of, or any combination of, the following properties:

(a) an average particle sphericity of 0.80, 0.85, 0.90, or greater;

(b) an average particle roundness of 0.80, 0.85, 0.90, or greater; and (c) an average particle circularity of 0.80, 0.85, 0.90, or greater.

Figure 15:
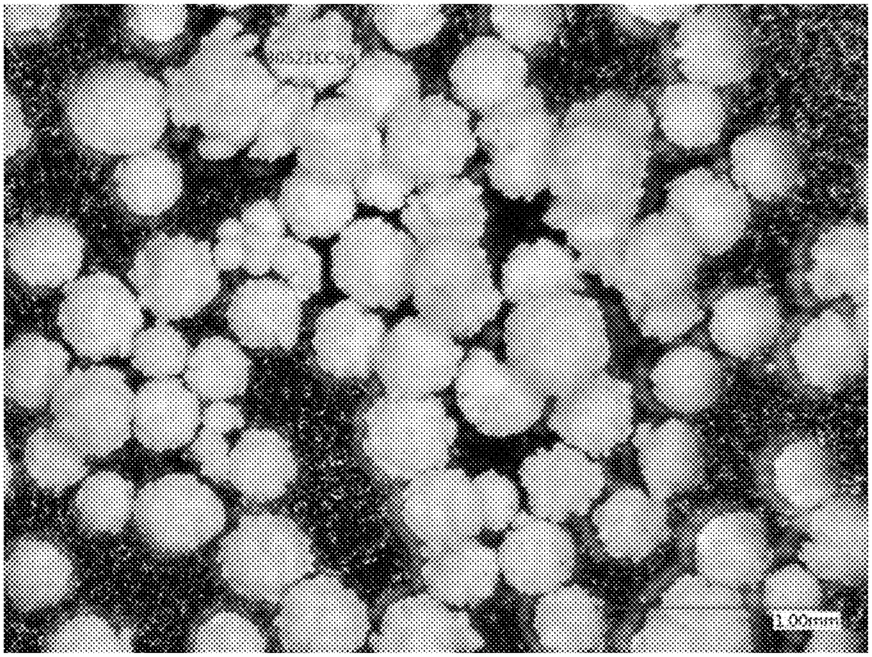
FIG. 15 illustrates another embodiment of this disclosure, showing an optical microscope image of an ethylene-1-hexene copolymer derived from a polymerization in which a support-activator was combined with the metallocene bis(1-butyl-3-methylcyclopentadienyl)zirconium dichloride and triethylaluminum co-catalyst to form the active catalyst. The support-activator was formed by spray-drying an aqueous slurry in which the solid component was the filtered adduct obtained by contacting tetramethylammonium bromide and Volclay® HPM-20 montmorillonite in the process described in Example 21-E1, and subsequently calcining the spray-dried product.
Figure 16:
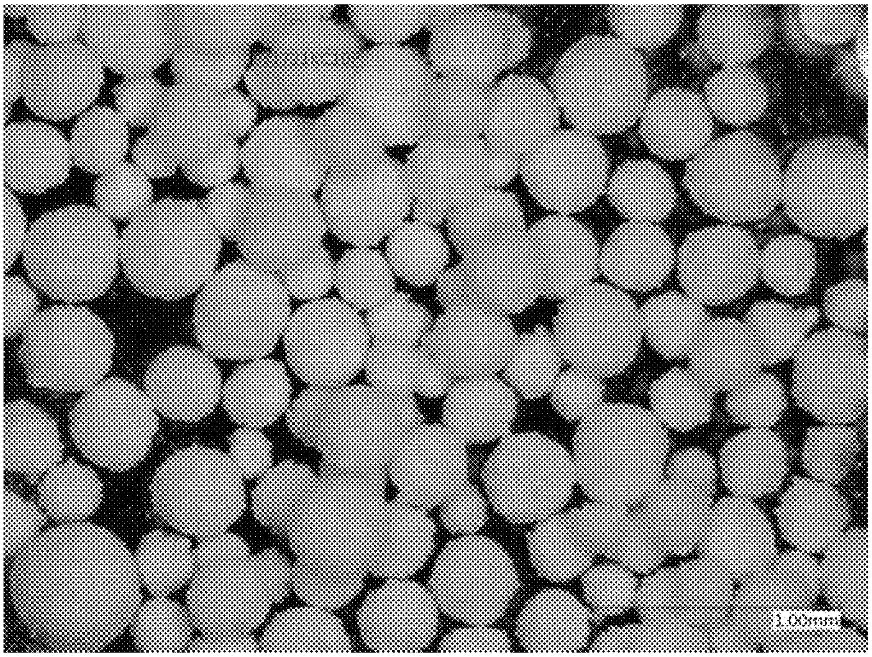
FIG. 16 illustrates another embodiment of this disclosure, showing an optical microscope image of an ethylene-1-hexene copolymer derived from a polymerization in which a support-activator was combined with the metallocene bis(1-butyl-3-methylcyclopentadienyl)zirconium dichloride and triethylaluminum co-catalyst to form the active catalyst. The support-activator was formed by spray-drying an aqueous slurry in which the solid component was the filtered adduct obtained by contacting tetrabutylammonium bromide and Volclay® HPM-20 montmorillonite in the process described in Example 22-E2, and subsequently calcining the spray-dried product.

In a further aspect of the disclosure, the polymer particles produced from polymerizations conducted with metallocene-activated spray-dried clay-surfactant heterocoagulate support-activators also are highly spherical in nature. The calcined, spray-dried support-activators derived from clay and tetramethylammonium bromide (Example 21-E1) or tetrabutylammonium bromide (Example 22-E2) (see FIGS. 9, 10, 13, and 14) were combined with the metallocene bis(1-butyl-3-methylcyclopentadienyl)zirconium dichloride and triethylaluminum co-catalyst to form the active catalyst, which was used to produce an ethylene-1-hexene copolymer. Optical microscope images for these polymer particles are provided in FIG. 15 and FIG. 16, respectively. These polymer particles, like their parent catalyst particles, are highly spherical in nature.

Figure 17:
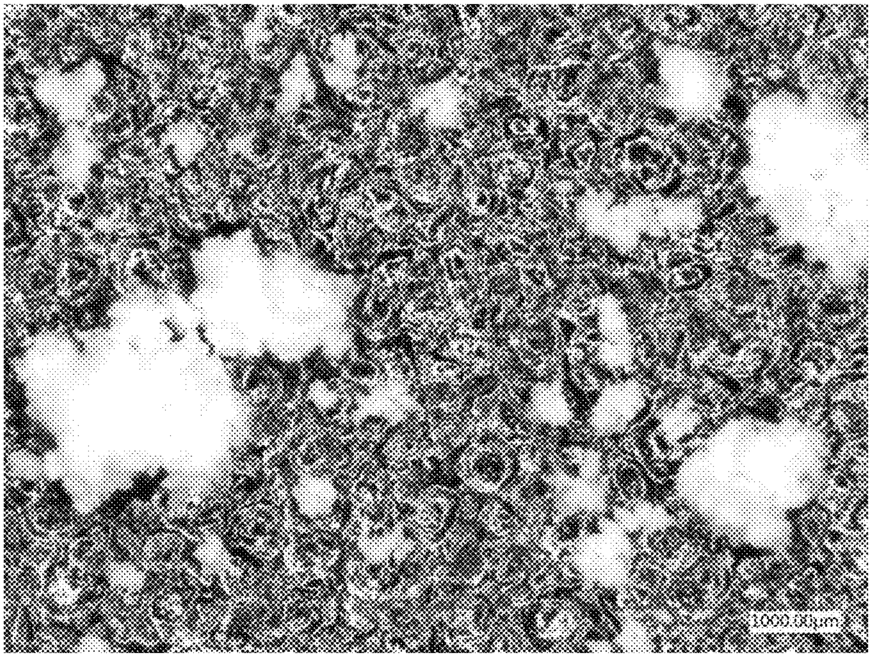
FIG. 17 illustrates a further embodiment of this disclosure, showing an optical microscope image of an ethylene-1-hexene copolymer derived from a polymerization in which a support-activator was combined with the metallocene bis(1-butyl-3-methyl-cyclopentadienyl)zirconium dichloride and triethylaluminum co-catalyst to form the active catalyst. The support-activator was formed by azeotropically drying the adduct obtained by contacting aluminum chlorohydrate (ACH) and Volclay® HPM-20 montmorillonite using 1-butanol as the azeotroping agent in the process described in Example 2-A1.
Figure 18:
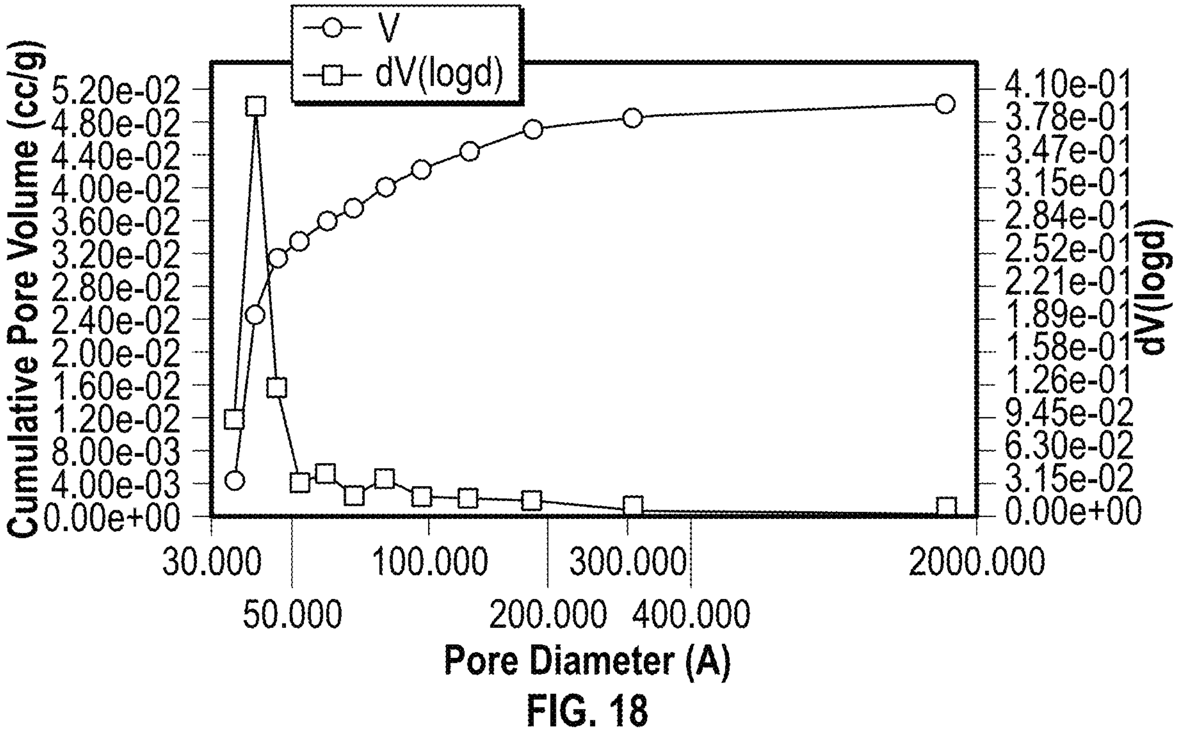
FIG. 18 provides the results of a nitrogen adsorption/desorption BJH (Barrett, Joyner, and Halenda) pore volume analysis of the calcined aluminum chlorhydrate (ACH) heterocoagulated clay of Example 5-A4, providing a plot of pore diameter (Angstrom, A) versus the cumulative pore volume (cubic centimeters per gram, cc/g) for the heteroadduct. The recipe for the preparation of this heteroadduct slurry used 1.54 mmol Al/g clay, and the sample was dried non-azeotropically and calcined to provide the non-azeotroped clay-ACH heteroadduct.
Figure 19:
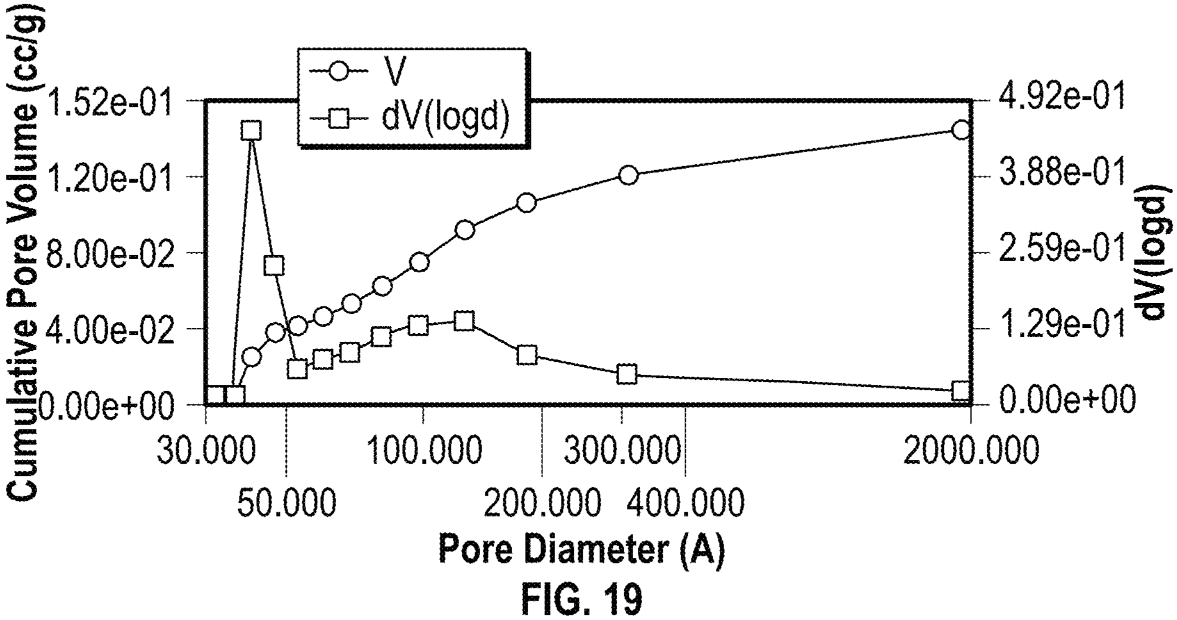
FIG. 19 provides the results of a nitrogen adsorption/desorption BJH pore volume analysis of the calcined tetramethylammonium bromide heterocoagulated clay of Example 11-B6, providing a plot of pore diameter (Angstrom, A) versus the cumulative pore volume (cubic centimeters per gram, cc/g) for the heteroadduct. The recipe for the preparation of this heteroadduct slurry used 2.48 mmol tetramethylammonium bromide/g clay in the absence of a cationic polymetallate to form the heterocoagulated clay which was dried non-azeotropically and calcined to provide the non-azeotroped clay-surfactant heteroadduct.
Figure 20:
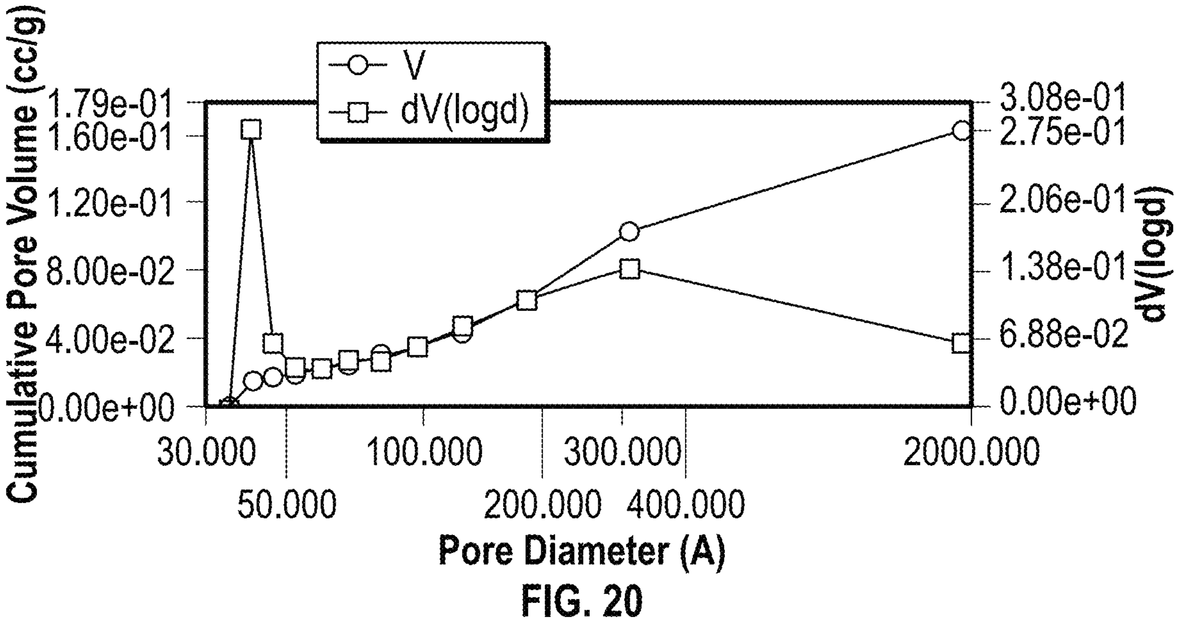
FIG. 20 provides the results of a nitrogen adsorption/desorption BJH pore volume analysis of the calcined tetrabutylammonium bromide heterocoagulated clay of Example 14-B9, providing a plot of pore diameter (Angstrom, A) versus the cumulative pore volume (cubic centimeters per gram, cc/g) for the heteroadduct. The recipe for the preparation of this heteroadduct slurry used 1.24 mmol tetramethylammonium bromide/g clay in the absence of a cationic polymetallate to form the heterocoagulated clay which was dried non-azeotropically and calcined to provide the non-azeotroped clay-surfactant heteroadduct.
Figure 21:
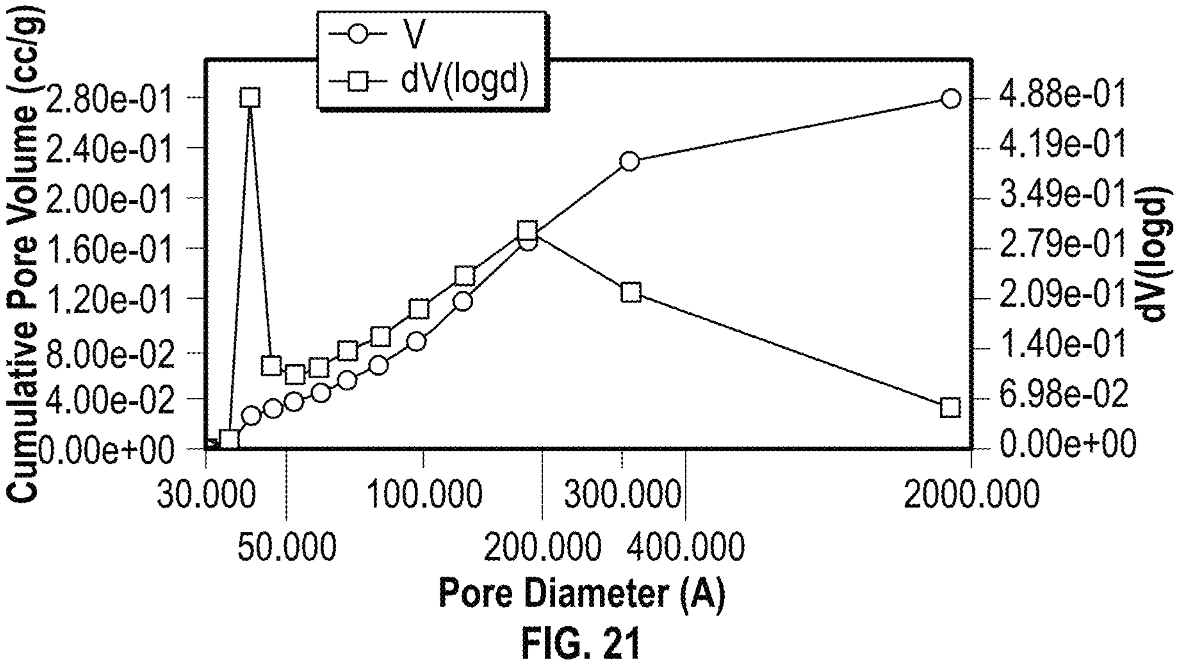
FIG. 21 provides the results of a nitrogen adsorption/desorption BJH pore volume analysis of the calcined tetrabutylammonium bromide and aluminum chlorohydrate (ACH) heterocoagulated clay of Example 23-E3, providing a plot of pore diameter (Angstrom, A) versus the cumulative pore volume (cubic centimeters per gram, cc/g) for the heteroadduct. The recipe for the preparation of this heteroadduct slurry used 1.24 mmol tetrabutylammonium bromide/g clay in combination with ACH to form the heterocoagulated clay which was spray-dried and calcined to provide the spray-dried clay-ACH-surfactant heteroadduct.
Figure 22:
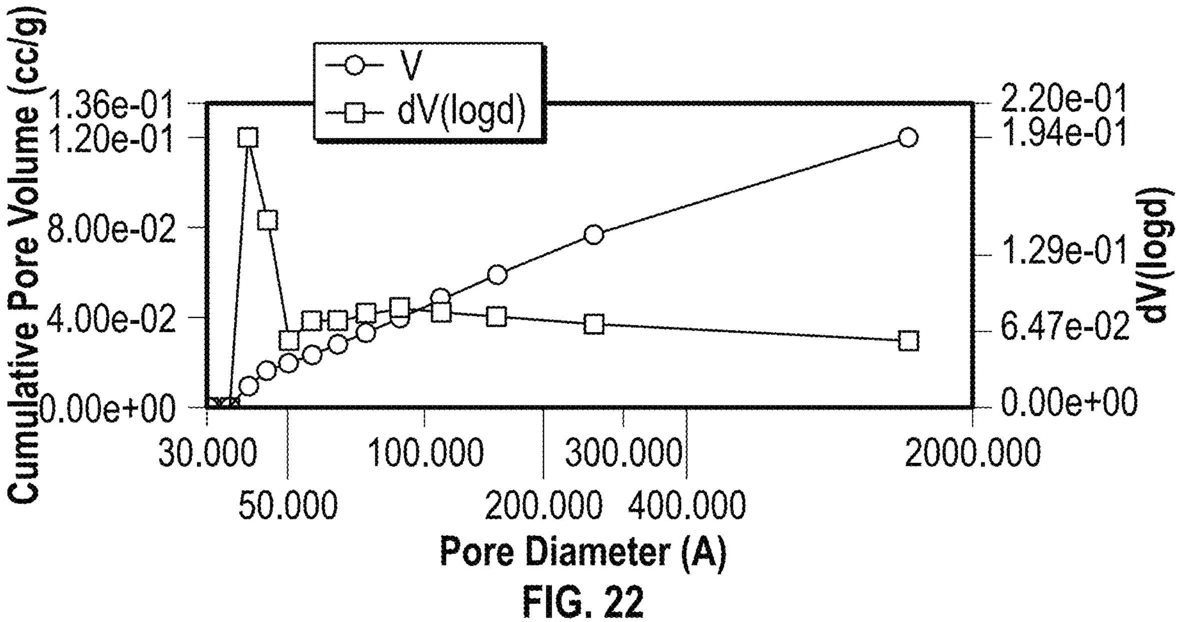
FIG. 22 provides the results of a nitrogen adsorption/desorption BJH pore volume analysis of the calcined tetraoctylammonium bromide and aluminum chlorohydrate (ACH) heterocoagulated clay of Example 24-E4, providing a plot of pore diameter (Angstrom, A) versus the cumulative pore volume (cubic centimeters per gram, cc/g) for the heteroadduct. The recipe for the preparation of this heteroadduct slurry used 0.73 mmol tetraoctylammonium bromide/g clay in combination with ACH to form the heterocoagulated clay which was spray-dried and calcined to provide the spray-dried clay-ACH-surfactant heteroadduct.
Figure 23:
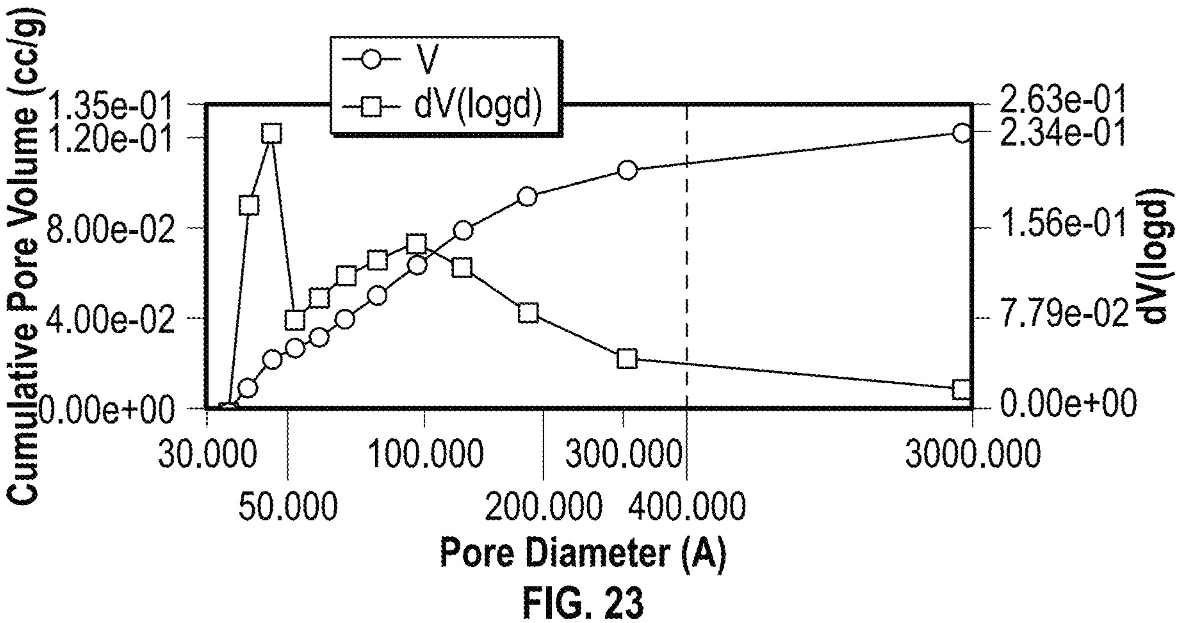
FIG. 23 provides the results of a nitrogen adsorption/desorption BJH pore volume analysis of a comparative example of the spray-dried and calcined aluminum chlorohydrate (ACH) heterocoagulated clay of Example 20-D1, providing a plot of pore diameter (Angstrom, A) versus the cumulative pore volume (cubic centimeters per gram, cc/g) for the heteroadduct. The recipe for the preparation of this heteroadduct slurry used 1.54 mmol aluminum chlorohydrate/g clay to form the heterocoagulated clay which was spray-dried and calcined to provide the spray-dried clay-ACH heteroadduct.
Figure 24:
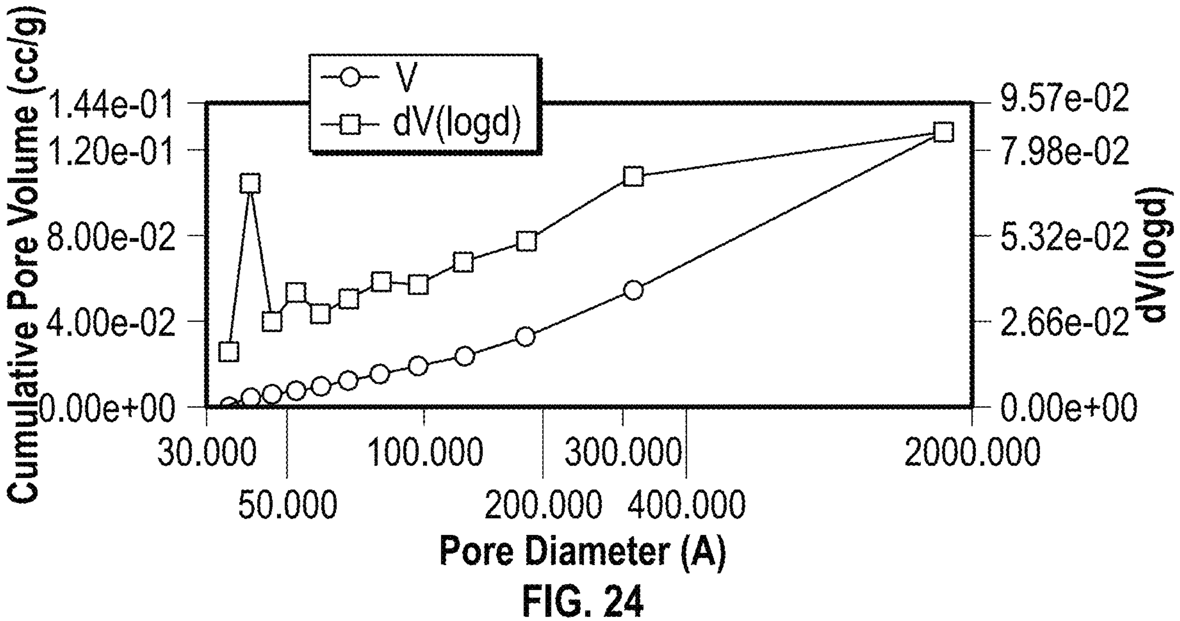
FIG. 24 provides the results of a nitrogen adsorption/desorption BJH pore volume analysis of the spray-dried and calcined tetrabutylammonium bromide heterocoagulated clay of Example 22-E2, providing a plot of pore diameter (Angstrom, A) versus the cumulative pore volume (cubic centimeters per gram, cc/g) for the heteroadduct. The recipe for the preparation of this heteroadduct slurry used 0.73 mmol tetrabutylammonium bromide/g clay in the absence of a cationic polymetallate to form the heterocoagulated clay which was spray-dried and calcined.

In contrast, FIG. 17 shows an optical microscope image of the polymer derived from co-polymerizing ethylene and 1-hexene using the azeotropically dried, clay-aluminum chlorohydrate (ACH) support-activator (absent a surfactant) described in Example 2-A1, in which the support-activator was combined with the metallocene $(\eta^5\text{-1-Bu-3-MeCp})_2ZrCl_2$ and triethylaluminum co-catalyst to form the active catalyst. FIG. 7 and FIG. 8 illustrate SEM images of the support-activator prepared in Example 2-A1 and used to make the polymer in FIG. 17. The polymer particles of FIG. 17, like the support-activator of FIGS. 7 and 8, are granular and quite irregular, highly non-spherical, and agglomerated, in contrast to the polymer particles shown in FIG. 15 and FIG. 16.

Therefore, it can be seen that the spray-drying process from a water-only slurry can be effective method for achieving a desirable, highly spherical morphology for support-activators, which in turn can produce highly symmetric and spherical polymer particles once introduced to metallocene, co-catalyst, and monomer under polymerization conditions. The amenability of the clay-surfactant heteroadducts of this disclosure to spray-drying, particularly their retention of polymerization activity when subjected to such drying methods, thus confers a number of benefits on catalyst bed loading and polymer packing properties.

In a further aspect, circularity (C) of the clay-surfactant heteroadducts and supported catalysts comprising the clay-surfactant heteroadducts can be analyzed and quantified through surface electron microscopy (SEM), with subsequent image analysis. For example, the calcined clay-surfactant heteroadducts and supported catalysts comprising the clay-surfactant heteroadducts can be can be analyzed through surface electron microscopy, with subsequent image analysis using methods such as Scanning Probe Image Processor (SPIP) software to measure circularity of the particles. In this aspect, the circularity of the spray-dried and calcined heteroadducts and catalysts can be measured and compared with the circularity of calcined heteroadducts and catalysts which were dried using other means such as azeotropic drying.

In analyzing such an SEM image by SPIP software, and unless otherwise indicated, particles having a diameter of greater than 8 m and less than 100 m in diameter were selected for analysis, because such a range eliminated the fines that can be generated in grinding the calcined heteroadduct and eliminated large particles that are highly likely to be artifacts of incorrectly perceived fused particles, while still encompassing those particle sizes that are most relevant to the catalytic process and most common in the sample. This circularity analysis of the >8 m and <100 m diameter particles used the SPIP software to calculate the area (A) of a two-dimensional image of the particles and the perimeter length, which is the length of the path encompassing the two-dimensional image of the particles. The SEM images of individual particles were examined before used for calculations to eliminate particles for which the detected boundaries were incorrectly fused with other particles, occluded by other particles, or interrupted by the boundaries of the SEM photograph. In each analysis, unless otherwise stated, a sample of 10 or more particles were detected and subjected to this analysis to calculate circularity (C).

In contrast with the circularity of non-spray dried heteroadduct samples, the heteroadducts which were made according to this disclosure and were spray dried from a water only suspension were characterized by average particle circularity (C) of 0.80 or greater, 0.85 or greater, or 0.90 or greater. The circularity measurements of spray-dried and non-spray-dried clay heteroadducts prepared as described herein are recorded in Table 5, and the corresponding SEM images appear at FIG. 31 through FIG. 36.

Figure 31:
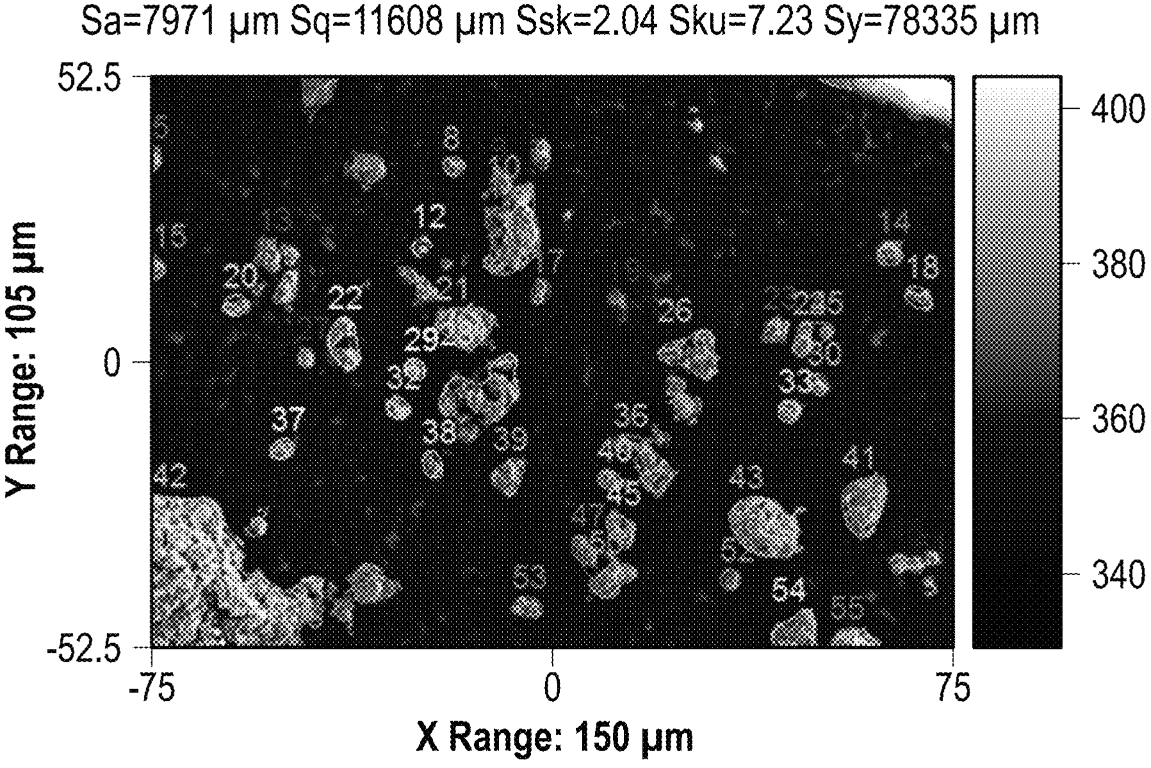
FIG. 31 and FIG. 32 illustrate comparative embodiments of this disclosure, showing SEM images of the support-activators produced by the processes of Example 2-A1 and Example 3-A2, respectively, in which the SEM images of the calcined support-activators are analyzed by Scanning Probe Image Processor (SPIP) software to provide the particle boundaries which are depicted on the images, which are used for Circularity calculations. The FIG. 31 and FIG. 32 support-activators were formed by azeotropically drying the adduct obtained by contacting aluminum chlorhydrate (ACH) and Volclay® HPM-20 montmorillonite in the absence of a surfactant, using 1-butanol as the azeotroping agent and subsequently calcining the dried product as described in Example 2-A1 and Example 3-A2, respectively.
Figure 32:
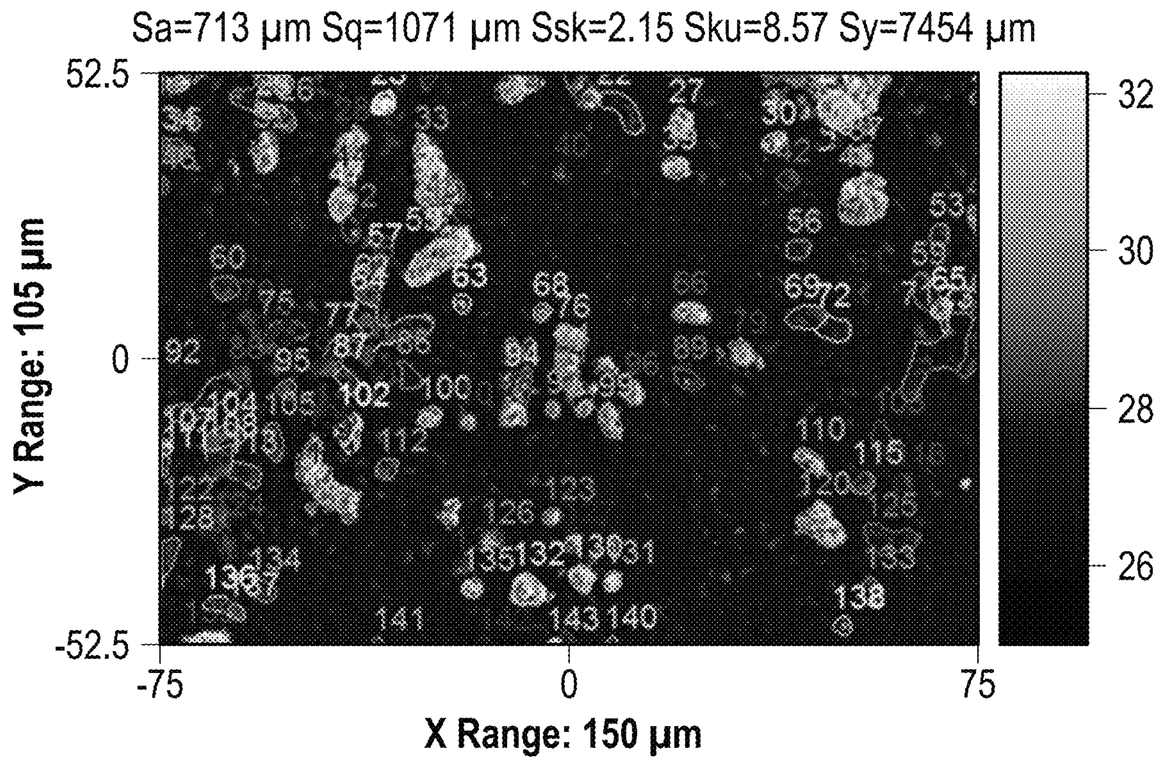
Figure 33:
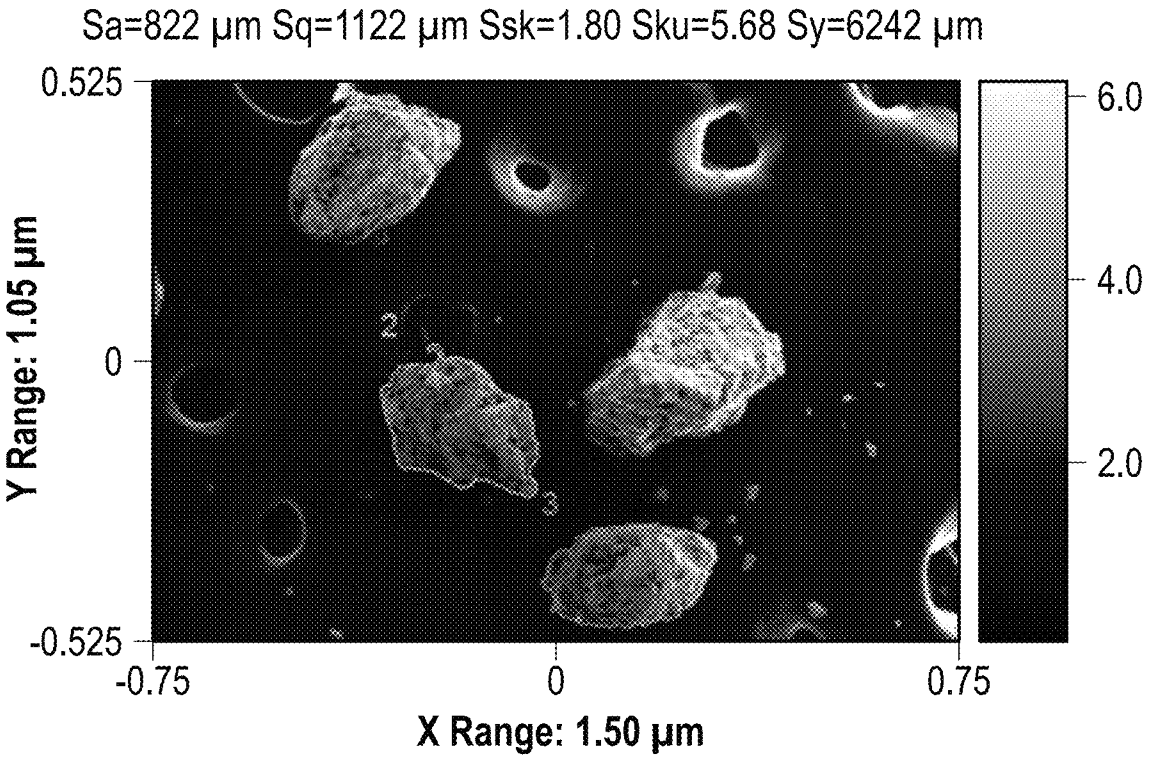
FIG. 33 illustrates an embodiment of this disclosure, showing an SEM image of the support-activator in which the SEM image of the calcined support-activator which is analyzed by Scanning Probe Image Processor (SPIP) software to provide the particle boundaries which are depicted on the image, which are used for Circularity calculations. The FIG. 33 support-activator was formed as described in Example 30-E2 by contacting tetrabutylammonium bromide and Volclay® HPM-20 montmorillonite in the absence of a cationic polymetallate, and the isolated product was dried by rotary evaporation non-azeotropically from an aqueous slurry prior to calcining. The FIG. 33 image can be compared with the spray-dried and calcined samples of Example 22-E2 shown in FIGS. 34-36.

For example, as illustrated in the SEM images of FIG. 31 and FIG. 32, non-spray dried support-activators were obtained by azeotropically drying the adduct obtained by contacting aluminum chlorhydrate (ACH) and montmorillonite in the absence of a surfactant, using 1-butanol as the azeotroping agent and subsequently calcining the dried product as described in Example 2-A1 and Example 3-A2, respectively. The FIG. 33 SEM illustrates a support-activator which was formed as described in Example 30-E2 by contacting tetrabutylammonium bromide and montmorillonite in the absence of a cationic polymetallate, and the isolated product was drying by rotary evaporation from an aqueous slurry in the absence of an azeotroping agent prior to calcining. In all of the FIG. 31 through FIG. 33 samples, the particles observed in these images exhibit low circularity and/or a large proportion of the particles which fall outside the 8 m to 100 m diameter range. In general, such low circularity and exceptionally large or small particles are not desirable for catalytic processes.

Figure 34:
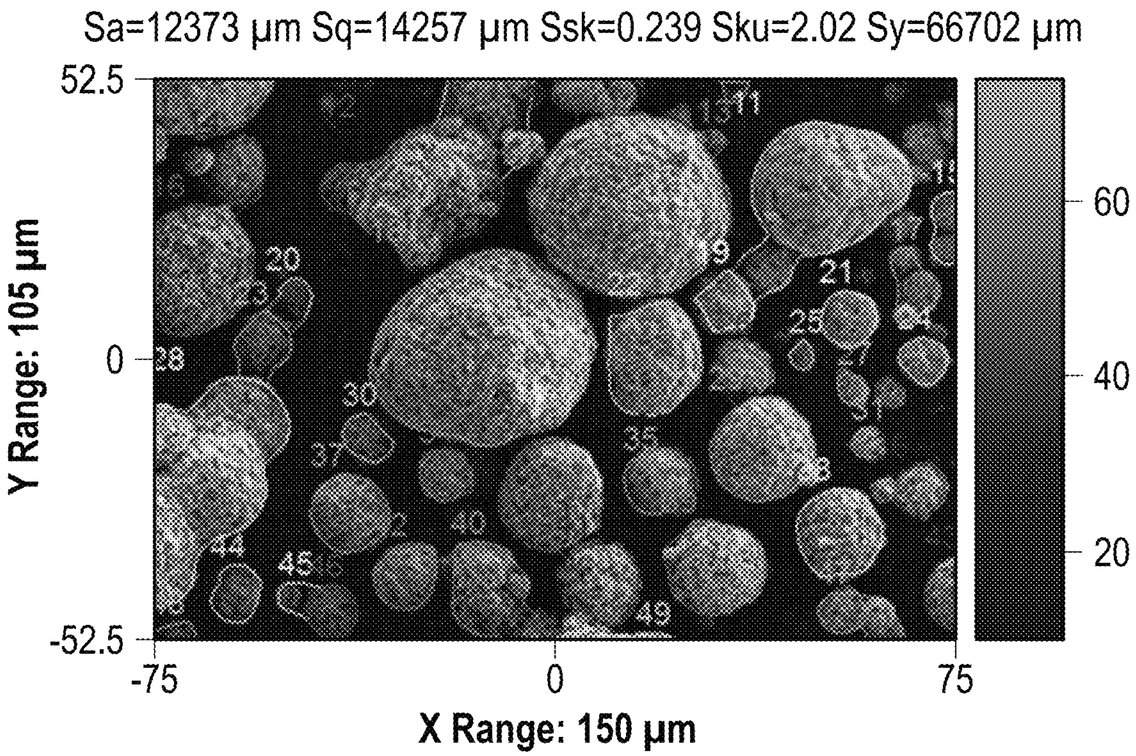
FIG. 34, FIG. 35, and FIG. 36 illustrate embodiments of this disclosure, showing three different SEM images of the calcined support-activators which are analyzed by Scanning Probe Image Processor (SPIP) software to provide the particle boundaries which are depicted on the images and which are used for Circularity calculations. The FIG. 34, FIG. 35, and FIG. 36 support-activators were formed as described in Example 22-E2 by contacting tetrabutylammonium bromide and Volclay® HPM-20 montmorillonite in the absence of a cationic polymetallate which was isolated by filtration, and the isolated support-activator was spray-dried from an aqueous suspension and subsequently calcined.
Figure 35:
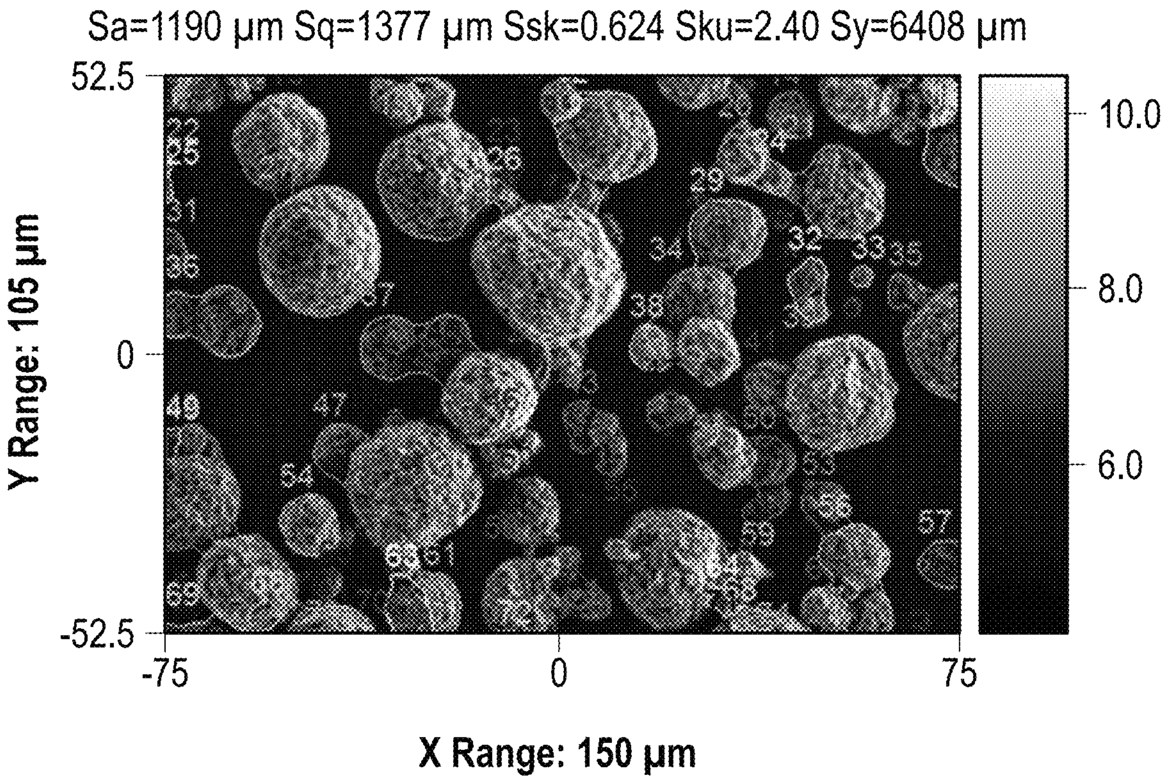
Figure 36:
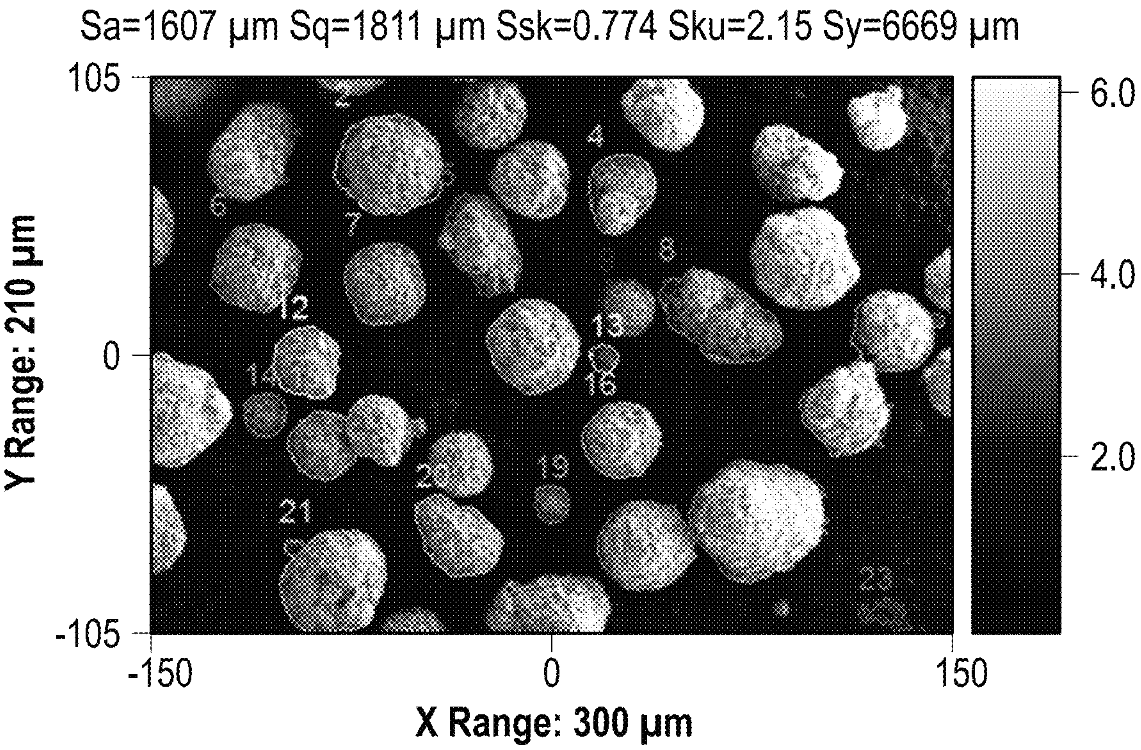

In contrast, the SEM images of FIG. 34, FIG. 35, and FIG. 36 illustrate support-activators which were formed as described in Example 22-E2 by contacting tetrabutylammonium bromide and montmorillonite in the absence of a cationic polymetallate and which were isolated by filtration, and the isolated support-activators were subsequently spray-dried from an aqueous suspension and calcined. In all of the FIG. 34 through FIG. 36 samples, the particles observed in these images exhibit a very high circularity and a large proportion of the particles fall within the desirable 8 m to 100 m diameter range, making these support-activators very advantageous for catalytic processes.

K. Metallocene Compounds

The clay-surfactant heteroadduct (also referred to as clay heteroadduct) can be used as a substrate or catalyst support-activator for one or more suitable polymerization catalyst precursors such as metallocenes, other organometallic compounds, and/or organoaluminum compounds and the like, or other catalyst components in order to prepare an olefin polymerization catalyst composition. Therefore, in one aspect, when a clay heteroadduct is prepared as disclosed herein and combined with an organo-main group metal, such as alkylaluminum compounds and group 4 organotransition metal compound such as a metallocene, an active olefin polymerization catalyst or catalyst system is provided.

The support-activator of this disclosure can be used with metallocene compounds (also referred to herein as metallocene catalysts) and co-catalysts such as organoaluminum compounds, the resulting composition exhibits catalytic polymerization activity in the absence or substantial absence of an ion-exchanged, protic-acid-treated, or pillared clay, or aluminoxane or borate activators. Previously, activators such as aluminoxane or borate activators have been thought of as necessary in order to achieve polymerization catalytic activity with metallocene or single site or coordination catalyst systems. However, the combination of heteroadduct support-activator, metallocene, and co-catalyst such as aluminum alkyl compound if desired to impart an activatable alkyl ligand to the metallocene provides an active catalyst with the need for other activators such as aluminoxane or borate activators.

Metallocene compounds are well-understood in the art, and the skilled person will recognize that any metallocene can be used with the support-activator described in this disclosure, including for example, both non-bridged (non-ansa) metallocene compounds or bridged (ansa) metallocene compounds, or combinations thereof. Therefore, one, two, or more metallocene compounds can be used with the clay-surfactant support-activators of this disclosure.

In one aspect, the metallocene can be a metallocene comprising a group 3 to group 6 transition metal or a metallocene comprising a lanthanide metal or a combination of more than one metallocene. For example, the metallocene can comprise a group 4 transition metal (titanium, zirconium, or hafnium). In a further aspect, the metallocene compound can comprises, consists of, consists essentially of, or is selected from a compound or a combination of compounds, each independently having the formula:

$(X^1)(X^2)(X^3)(X^4)M$, wherein a) M is selected from titanium, zirconium, or hafnium;
b) $X^1$ is selected from a substituted or an unsubstituted cyclopentadienyl, indenyl, fluorenyl, pentadienyl, allyl, boratabenzenyl, 1,2-azaborolyl, or 1,2-diaza-3,5-diborolyl, wherein any substituent is selected independently from a halide, a $C_1$-$C_{20}$ hydrocarbyl, a $C_1$-$C_{20}$ heterohydrocarbyl, a $C_1$-$C_{20}$ organoheteryl, a fused $C_4$-$C_{12}$ carbocyclic moiety, or a fused $C_4$-$C_{11}$ heterocyclic moiety having at least one heteroatom selected independently from nitrogen, oxygen, sulfur, or phosphorus;
c) $X^2$ is selected from: [1] a substituted or an unsubstituted cyclopentadienyl, indenyl, fluorenyl, pentadienyl, or allyl, wherein any substituent is selected independently from a halide, a $C_1$-$C_{20}$ hydrocarbyl, a $C_1$-$C_{20}$ heterohydrocarbyl, or a $C_1$-$C_{20}$ organoheteryl; or [2] a halide, a hydride, a $C_1$-$C_{20}$ hydrocarbyl, a $C_1$-$C_{20}$ heterohydrocarbyl, a $C_1$-$C_{20}$ organoheteryl, a fused $C_4$-$C_{12}$ carbocyclic moiety, or a fused $C_4$-$C_{11}$ heterocyclic moiety having at least one heteroatom selected independently from nitrogen, oxygen, sulfur, or phosphorus;
d) wherein $X^1$ and $X^2$ are optionally bridged by at least one linker substituent having from 2 to 4 bridging atoms selected independently from C, Si, N, P, or B, wherein each available non-bridging valence of each bridging atom is unsubstituted (bonded to H) or substituted, wherein any substituent is selected independently from, a halide, a $C_1$-$C_{20}$ hydrocarbyl, a $C_1$-$C_{20}$ heterohydrocarbyl, or a $C_1$-$C_{20}$ organoheteryl, and wherein any hydrocarbyl, heterohydrocarbyl, or organoheteryl substituent can form a saturated or unsaturated cyclic structure with a bridging atom or with $X^1$ or X2
e) [1] $X^3$ and $X^4$ are selected independently from a halide, a hydride, a $C_1$-$C_{20}$ hydrocarbyl, a $C_1$-$C_{20}$ heterohydrocarbyl, or a $C_1$-$C_{20}$ organoheteryl; [2] $[GX^A_kX^B_{4-k}]$, wherein G is B or Al, k is a number from 1 to 4, and $X^A$ in each occurrence is selected independently from H or a halide, and $X^B$ in each occurrence is selected independently from a $C_1$-$C_{12}$ hydrocarbyl, a $C_1$-$C_{12}$ heterohydrocarbyl, a $C_1$-$C_{12}$ organoheteryl; [3] $X^3$ and $X^4$ together are a $C_4$-$C_{20}$ polyene; or [4] $X^3$ and $X^4$ together with M form a substituted or an unsubstituted, saturated or unsaturated $C_3$-$C_6$ metallacycle moiety, wherein any substituent on the metallacycle moiety is selected independently from a halide, a $C_1$-$C_{20}$ hydrocarbyl, a $C_1$-$C_{20}$ heterohydrocarbyl, or a $C_1$-$C_{20}$ organoheteryl.

According to a further aspect, if desired, $X^1$ and $X^2$ can be bridged by a linker substituent selected from:

a) $>EX^5_2$, $-EX^5_2EX^5_2—$, $-EX^5_2EX^5EX^5_2—$, or $>C{=}CX^5_2$, wherein E in each occurrence is independently selected from C or Si;
b) $—BX^5—$, $—NX^5—$, or $—PX^5—$; or
c) $[—SiX^5_2(1,2\text{-}C_6H_4)SiX^5_2—]$, $[—CX^5_2(1,2\text{-}C_6H_4)CX^5_2—]$, $[—SiX^5_2(1,2\text{-}C_6H_4)CX^5_2—]$, $[—SiX^5_2(1,2\text{-}C_2H_2)SiX^5_2—]$, $[—CX^5_2(1,2\text{-}C_6H_4)CX^5_2—]$, or $[—SiX^5_2(1,2\text{-}C_6H_4)CX^5_2—]$;

wherein $X^5$ in each occurrence is selected independently from H, a halide, a $C_1$-$C_{20}$ hydrocarbyl, a $C_1$-$C_{20}$ heterohydrocarbyl, or a $C_1$-$C_{20}$ organoheteryl; and wherein any $X^5$ substituents selected from hydrocarbyl, heterohydrocarbyl, or organoheteryl substituent can form a saturated or unsaturated cyclic structure with a bridging atom, another $X^5$ substituent, $X^1$, or $X^2$.

Examples of suitable linker substituents which can bridge $X^1$ and $X^2$ include $C_1$-$C_{20}$ hydrocarbylene group, a $C_1$-$C_{20}$ hydrocarbylidene group, a $C_1$-$C_{20}$ heterohydrocarbyl group, a $C_1$-$C_{20}$ heterohydrocarbylidene group, a $C_1$-$C_{20}$ heterohydrocarbylene group, or a $C_1$-$C_{20}$ heterohydrocarbylidene group. For example, $X^1$ and $X^2$ can be bridged by at least one substituent having the formula $>EX^5_2$, $-EX^5_2EX^5_2—$, or $—BX^5—$, wherein E is independently C or Si, $X^5$ in each occurrence is selected independently from a halide, a $C_1$-$C_{20}$ aliphatic group, a $C_6$-$C_{20}$ aromatic group, a $C_1$-$C_{20}$ heteroaliphatic group, a $C_4$-$C_{20}$ heteroaromatic group, or a $C_1$-$C_{20}$ organoheteryl group.

The Aspects section of this disclosure recites additional description and selections regarding linking moieties between $X^1$ and $X^2$, regarding $X^5$, and regarding specific linker substituents or $X^5$ substituents.

The Aspects section of this disclosure also recites additional description and selections for $X^1$ and $X^2$, including specific substituents on $X^1$ and $X^2$.

The Aspects section of this disclosure also recites additional description and selections for $X^3$ and $X^4$, including specific substituents on $X^3$ and $X^4$.

The Aspects section of this disclosure also provides some specific examples of metallocene compounds that are useful in combination with the support-activator of this disclosure.

Once the supported metallocene catalyst is prepared and dried according to this disclosure, and prior to its use in combination with a co-catalyst, the supported metallocene catalyst can have an average particle size of, for example, from 1 m (micron) to 250 m, which is the average dry particle size. Unless stated otherwise, particle sizes recited for the supported metallocene catalyst are for the dried supported catalyst particles measured as described herein. In an aspect, the supported metallocene catalyst can have an average particle size of about 1 m (microns), about 2 m, about 3 m, about 5 m, about 7 m, about 10 μm, about 12 μm, about 15 μm, about 18 μm, about 20 m, about 25 μm, about 30 μm, about 35 μm, about 40 μm, about 45 μm, about 50 μm, about 55 μm, about 60 μm, about 65 μm, about 70 μm, about 75 μm, about 80 μm, about 85 μm, about 90 μm, about 95 μm, about 100 μm, about 110 μm, about 120 μm, about 125 μm, about 130 μm, about 140 μm, about 150 μm, about 160 μm, about 170 μm, about 175 μm, about 185 μm, about 200 μm, about 225 μm, or about 250 μm, or any ranges of particle sizes between these recited numbers. For example, the supported metallocene catalyst can have an average particle size of from 1 μm (micron) to 250 μm, from 2 μm to 125 μm, from 3 μm to 100 μm, from 5 μm to 150 μm, from 5 μm to 80 μm, from 7 μm to 70 μm, from 10 μm to 100 μm, from 10 μm to 60 μm, from 15 μm to 80 μm, from 15 μm to 50 μm, or from 20 μm to 75 μm.

Metallocene compounds are understood by the person skilled in the art, who will recognize and appreciate the methods of making and using the metallocene in olefin polymerization catalyst systems. Many metallocenes and processes to make metallocenes and organotransition metal compounds are known in the art, such as disclosed in U.S. Pat. Nos. 4,939,217; 5,210,352; 5,436,305; 5,401,817; 5,631,335, 5,571,880; 5,191,132; 5,480,848; 5,399,636; 5,565,592; 5,347,026; 5,594,078; 5,498,581; 5,496,781; 5,563,284; 5,554,795; 5,420,320; 5,451,649; 5,541,272; 5,705,478; 5,631,203; 5,654,454; 5,705,579; 5,668,230; 9,045,504; and 9,163,100, and U.S. Patent Application Publication No. 2017/0342175, the entire disclosures of which are incorporated herein by reference.

L. Co-Catalysts

According to one aspect, this disclosure provides a catalyst composition for olefin polymerization, the catalyst composition comprising: a) at least one metallocene compound;

b) optionally, at least one co-catalyst; and c) at least one support-activator as described herein. The co-catalyst includes compounds such as a trialkyl aluminum which are thought to impart a ligand to the metallocene or activate a metallocene ligand, which can then initiate polymerization when the metallocene is otherwise activated with the support-activator. The co-catalyst may be considered optional, for example, in scenarios in which the metallocene may already include a polymerization-activatable/initiating ligand such as methyl or hydride. It will be understood that even when the metallocene compound includes such as a polymerization-activatable/initiating ligand, a co-catalyst can be used for other purposes, such as to scavenge moisture from the polymerization reactor or process. Thus, the co-catalyst can comprise or be selected from, for example, an alkylating agent, a hydriding agent, or a silylating agent. The metallocene compound, the support-activator, and the co-catalyst can be contacted in any order.

The co-catalyst can comprises or can be selected from an organoaluminum compound, an organoboron compound, an organozinc compound, an organomagnesium compound, an organolithium compound, or any combination thereof.

The Aspects section of this disclosure recites additional description and selections for each of the organoaluminum compound, organoboron compound, organozinc compound, organomagnesium compound, and organolithium compound.

In an aspect, for example, the co-catalyst can comprise, consists of, consist essentially of, or be selected from at least one organoaluminum compound which can independently have the formula $Al(X^A)_n(X^B)_m$, $M^x[AlX^A_4]$, $Al(X^C)_n(X^D)_{3-n}$, $M^x[AlX^C_4]$, that is, can be neutral molecular compounds or ionic compounds/salts of aluminum, wherein each of the variables of these formulas is defined in the Aspects section of this disclosure. For example, the co-catalyst can comprise, consists of, consist essentially of, or be selected from trimethylaluminum, triethylaluminum (TEA), tripropylaluminum, tributylaluminum, trihexylaluminum, trioctylaluminum, ethyl-(3-alkylcyclopentadiyl)aluminum, diethylaluminum ethoxide, diisobutylaluminum hydride, triisobutylaluminum (TIBAl), diethylaluminum chloride, ethyl-(3-alkylcyclopentadiyl)aluminum, and the like, including any combination thereof.

In another aspect, for example, the co-catalyst can comprise, consists of, consist essentially of, or be selected from at least one organoboron compound which can independently have the formula $B(X^E)_q(X^F)_{3-q}$, $B(X^E)_3$, or $M^y[BX^E_4]$, that is, can be neutral molecular compounds or ionic compounds/salts of boron, wherein each of the variables of these formulas is defined in the Aspects section of this disclosure. For example, the co-catalyst can comprise, consists of, consist essentially of, or be selected from trimethylboron, triethylboron, tripropylboron, tributylboron, trihexylboron, trioctylboron, diethylboron ethoxide, diisobutylboron hydride, triisobutylboron, diethylboron chloride, di-3-pinanylborane, pinacolborane, catecholborane, lithium borohydride, lithium triethylborohydride, and the like, including a Lewis base adduct thereof, or any combination or mixture thereof. In another aspect, the co-catalyst can comprise or can be a halogenated organoboron compound, for example a fluorinated organoboron compound, examples of which include tris(pentafluorophenyl)boron, tris[3,5-bis(trifluoromethyl)phenyl]boron, N,N-dimethylanilinium tetrakis(pentafluorophenyl)-borate, triphenylcarbenium tetrakis(pentafluorophenyl)borate, lithium tetrakis-(pentafluorophenyl)borate, N,N-dimethylanilinium tetrakis [3,5-bis(trifluoro-methyl)phenyl]borate, triphenylcarbenium tetrakis[3,5-bis(trifluoromethyl)-phenyl]borate, and any combination or mixture thereof.

In yet another aspect, for example, the co-catalyst can comprise, consists of, consist essentially of, or be selected from at least one organozinc or organomagnesium compound which can independently have the formula $M^C(X^G)_r(X^H)_{2-r}$, wherein each of the variables of this formula is defined in the Aspects section of this disclosure. For example, the co-catalyst can comprise, consists of, consist essentially of, or be selected from dimethylzinc, diethylzinc, diisopropylzinc, dicyclohexylzinc, diphenylzinc, butylethylmagnesium, dibutylmagnesium, n-butyl-sec-butylmagnesium, dicyclopentadienylmagnesium, ethylmagnesium chloride, butylmagnesium chloride, and the like, including any combination thereof.

In yet another aspect, for example, the co-catalyst can comprise, consists of, consist essentially of, or be selected from at least one organolithium compound which can independently have the formula $Li(X^J)$, wherein each of the variables of this formula is defined in the Aspects section of this disclosure. For example, the co-catalyst can comprise, consists of, consist essentially of, or be selected from methyllithium, ethyllithium, propyllithium, butyllithium (including n-butyllithium and t-butyllithium), hexyllithium, iso-butyllithium, and the like, or any combination thereof.

M. Optional Co-Activators

In an aspect, other activators in addition to the calcined smectite heteroadduct support-activator can be used in the catalyst compositions of this disclosure if desired. These are referred to as co-activators, and examples of optional co-activators include but are not limited to an ion-exchanged clay, a protic-acid-treated clay, a pillared clay, an aluminoxane, a borate activator, an aluminate activator, an ionizing ionic compound, a solid oxide treated with an electron withdrawing anion, or any combination thereof. In one aspect, the catalyst system and polymerization method can be absent any co-activators, including any one of more of the co-activators described herein.

The Aspects section of this disclosure recites additional description and selections for each of these optional co-activators.

Aluminoxanes. Aluminoxanes (also referred to as poly (hydrocarbyl aluminum oxides) or organoaluminoxanes) can be used to contact the other catalyst components, for example, in any solvent which is substantially inert to the reactants, intermediates, and products of the activation step such as a saturated hydrocarbon solvent or a solvent such as toluene. The catalyst composition formed in this manner may be isolated if desired or the catalyst composition may be introduced into the polymerization reactor without being isolated.

As understood by the skilled artisan, aluminoxanes are oligomeric, wherein the aluminoxane compound can comprise linear structures, cyclic, or cage structures, or mixtures thereof. For example, cyclic aluminoxane compounds having the formula $(R—Al—O)_n$, wherein R can be a linear or branched alkyl having from 1 to about 12 carbon atoms, and n can be an integer from 3 to about 12. The $(AlRO)_n$ moiety also constitutes the repeating unit in a linear aluminoxane, for example, having the formula: $R(R—Al—O)_nAlR_2$, wherein R can be a linear or branched alkyl having from 1 to about 12 carbon atoms, and n can be an integer from 1 to about 75. For example, the R group can be a linear or branched $C_1$-$C_8$ alkyl such as methyl, ethyl, propyl, butyl, pentyl, hexyl, heptyl, or octyl, and wherein n can represent an integer from 1 to about 50. Depending upon how the organoaluminoxane is prepared, stored, and used, the value of n may be variable within a single sample of aluminoxane, and such a combination or population of organoaluminoxane species is usually present in any sample.

Organoaluminoxanes can be prepared by various procedures known in the art, for example, organoaluminoxane preparations are disclosed in U.S. Pat. Nos. 3,242,099 and 4,808,561, each of which is incorporated by reference herein, in its entirety. In one aspect, an aluminoxane may be prepared by reacting water which is present in an inert organic solvent with an aluminum alkyl compound such as $AlR_3$ to form the desired organoaluminoxane compound. Alternatively, organoaluminoxanes may be prepared by reacting an aluminum alkyl compound such as $AlR_3$ with a hydrated salt, such as hydrated copper sulfate, in an inert organic solvent.

In one embodiment, the aluminoxane compound can be methylaluminoxane, ethylaluminoxane, n-propylaluminoxane, iso-propyl-aluminoxane, n-butylaluminoxane, t-butylaluminoxane, sec-butylaluminoxane, iso-butylaluminoxane, 1-pentylaluminoxane, 2-pentylaluminoxane, 3-pentyl-aluminoxane, iso-pentylaluminoxane, neopentylaluminoxane, or combinations thereof. In an aspect, methyl aluminoxane (MAO), ethyl aluminoxane (EAO), or isobutyl aluminoxane (IBAO) can be used as optional co-catalysts, and these aluminoxanes can be prepared from trimethylaluminum, triethylaluminum, or triisobutylaluminum, respectively. These compounds can be complex compositions, and are sometimes referred to as poly(methyl aluminum oxide), poly(ethyl aluminum oxide), and poly(isobutyl aluminum oxide), respectively. In another aspect, aluminoxanes can be used in combination with a trialkylaluminium, such as disclosed in U.S. Pat. No. 4,794,096, which is herein incorporated by reference in its entirety.

In preparing a catalyst composition comprising optional aluminoxane, the molar ratio of the aluminum present in the aluminoxane to the metallocene compound(s) in the composition can be lower than the typical molar ratio that would be used in the absence of the support-activator of the present disclosure. In the absence of support-activators of this disclosure, aluminoxane amounts can be, for example, from about 1:10 moles Al/moles metallocene (mol Al/mol metallocene) to about 100,000:1 mol Al/mol metallocene or from about 5:1 mol Al/mol metallocene to about 15,000:1 mol Al/mol metallocene. When used in combination with the disclosed support-activators, the relative amounts of aluminoxane can be reduced. For example, the amount of optional aluminoxane added to a polymerization zone can be less than the previous typical amount within a range of about 0.01 mg/L to about 1000 mg/L, from about 0.1 mg/L to about 100 mg/L, or from about 1 mg/L to about 50 mg/L. Alternatively, aluminoxane can be used in an amount typically used in the prior art, but with the additional use of a support-activator of the present disclosure in order to obtain further advantages for such a combination.

Organoboron Compounds, Including Organoborates. The catalyst compositions of this disclosure can also comprise an optional organoboron co-activator if desired, in addition to the recited components (support-activator, metallocene, and optional co-catalyst). In one aspect, the organoboron compound can comprise or be selected form neutral boron compounds, borate salts, or combinations thereof. For example, the organoboron compounds can comprise or be selected from a fluoroorgano boron compound, a fluoroorgano borate compound, or a combination thereof, and any such fluorinated compounds known in the art can be utilized.

Thus, the term fluoroorgano boron compound is used herein to refer to the neutral compounds of the form $BY_3$, and the term fluoroorgano borate compound is used herein to refer to the monoanionic salts of a fluoroorgano boron compound of the form $[cation]^+[BY_4]^-$, where Y represents a fluorinated organic group. For convenience, fluoroorgano boron and fluoroorgano borate compounds are typically referred to collectively by organoboron compounds, or by either name as the context requires.

In an aspect, examples of fluoroorgano boron compounds that can be used as co-activators include, but are not limited to, tris(pentafluorophenyl)boron, tris[3,5-bis(trifluoromethyl)phenyl]boron, and the like, including mixtures thereof. Examples of fluoroorgano borate compounds that can be used as optional co-activators include, but are not limited to, fluorinated aryl borates such as, N,N-dimethylanilinium tetrakis-(pentafluorophenyl)borate, triphenylcarbenium tetrakis(pentafluorophenyl)borate, lithium tetrakis-(pentafluorophenyl)borate, N,N-dimethylanilinium tetrakis [3,5-bis (trifluoro-methyl)phenyl]borate, triphenylcarbenium tetrakis[3,5-bis(trifluoromethyl)-phenyl]borate, and the like, including mixtures thereof.

The Aspects section of this disclosure recites additional description and selections for the optional fluoroorgano boron and fluoroorgano borate compound co-activators.

Although not intending to be bound by theory, these fluoroorgano borate and fluoroorgano boron compounds are thought to form weakly-coordinating anions when combined with metallocene compounds, as disclosed in U.S. Pat. No. 5,919,983, which is incorporated herein by reference in its entirety.

Generally, any amount of organoboron compound can be utilized as an optional co-activator. For example, in one aspect, the molar ratio of the organoboron compound to the metallocene compound in the composition can be from about 0.1:1 mole of organoboron or organoborate compound per mole of metallocene (mol/mol) to about 10:1 mol/mol, or from about 0.5 mol/mol to about 10 mol/mol (mole of organoboron or organoborate compound per mole of metallocene), or alternatively in a range of from about 0.8 mol/mol to about 5 mol/mol (mole of organoboron or organoborate compound per mole of metallocene). However, it will be appreciated that the amount can be reduced or adjusted downward in the presence of a clay-heteroadduct support-activator.

Ionizing Compounds. In a further aspect, the optional co-activators which can be used in addition to the recited components of the catalyst compositions of this disclosure can comprise or can be selected from ionizing compounds. Examples of ionizing compound are disclosed in U.S. Pat. Nos. 5,576,259 and 5,807,938, each of which is incorporated herein by reference, in its entirety.

The Aspects section of this disclosure recites additional description and selections for the optional ionizing compound co-activators.

The term ionizing compound is term of art and refers to a compound, particularly an ionic compound, which can function to enhance activity of the catalyst composition. In one aspect, the fluoroorgano borate compounds described herein as optional organoboron co-activators can also be considered and function as ionizing compound co-activators. However, the scope of the ionizing compounds is broader than the fluoroorgano borate compounds, as compounds such as fluoroorgano aluminate are encompassed by ionizing compounds.

While not intending to be bound by theory, it is believed that the ionizing compounds may be capable of interacting or reacting with the metallocene compound and converting the metallocene into a cationic or an incipient cationic metallocene compound, which activates the metallocene to polymerization activity. Again, while not intending to be bound by theory, it is believed that the ionizing compound may function by completely or partially extracting an anionic ligand from the metallocene, particularly a non-cycloalkadienyl ligand or non-alkadienyl ligand such as $(X^3)$ or $(X^4)$ of the metallocene formula $(X^1)(X^2)(X^3)(X^4)M$ disclosed herein, to form a cationic or incipient cationic metallocene. However, the ionizing compound can function as an activator (co-activator) regardless of any mechanism by which it functions. For example, the ionizing compound may ionize the metallocene, abstract an $X^3$ or $X^4$ ligand in a fashion as to form an ion pair, weakens the metal-$X^3$ or metal-$X^4$ bond, or simply coordinate to an $X^3$ or $X^4$ ligand, or any other mechanisms by which activation may occur. Further, it is not necessary that the ionizing compound activate (co-activate) the metallocene only, as the activation function of the ionizing compound is evident in the enhanced activity of catalyst composition as a whole, as compared to a catalyst composition containing catalyst composition that does not comprise any ionizing compound.

Examples of ionizing compounds include, but are not limited to, the list of compounds presented in the Aspects section of this disclosure.

Optional Support-Activators. In a further aspect, the optional co-activators which can be used in addition to the recited components of the catalyst compositions of this disclosure can comprise or can be selected from other support-activators, sometimes termed activator-supports, which when used in the catalyst compositions described herein are termed co-activator-supports. Examples of optional co-activator-supports are disclosed in U.S. Pat. Nos. 6,107,230; 6,653,416; 6,992,032; 6,984,603; 6,833,338; and 9,670,296 each of which is incorporated herein by reference, in its entirety.

For example, the optional co-activator-support may comprise or be selected from silica, alumina, silica-alumina, or silica-coated alumina which is treated with at least one electron-withdrawing anion. For example, the silica-coated alumina can have a weight ratio of alumina-to-silica in a range of from about 1:1 to about 100:1, or from about 2:1 to about 20:1, in this aspect. The at least one electron-withdrawing anion can comprise or be selected from fluoride, chloride, bromide, phosphate, triflate, bisulfate, sulfate, and the like, or combinations thereof.

In an aspect, the optional co-activator-supports can be selected from, for example, fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, and the like, any of which or any combinations of which can be employed in catalyst compositions disclosed herein. Alternatively, or additionally, the co-activator-support can comprise or be selected from solid oxides treated with an electron withdrawing anion such as fluorided silica-alumina, or sulfated alumina and the like.

Examples of co-activator-supports can include, but are not limited to, those listed in the Aspects section of this disclosure.

N. The Catalyst System and its Preparation

An aspect provided by this disclosure is the preparation of a catalyst system comprising the smectite heteroadduct and a transition metal precatalyst, particularly a metallocene. In an aspect, the catalyst system for olefin polymerization can comprise:

(a) at least one metallocene compound;

(b) at least one support-activator according to any aspect of this disclosure.

The use of the term "catalyst system" encompasses a catalyst system comprising these components, and "catalyst system" can further comprise at least one co-catalyst such as an alkyl aluminum compound and/or at least one co-activator such as methyl aluminoxane (MAO) in combination with these components. This disclosure also provides a method of making a catalyst system, in which the method comprising contacting in a second liquid carrier: (a) at least one metallocene compound; and (b) at least one support-activator comprising a smectite heteroadduct according to this disclosure. This method of making a catalyst system can further comprise contacting in the second liquid carrier at least one co-catalyst such as an alkyl aluminum compound and/or at least one co-activator such as methyl aluminoxane (MAO), in which the contacting can occur in any order.

In the catalyst system the relative concentration or ratio of metallocene such as a group 4 metallocene of the formula $(X^1)(X^2)(X^3)(X^4)M$ to the calcined clay-surfactant heteroadduct can be expressed as moles of M (metal) per grams of calcined clay heteroadduct (mol M/g heteroadduct). In one aspect, it has been found that the ratio of moles of M per grams of calcined clay heteroadduct can be in a range of from about 0.025 mol M/g heteroadduct to about 0.000000005 mol M/g heteroadduct. In another aspect, the moles of M per grams of calcined clay heteroadduct can be used in a range of from about 0.0005 mol M/g heteroadduct to about 0.00000005 mol M/g heteroadduct, or alternatively, from about 0.0001 mol M/g heteroadduct to 0.000001 mol M/g heteroadduct. As in all ranges disclosed herein, these recited ranges include the end points as well as intermediate values and subranges within the recited range. These ratios reflect the catalyst recipe, that is, these ratios are based on the amount of the components combined to give the catalyst composition, regardless of what the ratio may be in the final catalyst.

In the catalyst system the relative concentration or ratio of co-catalyst to the calcined clay heteroadduct can be expressed as moles of co-catalyst (for example, organoaluminum compound) per grams of calcined clay heteroadduct (mol co-catalyst/g heteroadduct). In one aspect, it has been found that the ratio of moles of co-catalyst such as an organoaluminum compound per grams of calcined clay heteroadduct can be in a range of from about 0.5 mol co-catalyst/g heteroadduct to about 0.000005 mol co-catalyst/g heteroadduct. In another aspect, the ratio of moles of co-catalyst per grams of calcined clay heteroadduct that can be used is in a range of from about 0.1 mol co-catalyst/g heteroadduct to about 0.00001 mol co-catalyst/g heteroadduct, or alternatively, from about 0.01 mol co-catalyst/g heteroadduct to about 0.0001 mol co-catalyst/g heteroadduct.

Catalyst compositions can be produced by contacting the transition metal compound such as a metallocene, the calcined clay heteroadduct, and the co-catalyst such as an organoaluminum compound under suitable conditions. Contacting can occur in any number of ways, for example by blending, by contact in a carrier liquid, by feeding each component into a reactor separately or in any order or combination. For example, various combinations of the components or compounds can be contacted with one another before being further contacted in a reactor with the remaining compound(s) or component(s). Alternatively, all three components or compounds can be contacted together before being introduced into a reactor. Regarding the additional optional components which can be used in the catalyst system disclosed herein, such as co-activators, ionizing ionic compounds, and the like, contacting steps using these optional components can occur in any way and in any order.

In one aspect, the catalyst composition can be prepared by first contacting a transition metal compound such as a metallocene, with a co-catalyst such as an organoaluminum compound, for a time period of from about 1 minute to about 24 hours, or alternatively from about 1 minute to about 1 hour, at a contact temperature that can range from about 10° C. to about 200° C., alternatively from about 12° C. to about 100° C., alternatively from about 15° C. to about 80° C., or alternatively from about 20° C. to about 80° C., to form a first mixture, and this first mixture can then be contacted with a calcined clay heteroadduct to form the catalyst composition.

In another aspect, the metallocene, the co-catalyst such as an organoaluminum compound, and the calcined clay heteroadduct can be pre-contacted before being introduced into a reactor. For example, the pre-contacting step may occur over a time period of from about 1 minute to about 6 months. In one aspect, for example, the pre-contacting step may occur over a time period of from about 1 minute to about 1 week at a temperature from about 10° C. to about 200° C. or from about 20° C. to about 80° C., to provide the active catalyst composition. Further, any subset of the final catalyst components also can be pre-contacted in one or more pre-contacting steps, each with its own pre-contacting time period.

After pre-contacting any or all of the catalyst system components, the catalyst composition can be said to comprise post-contacted components. For example, a catalyst composition can comprise a post-contacted metallocene, a post-contacted co-catalyst such as an organoaluminum compound, and a post-contacted calcined clay heterodduct component. It is not uncommon in the field of catalyst technology that the specific and detailed nature of the active catalytic site and the specific nature and fate of each component used to make the active catalyst are not precisely known. While not intending to be bound by theory, the majority of the weight of the catalyst composition based upon the relative weights of the individual components can be thought of as comprising the post-contacted calcined clay heteroadduct. Because the nature of the active site and post-contacted components are not precisely known, the catalyst composition may simply be described according to its components or referred to as comprising post-contacted compounds or components.

As used herein, the first liquid carrier is the liquid carrier in which the smectite heteroadduct is prepared, and the second liquid carrier is the liquid in which the catalyst system is prepared. The second liquid carrier can be any liquid carrier in which the metallocene can be contacted with the smectite heteroadduct to prepare the supported pre-catalyst or catalyst without degrading the metallocene or the smectite heteroadduct. In embodiments, the second liquid carrier can comprise, consist essentially of, or be selected from cyclohexane, isobutane, n-butane, propane, n-pentane, isopentane, neopentane, n-hexane, naphtha, hydrogen-treated naphtha, Isopar™, at least one olefin, or any combination thereof. The second liquid carrier can further comprise at least one olefin.

As disclosed, the catalyst system for olefin polymerization can comprise or consist essentially of: (a) at least one metallocene compound; (b) at least one support-activator according to this disclosure. The catalyst system may also further comprise: c) at least one co-catalyst; (d) at least one co-activator; or a combination thereof. The catalyst system can also further comprise a fluid carrier. In this disclosure, a "fluid carrier" is used to describe the carrier in which the catalyst system and at least one olefin are contacted to form a polyolefin. Therefore, a fluid carrier can be a liquid or a gas because polymerization using the disclosed catalyst system can be conducted under conditions such as slurry or fixed bed polymerization conditions or under gas phase polymerization conditions.

In an aspect, the fluid carrier can comprise, consist essentially of, or be selected from: nitrogen; a hydrocarbon such as cyclohexane, isobutane, n-butane, propane, n-pentane, isopentane, neopentane, n-hexane, naphtha, hydrogen-treated naphtha, or Isopar™; at least one olefin; or any combination thereof. However, any fluid carrier that can be used with supported catalysts can be used to conduct the polymerization using the present catalyst system. In another aspect, the fluid carrier can comprise or can consist essentially of a liquid or a gaseous hydrocarbon, an ether, or a combination thereof, each of which independently has from 2 to 20 carbon atoms.

O. Polymerization Activity of the Isolated Clay-Heterocoagulates

The data in Tables 1, 2, and 3 disclose the compositions, surface area/pore volume properties, and polymerization activities of smectite clay support-activators produced by contacting the clay with either an exemplary cationic polymetallate (aluminum chloride hydrates), a surfactant, or a combination of a cationic polymetallate and a surfactant.

The heteroadducts Table 1 and Table 2 are isolated by rotary evaporation drying under the specified conditions, while the heteroadducts in Table 3 are isolated by spray-drying from an aqueous slurry.

The polymerization activities of the catalyst compositions comprising the clay heteroadduct support-activator can be expressed as the weight of polymer polymerized per weight of support-activator comprising the calcined smectite heteroadduct, per unit of time, for example, gram polymer/gram (calcined) support-activator/hour (g/g/hr). That is, activity can be calculated on the basis of the support-activator alone, absent any metallocene or co-catalyst components. This measurement allows comparisons of the various support-activators, including with other activators, where the metallocene, co-catalyst, and other conditions are the same or substantially the same.

The activities disclosed in the Examples were measured under slurry polymerization conditions, using isobutane as the diluent, unless otherwise specified, and with a polymerization temperature of from about 50° C. to about 150° C., (for example at a temperature of 90° C.), and using a combined ethylene and isobutane pressure in a range of from about 300 psi to about 800 psi, for example 450 psi for the total combined ethylene and isobutane. Activity data are reported as the weight of polymer produced divided by the weight of calcined clay-surfactant heteroadduct per hour.

Catalyst activity can be a function of the metallocene and the calcined clay heteroadduct, as well as other components and conditions. Under the conditions explained above, the activity based on the weight of the calcined clay-surfactant heteroadducts and the calcined clay-cationic polymetallate-surfactant heteroadducts can be greater than 1,000 grams of polyethylene (PE) polymer per gram of calcined clay heteroadduct per hour (g PE/g heteroadduct/hr, or simply, g/g/hr or g/g/h). In another aspect, the catalytic activity based on the weight of the calcined clay heteroadduct can be greater than 250 g/g/hr, greater than 500 g/g/hr, greater than 1000 g/g/hr, greater than 1500 g/g/hr, greater than 2000 g/g/hr, greater than 3,000 g/g/hr, greater than 5,000 g/g/hr, greater than 7,500 g/g/hr, greater than 10,000 g/g/hr, greater than 15,000 g/g/hr, greater than 20,000 g/g/hr, greater than 30,000 g/g/hr, greater than 40,000 g/g/hr, greater than 50,000 g/g/hr, greater than 60,000 g/g/hr, greater than 70,000 g/g/hr, or greater than 80,000 g/g/hr. In some aspects, one upper limit for the activity can be about 100,000 g/g/hr, such that the activities can range from greater than these disclosed values, and less than 100,000 g/g/hr.

For example, in an aspect and using the conditions described herein, the support-activators can have a polymerization activity of about 250 g/g/hr, about 300 g/g/hr, about 400 g/g/hr, about 500 g/g/hr, about 750 g/g/hr, about 1,000 g/g/hr, about 1,250 g/g/hr, about 1,500 g/g/hr, 1,750 g/g/hr, about 2,000 g/g/hr, about 2,500 g/g/hr, about 3,500 g/g/hr, about 5,000 g/g/hr, about 7,500 g/g/hr, about 10,000 g/g/hr, about 12,500 g/g/hr, about 15,000 g/g/hr, about 17,500 g/g/hr, about 20,000 g/g/hr, about 25,000 g/g/hr, about 30,000 g/g/hr, about 40,000 g/g/hr, about 50,000 g/g/hr, about 60,000 g/g/hr, about 70,000 g/g/hr, about 80,000 g/g/hr, about 90,000 g/g/hr, or about 100,000 g/g/hr, including any ranges between these values. The higher values of polymerization activity can be associated with clay supports having extremely site densities, and these activity values also can be metallocene dependent. Therefore, by applying the teachings herein, activity levels can be achieved that are in a range between two of the recited values recited, for example, activity levels can be obtained in the range of 250-35,000 g/g/hr, in the range as well as intermediate values and ranges such as 300-30,000 g/g/hr, 400-25,000 g/g/hr, or 500-20,000 g/g/hr. In an aspect, the heterocoagulation of the clay with a surfactant reagent provides support-activators which possess substantially increased polymerization activity relative to analogously prepared species which are not contacted with a surfactant.

In one aspect, no aluminoxane such as methyl aluminoxane was needed to activate the metallocene and form the catalyst composition. Methyl aluminoxane (MAO) is an expensive activator compound which can greatly increase the polymer production costs. Further, in another aspect, no organoboron compound or ionizing compound, such as borate compounds, were required to in order to activate the metallocene and form the catalyst composition. Further, ion-exchanged, protic-acid-treated or pillared clays, which require similarly multi-step preparations which increase costs, were also not required to activate the metallocene and form the catalyst composition. Therefore, an active heterogeneous catalyst composition can be easily and inexpensively produced and used for polymerizing olefin monomers including comonomers if desired in the absence of any aluminoxane compounds, boron compounds or borate compounds, ion-exchanged-, protic-acid-treated- or pillared-clays. Although MAO or other aluminoxanes, boron or borate compounds, ion-exchanged-clays, protic-acid-treated-clays, or pillared-clays are not required in the disclosed catalyst systems, these compounds can be used in reduced amounts or typical amounts according to other aspects of the disclosure.

The catalyst activities of the Examples and in Tables 1-3 were measured for homopolymerization of ethylene under slurry polymerization conditions, using isobutane as the diluent, and with a polymerization temperature of 80° C., and a combined ethylene and isobutane pressure of 350 total psi and ($\eta^5$-1-n-butyl-3-methyl-cyclopentadienyl)$_2$ZrCl$_2$ and triethylaluminum ($AlEt_3$) as metallocene and co-catalyst, unless otherwise noted.

Throughout this disclosure, the support-activators' drying process may be described as azeotroped (for example, rotary evaporating from 1-butanol and water) and non-azeotroped (rotary evaporating from water only), or spray-dried (from an aqueous suspension or the suspension specified). Moreover, the surface of the support-activator can be made more hydrophobic by addition of a surfactant in any of these drying processes. If desired, these methods can be combined, such as drying by an azeotroping or non-azeotroping process followed by re-suspending the heteroadduct and spray drying from a aqueous slurry in the presence of a surfactant. Tightly bound water can be subsequently removed from the dried heteroadduct (support-activator), for example by calcining, heating in a fluidized bed, and the like, prior to their use as catalyst support-activators.

Table 1 reports the properties and polymerization data for azeotroped (1-butanol and water) and non-azeotroped (water only), calcined, clay-aluminum chlorhydrate (ACH) support-activators. These support-activators were prepared in the absence of a surfactant, and they were not spray-dried but dried by (rotary) evaporation from the slurry. While Runs 1-4 of Table 1 demonstrate that the clay-ACH adducts which have undergone azeotropic drying exhibit very good catalytic activity when calcined (2000-4000 g PE/g support-activator/hr), Run 5 of Table 1 demonstrates that the drying of these adducts from a slurry of water only, in the absence of an azeotroping agent, produces a support with little to no catalytic activity (<200 g PE/g support-activator/hr). Therefore, attempts to dry clay-ACH support-activators in this manner from an aqueous slurry without an organic azeotroping agent have resulted in a loss of activity and porosity from aqueous-only drying.

In contrast, Runs 7-32 of Table 2 combine clay with surfactant agents tetraoctylammonium bromide, tetrabutylammonium bromide, and tetramethylammonium bromide respectively, and are subsequently dried by (rotary) evaporation from a water-only slurry in the absence of an azeotroping agent, produce catalytically active species for ethylene polymerization. Runs 7-32 of Table 2 demonstrate activities in a range of from 1000-3000 g PE/g support-activator/hr. Run 2 of Table 2 compares the activity of a clay-ACH-surfactant heteroadduct, utilizing clay combined with both a surfactant agent (tetraoctylammonium bromide) and an aluminum chlorhydrate, which is dried as an aqueous-only slurry. This sample also demonstrates enhanced polymerization activity (>2000 g PE/g support-activator/hr) relative to Run 1 of Table 2 (<200 g PE/g support-activator/hr), which is a species containing only clay and the aluminum chlorhydrate, absent a surfactant.

Run 6 of Table 2 (Example 8-B3) provides an example of using the nonionic surfactant dextrose to form a clay-aluminum chlorhydrate-surfactant heteroadduct as a support-activator in the ethylene homopolymerization. While the activity of the sample is modest (75 g PE/g support-activator/hr), its activity is more than twice the activity provided by the clay-aluminum chlorhydrate heteroadduct support-activator of Run 1 of Table 2 (Example 5-A4) which is absent a surfactant of any type.

Run 5 of Table 2 (Example 7-B2) illustrates the use of the phosphonium salt cationic surfactant, trihexyl tetradecyl phosphonium bromide to form a clay-surfactant heteroadduct. The activity of this support-activator in the ethylene homopolymerization was found to be 184 g PE/g support-activator/hr, somewhat lower than most of the ammonium salt cationic surfactant heteroadducts.

Finally, Runs 3 and 4 of Table 2 (Examples 28-C1 and 29-C2) use ammonium bromide $[NH_4]Br$ rather than any hydrocarbyl ammonium surfactant to combine with the smectite clay. When the clay was combined with an ammonium cation absent a hydrocarbyl moiety bound to the ammonium nitrogen, no significant coagulation product with the clay and ammonium bromide was observed. While not intending to be bound by theory, it is believed that the same type of heterocoaguloate as is formed with a hydrocarbyl ammonium moiety is not formed in this reaction. The activity of this ammonium bromide treated clay support-activator in the ethylene homopolymerization was found to be about 300-400 g PE/g support-activator/hr.

Therefore, in an aspect, clay-surfactant support-activators prepared in the absence of a cationic polymetallate according to this disclosure can be combined with a metallocene procatalyst to yield an olefin polymerization catalyst which exhibits surprising polymerization activities of from about 300 g PE/g support-activator/hr to about 2,500 g PE/g support-activator/hr. Optionally, other heterocoagulation agents (such as aluminum polyoxometallates) can be combined with the clay and surfactant mixture. Thus, even the clay-cationic polymetallate support-activators can exhibit a tremendous enhancement in activity when prepared in the presence of a surfactant to form clay-cationic polymetallate-cationic surfactant support-activators (compare Table 2 Run 1 and Run 2). A large BJH pore volume enhancement is observed to accompany this increase in activity. The activity enhancement using surfactants is not limited to cationic surfactants, as nonionic surfactants also impart improvements to the activity of the clay-cationic polymetallate support-activators (compare Table 2 Run 6).

While not wishing to be bound by theory, it is thought that the increased porosity of clay heteroadduct species reported in this disclosure facilitates the diffusion and accessibility of the metallocene compound to an ionizing site on the clay heteroadduct surface, enabling the increased polymerization activity of these clay-surfactant species.

Regarding the activity of the isolated spray-dried heterocoagulates, it has been found that clay heteroadducts which are spray-dried from an aqueous slurry display a surprisingly high degree of sphericity, roundness, and circularity, and maintain excellent polymerization activities. This combination of properties imparts processing advantages in their use as polymerization support-activators such as providing superior flow and packing properties the catalyst particles for use in catalyst bed systems.

The data in Table 3 illustrate the properties and polymerization data for spray-dried, calcined, heterocoagulated [1] clay-aluminum chlorohydrate (ACH) support-activators, [2] clay-ACH-surfactant support-activators, and [3] clay-surfactant support-activators. The polymerizations were performed at 350 psi reactor pressure and 80° C., using $(\eta^5$-1-n-butyl-3-methyl-cyclopentadienyl$)_2ZrCl_2$ as metallocene and triethylaluminum $(AlEt_3)$ as co-catalyst, and percentages in Table 3 are weight percentages relative to the clay. The ACH component is present at a concentration of 1.54 mmol Al/g clay.

The results in Table 3 demonstrate the surprising discovery that excellent polymerization activities can be achieved even in the absence of a cationic polymetallate using a smectite clay-surfactant heteroadduct which has been spray-dried from an aqueous slurry, in the absence of an organic liquid, and calcined, as in Runs 3-6. These clay-surfactant heteroadduct data (Runs 3-6) are comparable to the clay-ACH-surfactant heteroadducts which has been spray-dried from an aqueous slurry in Runs 7-10.

These clay-surfactant heteroadduct data (Runs 3-6) exhibit substantially better activities than the comparative low activities observed from clay-cationic polymetallate (ACH) heteroadducts prepared in the absence of a surfactant in Runs 1-2, which are spray-dried from an aqueous slurry. Notably, when these clay-cationic polymetallate (ACH) heteroadducts are not spray-dried but are azeotroped, as in Runs 3 and 4 of Table 1, their polymerization activities exceed 2500 g/g/hr. This observation is consistent with the significant reduction in polymerization activity obtained when non-azeotropically drying clay-ACH heteroadducts from a water-only slurry as in Run 5 of Table 1.

Therefore, the clay-surfactant heteroadducts and the clay-cationic polymetallate-surfactant heteroadducts can be spray dried and subsequently calcined which, when combined with a metallocene precatalyst, yield catalysts with high catalytic activity (1400-3000 g PE/g support-activator/hr) for olefin polymerization, as depicted in Table 3, Entries 3-10. In embodiments, the spray drying process can be carried out on the clay-surfactant heteroadducts and the clay-cationic polymetallate-surfactant heteroadducts slurried in alcohol/water mixtures. In other embodiments, this spray drying process can be carried out on these heteroadducts slurried in water in the absence of an organic liquid.

In an aspect, once the clay-surfactant heteroadducts and the clay-cationic polymetallate-surfactant heteroadducts are isolated, for example by filtering the slurry in which the heteroadduct is prepared, the isolated heteroadducts can be re-suspended into a slurry which is subsequently spray dried. For example, in embodiments, the spray drying is performed on a slurry obtained from re-suspending the "filter cake" of the clay-surfactant adduct in a liquid carrier to be used for spray-drying and stirring or agitating, for example using high shear conditions, for a period of time. In embodiments, the spray drying can be performed on a slurry obtained from re-suspending the filter cake of a clay-surfactant adduct in a liquid carrier to be used for spray-drying for a period of 15 minutes to 24 hours. In other embodiments, the spray drying can be performed on a slurry obtained from re-suspending the filter cake of the clay-surfactant adduct in a liquid carrier to be used for spray-drying and stirring or agitating the mixture for a period of 24 hours to 72 hours.

In one aspect, the advantages of using a surfactant agent can be realized when it is introduced at different times prior to spray-drying the resulting heterocoagulate. For example, Runs 3-6 of Table 3 illustrate the surfactant and the clay are contacted prior to the preparation of the spray-drying feed, that is, the clay-surfactant is formed and isolated and is subsequently re-suspended to prepare the spray-drying feed. Alternatively, Runs 7-10 of Table 3 illustrate embodiments in which the surfactant agent can be introduced directly to the spray drying feed of an isolated and re-suspended clay-cationic polymetallate heteroadduct. In these runs (Examples 23-E3 and 24-E4), the clay-ACH heteroadduct was prepared and filtered off, and the resulting wet cake was re-suspended in water with the surfactant to form the spray-drying feed. These samples were calcined after spray-drying and exhibited good porosities, with the tetrabutylammonium bromide sample (Runs 7-8, Example 23-E3) having a total BJH porosity of 0.273 cc/g. and the tetraoctylammonium bromide sample (Runs 9-10, Example 24-E4) having a total BJH porosity of 0.123 cc/g. While not intending to be bound by theory, these latter Runs 7-10 of Table 3 are also referred to herein as forming a clay-cationic polymetallate-surfactant heteroadduct, although the method of making these is different from other heteroadducts in which the clay, ACH, and surfactant are contacted in the initial slurry of the clay.

Therefore, in an aspect, once spray-dried clay-surfactant heteroadduct is calcined and the resulting support-activator is combined with a metallocene and co-catalyst to yield a polymerization catalyst, the polymerization activities are demonstrated to range from about 500 g PE/g support-activator/hr to 2000 g PE/g support-activator/hr. When the polymers produced from these catalysts were compared with polymer particles produced from non-spray-dried support-activators, lower particle sizes and higher particle uniformities in the polymer particles were observed in the spray-dried heteroadduct polymers, which provides desirable operability advantages when these catalysts are introduced to fluidized reactor bed systems. For example, the data of Table 4 illustrates particle size distribution properties for the polyethylene homopolymer produced using [1] an azeotroped clay-aluminum chlorohydrate (ACH) support-activator produced in the absence of a surfactant (see comparative Example 2-A1 and Run 1 of Table 1), [2] an isolated clay-aluminum chlorohydrate (ACH) heteroadduct spray-dried in the presence of tetrabutylammonium bromide surfactant (see Example 23-E3 and Run 7 of Table 3), and [3] an isolated clay-aluminum chlorohydrate (ACH) heteroadduct spray-dried in the presence of tetraoctylammonium bromide surfactant (see Example 24-E4 and Run 10 of Table 3), demonstrating the higher uniformity coefficient of the inventive heteroadducts spray-dried in the presence of surfactants.

This disclosure thus demonstrates the practical utility of a process which minimizes the porosity loss typically associated with spray drying clay slurries, which enables production of catalysts which are both active, and exhibit desirable morphologies for use in catalyst beds.

Accordingly, at least the following unexpected results are provided and demonstrated throughout this disclosure.

1. Smectite clay-surfactant heteroadducts prepared in the absence of a cationic polymetallate and in the absence of any other additives can provide support-activators which can achieve excellent polymerization activities.
2. When a surfactant is used in combination with a smectite clay and a cationic polymetallate, the resulting smectite clay-cationic heteroadduct-surfactant heteroadduct can achieve a significantly greater polymerization activity as compared to the analogous clay-polymetallate heteroadducts prepared in the absence of a surfactant.
3. A surfactant can be combined with a smectite clay in the absence of other additives, or a surfactant can be combined with a smectite clay and a cationic polymetallate, in any sequence or any manner to form the isolated heteroadduct. For example, a surfactant can be combined with a smectite clay with or without a cationic polymetallate to form a heteroadduct, or the surfactant can be used to contact a smectite clay-cationic polymetallate heteroadduct at the time of heteroadduct formation or later, for example, in preparing a spray-drying feed of the clay-polymetallate heteroadduct.
4. Use of a surfactant to prepare smectite clay-surfactant heteroadducts and smectite clay-cationic polymetallate-surfactant heteroadducts permits the heteroadducts to be spray-dried from a slurry in water only, without the need to use an organic liquid with the water such as in an azeotropic drying process, while still providing high polymerization activities.
5. Heteroadducts which are spray-dried from an aqueous slurry display a surprisingly high degree of sphericity, roundness, and circularity, which impart processing advantages in their use as polymerization support-activators such as providing superior flow and packing properties the catalyst particles for use in catalyst bed systems.
6. Polymer particles produced using the inventive heteroadduct support-activators that have been spray-dried are characterized as having lower particle sizes and higher particle uniformities than their non-surfactant analogs, and these properties provide desirable operability advantages when these catalysts are introduced to fluidized reactor bed systems.

P. Polyolefins and Polymerization Processes

In an aspect, this disclosure describes a process of contacting at least one olefin monomer and the disclosed catalyst composition to produce at least one polymer (polyolefin). The term "polymer" is used herein to include homopolymers, copolymers of two olefin monomers, and polymers of more than two olefin monomers such as terpolymers. For convenience, polymers of two or more than two olefin monomers are referred to as simply copolymers. Thus, the catalyst composition can be used to polymerize at least one monomer to produce a homopolymer or a copolymer.

In an aspect, homopolymers are comprised of monomer residues which have from 2 to about 20 carbon atoms per molecule, preferably 2 to about 10 carbon atoms per molecule. The olefin monomer can comprise or be selected from ethylene, propylene, 1-butene, 3-methyl-1-butene, 1-pentene, 3-methyl-1-pentene, 4-methyl-1-pentene, 1-hexene, 3-ethyl-1-hexene, 1-heptene, 1-octene, 1-nonene, 1-decene, and mixtures thereof. In one aspect, homopolymers of ethylene, homopolymers of propylene, and homopolymers of other olefins are encompassed by this disclosure. In another aspect, copolymers of ethylene and at least one comonomer and less commonly, copolymers of two non-ethylene copolymers, are encompassed by this disclosure.

When a copolymer is desired, each monomer may have from about 2 to about 20 carbon atoms per molecule. Comonomers of ethylene can include, but are not limited to, aliphatic 1-olefins having from 3 to 20 carbon atoms per molecule, such as, for example, propylene, 1-butene, 2-butene, 1-pentene, 2-pentene, 3-methyl-1-butene, 3-methyl-1-pentene, 4-methyl-1-pentene, 1-hexene, 3-ethyl-1-hexene, 1-heptene, 1-octene, 1-nonene, 1-decene, styrene, vinylcyclohexane and other olefins, and conjugated or non-conjugated diolefins such as 1,3-butadiene, isoprene, piperylene, 2,3-dimethyl-1,3-butadiene, 1,4-pentadiene, 1,7-hexadiene, and other such diolefins and mixtures thereof. In a further aspect, ethylene can be copolymerized with at least one comonomer comprising or selected from 1-butene, 4-methyl-1-pentene, 1-hexene, 1-octene, or 1-decene. An amount of comonomer can be introduced into a reactor zone which is sufficient to produce a copolymer that can incorporate from about 0.01 wt. % to about 10 wt. % comonomer or even beyond this range, based upon the total weight of the monomer and comonomer in the copolymer; alternatively, from about 0.01 wt. % to about 5 wt. % comonomer; alternatively still, from about 0.1 wt. % to about 4 wt. % comonomer; or alternatively still, any amount of comonomer can be introduced into a reactor zone that provides a desired copolymer.

Typically, the catalyst composition can be used to homopolymerize ethylene, or propylene, or copolymerize ethylene with a comonomer, or copolymerize ethylene and propylene. In another aspect, several comonomers may be polymerized with monomer in the same or different reactor zones to achieve the desired polymer properties.

Other useful comonomers can include polar vinyl, conjugated and non-conjugated dienes, acetylene and aldehyde monomers, which can be included for example in minor amounts in terpolymer compositions. For example, non-conjugated dienes useful as comonomers can be straight chain, hydrocarbon di-olefins or cycloalkenyl-substituted alkenes having from 6 to 15 carbon atoms. Suitable non-conjugated dienes can include, for example: (a) straight chain acyclic dienes, such as 1,4-hexadiene and 1,6-octadiene; (b) branched chain acyclic dienes, such as 5-methyl-1,4-hexadiene; 3,7-dimethyl-1,6-octadiene; and 3,7-dimethyl-1,7-octadiene; (c) single ring alicyclic dienes, such as 1,4-cyclohexadiene; 1,5-cyclo-octadiene and 1,7-cyclododecadiene; (d) multi-ring alicyclic fused and bridged ring dienes, such as tetrahydroindene; norbornadiene; methyl-tetrahydroindene; dicyclopentadiene (DCPD); bicyclo-(2.2.1)-hepta-2,5-diene; alkenyl, alkylidene, cycloalkenyl and cycloalkylidene norbornenes, such as 5-methylene-2-norbornene (MNB), 5-propenyl-2-norbornene, 5-isopropylidene-2-norbornene, 5-(4-cyclopentenyl)-2-norbornene, 5-cyclohexylidene-2-norbornene, and 5-vinyl-2-norbornene (VNB); and (e) cycloalkenyl-substituted alkenes, such as vinyl cyclohexene, allyl cyclohexene, vinyl cyclooctene, 4-vinyl cyclohexene, allyl cyclodecene, and vinyl cyclododecene. Particularly useful non-conjugated dienes include dicyclopentadiene, 1,4-hexadiene, 5-methylene-2-norbornene, 5-ethylidene-2-norbornene, and tetracyclo-(.Δ.-11,12)-5,8-dodecene. Particularly useful diolefins include 5-ethylidene-2-norbornene (ENB), 1,4-hexadiene, dicyclopentadiene (DCPD), norbornadiene, and 5-vinyl-2-norbornene (VNB). Note that throughout this description the terms "non-conjugated diene" and "diene" are used interchangeably.

The catalyst compositions can be used for polymerizing olefins to make oligomeric and polymeric materials having a wide range of densities, for example, in a range of from about 0.66 g/mL (also, g/cc) to about 0.96 g/mL, which are used in numerous applications. The catalyst compositions disclosed herein are particularly useful for the production of copolymers. For example, copolymer resins may have a density of 0.960 g/cc or less, preferably 0.952 g/cc or less, or more preferably 0.940 g/cc or less. In accordance with certain aspects of the present disclosure, it is possible to achieve densities of less than 0.91 g/cc and even as low as 0.860 g/cc. When describing a density as less than a specific density, one lower limit of such densities can be about 0.860 g/cc. Copolymer resins can contain at least about 65 wt. % (percent by weight) of ethylene units, that is, the weight percent of ethylene monomers actually incorporated into the copolymer resin. In another aspect, the copolymer resins of this disclosure can contain at least about 0.5 wt. %, for example, from 0.5 wt. % to 35 wt. % of an alpha-olefin ($\alpha$-olefin), referring to the weight percent of alpha-olefin comonomers actually incorporated into the copolymer resin.

The catalyst compositions prepared according to the present disclosure are also useful for preparing: (a) ethylene/propylene copolymers, including "random copolymer" in which the commoner is distributed randomly along the polymer back-bone or chain; (b) "propylene random copolymer", in which a random copolymer of propylene and ethylene comprising about 60 wt. % of the polymer derived from propylene units; and (c) "impact copolymer" meaning two or more polymers in which one polymer is dispersed in the other polymer, typically one polymer comprising a matrix phase and the other polymer comprising an elastomer phase. The catalyst compositions described herein may further be used to prepare polyalphaolefins with monomers containing more than three carbons. Such oligomers and polymers are particularly useful, for example, as lubricants.

Any number of polymerization methods or processes can be used with the catalyst compositions of this disclosure. For example, slurry polymerization, gas phase polymerization, and solution polymerization and the like, including multi-reactor combinations thereof, can be used. Multi-reactor combinations can be configured in a serial or parallel configuration, or a combination thereof, depending upon the desired polymerization sequence. Examples of reactor systems and combinations can include, for example, dual slurry loops in series, multiple slurry tanks in series, or slurry loop combined with gas phase, or multiple combinations of these processes, in which polymerization of ethylene, propylene and alpha-olefins separately or together can be carried out. In another aspect, gas phase reactors can comprise fluidized bed reactors or tubular reactors, slurry reactors can comprise vertical loops or horizontal loops or stirred tanks, and solution reactors can comprise stirred tank or autoclave reactors. Thus, any polymerization zone known in the art which can produce polyolefins such as ethylene and alpha-olefin-containing polymers including polyethylene, polypropylene, ethylene alpha-olefin copolymers, as well as more generally to substituted olefins such as vinylcyclohexane, can be utilized. In an aspect, for example, a stirred reactor can be utilized for a batch process, and then the reaction can be carried out continuously in a loop reactor or in a continuous stirred reactor or in a gas phase reactor.

The catalyst compositions comprising the recited components can polymerize olefins in the presence of a diluent or liquid carrier, and these two terms are used interchangeably herein, even if a catalyst component is not soluble in the diluent or liquid carrier. Suitable diluents used in slurry and solution polymerization are known in the art and include hydrocarbons which are liquid under reaction conditions. Further, term "diluent" as used in this disclosure does not necessarily mean that the material is inert, as it is possible that a diluent can contribute to polymerization such as in bulk polymerizations with propylene.

Suitable hydrocarbon diluents can include, but are not limited to cyclohexane, isobutane, n-butane, propane, n-pentane, isopentane, neopentane, and n-hexane, and higher boiling solvents such as ISOPAR™ and the like. Isobutane works well as the diluent in a slurry polymerization. Examples of such slurry polymerization technologies can be found in U.S. Pat. Nos. 4,424,341; 4,501,885; 4,613,484; 4,737,280; and 5,597,892; the entire disclosures of which are incorporated herein by reference. When polymerizing propylene, or other alpha-olefins, the propylene or alpha-olefin itself can comprise the solvent, which are known in the art as bulk polymerizations.

In various aspects and embodiments, polymerization reactors suitable for use with the catalyst system can comprise at least one raw material feed system, at least one feed system for catalyst or catalyst components, at least one reactor system, at least one polymer recovery system or any suitable combination thereof. Suitable reactors can further comprise any, or combination of, a catalyst storage system, an extrusion system, a cooling system, a diluent recycling system, a monomer recycling system, and comonomer recycling system or a control system. Such reactors can comprise continuous take-off and direct recycling of the catalyst, diluent, monomer, comonomer, inert gases, and polymer as desired. In one aspect, continuous processes can comprise the continuous introduction of a monomer, a comonomer, a catalyst, a co-catalyst if desired, and a diluent into a polymerization reactor and the continuous removal from this reactor of a suspension comprising polymer particles and the diluent.

In one aspect, the polymerization methods can be carried out over a wide temperature range, for example, the polymerization temperatures may be in a range of from about 50° C. to about 280° C., and in another aspect, polymerization reaction temperatures may be in a range of from about 70° C. to about 110° C. The polymerization reaction pressure can be any pressure that does not terminate the polymerization reaction. In one aspect, polymerization pressures may be from about atmospheric pressure to about 30000 psig. In another aspect, polymerization pressures may be from about 50 psig to about 800 psig.

The polymerization reaction can be carried out in an inert atmosphere, that is, in an atmosphere substantially free of molecular oxygen and under substantially anhydrous conditions; thus, in the absence of water as the reaction begins. Therefore a dry, inert atmosphere, for example, dry nitrogen or dry argon, is typically employed in the polymerization reactor.

In an aspect, hydrogen can be used in a polymerization process to control polymer molecular weight. In another aspect a method of deactivating a catalyst, by adding carbon monoxide to the polymerization zone as described in U.S. Pat. No. 9,447,204, which is incorporated by reference herein, may be used to mitigate or stop an uncontrolled, or runaway polymerization.

For the catalyst systems of this disclosure, the polymerizations disclosed herein are commonly carried out using a slurry polymerization process in a loop reaction zone or a batch process, or a gas phase zone utilizing a fluidized bed or a stirrer bed.

Slurry Loop. In one aspect, a typical polymerization method is a slurry polymerization process (also known as the "particle form process"), which is disclosed, for example in U.S. Pat. No. 3,248,179, which is incorporated herein by reference. Other polymerization methods for slurry processes can employ a loop reactor of the type disclosed in U.S. Pat. No. 3,248,179, and those utilized in a plurality of stirred reactors either in series, parallel, or combinations thereof.

The polymerization reactor system can comprise at least one loop slurry reactor, and can include vertical or horizontal loops or a combination, which can independently be selected from a single loop or a series of loops. Multiple loop reactors can comprise both vertical and horizontal loops. The slurry polymerization can be performed in an organic liquid as the carrier or diluent. Examples of suitable solvents include propane, hexane, cyclohexane, octane, isobutane, or combinations thereof. Olefin monomer, carrier, catalyst system components, and any comonomer can be continuously fed to a loop reactor where polymerization occurs. Reactor effluent can be flash evaporated to separate the solid polymer particles.

Gas Phase. In one aspect, a method for producing polyolefin polymers according to the disclosure is a gas phase polymerization process, using for example a fluidized bed reactor. This type reactor, and means for operating the reactor, are described in, for example, U.S. Pat. Nos. 3,709,853; 4,003,712; 4,011,382; 4,302,566; 4,543,399; 4,882,400; 5,352,749; 5,541,270; EP-A-0 802 202, Belgian Patent No. 839,380, each of which is incorporated herein by reference. These patents disclose gas phase polymerization processes wherein the polymerization medium is either mechanically agitated or fluidized by the continuous flow of the gaseous monomer and diluent.

Gas phase polymerization systems can employ a continuous recycle stream containing one or more monomers continuously cycled through the fluidized bed in the presence of the catalyst under polymerization conditions. The recycle stream can be withdrawn from the fluidized bed and recycled back into the reactor. Simultaneously, polymer product can be withdrawn from the reactor and fresh monomer can be added to replace the polymerized monomer. Such gas phase reactors can comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone.

Other gas phase processes contemplated by the disclosed polymerization process include series or multistage polymerization processes. In an aspect, gas phase processes that can be used in accordance with the disclosure include those described in U.S. Pat. Nos. 5,627,242, 5,665,818 and 5,677,375, and European publications EP-A-0 794 200, EP-B1-0 649 992, EP-A-0 802 202, and EP-B-634 421 all of which are incorporated herein by reference.

In an aspect of the gas phase polymerizations according to this disclosure, the ethylene partial pressure may vary in a range suitable for providing practical polymerization conditions, for example, in a range of from 10 psi to 250 psi, for example, from 65 psi to 150 psi, from 75 psi to 140 psi, or from 90 psi to 120 psi. In another aspect, a molar ratio of comonomer to ethylene in the gas phase also may vary in a range suitable for providing practical polymerization conditions, for example, in a range of from 0.0 to 0.70, from 0.0001 to 0.25, more preferably from 0.005 to 0.025, or from 0.025 to 0.05. According to an aspect, the reactor pressure can be maintained in a range suitable for providing practical polymerization conditions, for example, in a range of from 100 psi to 500 psi, from 200 psi to 500 psi, or from 250 psi to 350 psi, and the like.

According to further aspects, in a fluidized gas bed process used for producing polymers, a gaseous stream containing one or more monomers can be continuously cycled through a fluidized bed in the presence of a catalyst under reactive conditions. The gaseous stream can be withdrawn from the fluidized bed and recycled back into the reactor, and simultaneously, polymer product can be withdrawn from the fluidized bed and withdrawn from the reactor, while fresh monomer can be added to replace the polymerized monomer. See, for example, U.S. Pat. Nos. 4,543,399; 4,588,790; 5,028,670; 5,317,036; 5,352,749;

5,405,922; 5,436,304; 5,543,471; 5,462,999; 5,616,661; and 5,668,228; each of which is incorporated herein by reference in its entirety.

In another aspect, antistatic compounds can be fed simultaneously with the finished catalyst into a polymerization zone. Alternatively, antistatic compounds such as those described in U.S. Pat. Nos. 7,919,569; 6,271,325; 6,281,306; 6,140,432 and 6,117,955, each of which is incorporated herein by reference in its entirety, can be used. For example, the clay heteroadduct can be contacted with or impregnated with one or more antistatic compounds. Antistatic compounds may be added at any point, for example, they can be added any time after calcination such as up to and including the final post-contacted catalyst preparation.

In another aspect, so-called "self-limiting" compositions may be added to the clay heteroadduct to inhibit chunking, fouling, or uncontrolled or runaway reaction in the polymerization zone. For example, U.S. Pat. Nos. 6,632,769; 6,346,584; and 6,713,573, each of which is incorporated herein by reference, disclose additives that can release a catalyst poison above a threshold temperature. Typically, such compositions can be added at any time after calcination, in order to limit or stop polymerization activity above a desired temperature.

Solution. The polymerization reactor also can comprise a solution polymerization reactor, in which the monomer is contacted with the catalyst composition by suitable stirring or other means. Solution polymerizations can be effected in a batch manner, or in a continuous manner. A carrier comprising an inert organic diluent or excess monomer can be employed, and the polymerization zone is maintained at temperatures and pressures that will result in the formation of a solution of the polymer in the reaction medium. Agitation can be employed during polymerization to obtain better temperature control and to maintain uniform polymerization mixtures throughout the polymerization zone, and adequate means are utilized for dissipating the exothermic heat of polymerization. The reactor also can comprise a series of at least one separator that employs high pressure and low pressure to separate the desired polymer.

Tubular Reactors and High Pressure LDPE. In still another aspect, the polymerization reactor can comprise a tubular reactor, which can make polymers by free radical initiation or alternatively by employing the disclosed catalysts. Tubular reactors can have several zones where fresh monomer, initiators, or catalysts and co-catalysts are added. For example, monomer can be entrained in an inert gaseous stream and introduced at one zone of the reactor, and initiators, the catalysts composition and/or catalyst components can be entrained in a gaseous stream and introduced at another zone of the reactor. These gas streams can then be intermixed for polymerization, in which heat and pressure can be appropriately adjusted to obtain optimal polymerization reaction conditions.

Combined or Multiple Reactors. In a further aspect, the catalysts and processes of this disclosure are not limited by possible reactor types or combinations of reactor types. For example, the disclosed catalysts and processes can be used in multiple reactor systems which can comprise reactors combined or connected to perform polymerizations, or multiple reactors that are not connected. The polymer can be polymerized in one reactor under one set of conditions, and then the polymer can be transferred to a second reactor for polymerization under a different set of conditions.

In this aspect, the polymerization reactor system can comprise the combination of two or more reactors. Production of polymers in multiple reactors can include several stages in at least two separate polymerization reactors interconnected by a transfer device to transfer the polymers resulting from the first polymerization reactor into the second reactor, in which polymerization conditions are different in the individual reactors. Alternatively, polymerization in multiple reactors can include the manual transfer of polymer from one reactor to subsequent reactors for continued polymerization. Such reactors can include any combination including, but not limited to, multiple loop reactors, multiple gas reactors, a combination of loop and gas reactors, a combination of autoclave reactors or solution reactors with gas or loop reactors, multiple solution reactors, or multiple autoclave reactors, and the like.

Polymers Produced Using the Disclosed Catalysts and Processes. The catalyst compositions used in this process can produce high quality polymer particles without substantially fouling the reactor. When the catalyst composition is used in a loop reactor zone under slurry polymerization conditions, the particle size of the calcined heterocoagulated product can be in a range of from about 10 microns (m) to about 1000 microns, from about 25 microns to about 500 microns, from about 50 microns to about 200 microns, or from about 30 microns to about 100 microns to provide good control of the polymer particle production during polymerization.

When the catalyst composition is used in a gas phase reactor zone, the particle size of the calcined heterocoagulated product can be in a range of from about 1 micron to about 1000 microns, from about 5 to about 500 microns, or from about 10 microns to about 200 microns, or from about 15 microns to about 60 microns, to provide good control of the polymer particle and polymerization reaction.

The suitable particle size in other polymerization reactor systems, whether single or multiple systems in series can be a function of the total productivity of the catalyst and the optimal particle size and particle size distribution of the final polymer-catalyst composite particle. For example, the optimal size and size distribution can be determined by the polymerization reactor system, such as whether the particles are easily fluidizable in a gas phase system but sufficiently large that they are not entrained in the fluidizing gas, which can result in plugging downstream filters. Likewise, the optimal size and size distribution in the polymerization system may be balanced against the ease with which they are conveyed or handled in storage silos or extrusion facilities when the catalyst-polymer composite particles are melted and extruded into pellets.

Polymers produced using the catalyst composition of this disclosure can be formed into various articles, such as, for example, household containers and utensils, film products, car bumper components, drums, fuel tanks, pipes, geomembranes, and liners. In an aspect, additives and modifiers can be added to the polymer in order to provide desired effects, such as a desired combination of physical, structural and flow properties. It is believed that by using the methods and materials described herein, articles can be produced at a lower cost, while maintaining desired polymer properties obtained for polymers produced using transition metal or metallocene catalyst compositions as disclosed herein.

EXAMPLES

The foregoing description is intended to illustrate and not limit the scope of the present disclosure, which is further illustrated by the following examples. The examples are not to be construed as imposing limitations upon the scope of the disclosure. Rather, it is to be understood that recourse can be had to various other embodiments, aspects, modifications, and equivalents thereof which, in view of the written description, may suggest themselves to the person of ordinary skill in the art without departing from the spirit of the present invention or the scope of the appended claims. Therefore the following examples are put forth so as to provide those skilled in the art with a more detailed disclosure and description.

Reagents and General Procedures

Unless otherwise noted, all reagents used to prepare the clay-heteroadducts of this disclosure were obtained from the commercial sources indicated and used "as-is".

Volclay® HPM-20 bentonite aqueous dispersion (montmorillonite) manufactured by American Colloid Company was obtained from McCullough & Associates, and is also referred to as simply HPM-20 or HPM-20 clay. A 50% aluminum chlorhydrate aqueous solution (abbreviated "ACH") was obtained from GEO Specialty Chemicals.

Unless noted otherwise, in the specification and examples, the clay dispersions, clay heteroadducts, silicate composites, and other compositions were prepared using a dual-speed Conair™ Waring™ Commercial Lab Blender model 7010G, equipped with timer. Blender speeds may be referred to as "low" speed versus "high" speed blending as follows. The Model 7010G blender was connected to a Staco Energy Variable Transformer (Model number 3PN1010B), and the blender speed was adjusted by changing the setting on the Transformer. In the examples and specification, "low speed" blending was achieved by setting the Transformer between 0 to 50, while "high speed" blending was achieved by setting the Transformer between 50 to 100.

Conductivity was measured using a Eutech PCSTestr 35 or a Radiometer Analytical conductivity meter and measurements were according to the instrument instruction manual and the references provided with each instrument. The solution or slurry pH measurements were made using a Eutech PCSTestr 35 or Beckmann <265 laboratory pH meter.

Deionized water referred to herein as Milli-Q® water was obtained by initially pretreating water using a Prepak 1 Pretreatment Pack, and then further purifying the water using a Millipore Milli-Q® Advantage A10 Water Purification System. This water was typically used within 2 hours of collection.

Hexane, heptane, toluene and dichloromethane were dried over activated molecular sieves and degassed with nitrogen prior to use. Instrument grade isobutane, used as solvent for the ethylene homopolymerizations was purchased from Airgas and purified by passage through columns of activated charcoal, alumina, 13X molecular sieves, and finally an OxyClear™ gas purifier Model No. RGP-R1-500, from Diamond Tool and Die, Inc. Ultra-high purity grade ethylene and hydrogen were obtained from Airgas. The UHP (ultra-high purity) ethylene was further purified by passage through columns of activated charcoal, alumina, 13X molecular sieves, and an OxyClear™ gas purifier Model No. RGP-R1-500. The UHP hydrogen was purified by passage through an OxyClear™ gas purifier Model No. RGP-R1-500. Purified propylene was obtained as a slip stream from a commercial polypropylene plant.

All preparations involving the handling of organometallic compounds were carried out under a dry nitrogen ($N_2$) atmosphere using Schlenk techniques or in a glove box.

Zeta Potential Measurements

Zeta potentials of the colloidal suspensions disclosed herein were derived from measuring the electroacoustic effect upon application of electric field across the suspension. The apparatus used to perform these measurements was a Colloidal Dynamics Zetaprobe Analyzer™ For example, zeta potential measurements were used to determine the dispersed clay concentration in a 0.5 wt. % (weight percent) to 1 wt. % Volclay® HPM-20/water dispersion as follows. A 250 g to 300 g sample of the dispersion to be measured was transferred to the measurement vessel containing an axial bottom stirrer. The stirring speed was set fast enough to prevent settling or substantial settling of the dispersion but slow enough to allow the electroacoustic probe to be fully immersed in the mixture when fully lowered. Typically the stirring speed was set between 250 rpm and 350 rpm, most often 300 rpm.

The Colloidal Dynamic Zetaprobe Analyzer™ measurement parameters used were the following: 5 readings at 1 reading/minute; particle density of 2.6 g/cc; dielectric constant of 4.5. An initial estimated colloidal weight percentage of 0.7 wt. % to 1.0 wt. % ($conc_{estimate}$) was typically entered into the Zetaprobe Analyzer™ software. Measuring a 5 wt. % HPM-20/water dispersion provided a zeta potential of −46 mV. If the final dispersed clay concentration is referred to as "conc" in the equation below, then the final dispersed clay concentration can be calculated from the initial estimated concentration according to the following formula.

$$conc = conc_{estimate} * (\text{measured zeta potential}/(-46))$$

The Zetaprobe Analyzer™ was also used to dynamically track evolving zeta potential during titrations of clay dispersions with either colloidal dispersions or non-colloidal solutions. Typically, the cationic surfactant or other cationic titrant was added to a 0.5 wt. % to 5.0 wt. % HPM-20/water dispersion at about 0.1 mL, 0.15 mL, 0.2 mL, or 0.25 mL per titration point, with an equilibration delay of from 30 seconds to 120 seconds.

The Zetaprobe software calculates zeta potential using a colloidal particle weight percentage which does not factor in the colloidal titrant. Thus, in cases where the titrant is a colloidal species, the measured zeta potential was adjusted to reflect the extra colloidal content of the measured solution through the following method. Initially, both the weight of the titrand clay and the titrant cationic species were determined by the following equations (where * indicates multiplication, W is weight, V is volume).

$$W_{titrant} = V_{titrant} * \text{density}_{titrant} * \text{solids \% titrant}$$

$$W_{clay} = V_{total} * \text{density}_{titrand} * \text{particle concentration}_{measured}$$

The density for 5% HPM-20 aqueous dispersion (titrand) was determined to be approximately 1.03 g/mL. The titrant weight was scaled according to its particle density relative to the particle density of the titrand HPM-20 (montmorillonite), to provide an effective titrant weight ($W_{efftitrant}$), which in this example was calculated as follows.

$$W_{efftitrant} = W_{titrant} * \text{particle density}_{titrant} / \text{particle density}_{titrand}$$

The effective colloidal particle weight percentage (wt. $\%_{eff}$) was then calculated, to provide an estimate of the relative increase in colloidal content compared to an equivalent titration using a non-colloidal titrant. The inverse of this value was then multiplied by the measured zeta potential to determine an adjusted zeta potential as follows.

$$\text{wt. }\%_{eff} = (W_{efftitrant} + W_{clay})/V_t$$

$$A = \text{wt. }\%_{measured} / \text{wt. }\%_{eff}$$

$$ZP_{adjusted} = ZP_{measured} * A$$

As an example of the zeta potential titrations, FIG. 29 and FIG. 30 illustrate zeta potential titrations for the volumetric addition of a 10.7 wt. % (weight percent) aqueous solution of tetrabutylammonium bromide (FIG. 29) and a 7.9 wt. % aqueous solution of tetramethylammonium bromide (FIG. 30) into a 1 wt. % Volclay® HPM-20 bentonite aqueous dispersion, respectively, plotting the measured zeta potential versus the millimoles of cation per gram of clay (mmol cation/g clay) calculated from the titrant volume. An equilibration delay of 30 seconds was allowed after each titrant aliquot. The millimoles of cation indicates the cumulative millimoles of the aqueous tetraalkylammonium bromide solution added.

Powder X-Ray Diffraction (XRD) Studies

Powder X-ray patterns of clays and clay heteroadducts were obtained using standard X-ray powder diffraction techniques on a Bruker D8 daVinci instrument, with a Bragg Brentano geometry with a "theta-theta" scan type, using a Back-loading holder with zero background Silicon chip. The detector used was a Linear Silicon Strip (LynxEYE) PSD detector. The test sample was placed in the sample holder of a two circle goniometer, enclosed in a radiation safety enclosure. The X-ray source was a 2.0 kW Cu X-ray tube, maintained at an operating current of 40 kV and 25 mA. The X-ray optics were the standard Bragg-Brentano para-focusing mode with the X-ray diverging from a DS slit (0.6 mm) at the tube to strike the sample and then converging at a position sensitive X-ray Detector (Lynx-Eye, Bruker-AXS). The two-circle 250 mm diameter goniometer was computer controlled with independent stepper motors and optical encoders. Flat compressed powder samples were scanned at 0.8° (2θ) per minute (2-30° 2θ over 35 minutes). The software suite for data collection and evaluation was Windows based. Data collection was automated using the COMMANDER program by employing a BSML file, and data was analyzed by the program DIFFRAC.EVA.

The XRD test method applied to the calcined clay heteroadducts disclosed herein for determining basal spacing is described in, for example, by McCauley in U.S. Pat. No. 5,202,295 (for example, at column 27, lines 22-43). Bragg's equation or law as applied to clays is $n\lambda=2d\cdot\sin\theta$, wherein n is the repeat number, λ is 1.5418, d is d001 spacing and θ is the angle of incidence.

Particle Size and Particle Size Distribution

Polymer, support-activator, and catalyst particle sizes were determined as follows. As used herein, the terms d(0.1), d(0.5), and d(0.9), alternatively D10, D50, and D90 respectively, are used to indicate a particle size at which 10%, 50%, and 90% of the total volume of the particle sample consists of particles below the designated particle size. For example, a d(0.9) or D90 of 150 m indicates that 90% of the total volume of particles in the sample have a particle size of less than 150 m, and a d(0.1) or D10 of 100 m indicates that 10% of the total volume of particles in the sample have a particle size of less than 10 m. The width or narrowness of a particle size distribution can be given by its Span (also, "SPAN"), which is defined as (D90−D10)/(D50) or [d(0.9)−d(0.1)]/[d(0.5)]. Particles sizes for the support-activator or supported catalyst were determined using a Malvern Mastersizer™ 2000 particle size analyzer using hexane solvent. Particles sizes for the polymer were determined using a CAMSIZER® X2.

Particle Size and Shape Distribution Analysis of Polymer Powders

The particle size distribution and shape distribution analysis of the ethylene homopolymer and ethylene-1-hexene co-polymer powders produced using support-activators of this disclosure were analyzed using a CAMSIZER® X2 Dynamic Image Analyzer. Support-activators were prepared as described in the cited Examples, and catalysts and polymers that were analyzed were prepare using the procedures detailed in Catalyst Preparation and Polymerization Reactions sections of these Examples.

Dry polymer powder samples of approximately 1-5 g (grams) were weighed into a vial and transferred to the ramp on the X-FALL module of the CAMSIZER® X2 Dynamic Image Analyzer. The speed of the ramp vibration was set at a sufficient rate to ensure a constant stream of powder flow into the X-FALL module. In the event of an incomplete transfer of the polymer powder into the X-FALL module, the remainder of the material was manually pushed in using a Kimwipe™. Characteristics such as equivalent circle diameter ($x_{area}$), volume-weighted D10/D50/D90, SPHT3 (volume-weighted sphericity), SPHT0 (number-weighted sphericity), and Span3 were selected for measurement, and data are recorded in the tables and figures.

Surface Electron Microscopy (SEM) and Scanning Probe Image Processor (SPIP) Image Analysis The SEM images in this disclosure were obtained as follows. A 2 mg to 10 mg sample of material to be analyzed, for example a calcined support-activator, was weighed out to a vial inside an inert atmosphere glove box, and the material was transferred to a piece of double-sided conductive adhesive tape placed upon a metallic specimen stub. Excess powder was removed using a blower. This stub was placed within a specimen holder of a Hitachi SU3500 Scanning electron microscope. Once installed to the specimen chamber, the chamber was evacuated and the measurement commenced. A suitable image for subsequent Scanning Probe Image Processor (SPIP) analysis was found by locating an area in which particles were dispersed enough in the image for the analysis in this measurement range from 100× to 600×, depending upon particle size.

The resulting SEM images were imported into Image Metrology SPIP 6.6.4 software. The "Watershed-Dispersed Features" was selected as the Particle Detection method, although the "Advance Threshold" detection can also be used with comparable results. From the SEM image and data file, the x-axis and y-axis lengths of the photograph, and z-axis (also referred to as the "working" distance) lengths are recorded, and used in the SPIP image analysis parameters. The Smoothing Filter Size was set at 40 pixels, the Slope Noise reduction was set to 15-25%, and the Slope Image Threshold Percentile was adjusted as needed to obtain clear particle boundaries, and ranged from 50% to 76% depending on image. The particle detection method used was the "Watershed Dispersion Segments" detection method.

In analyzing such an SEM image by SPIP software, and unless otherwise indicated, particles having a diameter of greater than 8 m and less than 100 m in diameter were selected for analysis. The SPIP software calculated the area (A) of a two-dimensional image of the particles and the perimeter length of the two-dimensional image of the particles to calculate circularity. The SEM images of particles used for circularity calculations were individually examined to eliminate those for which the detected boundaries were incorrectly fused with other particles, occluded by other particles, or interrupted by the boundaries of the SEM photograph. In each analysis, unless otherwise stated, a sample of 10 or more particles were detected and subjected to this analysis to calculate circularity (C).

Pore Volume and Pore Volume Distribution

Pore volumes of the clay heteroadducts are reported as the cumulative volume in cc/g ($cm^3/g$, cubic centimeters per gram) of all pores discernable by nitrogen desorption methods. For catalyst support or carrier particles such as alumina powder, and for the clays and clay heteroadducts of this disclosure, the pore diameter distribution and pore volumes were calculated with reference to nitrogen desorption isotherm (assuming cylindrical pores) by the B.E.T. (or BET) technique as described by S. Brunauer, P. Emmett, and E. Teller in the J. Am. Chem. Soc., 1939, 60, 309; see also ASTM D 3037, which identifies the procedure for determining the surface area using the nitrogen BET method.

The pore volume distribution can be useful in understanding catalyst performance, and the pore volume (total pore volume), various attributes of pore volume distribution such as the percentage of pores in various size ranges, as well as "pore mode", which describes the pore diameters corresponding to local maxima in the dV(log D) vs. pore diameter distribution, were derived from nitrogen adsorption-desorption isotherms based on the method described by E. P. Barrett, L. G. Joyner and P. P. Halenda ("BJH"), in "The Determination of Pore Volume and Area Distributions in Porous Substances. I. Computations from Nitrogen Isotherms," *J. Am. Chem. Soc.,* 1951, 73 (1), pp 373-380.

Surface Area

Surface area was determined by nitrogen adsorption methods using the nitrogen adsorption-desorption isotherm using the B.E.T. (or BET) technique as described by S. Brunauer, P. Emmett, and E. Teller in the *J. Am. Chem. Soc.,* 1939, 60, 309; see also ASTM D 3037, which identifies the procedure for determining the surface area using the nitrogen BET method. All morphological properties involving weight, such as pore volume (PV) (cc/g, cubic centimeters per gram) or surface area (SA) ($m^2/g$, meters squared per gram) were normalized to a "metals-free basis" in accordance with procedures well-known in the art. However, unless stated otherwise, the morphological properties reported herein are on an "as-measured" basis without correcting for metals content.

Catalyst Preparation

The preparation of a supported metallocene polymerization catalyst for ethylene homopolymerization or ethylene-α-olefin copolymerization may be carried out as exemplified by the following procedure. In a glove box under a nitrogen atmosphere, 4 mL of heptanes was added to a charge vessel. A 75 mg portion of calcined clay heteroadduct was weighed out and the calcined material was then dispensed into this charge vessel. A 2 mL portion of a 4.6 mM (millimolar) solution of bis(1-butyl-3-methylcyclopentadienyl)zirconium dichloride ($9.2\times10^{-3}$ mmol metallocene) in heptanes was then slowly added to the charge vessel via syringe to form a catalyst slurry. Therefore, the metallocene was charged in an amount to provide a metallocene-to-clay heteroadduct ratio of about $1.2\times10^{-4}$ mmol metallocene/mg calcined clay heteroadduct.

Triethylaluminum ($AlEt_3$ or TEA) in hexanes (3 mL of a 0.6 M solution, for 1.8 mmol TEA) of was added to a sample cylinder via syringe. This process was used for both ethylene homopolymerization and ethylene-α-olefin (e.g. 1-hexene) copolymerization, therefore, from 0 mL to 140 mL of 1-hexene was also added to the sample cylinder via syringe. The sample cylinder was attached to a 2 L autoclave, and the material inside was pushed into the autoclave through isobutane flow. The charge vessel was also attached to a 2 L autoclave, and the material inside was pushed into the autoclave through ethylene flow.

Polymerization Reactions

Unless otherwise indicated, ethylene polymerizations were conducted in a dry, 2 L stainless steel Parr autoclave reactor using 1 L of isobutane diluent.

Prior to conducting a polymerization run, moisture was first removed from the reactor interior by pre-heating the reactor to at least 115° C. under a dry nitrogen flow, which was maintained for at least 15 minutes. Stirring was provided by an impellor and Magnadrive™ with a set point of, for example, 600 rpm.

The post-contacted catalyst components, that is the composition containing all the listed catalyst system components that were previously contacted to form the composition, were prepared in an inert atmosphere glove box under dry nitrogen and transferred to a catalyst charge tube or vessel as described above. The catalyst charge vessel contents were then charged to the reactor by flushing them in with 1 L of isobutane. The reactor temperature control system was then turned on and is allowed to reach a few degrees lower than the temperature set-point, which typically took about 7 minutes. The reactor was brought to run pressure by opening a manual feed valve for the ethylene, and polymerization runs were continued for 1 hour to provide the polymer and data in Tables 1-3. The selected pressure and temperature in the reactor for calculating activities in Tables 1-3 were 350 total psi (0.3 psi $H_2$ and sufficient ethylene for 350 psi total) and 80° C. A pre-mixed gas feed tank ("mixtank") of purified hydrogen and ethylene (0.3 psi $H_2$ and sufficient ethylene for 700 psi total) was used to maintain the desired total reactor pressure, with a large enough volume and a high enough pressure in the feed tank so as not to significantly change the ratio of ethylene-to-hydrogen in the feed to the reactor.

Alternatively, the contents of the catalyst charge tube can be pushed into the reaction vessel with ethylene at several degrees below the set point temperature of the run, for example, about 10 degrees centigrade below the set point temperature. In this method, two charge tubes were used. When the run pressure was reached, the reactor pressure was controlled by the mass flow controller. The consumption of ethylene and the temperature were monitored electronically. During the course of the polymerization, with the exception of the initial charge of catalyst during the first few minutes of the run, the reactor temperature was maintained at the set point temperature ±2° C. After a designated run time of 1 hour, the polymerization was stopped by shutting off the ethylene inlet valve and venting the isobutane. The reactor was returned to ambient temperature. The polymer produced in the reaction was then removed from the reactor and dried, and the polymer weight was used to calculate the activity of the particular polymerization. Polymer melt indices, specifically, melt index (MI) and high load melt index (HLMI), were obtained after stabilization of the polymer with butylated hydroxytoluene (BHT) according to ASTM procedures D618-05 and D1238-04C. Polymer density was measured according to ASTM D1505-03.

Tables 1-3 also report surface area and porosity properties of comparative supports and inventive heterocoagulated clay supports. In these data tables, the heterocoagulation agent(s) and the drying conditions (azeotroped, non-azeotroped, spray-dried) for the various support-activator types, including calcined, heterocoagulated [1] clay-aluminum chlorohydrate (ACH) support-activators, [2] clay-ACH-surfactant support-activators, and [3] clay-surfactant support-activators. The specific Example number of the support used in each polymerization run is listed.

Catalyst and Polymer Characterization

The $^1H$ NMR spectra of metallocene compounds were collected at room temperature by placing 20 mg of the metallocene sample into a 10 mm NMR tube, to which 3.0 mL of $CDCl_3$ were added. $^1H$ NMR spectra were acquired on a Bruker AVANCE™ 400 NMR (400.13 MHz). Chemical shifts are reported in ppm (δ) relative to TMS, or referenced to the chemical shifts of residual solvent proton resonances. Coupling constants are reported in Hertz (Hz).

The NMR determination of isotactic pentads content in the polypropylene was obtained by place 400 mg of polymer sample into a 10 mm NMR tube, into which 1.7 g of tetracholoroethane-d2 and 1.7 g of o-dichlorobenzene were added. The $^{13}C$ NMR spectra were acquired on a Bruker AVANCE™ 400 NMR (100.61 MHz, 900 pulse, 12 s delay between pulse). About 5000 transients were stored for each spectrum, and the mmmm pentad peak (21.09 ppm) was used as reference. The microstructure analysis was carried out as described by Busico, et al., Macromolecules, 1994, 27, 4521-4524.

The polypropylene Melt Flow Rate (MFR) was determined at 230° C. under the load of 2.16 kg according to ASTM D-1238 procedure.

Polypropylene melting temperature Tm was obtained according to ASTM D-3417 procedure using DSC and TA Instrument, Inc. Model: DSC Q1000.

Nitrogen adsorption-desorption data for the support-activators and other materials were collected using an Anton Paar Autosorb iQ apparatus. A representative measurement was carried out as follows. A 50 mg to 150 mg calcined sample was weighed into a sample cell under an inert atmosphere and sealed with a stopper. The sample cell was inserted into the Autosorb iQ station and placed under vacuum. The sample was subsequently cooled using liquid nitrogen. The nitrogen adsorption-desorption isotherms were recorded at 77 K and from relative pressures $P/P_0=0.05$ to 1 ($P_0$=atmospheric pressure).

Table 1 presents the properties and polymerization data for clay-aluminum chlorohydrate (ACH) heterocoagulates prepared in the absence of a surfactant, dried by either an azeotroping or non-azeotroping process, and which have been calcined to form the clay-ACH support-activators.

The Table 2 data illustrate embodiments of the present disclosure. In an aspect, the addition of surfactant to a clay dispersion in water and evaporation of the aqueous slurry, without the addition of azeotroping agents (such as 1-butanol, 1-propanol, or other organic solvents), and subsequent calcination of the clay-heteroadduct produces support-activators with substantial BJH porosities relative to the calcined clay prepared under analogous conditions without the surfactant species.

Table 3 sets out the properties and polymerization data for spray-dried, calcined, heterocoagulated [1] clay-aluminum chlorohydrate (ACH) support-activators, [2] clay-ACH-surfactant support-activators, and [3] clay-surfactant support-activators. The polymerizations were performed at 350 psi reactor pressure and 80° C., using ($\eta^5$-1-n-butyl-3-methylcyclopentadienyl)$_2ZrCl_2$ as metallocene and triethylaluminum ($AlEt_3$) as co-catalyst, and percentages in Table 3 are weight percentages relative to the clay. The ACH component is present at a concentration of 1.54 mmol Al/g clay.

Table 4 compares the polymer particle size distribution properties of polyethylene homopolymer produced using [1] a comparative azeotroped clay-aluminum chlorohydrate (ACH) heteroadduct support-activator produced in the absence of a surfactant, [2] a support-activator produced by spray-drying an isolated clay-aluminum chlorohydrate (ACH) heteroadduct in the presence of a tetrabutylammonium bromide surfactant, and [3] a support-activator produced by spray-drying an isolated clay-aluminum chlorohydrate (ACH) heteroadduct in the presence of a tetraoctylammonium bromide surfactant, as described herein.

Table 5 compares the average particle circularities obtained from SEM image analysis of various clay-support-activator samples using Scanning Probe Image Processor (SPIP) image analysis of the calcined support-activators. The Table 5 circularity data are based on the image analysis of the samples illustrated in FIG. 31 through FIG. 36, and include: non-spray-dried, calcined support-activators formed from the combination of clay and aluminum chlorohydrate in an aqueous slurry (FIG. 31 and FIG. 32); non-spray-dried, calcined support-activator formed from combination of clay and tetrabutylammonium bromide in an aqueous slurry (FIG. 33); and spray-dried, calcined support-activators formed from combination of clay and tetrabutylammonium bromide in an aqueous slurry (FIG. 33 through FIG. 36). The spray-dried particles depicted in FIG. 33 through FIG. 36 exhibit substantially higher circularity and a larger proportion of 8-100 m diameter particles as compared to those of FIG. 31 through FIG. 33 which were not spray-dried.

Table 6 compares the mean volume-weighted sphericities (SPHT3), the mean number-weighted sphericities (SPHT0), and the particle size data obtained from the CAMSIZER® analysis of polymer powder samples prepared from metallocene-catalyzed ethylene-1-hexene co-polymerizations using various calcined clay-support-activators. The Table 6 mean sphericities are derived from the sphericity versus particle size plots in FIG. 37 through FIG. 40. The FIG. 37 polymer data in Table 6 was derived using the support-activator of Example 2-A1 (azeotroped clay-aluminum chlorohydrate heteroadduct). The FIG. 38 polymer data in Table 6 was derived using the support-activator of Example 30-E2 (clay-tetrabutylammonium bromide heteroadduct, non-azeotroped and rotary evaporated). The FIG. 39 and FIG. 40 polymer data in Table 6 were derived using the support-activator of Example 31 (large-scale preparations and spray drying of a clay-tetrabutylammonium bromide composite in the absence of a cationic polymetallate). Table 6 shows that the spray-dried particles analyzed in FIG. 39 and FIG. 40 exhibit substantially higher volume-weighted average SPHT3 sphericities as compared to those of FIG. 37 and FIG. 38 which were not spray-dried.

Table 7 compares the mean volume-weighted sphericities (SPHT3), the mean number-weighted sphericities (SPHT0), and the particle size data for polymer particles, obtained from the CAMSIZER® analysis of ethylene-1-hexene co-polymer powder samples prepared using the calcined both sieved and unsieved support-activators prepared according to Example 31. This support-activator is a spray-dried (non-azeotroped) clay-tetrabutylammonium bromide heteroadduct prepared in the absence of a cationic polymetallate. The Table 7 compares polymer particle data prepared using the non-sieved support-activator of Example 31, versus polymer data prepared using different size-range portions of this support-activator (Examples 33-35). In these examples, a clay heteroadduct was prepared and spray-dried as set out in Example 31, then sieved to provide more narrow size ranges of clay heteroadduct. These narrow size range samples of spray-dried clay heteroadduct were calcined, used to prepare a polymerization catalysts, and the ethylene-1-hexene co-polymers obtained from each polymerization were collected. These CAMSIZER® analysis data in Table 7 include data for polymer prepared from the unsieved Example 31 clay heteroadduct, and polymers obtained from support-activator particles captured between sieves having the openings of the following sizes: [1] between sieves with 19 μm (micron) and 37 μm openings (Example 33 and FIG. 43), [2] between 37 μm and 50 μm opening sieves (Example 34 and FIG. 45), and [3] between 50 μm and 74 μm opening sieves (Example 35 and FIG. 47).

These Table 7 data shown that the narrow size range samples of Examples 33-35 show mean volume-weighted sphericities SPHT3 of greater than or equal to 0.65, with SPHT3 sphericity increasing with increasing particle size. For example, the polymer made using clay heteroadduct between 50 μm and 74 μm in size (Example 35 and FIG. 47) had the highest SPHT3 sphericity of 0.86. The particle size ranges of the Examples 33-35 polymers as measured by Span were all observed to be more narrow than the polymer particles make using the unsieved Example 31 clay heteroadduct.

In the following tables, the heterocoagulation agent and the drying conditions are mutually exclusive and are indicated for each of the examples as follows; see also the referenced Examples. Samples designated "azeotroped" were dried from a slurry of water and 1-butanol azeotroping agent by rotary evaporation and were not spray-dried. Samples designated "non-azeotroped" or "not azeotroped" with no adinol information were dried from a slurry of water in the absence of an azeotroping agent such as 1-butanol, by rotary evaporation and also were not spray-dried. Samples designated as "spray-dried" were spray-dried from a water-only suspension.

TABLE 1

Properties and polymerization data for azeotroped and non-azeotroped, calcined, clay-aluminum chlorohydrate (ACH) support-activators, demonstrating loss of activity and porosity from aqueous-only drying of clay-ACH support-activators. [A, B]

| Run No. | Support-Activator Example No. | Heterocoagulation Agent and Drying Conditions [C] | Surfactant mmol cation/-gram clay | BET Surface Area ($m^2$/g) | BJH Pore Volume (cc/g) | PE Yield (g) [B] | Productivity (g PE/g Support-Activator) | Activity (g PE/g Support-Activator/hour) |
|---|---|---|---|---|---|---|---|---|
| 1 | 2-A1 | ACH [D], Azeotroped | 0 | 212 | 0.544 | 292 | 3893 | 3893 |
| 2 | 3-A2 | ACH [D], Azeotroped | 0 | 210 | 0.421 | 274.6 | 3661 | 3661 |
| 3 | 4-A3 | ACH [E], Azeotroped | 0 | 132 | 0.261 | 212 | 2827 | 2827 |
| 4 | 4-A3 | ACH [E], Azeotroped | 0 | 132 | 0.261 | 188.7 | 2516 | 2516 |
| 5 | 5-A4 | ACH [E], Non-Azeotroped | 0 | 123 | 0.049 | 2.4 | 32 | 32 |

[A] Polymerizations were performed at 350 psi reactor pressure and 80° C., using ($\eta^5$-1-n-butyl-3-methyl-cyclopentadienyl)$_2$ZrCl$_2$ and triethylaluminum (AlEt$_3$) as metallocene and co-catalyst.
[B] ACH, aluminum chlorohydrate; PE, polyethylene.
[C] Drying was carried out by (i) azeotropically drying from a 1-butanol/water slurry (rotary evaporator), or (ii) non-azeotropically drying from an aqueous-only slurry (rotary evaporator).
[D] ACH component, 1.75 mmol Al/g clay.
[E] ACH component, 1.54 mmol Al/g clay.

TABLE 2

Properties and polymerization data for non-azeotroped, calcined, heterocoagulated [1] clay-aluminum chlorohydrate (ACH) support-activators, [2] clay-ACH-surfactant support-activators, and [3] clay-surfactant support-activators. [A, B]

| Run No. | Support-Activator Example No. | Heterocoagulation Agent and Drying Conditions [C] | Surfactant mmol cation/-gram clay | BET Surface Area ($m^2$/g) | BJH Pore Volume (cc/g) | PE Yield (g) | Productivity (g PE/g Support-Activator) | Activity (g PE/g Support-Activator/hour) |
|---|---|---|---|---|---|---|---|---|
| 1 | 5-A4 | ACH, Non-Azeotroped | 0 | 123 | 0.049 | 2.4 | 32 | 32 |
| 2 | 6-B1 | ACH + 2 wt % tetraoctylammonium bromide, Non-Azeotroped | 0.731542 | 49 | 0.287 | 168.7 | 2249 | 2249 |
| 3 | 28-C1 | ammonium bromide, Non-Azeotroped | 1.24 | — | — | 23.1 | 308 | 308 |
| 4 | 29-C2 | ammonium bromide, Non-Azeotroped | 2.48 | — | — | 28.3 | 377 | 377 |
| 5 | 7-B2 | ACH + 0.5 wt % trihexyl tetradecyl phosphonium bromide, Non-Azeotroped | 0.18 | 26 | 0.148 | 13.8 | 184 | 184 |
| 6 | 8-B3 | ACH + 2 wt % dextrose, Non-Azeotroped | 2.22 | 151 | 0.053 | 5.6 | 75 | 75 |
| 7 | 9-B4 | 1.3 wt % tetramethyl-ammonium bromide, Non-Azeotroped | 1.69 | — | 0.138 | 44 | 591 | 591 |
| 8 | 9-B4 | 1.3 wt % tetramethyl-ammonium bromide, Non-Azeotroped | 1.69 | — | 0.138 | 28.7 | 383 | 383 |
| 9 | 9-B4 | 1.3 wt % tetramethyl-ammonium bromide, Non-Azeotroped | 1.69 | — | 0.138 | 15.2 | 203 | 203 |

TABLE 2-continued

Properties and polymerization data for non-azeotroped, calcined, heterocoagulated [1] clay-aluminum chlorohydrate (ACH) support-activators, [2] clay-ACH-surfactant support-activators, and [3] clay-surfactant support-activators. [A, B]

| Run No. | Support-Activator Example No. | Heterocoagulation Agent and Drying Conditions [C] | Surfactant mmol cation/-gram clay | BET Surface Area ($m^2$/g) | BJH Pore Volume (cc/g) | PE Yield (g) | Productivity (g PE/g Support-Activator) | Activity (g PE/g Support-Activator/hour) |
|---|---|---|---|---|---|---|---|---|
| 10 | 10-B5 | 2 wt % tetramethyl-ammonium bromide, Non-Azeotroped | 2.6 | — | 0.132 | 75.8 | 1011 | 1011 |
| 11 | 10-B5 | 2 wt % tetramethyl-ammonium bromide, Non-Azeotroped | 2.6 | — | 0.132 | 37.4 | 499 | 499 |
| 12 | 11-B6 | 2.6 wt % tetramethyl-ammonium bromide, Non-Azeotroped | 3.36 | — | 0.138 | 84.7 | 1129 | 1129 |
| 13 | 11-B6 | 2.6 wt % tetramethyl-ammonium bromide, Non-Azeotroped | 3.36 | — | 0.138 | 128.3 | 1711 | 1711 |
| 14 | 11-B6 | 2.6 wt % tetramethyl-ammonium bromide, Non-Azeotroped | 3.36 | — | 0.138 | 106.6 | 1421 | 1421 |
| 15 | 12-B7 | 3.26 wt % tetramethyl-ammonium bromide, Non-Azeotroped | 4.23 | — | — | 72.3 | 964 | 964 |
| 16 | 12-B7 | 3.26 wt % tetramethyl-ammonium bromide, Non-Azeotroped | 4.23 | — | — | 87 | 1160 | 1160 |
| 17 | 12-B7 | 3.26 wt % tetramethyl-ammonium bromide, Non-Azeotroped | 4.23 | — | — | 47.1 | 628 | 628 |
| 18 | 13-B8 | 1 wt % tetrabutyl-ammonium bromide, Non-Azeotroped | 0.62 | 16 | 0.126 | 4.8 | 64 | 64 |
| 19 | 14-B9 | 2 wt % tetrabutyl-ammonium bromide, Non-Azeotroped | 1.24 | 20 | 0.162 | 105 | 1400 | 1400 |
| 20 | 14-B9 | 2 wt % tetrabutyl-ammonium bromide, Non-Azeotroped | 1.24 | 20 | 0.162 | 129.8 | 1731 | 1731 |
| 21 | 14-B9 | 2 wt % tetrabutyl-ammonium bromide, Non-Azeotroped | 1.24 | 20 | 0.162 | 184.6 | 2461 | 2461 |
| 22 | 15-B10 | 3 wt % tetrabutyl-ammonium bromide, Non-Azeotroped | 1.86 | 20 | — | 112 | 1493 | 1493 |
| 23 | 15-B10 | 3 wt % tetrabutyl-ammonium bromide, Non-Azeotroped | 1.86 | 20 | — | 59.8 | 797 | 797 |
| 24 | 15-B10 | 3 wt % tetrabutyl-ammonium bromide, Non-Azeotroped | 1.86 | 20 | — | 86 | 1147 | 1147 |
| 25 | 16-B11 | 4 wt % tetrabutyl-ammonium bromide, Non-Azeotroped | 2.48 | — | — | 71 | 947 | 947 |
| 26 | 16-B11 | 4 wt % tetrabutyl-ammonium bromide, Non-Azeotroped | 2.48 | — | — | 45.8 | 611 | 611 |
| 27 | 16-B11 | 4 wt % tetrabutyl-ammonium bromide, Non-Azeotroped | 2.48 | — | — | 27 | 360 | 360 |
| 28 | 17-B12 | 2 wt % tetraoctyl ammonium bromide, Non-Azeotroped | 0.73 | 20 | — | 20.8 | 277 | 277 |
| 29 | 18-B13 | 3 wt % tetraoctyl ammonium bromide, Non-Azeotroped | 1.10 | — | — | 70.1 | 935 | 935 |
| 30 | 18-B13 | 3 wt % tetraoctyl ammonium bromide, Non-Azeotroped | 1.10 | — | — | 41.4 | 552 | 552 |
| 31 | 19-B14 | 4 wt % tetraoctyl ammonium bromide, Non-Azeotroped | 1.47 | — | — | 57.2 | 763 | 763 |
| 32 | 19-B14 | 4 wt % tetraoctyl ammonium bromide, Non-Azeotroped | 1.47 | — | — | 62.3 | 831 | 831 |
| 33 | 25 | 1.91 wt % dodecyl-trimethylammonium bromide, Non-Azeotroped | 1.24 | — | — | 228.5 | 3047 | 3047 |

TABLE 2-continued

Properties and polymerization data for non-azeotroped, calcined, heterocoagulated [1] clay-aluminum chlorohydrate (ACH) support-activators, [2] clay-ACH-surfactant support-activators, and [3] clay-surfactant support-activators. [A, B]

| Run No. | Support-Activator Example No. | Heterocoagulation Agent and Drying Conditions [C] | Surfactant mmol cation/-gram clay | BET Surface Area ($m^2$/g) | BJH Pore Volume (cc/g) | PE Yield (g) | Productivity (g PE/g Support-Activator) | Activity (g PE/g Support-Activator/hour) |
|---|---|---|---|---|---|---|---|---|
| 34 | 26 | 1.65 wt % dodecyl-ammonium bromide, Non-Azeotroped | 1.24 | — | — | 187 | 2493 | 2493 |
| 35 | 27 | 1.74 wt % decyltrimethyl-ammonium bromide, Non-Azeotroped | 1.24 | — | — | 117 | 1555 | 1555 |

[A] Polymerizations were performed at 350 psi reactor pressure and 80° C., using ($\eta^5$-1-n-butyl-3-methyl-cyclopentadienyl)$_2$ZrCl$_2$ and triethylaluminum (AlEt$_3$) as metallocene and co-catalyst.
[B] ACH, aluminum chlorohydrate; PE, polyethylene.
[C] Percentages are weight percents relative to the clay; ACH component, 1.54 mmol Al/g clay. Drying was carried out by non-azeotropically drying from an aqueous-only slurry (rotary evaporator).

TABLE 3

Properties and polymerization data for spray-dried and calcined heterocoagulated [1] clay-aluminum chlorohydrate (ACH) support-activators, [2] clay-ACH-surfactant support-activators, and [3] clay-surfactant support-activators. [A, B]

| Run No. | Support-Activator Example No. | Heterocoagulation Agent and Drying Conditions [C] | Surfactant mmol cation/-gram clay | BET Surface Area ($m^2$/g) | BJH Pore Volume (cc/g) | PE Yield (g) | Productivity (g PE/g Support-Activator) | Activity (g PE/g Support-Activator/hour) |
|---|---|---|---|---|---|---|---|---|
| 1 | 20-D1 | ACH, Spray-Dried | 0 | 13 | 0.122 | 6.8 | 91 | 91 |
| 2 | 20-D1 | ACH, Spray-Dried | 0 | 13 | 0.122 | 6.9 | 92 | 92 |
| 3 | 21-E1 | tetramethylammonium bromide, Spray-Dried | 2.48 | — | — | 129.8 | 1731 | 1731 |
| 4 | 21-E1 | tetramethylammonium bromide, Spray-Dried | 2.48 | — | — | 111.7 | 1489 | 1489 |
| 5 | 22-E2 | tetrabutylammonium bromide, Spray-Dried | 0.7315 | 17 | 0.13 | 145 | 1933 | 1933 |
| 6 | 22-E2 | tetrabutylammonium bromide, Spray-Dried | 0.7315 | 17 | 0.13 | 169.6 | 2261 | 2261 |
| 7 | 23-E3 | ACH, followed by tetrabutylammonium bromide, Spray-Dried | 1.24081 | 48 | 0.273 | 154 | 2053 | 2053 |
| 8 | 23-E3 | ACH, followed by tetrabutylammonium bromide, Spray-Dried | 1.24081 | 48 | 0.273 | 187 | 2493 | 2493 |
| 9 | 24-E4 | ACH, followed by tetraoctylammonium bromide, Spray-Dried | 0.731542 | 15 | 0.123 | 199.6 | 2661 | 2661 |
| 10 | 24-E4 | ACH, followed by tetraoctylammonium bromide, Spray-Dried | 0.731542 | 15 | 0.123 | 208 | 2773 | 2773 |

[A] Polymerizations were performed at 350 psi reactor pressure and 80° C., using ($\eta^5$-1-n-butyl-3-methyl-cyclopentadienyl)$_2$ZrCl$_2$ and triethylaluminum (AlEt$_3$) as metallocene and co-catalyst.
[B] ACH, aluminum chlorohydrate; PE, polyethylene.
[C] Drying was carried out by spray-drying from an aqueous slurry in the absence of an azeotroping agent.

TABLE 4

Polyethylene homopolymer particle size distributions produced using [1] an azeotroped clay-aluminum chlorohydrate (ACH) support-activator produced in the absence of a surfactant, [2] an isolated clay-aluminum chlorohydrate (ACH) heteroadduct spray-dried in the presence of tetrabutylammonium bromide surfactant, and [3] an isolated clay-aluminum chlorohydrate (ACH) heteroadduct spray-dried in the presence of tetraoctylammonium bromide surfactant. [A]

| Run No. | Support-Activator Example No. | Heterocoagulation Agent and Drying Conditions [B] | Support-Activator BET Surface Area ($m^2$/g) | Support-Activator BJH Pore Volume (cc/g) | d(0.1), µm | d(0.5), µm | d(0.9), µm | $\text{Span} = \frac{d(0.9) - d(0.1)}{d(0.5)}$ | Uniformity |
|---|---|---|---|---|---|---|---|---|---|
| 1 | 2-A1 (Table 1, Run 1) | ACH, Azeotroped | 212 | 0.544 | 485 | 986 | 1529 | 1.06 | 0.332 |

TABLE 4-continued

Polyethylene homopolymer particle size distributions produced using [1] an azeotroped clay-aluminum chlorohydrate (ACH) support-activator produced in the absence of a surfactant, [2] an isolated clay-aluminum chlorohydrate (ACH) heteroadduct spray-dried in the presence of tetrabutylammonium bromide surfactant, and [3] an isolated clay-aluminum chlorohydrate (ACH) heteroadduct spray-dried in the presence of tetraoctylammonium bromide surfactant. [A]

| Run No. | Support-Activator Example No. | Heterocoagulation Agent and Drying Conditions [B] | Support-Activator BET Surface Area ($m^2/g$) | Support-Activator BJH Pore Volume (cc/g) | d(0.1), µm | d(0.5), µm | d(0.9), µm | Span = $\frac{d(0.9) - d(0.1)}{d(0.5)}$ | Uniformity |
|---|---|---|---|---|---|---|---|---|---|
| 2 | 23-E3 (Table 1, Run 7) | ACH, followed by tetrabutylammonium bromide, Spray-Dried | 48 | 0.273 | 84 | 160 | 314 | 1.43 | 0.460 |
| 3 | 24-E4 (Table 3, Run 10) | ACH, followed by tetraoctylammonium bromide, Spray-Dried | 15 | 0.123 | 80 | 148 | 314 | 1.58 | 0.442 |

[A] Polymerizations were performed at 350 psi reactor pressure and 80° C., using ($\eta^5$-1-n-butyl-3-methyl-cyclopentadienyl)$_2$ZrCl$_2$ and triethylaluminum ($AlEt_3$) as metallocene and co-catalyst.
[B] ACH, aluminum chlorohydrate. Drying was carried out by (i) azeotropically drying from a 1-butanol/water slurry (rotary evaporator), or (ii) spray-drying from an aqueous slurry in the absence of an azeotroping agent.

TABLE 5

Circularity data for azeotroped (1-butanol and water), non-azeotroped, and spray-dried (aqueous slurry), calcined support-activators demonstrating the improved circularity of support-activators prepared in the absence of cationic polymetallates and spray-dried from an aqueous suspension.[A]

| Run No. | Support-Activator Example No. | Figure Number | Heterocoagulation Agent and Drying Conditions[B] | Circularity (average) |
|---|---|---|---|---|
| 1 | 2-A1 | 31 | ACH, Azeotroped | 0.757 |
| 2 | 3-A2 | 32 | ACH, Azeotroped | 0.813[C] |
| 3 | 30-E2 | 33 | Tetrabutylammonium bromide, Non-Azeotroped | 0.548[D] |
| 4[E] | 32 | 34 | Tetrabutylammonium bromide, Spray-Dried | 0.908 |
| 5[E] | 32 | 35 | Tetrabutylammonium bromide, Spray-Dried | 0.912 |
| 6 | 31 | 36 | Tetrabutylammonium bromide, Spray-Dried | 0.840 |

[A]Circularities of particles having a diameter of greater than 8 µm and less than 100 µm were calculated according to the formula:

$$\text{circularity } (C) = \frac{4\pi A}{(\text{perimeter})^2};$$

wherein A is the area of a two-dimensional image of a particle, and perimeter is the length of the path encompassing the two-dimensional image of a particle, using Scanning Probe Image Processor (SPIP).
[B]ACH, aluminum chlorohydrate. Drying was carried out by (i) azeotropically drying from a 1-butanol/water slurry (rotary evaporator), (ii) non-azeotropically drying from an aqueous-only slurry (rotary evaporator), or (iii) spray-drying from an aqueous slurry in the absence of an azeotroping agent.
[C]Circularity determined using less than 10 particles having a diameter greater than 8 µm.
[D]Circularity determined using a total of 3 large (>100 µm diameter) particles.
[E]Clay-heterocoagulates used in Run Nos. 4 and 5 were produced under different spray-drying conditions within the ranges of Example 32.

TABLE 6

Sphericity and span data for ethylene-1-hexene co-polymers derived from metallocene-catalyzed polymerizations using calcined support-activators from [1] azeotroped clay-aluminum chlorohydrate (ACH) heteroadduct, [2] non-azeotroped clay-surfactant heteroadduct, and [3] spray-dried clay-surfactant support-activators.[A,B]

| Run No. | Support-Activator Example No. | Figure Number | Heterocoagulation Agent and Drying Conditions[C] | Mean Volume-Weighted Sphericity (SPHT3) | Mean Number-Weighted Sphericity (SPHT0) | d(0.1), µm | d(0.5), µm | d(0.9), µm | Span = $\frac{d(0.9) - d(0.1)}{d(0.5)}$ |
|---|---|---|---|---|---|---|---|---|---|
| 1 | 2-A1 | 37 | ACH, Azeotroped | 0.662 | 0.779 | 256 | 885 | 1503 | 1.41 |
| 2 | 30-E2 | 38 | Tetrabutylammonium bromide, Non-Azeotroped | 0.654 | 0.793 | 308 | 1078 | 2528 | 2.06 |

TABLE 6-continued

Sphericity and span data for ethylene-1-hexene co-polymers derived from metallocene-catalyzed polymerizations using calcined support-activators from [1] azeotroped clay-aluminum chlorohydrate (ACH) heteroadduct, [2] non-azeotroped clay-surfactant heteroadduct, and [3] spray-dried clay-surfactant support-activators.[A,B]

| Run No. | Support-Activator Example No. | Figure Number | Heterocoagulation Agent and Drying Conditions[C] | Mean Volume-Weighted Sphericity (SPHT3) | Mean Number-Weighted Sphericity (SPHT0) | d(0.1), μm | d(0.5), μm | d(0.9), μm | Span = $\frac{d(0.9) - d(0.1)}{d(0.5)}$ |
|---|---|---|---|---|---|---|---|---|---|
| 3[E] | 31 | 39 | Tetrabutylammonium bromide, Spray-Dried | 0.775 | 0.889 | 504 | 1012 | 2115 | 1.59 |
| 4[E] | 31 | 40 | Tetrabutylammonium bromide, Spray-Dried | 0.861 | 0.864 | 179 | 442 | 932 | 1.70 |

[A]Polymerizations were performed at 350 psi reactor pressure and 80° C., using ($\eta^5$-1-n-butyl-3-methyl-cyclopentadienyl)$_2$ZrCl$_2$ and triethylaluminum ($AlEt_3$) as metallocene and co-catalyst, with 140 mL of 1-hexene introduced to the sample cylinder.
[B]Data obtained from CAMSIZER ® X2 Dynamic Image Analyzer.
[C]ACH, aluminum chlorohydrate. Drying was carried out by (i) azeotropically drying from a 1-butanol/water slurry (rotary evaporator), (ii) non-azeotropically drying from an aqueous-only slurry (rotary evaporator), or (iii) spray-drying from an aqueous slurry in the absence of an azeotroping agent.
[E]Clay-heterocoagulates used in Run Nos. 3 and 4 were produced under different spray-drying conditions within the ranges of Example 31.

TABLE 7

Sphericity and span data for ethylene-1-hexene co-polymers derived from metallocene-catalyzed polymerizations using calcined support-activators from [1] spray-dried unsieved clay-surfactant support-activator of Example 31 and [2] spray-dried sieved clay-surfactant support-activator of Examples 33-35.[A,B]

| Run No | Support-Activator Example No. | Figure Numbers | Heterocoagulation Agent and Drying Conditions[C] | Sieve Opening Range (lower bound-upper bound), μm[D] | Mean Volume-Weighted Sphericity (SPHT3) | Mean Number-Weighted Sphericity (SPHT0) | d(0.1), μm | d(0.5), μm | d(0.9), μm | Span = $\frac{d(0.9) - d(0.1)}{d(0.5)}$ |
|---|---|---|---|---|---|---|---|---|---|---|
| 1 | 31 | 40, 41 | Tetrabutyl-ammonium bromide, Spray-Dried | Unsieved | 0.861 | 0.864 | 179 | 442 | 932 | 1.703 |
| 2 | 33 | 42, 43 | Tetrabutyl-ammonium bromide, Spray-Dried | 19-37 μm | 0.890 | 0.856 | 169 | 350 | 585 | 1.189 |
| 3 | 34 | 44, 45 | Tetrabutyl-ammonium bromide, Spray-Dried | 37-50 μm | 0.881 | 0.839 | 479 | 723 | 993 | 0.711 |
| 4 | 35 | 46, 47 | Tetrabutyl-ammonium bromide, Spray-Dried | 50-74 μm | 0.745 | 0.805 | 851 | 1196 | 2242 | 1.163 |

[A]Polymerizations were performed at 350 psi reactor pressure and 80° C., using ($\eta^5$-1-n-butyl-3-methyl-cyclopentadienyl)$_2$ZrCl$_2$ and triethylaluminum ($AlEt_3$) as metallocene and co-catalyst, with 140 mL of 1-hexene introduced to the sample cylinder.
[B]Obtained from CAMSIZER ® X2 Dynamic Image Analyzer.
[C]Drying was carried out by spray-drying from an aqueous slurry in the absence of an azeotroping agent.
[D]The lower number is the sieve size opening which captured the spray-dried clay-heteroadduct sample, and the upper number is the larger sieve size opening which allowed the spray-dried clay-heteroadduct sample to pass through.

In designating example numbers in this application in the specification, tables, and the following Examples, additional alphanumeric characters in an example number which follow a hyphen, such as "B9" in Example "14-B9", are arbitrary internal reference or confirmation numbers to ensure the accuracy of the data.

Example 1. Preparation of a Colloidal Clay Dispersion

To a Waring® blender was charged 570 grams (g) of deionized Milli-Q® water, and with stirring, 30.0 g of Volclay® HPM-20 was added portion-wise. This mixture was stirred at a high rate (high revolutions per minute, rpm) to afford a substantially lump or clump-free, 5 wt. % (weight percent) dispersion or suspension of HPM-20 clay in water. When a 4.8 wt. % dispersion of HPM-20 clay was prepared in this manner using 20 g of Volclay® HPM-20 and 394 g of deionized water and stirred using a Waring® blender at high rpm (revolutions-per-minute) to afford a clump-free dispersion, the dispersion was characterized by a conductivity of 908 μS (microsiemens)/cm and pH of 9.39.

Example 2-A1. Comparative Example of an Azeotroped Clay-Aluminum Chlorohydrate (ACH) Heteroadduct With stirring, 30 g of Volclay® HPM-20 clay was added slowly over the course of 1 to 2 min (minutes) into a Waring® blender containing 570 g of deionized Milli-Q® water, while stirring at low speed to afford a grey colloidal dispersion containing no or substantially no visible lumps or clumps. After the addition was complete, the dispersion was blended at high speed for 5 to 10 minutes to obtain a slightly viscous mixture of 5 wt. % aqueous dispersion of HPM-20 clay.

A 100 g portion of this 5 wt. % aqueous dispersion of HPM-20 clay was transferred into a Waring® blender and stirred, and 1.91 g of aluminum chlorohydrate 50 wt. % aqueous solution (GEO) was pipetted into a vial and was added all at once to the dispersion. The mixture coagulated rapidly, and 70 mL of deionized Milli-Q® water was added in order to facilitate stirring. The mixture was then blended at high speed for 5 minutes and subsequently vacuum filtered through Fisherbrand™ P8 Qualitative-Grade Filter Paper (coarse porosity). After allowing 15 to 30 minutes for the filtration, the filtrate pH and conductivity were measured (Eutech PCSTestr 35), to provide a pH of 6.1 and a conductivity of 1516 μS/cm. The filtrate was discarded, and the remaining wet solid was re-suspended in 50 to 100 mL of deionized Milli-Q® water.

This filtration process of suspension of wet solid in deionized Milli-Q® water, vacuum filtration, and filtrate pH/conductivity measurement was repeated once more. The remaining wet solid was then re-suspended in 150 to 200 mL of 1-butanol and rotary evaporated at 45° C. The resulting solid was then ground with a mortar and pestle to obtain 5.18 g of a light grey powder. A 1.90 g portion of this solid was transferred to a porcelain crucible and calcined for 6 hours at 300° C. to afford 0.9 g of a grey-black powder of the azeotroped clay-aluminum chlorohydrate (ACH) heteroadduct.

Example 3-A2. Comparative Example of an Azeotroped Clay-Aluminum Chlorohydrate (ACH) Heteroadduct With stirring, 30 g of Volclay® HPM-20 clay was added slowly over the course of 1 to 2 minutes into a Waring® blender containing 570 g of deionized Milli-Q® water while stirring at low speed to afford a grey colloidal dispersion containing no or substantially no visible lumps or clumps. After the addition was complete, the dispersion was blended at high speed for 5 to 10 minutes to obtain a slightly viscous mixture of 5 wt. % aqueous dispersion of HPM-20 clay.

A 200 g portion of this 5 wt. % aqueous dispersion of HPM-20 clay was transferred into a Waring® blender, and 3.82 g of aluminum chlorohydrate 50 wt. % aqueous solution (GEO) was pipetted into a vial and was added all at once to the dispersion. The mixture coagulated rapidly, and 80 mL of deionized Milli-Q® water was added in order to facilitate stirring. The mixture was then blended at high speed for 5 minutes and subsequently vacuum filtered through Fisherbrand™ P8 Qualitative-Grade Filter Paper (coarse porosity). After allowing 15 to 30 minutes for the filtration, the filtrate pH and conductivity were measured (Eutech PCSTestr 35), to provide a conductivity of 2640 μS/cm. The filtrate was discarded, and the remaining wet solid was re-suspended in 50 to 100 mL of deionized Milli-Q® water.

The filtration process (suspension of wet solid in deionized Milli-Q® water, vacuum filtration, and filtrate pH/conductivity measurement) was repeated twice more. The remaining wet solid was then re-suspended in 400 mL of 1-butanol and rotary evaporated at 45° C. The resulting solid was then ground with a mortar and pestle to obtain 19.6 g of a light grey powder. A 2 g portion of this solid was transferred to a porcelain crucible and calcined for 6 hours at 300° C. to afford 0.7 g of a grey-black powder.

Example 4-A3. Comparative Example of an Azeotroped Clay-Aluminum Chlorohydrate (ACH) Heteroadduct With stirring, 30 g of HPM-20 from American Colloid Company was added slowly over the course of 1-2 minutes into a Waring® blender containing 570 g of deionized Milli-Q® water while stirring at low speed to afford a grey colloidal dispersion containing no or substantially no visible lumps or clumps. After the addition was complete, the dispersion was blended at high speed for 5-10 minutes to obtain a slightly viscous mixture of 5 wt. % aqueous dispersion of HPM-20.

A 100 g portion of this 5 wt. % aqueous dispersion of HPM-20 was transferred into a Waring® blender, and 1.66 g of GEO aluminum chlorohydrate 50 wt. % aqueous solution was pipetted into a vial and was added all at once to the dispersion. The mixture coagulated rapidly, and 80 mL of deionized Milli-Q® water was added in order to facilitate stirring. The mixture was then blended at high speed for 5 minutes, then suction filtered through Fisherbrand™ P8 Qualitative-Grade Filter Paper (coarse porosity). After allowing 15-30 minutes for the filtration, the filtrate pH and conductivity were measured (Eutech PCSTestr 35), to provide a pH of 6.2 and a conductivity of 1518 μS/cm. The filtrate was then discarded and the remaining wet solid was re-suspended in 50-100 mL of deionized Milli-Q® water.

The filtration process (suspension of wet solid in deionized Milli-Q® water, suction filtration, filtrate pH/conductivity measurement) was repeated until the conductivity of the re-suspended slurry reached 100-300 μS/cm. In this case, two of these filtration cycles were performed to obtain a slurry with a pH of 6.1 and a conductivity of 199 μS/cm. The remaining wet solid was re-suspended in 150-200 mL of 1-butanol and rotary evaporated at 45° C. The resulting solid was ground in a mortar and pestle to obtain 3.19 g of a light grey powder. 1.65 g of this solid was transferred to a clay crucible and calcined at 6 hours at 300° C. to afford 0.9 g of a grey-black powder.

Example 5-A4. Comparative Example of a Non-Azeotroped Clay-Aluminum Chlorohydrate (ACH) Heteroadduct A Waring® blender was charged with 100 g of the colloidal clay dispersion (5 wt. % clay) prepared according to Example 1, followed by, with stirring, 1.68 g of a 50% aluminum chlorhydrate (ACH) solution (GEO) with reported basicity of 83.47%. This mixture coagulated rapidly, and 60 mL of deionized water was added to enable continued stirring of the mixture. The mixture was then stirred at a high rate (rpm) for an additional 5-10 minutes, subsequently vacuum filtered through Fisherbrand™ P8 Qualitative-Grade Filter Paper (coarse porosity), and washed with an additional 100 g of Milli-Q® deionized water. The filtrate was then discarded, and the remaining wet solid was re-suspended in 50 to 100 mL of deionized Milli-Q® water to form a slurry. The slurry conductivity was measured as 820 μS (microsiemens)uS/cm using a Eutech PCSTestr 35. The slurry was rotary evaporated at 40° C. to dryness, and the resulting solid was ground with a mortar and pestle to a uniform powder. A 2.7 g portion of the powder was charged to a porcelain crucible and calcined for 6 hours at 300° C. The calcined material was cooled down under vacuum and weighed in a glove box under an inert atmosphere to provide 2.58 g of calcined powder of the non-azeotroped clay-ACH heteroadduct.

Example 6-B1. Example of a Non-Azeotroped Clay-Aluminum Chlorohydrate (ACH)-Surfactant (Tetraoctylammonium Bromide) Composite A Waring® blender was charged with 200 g of the colloidal clay dispersion (5 wt. % clay) prepared according to Example 1, followed by, with stirring, 4 g (2 wt. %) of tetraoctylammonium bromide followed by 3.29 g of 50% GEO aluminum chlorhydrate solution with reported basicity of 83.47% and. A 50 mL portion of deionized water was added to enable continued stirring of the mixture. After these additions, the mixture was stirred at a high rate (rpm) for an additional 5-10 minutes, and subsequently vacuum filtered through Fisherbrand™ P8 Qualitative-Grade Filter Paper (coarse porosity). After allowing 15 to 30 minutes for the filtration, the filtrate conductivity was measured as 1325 μS/cm using a Eutech PCSTestr 35. The filtrate was discarded, and the remaining wet solid was re-suspended in 50 mL of deionized Milli-Q® water to form a slurry. The slurry conductivity was measured as 290 μS/cm (Eutech PCSTestr 35). This slurry was rotary evaporated to dryness, and the resulting solid was ground with a mortar and pestle to a uniform powder. A 3.14 g portion of the powder was charged to a porcelain crucible and calcined for 6 hours at 300° C. The calcined material was cooled down under vacuum and weighed in a glove box under an inert atmosphere to provide 1.68 g of calcined powder.

Example 7-B2. Example of a Non-Azeotroped, Clay-Aluminum Chlorohydrate (ACH)-Trihexyltetradecylphosphonium Bromide (0.5 wt. %) Composite (0.18 Mmol Cation/g Clay)

With stirring, 30 g of Volclay® HPM-20 clay was added slowly over the course of 1 to 2 minutes into a Waring® blender containing 570 g of deionized Milli-Q® water while stirring at low speed to afford a grey colloidal dispersion containing no or substantially no visible lumps or clumps. After the addition was complete, the dispersion was blended at high speed for 5 to 10 minutes to obtain a slightly viscous mixture of 5 wt. % aqueous dispersion of HPM-20 clay.

A 200 g portion of this 5 wt. % aqueous dispersion of HPM-20 clay was transferred into a Waring® blender, and 3.295 g of 50 wt % aluminum chlorhydrate from GEO, and 1 g of trihexyltetradecylphosphonium bromide (0.18 mmol cation/g clay) was added all at once to the dispersion. The dispersion conductivity was measured as 1340 μS/cm. A 100 mL portion of deionized Milli-Q® water was added to this dispersion, and the mixture was subsequently filtered. The mixture was dried on a rotovap at 45° C., and the resulting solid was then ground with a pestle and mortar to obtain 4.34 g of a light grey powder. The entirety of this solid was transferred to a porcelain crucible and calcined for 6 hours at 300° C. to afford 3.61 g of a grey-black powder.

Example 8-B3. Example of a Non-Azeotroped Clay-Aluminum Chlorohydrate (ACH)-Dextrose Composite A Waring® blender was charged with 200 g of the colloidal clay dispersion (5 wt. % clay) prepared according to Example 1, followed by, with stirring, 4 g of dextrose and 3.29 g of 50% GEO aluminum chlorhydrate solution with reported basicity of 83.47% and 4 g of dextrose. The mixture coagulated rapidly, and 100 mL of deionized water was added to enable continued stirring of the mixture. Following these additions, the mixture was stirred at a high rate (rpm) for an additional 5-10 minutes, and subsequently vacuum filtered through Fisherbrand™ P8 Qualitative-Grade Filter Paper (coarse porosity. The filtrate was discarded, and the remaining wet solid was re-suspended in 50 to 100 mL of deionized Milli-Q® water to form a slurry. This slurry was rotary evaporated to dryness, and the resulting solid was ground with a mortar and pestle to obtain 4.63 g of a powder. The powder was charged to a porcelain crucible and calcined for 6 hours at 300° C. The calcined material was cooled down under vacuum and weighed in a glove box under an inert atmosphere to provide 3.69 g of calcined powder.

Example 9-B4. Example of Non-Azeotroped, Clay-Tetramethylammonium Bromide Composite in the Absence of a Cationic Polymetallate (1.69 Mmol Cation/g Clay)

A Waring® blender was charged with 100 g of the colloidal clay dispersion (5 wt. % clay) prepared according to Example 1, followed by, with stirring, 1.3 g of tetramethylammonium bromide. The mixture coagulated rapidly, and 100 mL of deionized water was added to enable continued stirring of the mixture. After these additions were performed, the mixture was stirred at a high rate (rpm) for an additional 5-10 minutes, and subsequently vacuum filtered through Fisherbrand™ P8 Qualitative-Grade Filter Paper (coarse porosity). After allowing 15 to 30 minutes for the filtration, the filtrate conductivity was measured as 98 μS/cm using a Eutech PCSTestr 35. The filtrate was discarded, and the remaining wet solid was re-suspended in 50 to 100 mL of deionized Milli-Q® water to form a slurry. This slurry was rotary evaporated to dryness, and the resulting solid was ground with a mortar and pestle to obtain 2.73 g of a powder. The powder was charged to a porcelain crucible and calcined for 6 hours at 300° C. The calcined material was cooled down under vacuum and weighed in a glove box under an inert atmosphere to provide 2.4 g of calcined powder.

Example 10-B5. Example of a Non-Azeotroped, Clay-Tetramethylammonium Bromide Composite in the Absence of a Cationic Polymetallate (2.60 Mmol Cation/g Clay)

A Waring® blender was charged with 200 g of the colloidal clay dispersion (5 wt. % clay) prepared according to Example 1, followed by, with stirring, 4 g of tetramethylammonium bromide. The mixture coagulated rapidly, and 100 mL of deionized water was added to enable continued stirring of the mixture. After these additions were performed, the mixture was stirred at a high rate (rpm) for an additional 5-10 minutes, and subsequently vacuum filtered through Fisherbrand™ P8 Qualitative-Grade Filter Paper (coarse porosity). After allowing several hours for the filtration, a 60 g wet cake was obtained. A 30 g sample of this wet cake was re-suspended in 60 mL of deionized Milli-Q® water forming a slurry and rotary evaporated the slurry to dryness. The resulting solid was ground with a mortar and pestle to obtain 2.2 g of a powder. The powder was charged to a porcelain crucible and calcined for 6 hours at 300° C. The calcined material was cooled down under vacuum and weighed in a glove box under an inert atmosphere to provide 2.21 g of calcined powder.

Example 11-B6. Example of a Non-Azeotroped, Clay-Tetramethylammonium Bromide Composite in the Absence of a Cationic Polymetallate (3.38 Mmol Cation/g Clay)

A Waring® blender was charged with 100 g of the colloidal clay dispersion (5 wt. % clay) prepared according to Example 1, followed by, with stirring, 2.6 g of tetramethylammonium bromide. The mixture coagulated rapidly, and 100 mL of deionized water was added to enable continued stirring of the mixture. After these additions were performed, the mixture was stirred at a high rate (rpm) for an additional 5-10 minutes, and subsequently vacuum filtered through Fisherbrand™ P8 Qualitative-Grade Filter Paper (coarse porosity). After allowing 15 to 30 minutes for the filtration, the filtrate was discarded, and the remaining wet solid was re-suspended in 50 to 100 mL of deionized Milli-Q® water to form a slurry. This slurry was rotary evaporated to dryness, and the resulting solid was ground with a mortar and pestle to obtain 3.22 g of a powder. The powder was charged to a porcelain crucible and calcined for 6 hours at 300° C. This calcined material was cooled down under vacuum and weighed in a glove box under an inert atmosphere to provide 2.5 g of calcined powder.

Example 12-B7. Example of a Non-Azeotroped, Clay-Tetramethylammonium Bromide (1 wt. %) Composite in the Absence of a Cationic Polymetallate (4.23 Mmol Cation/g Clay)

A Waring® blender was charged with 100 g of the colloidal clay dispersion (5 wt. % clay) prepared according to Example 1, followed by, with stirring, 3.26 g of tetramethylammonium bromide. The mixture coagulated rapidly, and 100 mL of deionized water was added to enable continued stirring of the mixture. After these additions were performed, the mixture was stirred at a high rate (rpm) for an additional 5-10 minutes, and subsequently vacuum filtered through Fisherbrand™ P8 Qualitative-Grade Filter Paper (coarse porosity). After allowing 15 to 30 minutes for the filtration, the filtrate conductivity was measured as 142 μS/cm using a Eutech PCSTestr 35. The filtrate was discarded, and the remaining wet solid was re-suspended in 50 to 100 mL of deionized Milli-Q® water to form a slurry. This slurry was rotary evaporated to dryness, and the resulting solid was ground with a mortar and pestle to obtain 2.69 g of a powder. The powder was charged to a porcelain crucible and calcined for 6 hours at 300° C. The calcined material was cooled down under vacuum and weighed in a glove box under an inert atmosphere to provide 3.1 g of calcined powder.

Example 13-B8. Example of a Non-Azeotroped, Clay-Tetrabutylammonium Bromide Composite in the Absence of a Cationic Polymetallate (0.62 Mmol Cation/g Clay)

A Waring® blender was charged with 200 g of the colloidal clay dispersion (5 wt. % clay) prepared according to Example 1, followed by, with stirring, 2 g of tetrabutylammonium bromide (1 wt. % relative to dispersion). The mixture coagulated rapidly, and 150 mL of deionized water was added to enable continued stirring of the mixture. After these additions were performed, the mixture was stirred at a high rate (rpm) for an additional 5-10 minutes, and subsequently vacuum filtered through Fisherbrand™ P8 Qualitative-Grade Filter Paper (coarse porosity). After allowing 15 to 30 minutes for the filtration, the filtrate was then discarded, and the remaining wet solid was re-suspended in 50 mL of deionized Milli-Q® water to form a slurry. The slurry conductivity was measured as 105 μS/cm using a Eutech PCSTestr 35. This slurry was rotary evaporated to dryness, and the resulting solid was ground with a mortar and pestle to a uniform powder. A 5.0 g portion of the powder was charged to a porcelain crucible and calcined for 6 hours at 300° C. The calcined material was cooled down under vacuum and weighed in a glove box under an inert atmosphere to provide 3.7 g of calcined powder.

Example 14-B9. Example of a Non-Azeotroped, Clay-2 wt. % Tetrabutylammonium Bromide Composite in the Absence of a Cationic Polymetallate (1.24 Mmol Cation/g Clay)

A Waring® blender was charged with 200 g of the colloidal clay dispersion (5 wt. % clay) prepared according to Example 1, followed by, with stirring, 4 g of tetrabutylammonium bromide. The mixture coagulated rapidly, and 200 mL of deionized water was added to enable continued stirring of the mixture. After these additions were performed, the mixture was stirred at a high rate (rpm) for an additional 5-10 minutes, and subsequently vacuum filtered through Fisherbrand™ P8 Qualitative-Grade Filter Paper (coarse porosity). After allowing 15 to 30 minutes for the filtration, the filtrate's conductivity was measured as 1325 S/cm using a Eutech PCSTestr 35. The filtrate was then discarded, and the remaining wet solid was re-suspended in 50 mL of deionized Milli-Q® water to form a slurry. The slurry conductivity was measured as 350 μS/cm using a Eutech PCSTestr 35. This slurry was rotary evaporated to dryness, and the resulting solid was ground with a mortar and pestle to a uniform powder. A 1.88 g portion of the powder was charged to a porcelain crucible and calcined for 6 hours at 300° C. The calcined material was cooled down under vacuum and weighed in a glove box under an inert atmosphere to provide 1.6 g of calcined powder.

Example 15-B10. Example of a Non-Azeotroped, Clay-3 wt. % Tetrabutylammonium Bromide Composite in the Absence of a Cationic Polymetallate (1.86 Mmol Cation/g Clay)

A Waring® blender was charged with 200 g of the colloidal clay dispersion (5 wt. % clay) prepared according to Example 1, followed by, with stirring, 6 g of tetrabutylammonium bromide. The mixture coagulated rapidly, and 100 mL of deionized water was added to enable continued stirring of the mixture. After these additions were performed, the mixture was stirred at a high rate (rpm) for an additional 5-10 minutes, and subsequently vacuum filtered through Fisherbrand™ P8 Qualitative-Grade Filter Paper (coarse porosity). The filtrate was then discarded, and the remaining wet solid was re-suspended in 50 mL of deionized Milli-Q® water to form a slurry. The slurry conductivity was measured as 700 μS/cm using a Eutech PCSTestr 35. A 40 g portion of this slurry was combined with 50 mL water and rotary evaporated at 50° C. to dryness, and the resulting solid was ground with a mortar and pestle to a uniform powder. A 2.45 g sample of the powder was charged to a porcelain crucible and calcined for 6 hours at 300° C. The calcined material was cooled down under vacuum and weighed in a glove box under an inert atmosphere to deliver 1.8 g of calcined powder.

Example 16-B11. Example of a Non-Azeotroped, Clay-4 wt. % Tetrabutylammonium Bromide Composite in the Absence of a Cationic Polymetallate (2.48 Mmol Cation/g Clay)

A Waring® blender was charged with 200 g of the colloidal clay dispersion (5 wt. % clay) prepared according to Example 1, followed by, with stirring, 8 g of tetrabutylammonium bromide. The mixture coagulated rapidly, and 50 mL of deionized water was added to enable continued stirring of the mixture. After these additions were performed, the mixture was stirred at a high rate (rpm) for an additional 5-10 minutes, and subsequently vacuum filtered through Fisherbrand™ P8 Qualitative-Grade Filter Paper (coarse porosity). The filtrate was then discarded, and the remaining wet solid was collected. A half portion of this material was combined with 50 mL of deionized Milli-Q® water to form a slurry and subsequently rotary evaporated at 50° C. to dryness. The resulting solid was ground with a mortar and pestle to a uniform powder, and a 2.3 g portion of the powder was charged to a porcelain crucible and calcined for 6 hours at 300° C. The calcined material was cooled down under vacuum and weighed in a glove box under an inert atmosphere to provide 1.7 g of calcined powder.

Example 17-B12. Example of a Non-Azeotroped, Clay-2 wt. % Tetraoctylammonium Bromide Composite, Absent a Cationic Polymetallate (0.73 Mmol Cation/g Clay)

A Waring® blender was charged with 200 g of the colloidal clay dispersion (5 wt. % clay) prepared according to Example 1, followed by, with stirring, 4 g of tetraoctylammonium bromide. After this addition was performed, the mixture was stirred at a high rate (rpm) for an additional 5-10 minutes, and subsequently vacuum filtered through Fisherbrand™ P8 Qualitative-Grade Filter Paper (coarse porosity). The filtration took approximately 5 hours. The filtrate was then discarded, and the remaining wet solid was collected and combined with 50 mL of deionized Milli-Q® water and rotary evaporated at 50° C. to dryness, and the resulting solid was ground with a mortar and pestle to a uniform powder. A 5.0 g portion of the powder was charged to a porcelain crucible and calcined for 6 hours at 300° C. The calcined material was cooled down under vacuum and weighed in a glove box under an inert atmosphere to form 3.8 g of calcined powder.

Example 18-B13. Example of a Non-Azeotroped, Clay-3 wt. % Tetraoctylammonium Bromide Composite, Absent a Cationic Polymetallate (1.10 Mmol Cation/g Clay)

A Waring® blender was charged with 100 g of the colloidal clay dispersion (5 wt. % clay) prepared according to Example 1, followed by, with stirring, 3 g of tetraoctylammonium bromide. After this addition was performed, the mixture was stirred at a high rate (rpm) for an additional 5-10 minutes, and subsequently vacuum filtered through Fisherbrand™ P8 Qualitative-Grade Filter Paper (coarse porosity). The filtration was carried out overnight. The filtrate was then discarded, the remaining wet solid was collected and combined with 100 mL of deionized Milli-Q® water, and the slurry was rotary evaporated at 50° C. to dryness. The resulting solid was ground with a mortar and pestle to a uniform powder. A 3.8 g sample of this powder was charged to a porcelain crucible and calcined for 6 hours at 300° C. The calcined material was cooled down under vacuum and weighed in a glove box under an inert atmosphere to provide 2.7 g of calcined powder.

Example 19-B14. Example of a Non-Azeotroped, Clay-4 wt. % Tetraoctylammonium Bromide Composite, Absent a Cationic Polymetallate (1.46 Mmol Cation/g Clay)

A Waring® blender was charged with 100 g of the colloidal clay dispersion (5 wt. % clay) prepared according to Example 1, followed by, with stirring, 4 g of tetraoctylammonium bromide. After this addition was performed, the mixture was stirred at a high rate (rpm) for an additional 5-10 minutes, and subsequently vacuum filtered through Fisherbrand™ P8 Qualitative-Grade Filter Paper (coarse porosity). The filtration was carried out overnight. The filtrate was then discarded, and the remaining wet solid was collected and combined with 100 mL of deionized Milli-Q® water and allowed to dry in air for a week. The resulting solid was ground with a mortar and pestle to a uniform powder. A 4.7 g sample of the powder was charged to a porcelain crucible and calcined for 6 hours at 300° C. The calcined material was cooled down under vacuum and weighed in a glove box under an inert atmosphere to provide 2.5 g of calcined powder.

Example 20-D1. Comparative Example of a Large-Scale Preparation and Spray Drying of a Clay-Aluminum Chlorohydrate (ACH) Heteroadduct Wet Cake A 5 wt. % dispersion of HPM-20 in deionized water was prepared, and a 600 g portion of this dispersion was added, with stirring, to 9.885 g 50% aluminum chlorohydrate (ACH) solution (GEO). The mixture coagulated rapidly, and 50-100 mL of deionized water was added to enable continued stirring of the mixture. After these additions were performed, the mixture was stirred at a high rate (rpm) for an additional 5-10 minutes and subsequently vacuum filtered through Fisherbrand™ P8 Qualitative-Grade Filter Paper (coarse porosity) while 100 mL of deionized water was added to the suspension during filtration. After allowing 15 to 30 minutes for the filtration, the filtrate was discarded, and the remaining wet solid was collected and weighed. A total of 180 g wet cake of approximately 16.7 wt. % clay was collected.

A 60 g portion of this wet cake was added to 141 g of deionized water along with a stir bar in a 250 mL flask, which was sealed with a septum and stopper. This mixture was stirred at 1200 rpm for approximately 24 hours, after which 100 g of the slurry was removed, and 25 mL of deionized water was added to the slurry remaining in the flask to enable stirring. This remaining mixture was then spray dried using a Mini Spray Dryer B-290 at the following settings: inlet temperature 170-180° C.; $N_2$ gas flow 25 mmHg; pump strength 17%. Spray drying was continued until 2.6 g of powdered product was obtained. A 1.1 g sample of the powder was charged to a porcelain crucible and calcined for 6 hours at 300° C. The calcined material was cooled down under vacuum and weighed in a glove box under an inert atmosphere to deliver 0.9 g of calcined powder.

Example 21-E1. Example of a Large-Scale Preparation and Spray Drying of a Clay-Tetramethylammonium Bromide Composite Wet Cake, Absent a Cationic Polymetallate A 355 g sample of a 5 wt. % dispersion of HPM-20 in deionized water was prepared and stirred, and 9.25 g of tetramethylammonium bromide solid was added to the stirred slurry. The mixture coagulated rapidly, and 50-100 mL of deionized water was added to enable continued stirring of the mixture. After these additions were performed, the mixture was stirred at a high rate (rpm) for an additional 5-10 minutes, and subsequently vacuum filtered through Fisherbrand™ P8 Qualitative-Grade Filter Paper (coarse porosity) while 100 mL of deionized water was added to the suspension. After allowing 15 to 30 minutes for the filtration, the filtrate was discarded, and the remaining wet solid was collected and weighed. A total of 189 g wet cake of approximately 9.2 wt. % clay was collected.

A 42.7 g portion of this wet cake was added to 77.8 g deionized water along with a stir bar to a 250 mL flask, which was sealed with a septum and stopper. The mixture was stirred at 1500 rpm for approximately 24 hours, after which another 165 g deionized water was added. This mixture was then spray dried on a Mini Spray Dryer B-290 at the following settings: inlet temperature 170° C., $N_2$ gas flow 25 mmHg; pump strength 13%. Spray drying was continued until 2.4 g of powdered product was obtained. A 900 mg portion of the powder was charged to a porcelain crucible and calcined for 6 hours at 300° C. The calcined material was cooled down under vacuum and weighed in a glove box under an inert atmosphere to provide 600 mg of calcined product.

Example 22-E2. Example of a Large-Scale Preparation and Spray Drying of a Clay-Tetrabutylammonium Bromide Composite Wet Cake, Absent a Cationic Polymetallate A 600 g sample of a 5 wt. % dispersion of HPM-20 in deionized water was prepared and stirred, and 12 g tetrabutylammonium bromide solid was added to the stirred slurry. The mixture coagulated rapidly, and 50-100 mL of deionized water was added to enable continued stirring of the mixture. After these additions were performed, the mixture was stirred at a high rate (rpm) for an additional 5-10 minutes, and subsequently vacuum filtered through Fisherbrand™ P8 Qualitative-Grade Filter Paper (coarse porosity). After 15 to 30 minutes, the mixture was gravity filtered overnight. The remaining wet solid was then collected and weighed, and a total of 180 g wet cake of approximately 31.2 wt. % clay was collected.

A 14.2 g sample of this wet cake was added to 120 g deionized water along with a stir bar to a 250 mL flask, which was sealed with a septum and stopper. The mixture was then stirred at 1200 rpm for approximately 24 hours. This mixture was then spray dried using a Mini Spray Dryer B-290 at the following settings: inlet temperature 170° C.; $N_2$ gas flow 25-30 mmHg; pump strength 14-15%. Spray drying was continued until 2.1 g of powdered product was obtained. A 900 mg sample of the powder was charged to a porcelain crucible and calcined for 6 hours at 300° C. The calcined material was cooled down under vacuum and weighed in a glove box under an inert atmosphere to provide 0.7 g of calcined powder.

Example 23-E3. Example of the Preparation and Spray-Drying of a Clay-Aluminum Chlorohydrate (ACH)-Tetrabutyl Ammonium Bromide Composite by Adding the Surfactant to the Spray-Drying Feed A Waring® blender was charged with 800 g of the colloidal clay dispersion (5 wt. % clay) prepared according to Example 1, followed by, with stirring, 13.18 g of 50% aluminum chlorhydrate solution (GEO). The mixture coagulated rapidly, and 200 mL Milli-Q® deionized water was added to enable continued stirring of the mixture. After these additions were performed, the mixture was stirred at a high rate (rpm) for an additional 5-10 minutes, and subsequently vacuum filtered through Fisherbrand™ P8 Qualitative-Grade Filter Paper (coarse porosity), and washed with 500 mL of Milli-Q® deionized water. The filtrate was then discarded, and the remaining 258 g of wet solid was collected.

A 40 g portion of this wet solid was combined with 154 g of Milli-Q® deionized water and 4 g of tetrabutylammonium bromide, and this mixture was agitated vigorously. The mixture was then spray dried using a Mini Spray Dryer B-290 at the following settings: inlet temperature 140° C.; gas flow 30 mmHg; aspirator strength 80%; pump strength 20%. The inlet temperature was gradually raised to 200° C. over the course of the spray drying, while the gas flow was lowered to 20 mmHg. Spray drying was continued until 900 mg of powdered product was obtained. A 900 mg sample of the powder was charged to a porcelain crucible and calcined for 6 hours at 300° C. The calcined material was cooled down under vacuum and weighed in a glove box under an inert atmosphere to provide 480 mg of calcined powder.

Example 24-E4. Example of the Preparation and Spray-Drying of a Clay-Aluminum Chlorohydrate (ACH)-Tetraoctyl Ammonium Bromide Composite by Adding the Surfactant to the Spray-Drying Feed A Waring® blender was charged with 800 g of the colloidal clay dispersion (5 wt. % clay) prepared according to Example 1, followed by, with stirring, 13.18 g of 50% aluminum chlorhydrate solution (GEO). The mixture coagulated rapidly, and 200 mL Milli-Q® deionized water was added to enable continued stirring of the mixture. After these additions were performed, the mixture was stirred at a high rate (rpm) for an additional 5-10 minutes, and subsequently vacuum filtered through Fisherbrand™ P8 Qualitative-Grade Filter Paper (coarse porosity) and washed with 500 mL of Milli-Q® deionized water. The filtrate was then discarded, and the remaining 258 g of wet solid was collected.

A 40 g portion of this wet solid was combined with 154 g of Milli-Q® deionized water and 4 g tetraoctylammonium bromide, and this mixture was agitated vigorously. The mixture was then spray dried using a Mini Spray Dryer B-290 at the following settings: inlet temperature 220° C.; gas flow 40 mmHg; aspirator strength 100%. An additional 90 g of water was added to the spray drying slurry during the process. Spray drying was continued until 1100 mg of powdered product was obtained. This product was calcined, and the BJH measurements were taken on the calcined product.

Example 25. Example of a Non-Azeotroped, Clay-Dodecyltrimethylammonium Bromide (1.91 Wt. %) Composite in the Absence of a Cationic Polymetallate (1.24 Mmol Cation/g Clay)

With stirring, 30 g of Volclay® HPM-20 clay was added slowly over the course of 1 to 2 minutes into a Waring® blender containing 570 g of deionized Milli-Q® water while stirring at low speed to afford a grey colloidal dispersion containing no or substantially no visible lumps or clumps. After the addition was complete, the dispersion was blended at high speed for 5 to 10 minutes to obtain a slightly viscous mixture of 5 wt. % aqueous dispersion of HPM-20 clay.

A 100 g portion of this 5 wt. % aqueous dispersion of HPM-20 clay was transferred into a Waring® blender, and 1.91 g of dodecyltrimethylammonium bromide was added all at once to the dispersion. Immediate coagulation was observed, and 100 g of deionized Milli-Q® water was added to improve blending. The mixture was filtered over 15-30 minutes, and an additional 100 g of deionized Milli-Q® water was added during the filtration. The mixture was dried on a rotovap at 50-60° C., and the resulting solid was then ground with a mortar and pestle to obtain 5.5 g of a light grey powder. The entirety of this solid was transferred to a porcelain crucible and calcined for 6 hours at 300° C. to afford 4.0 g of a grey-black powder of the calcined product.

Example 26. Example of a Non-Azeotroped, Clay-Dodecylammonium Bromide (1.65 wt. %) Composite in the Absence of a Cationic Polymetallate (1.24 Mmol Cation/g Clay)

With stirring, 30 g of Volclay® HPM-20 clay was added slowly over the course of 1 to 2 minutes into a Waring® blender containing 570 g of deionized Milli-Q® water while stirring at low speed to afford a grey colloidal dispersion containing no or substantially no visible lumps or clumps. After the addition was complete, the dispersion was blended at high speed for 5 to 10 minutes to obtain a slightly viscous mixture of 5 wt. % aqueous dispersion of HPM-20 clay.

A 100 g portion of this 5 wt. % aqueous dispersion of HPM-20 clay was transferred into a Waring® blender, and 1.65 g of dodecylammonium bromide was added all at once to the dispersion. Immediate coagulation was observed, and 70 g of deionized Milli-Q® water was added to improve blending. The mixture was filtered over 15-30 minutes, and an additional 100 g of deionized Milli-Q® water was added during the filtration. The mixture was dried on a rotovap at 50-60° C., and the resulting solid was then ground with a mortar and pestle to obtain 5.27 g of a light grey powder. The entirety of this solid was transferred to a porcelain crucible and calcined for 6 hours at 300° C. to afford 4.0 g of a grey-black powder.

Example 27. Example of a Non-Azeotroped, Clay-Decyltrimethylammonium Bromide (1.74 Wt. %) Composite in the Absence of a Cationic Polymetallate (1.24 Mmol Cation/g Clay)

With stirring, 30 g of Volclay® HPM-20 clay was added slowly over the course of 1 to 2 minutes into a Waring® blender containing 570 g of deionized Milli-Q® water while stirring at low speed to afford a grey colloidal dispersion containing no or substantially no visible lumps or clumps. After the addition was complete, the dispersion was blended at high speed for 5 to 10 minutes to obtain a slightly viscous mixture of 5 wt. % aqueous dispersion of HPM-20 clay.

A 100 g portion of this 5 wt. % aqueous dispersion of HPM-20 clay was transferred into a Waring® blender, and 1.74 g of decyltrimethylammonium bromide was added all at once to the dispersion. Immediate coagulation was observed, and 100 g of deionized Milli-Q® water was added to improve blending. The mixture was filtered over 15-30 minutes, and an additional 100 g of deionized Milli-Q® water was added during the filtration. The mixture was dried on a rotoary evaporator (rotovap) at 50-60° C., and the resulting solid was then ground with a mortar and pestle to obtain 7.7 g of a light grey powder. The entirety of this solid was transferred to a porcelain crucible and calcined for 6 hours at 300° C. to afford 3.3 g of a grey-black powder.

Example 28-C1. Comparative Example of a Non-Azeotroped, Clay-Ammonium Bromide Composition (1.24 Mmol Cation/g Clay)

With stirring, 30 g of Volclay® HPM-20 clay was added slowly over the course of 1 to 2 minutes into a Waring® blender containing 570 g of deionized Milli-Q® water while stirring at low speed to afford a grey colloidal dispersion containing no or substantially no visible lumps or clumps. After the addition was complete, the dispersion was blended at high speed for 5 to 10 minutes to obtain a slightly viscous mixture of 5 wt. % aqueous dispersion of HPM-20 clay.

A 100 g portion of this 5 wt. % aqueous dispersion of HPM-20 clay was transferred into a Waring® blender, and 607 mg of ammonium bromide was added all at once to the dispersion. No significant coagulation was observed. This mixture was dried on a rotovap at 50° C., and the resulting solid was then ground with a mortar and pestle to obtain 1.86 g of a light grey powder. The entirety of this solid was transferred to a porcelain crucible and calcined for 6 hours at 300° C. to afford 1.6 g of a grey-black powder.

Example 29-C2. Comparative Example of a Non-Azeotroped, Clay-Ammonium Bromide Composition (2.48 Mmol Cation/g Clay)

With stirring, 30 g of Volclay® HPM-20 clay was added slowly over the course of 1 to 2 minutes into a Waring® blender containing 570 g of deionized Milli-Q® water while stirring at low speed to afford a grey colloidal dispersion containing no or substantially no visible lumps or clumps. After the addition was complete, the dispersion was blended at high speed for 5 to 10 minutes to obtain a slightly viscous mixture of 5 wt. % aqueous dispersion of HPM-20 clay.

A 100 g portion of this 5 wt. % aqueous dispersion of HPM-20 clay was transferred into a Waring® blender, and 1214 mg of ammonium bromide was added all at once to the dispersion. No significant coagulation was observed. This mixture was dried on a rotovap at 50° C., and the resulting solid was then ground with a pestle and mortar to obtain 1.86 g of a light grey powder. The entirety of this solid was transferred to a porcelain crucible and calcined for 6 hours at 300° C. to afford 1.6 g of a grey-black powder.

Example 30-E2. Large-Scale Preparation and Non-Azeotroped Drying of a Clay-Tetrabutylammonium Bromide Composite Wet Cake, Absent a Cationic Polymetallate A 10 kg sample of a 5 wt. % dispersion of HPM-20 in deionized water was prepared and stirred, and 200 g tetrabutylammonium bromide solid was added to the stirred slurry. The mixture was stirred using a drill with paint mixer attachment, and allowed to coagulate overnight. The slurry was filtered in 2 liter batches using a Buchner funnel and partial vacuum filtration to produce a wet cake. A 5.5 kg portion of this wet cake was combined with 11 liters of water, and refiltered. An 8.2 g portion of this wet cake was taken and dried through rotary evaporation to produce 1.96 g of material which was ground in a pestle and mortar, and subsequently calcined for 7 hours at 300° C. to afford 1.6 g of a black powder.

Example 31. General Large-Scale Preparation and Spray Drying of a Clay-Tetrabutylammonium Bromide Composite, Absent a Cationic Polymetallate A 10 kg sample of a 5 wt. % dispersion of HPM-20 in deionized water was prepared and stirred, and 200 g tetrabutylammonium bromide solid was added to the stirred slurry. The mixture was stirred using a drill with paint mixer attachment and allowed to coagulate overnight. The slurry was then filtered in 2 liter batches using a Buchner funnel and partial vacuum filtration to produce a wet cake.

Portions of this wetcake were added to deionized water and then stirred at low shear for several minutes to disperse the clay in the water. After this, the mixture was pressure homogenized at around 800 to 1200 psi, with the end product mixture having a solids content of about 3 wt % to 6 wt %. This feed was introduced to a spray dryer using a rotary atomizer, with the following settings: drying $N_2$ gas flow rate 100 kg/hr; inlet temperature 220° C.; rotary atomizer speed was selected in the range of 17,000-35,000 RPM; feed rate was selected in the range of 4.5-6.0 kg/hr. Approximately 150 to 390 g of spray-dried powder were obtained from multiple spray drying runs under the stated conditions.

Example 32. General Large-Scale Preparation and Spray Drying of a Clay-Tetrabutylammonium Bromide Composite, Absent a Cationic Polymetallate A 10 kg sample of a 5 wt. % dispersion of HPM-20 in deionized water was prepared and stirred, and 200 g tetrabutylammonium bromide solid was added to the stirred slurry. The mixture was stirred using a drill with paint mixer attachment and allowed to coagulate overnight. The slurry was then filtered in 2 liter batches using a Buchner funnel and partial vacuum filtration to produce a wet cake.

Portions of this wetcake were added to deionized water and then stirred at low shear for several minutes to disperse the clay in the water. After this, the mixture was pressure homogenized at around 800 to 1200 psi, with the end product mixture having a solids content of about 3 wt % to 6 wt %. This feed was introduced to a spray dryer using a rotary atomizer, with the following settings: drying $N_2$ gas flow rate, 100 kg/hr; inlet temperature 220° C.; rotary atomizer speed was selected in the range of 30,000-35,000 RPM; feed rate was selected in the range of 5.4-5.5 kg/hr. Approximately 120 g to 150 g of spray-dried powder were obtained from multiple spray drying runs under the stated conditions.

Example 33. Preparation of a 19 μm (Micron) to 37 μm Sieved Fraction of a Spray-Dried Clay-Tetrabutylammonium Bromide Heteroadduct and Co-Polymer Prepared Therefrom A clay-tetrabutylammonium bromide composite was prepared in the absence of a cationic polymetallate, and subsequently spray dried, according to Example 31. Into a Gilson 8" Economy Sieve Shaker were placed sieves having 74 micron, 50 micron, 37 micron, and 19 micron openings, as well a pan to collect residual material. A 17 g sample of the spray-dried clay-tetrabutylammonium bromide heteroadduct prepared according to Example 31 was added to the 74 micron sieve. After 45 minutes of shaking, the material on the sieve with 19 micron openings was collected, yielding 0.700 of a powder. This 19-37 μm sample was used to prepare a polymerization catalyst, which was then used to prepare an ethylene-1-hexene copolymer as described herein in the Catalyst Preparation and Polymerization Reactions sections of the Examples. The resulting polymer was characterized as shown in Table 7.

Example 34. Preparation of a 37 μm (Micron) to 50 μm Sieved Fraction of a Spray-Dried Clay-Tetrabutylammonium Bromide Heteroadduct and Co-Polymer Prepared Therefrom A clay-tetrabutylammonium bromide composite was prepared in the absence of a cationic polymetallate, and subsequently spray dried, according to Example 31. Into a Gilson 8" Economy Sieve Shaker were placed sieves having 74 micron, 50 micron, 37 micron, and 19 micron openings, as well a pan to collect residual material. A 17 g sample of the spray-dried clay-tetrabutylammonium bromide heteroadduct prepared according to Example 31 was added to the 74 micron sieve. After 45 minutes of shaking, the material on the sieve with 37 micron openings was collected, yielding 12.77 of a powder. This 37-50 μm sample was used to prepare a polymerization catalyst, which was then used to prepare an ethylene-1-hexene copolymer as described herein in the Catalyst Preparation and Polymerization Reactions sections of the Examples. The resulting polymer was characterized as shown in Table 7.

Example 35. Preparation of a 50 μm (Micron) to 74 μm Sieved Fraction of a Spray-Dried Clay-Tetrabutylammonium Bromide Heteroadduct and Co-Polymer Prepared Therefrom A clay-tetrabutylammonium bromide composite was prepared in the absence of a cationic polymetallate, and subsequently spray dried, according to Example 31. Into a Gilson 8" Economy Sieve Shaker were placed sieves having 74 micron, 50 micron, 37 micron, and 19 micron openings, as well a pan to collect residual material. A 17 g sample of the spray-dried clay-tetrabutylammonium bromide heteroadduct prepared according to Example 31 was added to the 74 micron sieve. After 45 minutes of shaking, the material on the sieve with 50 micron openings was collected, yielding 3.29 of a powder. This 50-74 μm sample was used to prepare a polymerization catalyst, which was then used to prepare an ethylene-1-hexene copolymer as described herein in the Catalyst Preparation and Polymerization Reactions sections of the Examples. The resulting polymer was characterized as shown in Table 7.

Additional Examples

Table 8 illustrates some actual or constructive examples of components that can be selected and used to prepare the clay composite support-activator, and additional components that can be selected and used in combination with the support-activator to generate the olefin polymerization catalyst. Any one or more than one of the compounds or compositions set out in each component listing can be selected independently of any other compound or composition set out in any other component listing. For example, this table discloses that any one or more than one of Component 1, any one or more than one of Component 2, optionally any one or more than one of Component A, and optionally any one or more than one of Component B, can be selected independently of each other and combined or contacted in any order to provide the heterocoagulated clay support-activator, as disclosed herein. Any one or more than one of Component 3 (metallocene), optionally any one or more than one of Component C, and optionally any one or more than one of Component D, can be selected independently of each other and combined or contacted in any order with each other and the heterocoagulated clay support-activator to provide an olefin polymerization catalyst, as disclosed herein.

TABLE 8

Actual and constructive examples of components that can be selected independently and used to prepare a clay composite support-activator and an olefin polymerization catalyst.

| Component 1<br>Colloidal smectite clay | Component 2<br>Surfactants | Optional Component A<br>Metal oxide | Optional Component B<br>Cationic polymetallate |
|---|---|---|---|
| Montmorillonite | Cationic surfactants (alkyl ammonium compounds) | Fumed silica | Aluminum chlorohydrate |
| Sauconite | | Fumed alumina | Aluminum sesquichlorohydrate |
| Nontronite | Nonionic surfactants (polyglycol ethers, ethoxylates) | Fumed silica-alumina | Polyaluminum chloride |
| Hectorite | | Metal oxide sols (silica, alumina, silica-alumina) | Combinations thereof |
| Beidellite | Amphoteric surfactants | Combinations thereof | |
| Saponite | (betaines, amino acids, amine-N-oxides) | | |
| Bentonite | Combinations thereof | | |
| Combinations thereof | | | |

Component 1 + Component 2 +
Optionally, Component A + Optionally, Component B
⬇
Clay Composite Support-Activator

| Clay Composite<br>Support-Activator | Component 3<br>Metallocene | Optional Component C<br>Co-Catalyst | Optional Component D<br>Co-Activator |
|---|---|---|---|
| From above | 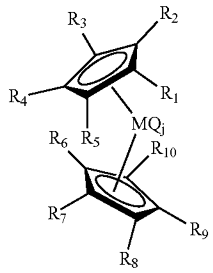 | Alkylaluminum compounds (TEA, TnOA, TiBA)<br>Organozinc/ organomagnesium compounds<br>Organolithium compounds<br>Alkylboron compounds<br>Hydriding agents ($LiAlH_4$, $NaBH_4$)<br>Combinations thereof | Aluminoxanes (MAO, EAO)<br>Alkylammonium tetrafluoroborates<br>Solid oxides<br>Organoborons (alkylborons, fluoroborate salts)<br>Fluorided/chloride/sulfated aluminas<br>Fluorided/sulfated/chlorided silica-aluminas<br>Combinations thereof |
| | 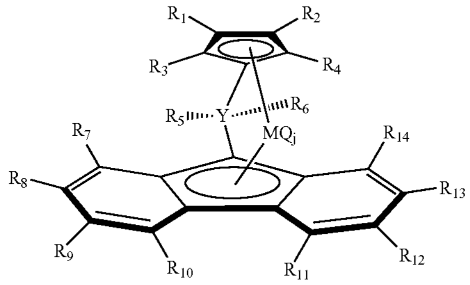 | | |
| | 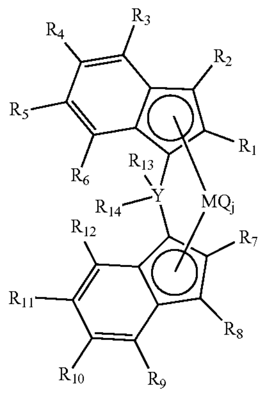 | | |

TABLE 8-continued

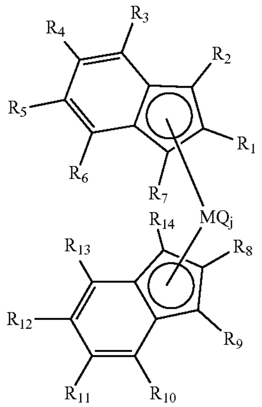

(and rac isomers)
$R_1$-$R_{12}$ = H, hydrocarbyl group, Si-containing hydrocarbyl;
Y = carbon or silicon;
M = group 4 metal;
Q = halogen, hydrocarbyl, hydrocarbyl, Si-containing hydrocarbyl;
J = integer from 1 to 4, inclusive
Combinations thereof Clay Composite Support-Activator + Component 3 + Optionally, Component C + Optionally, Component D
⬇
Olefin Polymerization Catalyst In Table 8, certain abbreviations are used which will be understood by the person of ordinary skill, such as TEA (triethylaluminum), TnOA (tri-n-octylaluminum), TiBA (triisobutylaluminum), MAO (methylaluminoxane), EAO (ethylaluminoxane), and the like. Unless otherwise specified, groups such as "hydrocarbyl" or "Si-containing hydrocarbyl" groups may be considered to have from 1 to about 12 carbons, such as for example, methyl, n-propyl, phenyl, trimethylsilylmethyl, neopentyl, and the like. In Table 8, each group or substituent is selected independently of any other group of substituent. Therefore, each "R" substituent is selected independently of any other R substituent, each "Q" group is selected independently of any other Q group, and the like.

Also with respect to Table 8, the co-catalyst component is referred to as optional (Optional Component C), and includes alkylating agents, hydriding agents and the like. A co-catalyst component such as those listed is typically used in the formation of the polymerization catalyst because the metallocene is commonly halide-substituted and the co-catalyst can provide a polymerization-activatable/initiating ligand such as methyl or hydride.

The invention according to this disclosure is described herein with reference to numerous aspects, features, embodiments, and specific examples, and many variations will suggest themselves to those skilled in the art in light of the Detailed Description. These and other aspects of the disclosure can further include, but are not limited to, the various statements, embodiments, and aspects that are presented below. Many of these numbered statements are described as "comprising" certain components or steps, but alternatively, can "consist essentially of" or "consist of" those components or steps unless stated otherwise.

ASPECTS OF THE DISCLOSURE

Aspect 1. A support-activator comprising a smectite heteroadduct, the smectite heteroadduct comprising or consisting essentially of a contact product in a first liquid carrier of:

(a) a colloidal smectite clay; and
(b) a surfactant, wherein the surfactant comprises or is selected from a cationic surfactant, a nonionic surfactant, an amphoteric surfactant, or any combination thereof to provide a slurry of the smectite heteroadduct in the first liquid carrier;

wherein the contact product occurs or is: [i] in the absence of: [A] a cationic polymetallate; [B] a non-layered silicate, a soluble silicate (for example, sodium silicate), a charged inorganic component, a metal oxide, an organic amide, an anionic surfactant, an inorganic acid, an organic acid, an inorganic base, an organic base, an oxidizing agent, or any combination thereof; [C] any one or any two of a cationic surfactant, a nonionic surfactant, or an amphoteric surfactant; or [D] any combination thereof; or [ii] in the absence of any other cationic reactant, except for cationic surfactant when present; or [iii] in the absence of any other reactant, except for the surfactant.

Aspect 2. A support-activator comprising a smectite heteroadduct, the smectite heteroadduct comprising or consisting essentially of a contact product in a first liquid carrier of:

(a) a colloidal smectite clay; and
(b) a surfactant comprising or selected from a cationic surfactant, a nonionic surfactant, an amphoteric surfactant, or any combination thereof;

wherein the first liquid carrier consists essentially of water, an organic liquid, or a combination thereof.

Aspect 3. A support-activator comprising a smectite heteroadduct, the smectite heteroadduct comprising or consisting essentially of a contact product in a first liquid carrier of:

(a) a colloidal smectite clay;
(b) a cationic polymetallate; and
(c) a surfactant comprising or selected from a cationic surfactant, a nonionic surfactant, an amphoteric surfactant, or any combination thereof.

Aspect 4. The support-activator according to Aspect 3, wherein the contact product occurs or is: [i] in the absence of: [A] a non-layered silicate, a soluble silicate (for example, sodium silicate), a charged inorganic component, a metal oxide, an organic amide, an anionic surfactant, an inorganic acid, an organic acid, an inorganic base, an organic base, an oxidizing agent, or any combination thereof; [B] any one or any two of a cationic surfactant, a nonionic surfactant, or an amphoteric surfactant; or [C] any combination thereof; [ii] in the absence of any other cationic reactant, except for the cationic polymetallate and the cationic surfactant when present; or [iii] in the absence of any other reactant, except for the cationic polymetallate and the surfactant.

Aspect 5. The support-activator according to any of the preceding Aspects, wherein the contact product comprises a slurry of the smectite heteroadduct in the first liquid carrier.

Aspect 6. The support-activator according to any of the preceding Aspects, wherein the contact product comprises a slurry of the smectite heteroadduct in the first liquid carrier from which the smectite heteroadduct is readily filterable according to the following criteria:

(i) when filtration of a 2.0 wt. % aqueous slurry of the smectite heteroadduct is initiated from 0 hours to 2 hours after the colloidal smectite clay and the surfactant form the contact product, the proportion of a filtrate obtained at a filtration time of from 2 hours to 12 hours using either vacuum filtration or gravity filtration, based upon the weight of the first liquid carrier in the slurry of the smectite heteroadduct is in a range of (A) from about 30% to about 100% by weight of the first liquid carrier in the slurry before filtration, that is, of the initial slurry water weight, (B) from about 40% to about 100% by weight of the first liquid carrier in the slurry, (C) from about 50% to about 100% by weight of the first liquid carrier in the slurry, or (D) from about 60% to about 100% by weight of the first liquid carrier in the slurry before filtration; and
(ii) the filtrate from the heteroadduct slurry, when evaporated, yields clay solids comprising less than 20%, less than 15%, or less than 10% of the initial combined weight of the smectite clay and the surfactant.

Aspect 7. The support-activator according to any of the preceding Aspects, wherein the smectite heteroadduct is isolated from the first liquid carrier.

Aspect 8. The support-activator according to any of the preceding Aspects, wherein the smectite heteroadduct, upon calcination, provides the support-activator which imparts activity to a polymerization catalyst.

Aspect 9. The support-activator according to any of the preceding Aspects, wherein the smectite heteroadduct is spray-dryable from a suspension of the smectite heteroadduct in a dispersion medium.

Aspect 10. The support-activator according to any of the preceding Aspects, wherein the smectite heteroadduct further comprises the contact product of an anionic surfactant.

Aspect 11. The support-activator according to any of the preceding Aspects, wherein the smectite heteroadduct is spray-dryable from a suspension of the smectite heteroadduct in a dispersion medium to provide the support-activator in particulate form which, following calcination, is characterized by any one of, or any combination of, the following properties:

(i) the smectite heteroadduct has an average particle sphericity of 0.65 or greater;
(ii) the smectite heteroadduct has an average particle roundness of 0.65 or greater; and
(iii) the smectite heteroadduct has an average particle circularity of 0.65 or greater.

Aspect 12. A catalyst system for olefin polymerization, the catalyst system comprising:

(a) at least one metallocene compound;
(b) at least one support-activator according to any of the preceding Aspects.

Aspect 13. The catalyst system according to Aspect 12, wherein the catalyst system further comprises:

(c) at least one co-catalyst;
(d) at least one co-activator; or a combination thereof.

Aspect 14. The catalyst system according to any of Aspects 12-13, wherein the catalyst system further comprises a fluid carrier.

Aspect 15. A method of making a support-activator comprising a smectite heteroadduct, the method comprising or consisting essentially of contacting in a first liquid carrier:

(a) a colloidal smectite clay; and
(b) a surfactant, wherein the surfactant comprises or is selected from a cationic surfactant, a nonionic surfactant, an amphoteric surfactant, or any combination thereof to provide a slurry of the smectite heteroadduct in the first liquid carrier;

wherein the contacting step occurs: [i] in the absence of: [A] a cationic polymetallate; [B] a non-layered silicate, a soluble silicate (for example, sodium silicate), a charged inorganic component, a metal oxide, an organic amide, an anionic surfactant, an inorganic acid, an organic acid, an inorganic base, an organic base, an oxidizing agent, or any combination thereof; [C] any one or any two of a cationic surfactant, a nonionic surfactant, or an amphoteric surfactant; or [D] any other combination thereof; [ii] in the absence of any other cationic reactant, except for cationic surfactant when present; or [iii] in the absence of any other reactant, except for the surfactant.

Aspect 16. A method of making a support-activator comprising a smectite heteroadduct, the method comprising contacting in a first liquid carrier:

(a) a colloidal smectite clay; and
(b) a surfactant, wherein the surfactant comprises or is selected from a cationic surfactant, a nonionic surfactant, an amphoteric surfactant, or any combination thereof to provide a slurry of the smectite heteroadduct in the first liquid carrier;

wherein the first liquid carrier consists essentially of water, an organic liquid, or a combination thereof.

Aspect 17. A method of making a support-activator comprising a smectite heteroadduct, the method comprising or consisting essentially of contacting in any order in a first liquid carrier:

(a) a colloidal smectite clay;
(b) a cationic polymetallate; and
(c) a surfactant comprising or selected from a cationic surfactant, a nonionic surfactant, an amphoteric surfactant, or any combination thereof, to provide a slurry of the smectite heteroadduct in the first liquid carrier.

Aspect 18. The method of making a support-activator according to Aspect 17, wherein the step of contacting the colloidal smectite clay, the cationic polymetallate, and the surfactant comprises:

(a) adding the surfactant and adding the cationic polymetallate, simultaneously or in any order, to a mixture of the colloidal smectite clay in the first liquid carrier; or (b)(1) adding the cationic polymetallate to a mixture of the colloidal smectite clay in the first liquid carrier to form a smectite-cationic polymetallate heteroadduct, (2) isolating the smectite-cationic polymetallate heteroadduct, and (3) re-suspending the smectite-cationic polymetallate heteroadduct in a dispersion medium into which the surfactant is added before, after, or during the re-suspending step.

Aspect 19. The method of making a support-activator according to any of Aspects 15-18, wherein the contacting step further comprises contacting the colloidal smectite clay or the smectite heteroadduct with an anionic surfactant, before, during, or after the colloidal smectite clay is contacted with the cationic surfactant, the nonionic surfactant, the amphoteric surfactant, or the combination thereof.

Aspect 20. The method of making a support-activator according to any of Aspects 17-19, wherein the contacting step occurs: [i] in the absence of: [A] a non-layered silicate, a soluble silicate (for example, sodium silicate), a charged inorganic component, a metal oxide, an organic amide, an anionic surfactant, an inorganic acid, an organic acid, an inorganic base, an organic base, an oxidizing agent, or any combination thereof; [B] any one or any two of a cationic surfactant, a nonionic surfactant, or an amphoteric surfactant; or [C] any combination thereof; [ii] in the absence of any other cationic reactant, except for the cationic polymetallate and the cationic surfactant when present; or [iii] in the absence of any other reactant, except for the cationic polymetallate and the surfactant.

Aspect 21. The method of making a support-activator according to any of Aspects 15-20, wherein the step of contacting the colloidal smectite clay with the surfactant and/or the cationic polymetallate occurs under high shear conditions.

Aspect 22. The method of making a support-activator according to any of Aspects 15-21, wherein the step of contacting the colloidal smectite clay with the surfactant and/or the cationic polymetallate occurs at a temperature of:

(i) from about 5° C. to about 90° C., from about 10° C. to about 50° C., or from about 15° C. to about 30° C.; or (ii) about 5° C., about 10° C., about 15° C., about 20° C., about 25° C., about 30° C., about 35° C., about 40° C., about 45° C., about 50° C., about 55° C., about 60° C., about 65° C., about 70° C., about 75° C., about 80° C., about 85° C., about 90° C., or any ranges between any of these temperatures.

Aspect 23. The method of making a support-activator according to any of Aspects 15-22, wherein the step of contacting the colloidal smectite clay and the surfactant comprises:

the addition of the surfactant in solid or neat liquid form to a mixture of the colloidal smectite clay in the first liquid carrier; or the addition of a solution or a slurry of the surfactant to a mixture of the colloidal smectite clay in the first liquid carrier.

Aspect 24. The method of making a support-activator according to any of Aspects 15-23, wherein the smectite heteroadduct is readily filterable from the slurry according to the following criteria:

(i) when filtration of a 2.0 wt. % aqueous slurry of the smectite heteroadduct is initiated from 0 hours to 2 hours after the colloidal smectite clay and the surfactant form the contact product, the proportion of a filtrate obtained at a filtration time of from 2 hours to 12 hours using either vacuum filtration or gravity filtration, based upon the weight of the first liquid carrier in the slurry of the smectite heteroadduct is in a range of (A) from about 30% to about 100% by weight of the first liquid carrier in the slurry before filtration, that is, of the initial slurry water weight, (B) from about 40% to about 100% by weight of the first liquid carrier in the slurry, (C) from about 50% to about 100% by weight of the first liquid carrier in the slurry, or (D) from about 60% to about 100% by weight of the first liquid carrier in the slurry before filtration; and (ii) the filtrate from the heteroadduct slurry, when evaporated, yields clay solids comprising less than 20%, less than 15%, or less than 10% of the initial combined weight of the smectite clay and the surfactant.

Aspect 25. The method of making a support-activator according to any of Aspects 15-24, further comprising the steps of:

(i) isolating the smectite heteroadduct from the slurry in the first liquid carrier.

Aspect 26. The method of making a support-activator according to Aspect 25, further comprising the step of:

(ii) washing the smectite heteroadduct with water, an organic liquid, or a combination thereof.

Aspect 27. The method of making a support-activator according to Aspect 24, further comprising the step of:

(iii) drying or calcining the smectite heteroadduct.

Aspect 28. The method of making a support-activator according to any of Aspects 25-27, wherein the step of isolating the smectite heteroadduct comprises or is selected from gravity filtering the slurry, vacuum filtering the slurry, subjecting the slurry to reduced pressure, heating the slurry, subjecting the slurry to rotary-evaporation, sparging a gas through the slurry, or any combination thereof.

Aspect 29. The method of making a support-activator according to any of Aspects 25-28, wherein the step of isolating the smectite heteroadduct comprises or is selected from filtering the slurry, evaporating the first liquid carrier from the slurry, or a combination thereof.

Aspect 30. The method of making a support-activator according to any of Aspects 25-29, wherein the step of isolating the smectite heteroadduct comprises or is selected from evaporating the first liquid carrier from the slurry to which an organic liquid azeotroping reagent has been added.

Aspect 31. The method of making a support-activator according to any of Aspects 25-29, wherein the step of isolating the smectite heteroadduct is conducted in the absence of an azeotroping agent.

Aspect 32. The method of making a support-activator according to any of Aspects 25-31, wherein the step of isolating the smectite heteroadduct is carried out without the use of ultrafiltration, centrifugation, or settling tanks.

Aspect 33. The method of making a support-activator according to any of Aspects 25-32, further comprising the step of re-suspending the smectite heteroadduct in water, an organic liquid, or a combination thereof to form a suspension, and evaporating the water from the suspension to isolate the smectite heteroadduct.

Aspect 34. The method of making a support-activator according to any of Aspects 25-32, further comprising the step of re-suspending the smectite heteroadduct in water, an organic liquid, or a combination thereof to form a suspension, and filtering the suspension to isolate the smectite heteroadduct.

Aspect 35. The method of making a support-activator according to any of Aspects 25-34, further comprising the step of washing the smectite heteroadduct with water, an organic liquid, or a combination thereof.

Aspect 36. The method of making a support-activator according to any of Aspects 25-35, further comprising the steps of washing the smectite heteroadduct by forming a suspension of the smectite heteroadduct in water, and filtering the suspension to provide the washed smectite heteroadduct.

Aspect 37. The method of making a support-activator according to Aspect 36, further comprising the step of measuring a conductivity of the suspension of the smectite heteroadduct in water, and if the conductivity is greater than 300 μS/cm, repeating the steps of washing the smectite heteroadduct and filtering the suspension to provide the washed smectite heteroadduct.

Aspect 38. The method of making a support-activator according to any of Aspects 25-37, further comprising the step of drying or calcining the smectite heteroadduct.

Aspect 39. The method of making a support-activator according to Aspect 38, further comprising the step of drying the smectite heteroadduct by an azeotroping process or by a spray-drying process.

Aspect 40. The method of making a support-activator according to Aspect 38, further comprising the step of drying or calcining the smectite heteroadduct by heating in air, heating in an inert atmosphere, heating under vacuum, or a combination thereof.

Aspect 41. The method of making a support-activator according to any of Aspects 25-40, further comprising the step of grinding the smectite heteroadduct to a uniform powder.

Aspect 42. The method of making a support-activator according to any of Aspects 25-41, further comprising the step of calcining the smectite heteroadduct to provide a calcined support-activator which imparts activity to a polymerization catalyst.

Aspect 43. The method of making a support-activator according to any of Aspects 15-42, further comprising the step of spray drying the slurry of the smectite heteroadduct in the first liquid carrier.

Aspect 44. The method of making a support-activator according to any of Aspects 15-43, further comprising the steps of:

(d) suspending the smectite heteroadduct in a dispersion medium to provide a suspension of the smectite heteroadduct in the dispersion medium; and (e) spray-drying the smectite heteroadduct from the suspension to provide the support-activator in particulate form.

Aspect 45. The method of making a support-activator according to Aspect 44, wherein the dispersion medium comprises or consists essentially of water, an organic liquid, or a combination thereof.

Aspect 46. The method of making a support-activator according to any of Aspects 44-45, wherein the dispersion medium comprises, consists essentially of, or is selected from water, methanol, ethanol, i-propanol, n-propanol, n-butanol, chloroform, methylene chloride, pentane, hexane, heptane, toluene, xylene, or a combination thereof.

Aspect 47. The method of making a support-activator according to Aspect 44-46, wherein the step of suspending the smectite heteroadduct in a dispersion medium occurs under high shear conditions.

Aspect 48. The method of making a support-activator according to any of Aspects 44-47, wherein prior to spray drying the suspension of the smectite heteroadduct, the smectite heteroadduct is suspended in the dispersion medium for a period of time of:

(i) from 0.1 hour to 72 hours, from 0.25 hours to 72 hours, from 1 hour to 72 hours, from 12 hours to 72 hours, from 18 hours to 72 hours, or from 24 hours to 72 hours;

(ii) from 0.1 hour to 48 hours, from 0.25 hours to 48 hours, from 1 hour to 48 hours, from 12 hours to 48 hours, from 18 hours to 48 hours, or from 24 hours to 48 hours; or (iii) about 1 hour, about 2 hours, about 4 hours, about 6 hours, about 9 hours about 12 hours, about 15 hours, about 18 hours, about 21 hours, about 24 hours, about 27 hours, or about 30 hours.

Aspect 49. The method of making a support-activator according to any of Aspects 44-48, wherein the suspension of the smectite heteroadduct comprises the dispersion medium and the smectite heteroadduct in a concentration of:

(i) from 0.1 wt % to 70 wt %, alternatively from 1 wt % to 50 wt %, or alternatively from 5 wt % to 30 wt % in the suspension; or (ii) about 1 wt %, about 2 wt %, about 5 wt %, about 10 wt %, about 15 wt %, about 20 wt %, about 30 wt %, about 40 wt %, about 50 wt %, about 60 wt %, or about 70 wt %.

Aspect 50. The method of making a support-activator according to any of Aspects 44-49, wherein the step of spray drying the suspension of the smectite heteroadduct comprises a spray drying process wherein air at a temperature of from 80° C. to 260° C., from 100° C. to 220° C., or from 120° C. to 200° C. is used in the spray drying process.

Aspect 51. The method of making a support-activator according to any of Aspects 44-50 further comprising the step of:

(f) calcining the smectite heteroadduct by heating the smectite heteroadduct in air, in an inert atmosphere, or under vacuum.

Aspect 52. A method of making a catalyst system, the method comprising contacting in a second liquid carrier:

(a) at least one metallocene compound; and (b) at least one support-activator comprising a smectite heteroadduct according to any of Aspects 1-11.

Aspect 53. A method of making a catalyst system, the method comprising contacting in any order in a second liquid carrier:

(a) at least one metallocene compound; and (b) at least one support-activator comprising a smectite heteroadduct prepared according to any of Aspects 15-51.

Aspect 54. The method of making a catalyst system according to any of Aspects 52-53, the method further comprising contacting in the second liquid carrier:

(c) at least one co-catalyst;

(d) at least one co-activator; or a combination thereof.

Aspect 55. A process for polymerizing olefins comprising contacting at least one olefin monomer and a catalyst system under polymerization conditions to form a polyolefin, wherein the catalyst system comprises:

(a) at least one metallocene compound; and (b) at least one support-activator comprising a smectite heteroadduct according to any of Aspects 1-11.

Aspect 56. A process for polymerizing olefins comprising contacting at least one olefin monomer and a catalyst system under polymerization conditions to form a polyolefin, wherein the catalyst system comprises:

(a) at least one metallocene compound; and (b) at least one support-activator comprising a smectite heteroadduct prepared according to any of Aspects 15-51.

Aspect 57. The process for polymerizing olefins according to any of Aspects 55-56, wherein the catalyst system further comprises:

(c) at least one co-catalyst;

(d) at least one co-activator; or a combination thereof.

Aspect 58. The process for polymerizing olefins according to any of Aspects 55-57, wherein the step of contacting the at least one olefin monomer and the catalyst system occurs in a fluid carrier.

Aspect 59. The support-activator, the catalyst system, the method of making a support-activator, the method of making a catalyst system, or the process for polymerizing olefins according to any of the preceding Aspects, wherein when the smectite heteroadduct is spray dried and calcined, and the resulting smectite heteroadduct has an average particle sphericity of 0.70 or greater wherein sphericity is calculated according to the formula $$\text{sphericity } (S) = \frac{r_{max-in}}{r_{min-cir}},$$

wherein $r_{max-in}$ is the radius of the largest inscribed circle of a two-dimensional image of a particle, and $r_{min-cir}$ is the radius of the smallest circumscribed circle of a two-dimensional image of the particle.

Aspect 60. The support-activator, the catalyst system, the method of making a support-activator, the method of making a catalyst system, or the process for polymerizing olefins according to Aspect 59, wherein when the smectite heteroadduct is spray dried and calcined, and the resulting smectite heteroadduct has an average particle sphericity of 0.65 or greater, 0.70 or greater, 0.75 or greater, 0.80 or greater, 0.85 or greater, 0.87 or greater, 0.90 or greater, 0.92 or greater, or 0.95 or greater.

Aspect 61. The support-activator, the catalyst system, the method of making a support-activator, the method of making a catalyst system, or the process for polymerizing olefins according to any of the preceding Aspects, wherein when the smectite heteroadduct is spray dried and calcined, and the resulting smectite heteroadduct has an average particle roundness of 0.70 or greater, wherein roundness is calculated according to the formula $$\text{roundness } (R) = \frac{\frac{1}{n}\left(\sum_{i=1}^{n} r_i\right)}{r_{max-in}},$$

wherein $r_i$ is the radius of the inscribed circle of the $i^{th}$ corner curvature of a two-dimensional image (silhouette) of a particle, n is the number of corners; and $r_{max-in}$ is the radius of the largest inscribed circle of the two-dimensional image of the particle.

Aspect 62. The support-activator, the catalyst system, the method of making a support-activator, the method of making a catalyst system, or the process for polymerizing olefins according to Aspect 61, wherein when the smectite heteroadduct is spray dried and calcined, and the resulting smectite heteroadduct has an average roundness of 0.75 or greater, 0.80 or greater, 0.85 or greater, 0.87 or greater, 0.90 or greater, 0.92 or greater, or 0.95 or greater.

Aspect 63. The support-activator, the catalyst system, the method of making a support-activator, the method of making a catalyst system, or the process for polymerizing olefins according to any of the preceding Aspects, wherein when the smectite heteroadduct is spray dried and calcined, and the resulting smectite heteroadduct has an average circularity of 0.60 or greater, wherein circularity is calculated according to the formula $$\text{circularity } (C) = \frac{4\pi A}{(\text{perimeter})^2},$$

wherein

A is the area of a two-dimensional image (silhouette) of a particle, and perimeter is the length of the path encompassing the two-dimensional image of a particle.

Aspect 64. The support-activator, the catalyst system, the method of making a support-activator, the method of making a catalyst system, or the process for polymerizing olefins according to Aspect 63, wherein when the smectite heteroadduct is spray dried and calcined, and the resulting smectite heteroadduct has an average circularity of 0.70 or greater, 0.75 or greater, 0.80 or greater, 0.85 or greater, 0.87 or greater, 0.90 or greater, 0.92 or greater, or 0.95 or greater.

Aspect 65. The support-activator, the catalyst system, the method of making a support-activator, the method of making a catalyst system, or the process for polymerizing olefins according to any of the preceding Aspects, wherein when the smectite heteroadduct is spray dried and calcined, and the resulting smectite heteroadduct is characterized by any one of, or any combination of, the following properties:

(a) the smectite heteroadduct has an average particle sphericity of 0.85 or greater;

(b) the smectite heteroadduct has an average particle roundness of 0.85 or greater; and (c) the smectite heteroadduct has an average particle circularity of 0.85 or greater.

Aspect 66. The support-activator, the catalyst system, the method of making a support-activator, the method of making a catalyst system, or the process for polymerizing olefins according to any of the preceding Aspects, wherein the first liquid carrier comprises, consists essentially of, or is selected from water, an organic liquid, or a combination thereof.

Aspect 67. The support-activator, the catalyst system, the method of making a support-activator, the method of making a catalyst system, or the process for polymerizing olefins according to any of the preceding Aspects, wherein the first liquid carrier comprises or consists essentially of water, an alcohol, an ether, a ketone, an ester, or any combination thereof.

Aspect 68. The support-activator, the catalyst system, the method of making a support-activator, the method of making a catalyst system, or the process for polymerizing olefins according to any of the preceding Aspects, wherein the first liquid carrier comprises or consists essentially of water, methanol, ethanol, n-propanol, isopropanol, n-butanol, diethyl ether, di-n-butyl ether, acetone, methyl acetate, ethyl acetate, or any combination thereof.

Aspect 69. The support-activator, the catalyst system, the method of making a support-activator, the method of making a catalyst system, or the process for polymerizing olefins according to any of Aspects 66-68, wherein any combination thereof includes water.

Aspect 70. The catalyst system or the process for polymerizing olefins according to any of the preceding Aspects, wherein the fluid carrier comprises, consists essentially of, or is selected from a gas or a liquid.

Aspect 71. The catalyst system or the process for polymerizing olefins according to any of the preceding Aspects, wherein the fluid carrier comprises, consists essentially of, or is selected from: nitrogen; a hydrocarbon such as cyclohexane, isobutane, n-butane, propane, n-pentane, isopentane, neopentane, n-hexane, naphtha, hydrogen-treated naphtha, or Isopar™; at least one olefin; or any combination thereof.

Aspect 72. The catalyst system or the process for polymerizing olefins according to any of the preceding Aspects, wherein the fluid carrier comprises, consists essentially of, or is selected from a liquid or a gaseous hydrocarbon, an ether, or a combination thereof, each of which independently has from 2 to 20 carbon atoms.

Aspect 73. The method of making a catalyst system according to any of the preceding Aspects, wherein the second liquid carrier comprises, consists essentially of, or is selected from cyclohexane, isobutane, n-butane, propane, n-pentane, isopentane, neopentane, n-hexane, naphtha, hydrogen-treated naphtha, Isopar™, at least one olefin, or any combination thereof.

Aspect 74. The method of making a catalyst system, wherein the second liquid carrier comprises, consists essentially of, or is selected from any one or combination of the fluid carriers.

Aspect 75. The support-activator, the catalyst system, the method of making a support-activator, the method of making a catalyst system, or the process for polymerizing olefins according to any of the preceding Aspects, wherein the first liquid carrier, fluid carrier, or the second liquid carrier comprises or further comprises at least one olefin.

Aspect 76. The support-activator, the catalyst system, the method of making a support-activator, the method of making a catalyst system, or the process for polymerizing olefins according to any of the preceding Aspects, wherein the smectite clay is [1] natural or synthetic, and/or [2] a dioctahedral smectite clay.

Aspect 77. The support-activator, the catalyst system, the method of making a support-activator, the method of making a catalyst system, or the process for polymerizing olefins according to any of the preceding Aspects, wherein the smectite clay comprises, consists of, consists essentially of, or is selected from montmorillonite, sauconite, nontronite, hectorite, beidellite, saponite, bentonite, or any combination thereof.

Aspect 78. The support-activator, the catalyst system, the method of making a support-activator, the method of making a catalyst system, or the process for polymerizing olefins according to any of the preceding Aspects, wherein the smectite clay comprises colloidal montmorillonite, such as HPM-20 Volclay.

Aspect 79. The support-activator, the catalyst system, the method of making a support-activator, the method of making a catalyst system, or the process for polymerizing olefins according to any of the preceding Aspects, wherein:

(a) the colloidal smectite clay can have an average particle size of from 1 m (micron) to 250 m, for example, about 1 m (microns), about 2 m, about 3 m, about 5 μm, about 7 μm, about 10 m, about 12 m, about 15 m, about 18 m, about 20 μm, about 25 μm, about 30 μm, about 35 μm, about 40 μm, about 45 μm, about 50 μm, about 55 μm, about 60 μm, about 65 μm, about 70 μm, about 75 μm, about 80 μm, about 85 μm, about 90 μm, about 95 μm, about 100 μm, about 110 μm, about 120 μm, about 125 μm, about 130 μm, about 140 μm, about 150 μm, about 160 μm, about 170 μm, about 175 μm, about 185 μm, about 200 μm, about 225 μm, or about 250 μm, or any ranges of particle sizes between these recited numbers, for example, from 1 μm to 250 μm, from 2 μm to 125 μm, from 3 μm to 100 μm, from 5 μm to 150 μm, from 5 μm to 80 μm, from 7 μm to 70 μm, from 10 μm to 100 μm, from 10 μm to 60 μm, from 15 μm to 80 μm, from 15 μm to 50 μm, or from 20 μm to 75 μm; or (a) the smectite clay heteroadduct (coagulate) can have an average particle size of from 1 μm (micron) to 250 μm, for example, about 1 μm (microns), about 2 μm, about 3 μm, about 5 μm, about 7 μm, about 10 μm, about 12 μm, about 15 μm, about 18 μm, about 20 μm, about 25 μm, about 30 μm, about 35 μm, about 40 μm, about 45 μm, about 50 μm, about 55 μm, about 60 μm, about 65 μm, about 70 μm, about 75 μm, about 80 μm, about 85 μm, about 90 μm, about 95 μm, about 100 μm, about 110 μm, about 120 μm, about 125 μm, about 130 μm, about 140 μm, about 150 μm, about 160 μm, about 170 μm, about 175 μm, about 185 μm, about 200 μm, about 225 μm, or about 250 μm, or any ranges of particle sizes between these recited numbers, for example, from 1 μm to 250 μm, from 2 μm to 125 μm, from 3 μm to 100 μm, from 5 μm to 150 μm, from 5 μm to 80 μm, from 7 μm to 70 μm, from 10 μm to 100 μm, from 10 μm to 60 μm, from 15 μm to 80 μm, from 15 μm to 50 μm, or from 20 μm to 75 μm; or (c) the supported metallocene catalyst can have an average particle size of from 1 μm (micron) to 250 μm, for example, about 1 μm (microns), about 2 μm, about 3 μm, about 5 μm, about 7 μm, about 10 μm, about 12 μm, about 15 μm, about 18 μm, about 20 μm, about 25 μm, about 30 μm, about 35 μm, about 40 μm, about 45 μm, about 50 μm, about 55 μm, about 60 μm, about 65 μm, about 70 μm, about 75 μm, about 80 μm, about 85 μm, about 90 μm, about 95 μm, about 100 μm, about 110 μm, about 120 μm, about 125 μm, about 130 μm, about 140 μm, about 150 μm, about 160 μm, about 170 μm, about 175 μm, about 185 μm, about 200 μm, about 225 am, or about 250 μm, or any ranges of particle sizes between these recited numbers, for example, from 1 μm to 250 μm, from 2 μm to 125 μm, from 3 μm to 100 μm, from 5 μm to 150 m, from 5 m to 80 m, from 7 μm to 70 μm, from 10 μm to 100 m, from 10 μm to 60 μm, from 15 μm to 80 μm, from 15 μm to 50 μm, or from 20 μm to 75 μm; or (d) any combination of properties (a), (b), and (c).

Aspect 80. The support-activator, the catalyst system, the method of making a support-activator, the method of making a catalyst system, or the process for polymerizing olefins according to any of the preceding Aspects, wherein the smectite clay comprises structural units characterized by the following formula:

$(M^{A}IV)_{s}(M^{B}VI)_{p}O_{20}(OH)_{4}$; wherein $M^{A}IV$ is a four-coordinate $Si^{4+}$, wherein the $Si^{4+}$ is optionally partially substituted by a four-coordinate cation that is not $Si^{4+}$;

$M^{B}VI$ is a six-coordinate $Al^{3+}$ or $Mg^{2+}$, wherein the $Al^{3+}$ or $Mg^{2+}$ is optionally partially substituted by a six-coordinate cation that is not $Al^{3+}$ or $Mg^{2+}$;

p is four for cations with a +3 formal charge, or p is 6 for cations with a +2 formal charge; and any charge deficiency that is created by the partial substitution of a cation that is not $Si^{4+}$ at $M^{A}$IV and/or any charge deficiency that is created by the partial substitution of a cation that is not $Al^{3+}$ or $Mg^{2+}$ at $M^{B}$VI is balanced by cations intercalated between structural units.

Aspect 81. The support-activator, the catalyst system, the method of making a support-activator, the method of making a catalyst system, or the process for polymerizing olefins according to Aspect 80, wherein:

in each occurrence, the cation that is not $Si^{4+}$ is independently selected from $Al^{3+}$, $Fe^{3+}$, $P^{5s}$, $B^{3+}$, $Ge^{4+}$, $Be^{2+}$, $Sn^{4+}$, and the like;

in each occurrence, the cation that is not $Al^{3+}$ or $Mg^{2+}$ is independently selected from $Fe^{3+}$, $Fe^{2+}$, $Ni^{2+}$, $CO^{2+}$, $Li^{+}$, $Zn^{2+}$, $Mn^{2+}$, $Ca^{2+}$, $Be^{2+}$, and the like; and/or the cations intercalated between structural units are selected from monocations, dications, trications, other multications, or any combination thereof.

Aspect 82. The support-activator, the catalyst system, the method of making a support-activator, the method of making a catalyst system, or the process for polymerizing olefins according to Aspect 80, wherein:

in each occurrence, the cation that is not $Si^{4+}$ is independently selected from $Al^{3+}$ or $Fe^{3+}$; and in each occurrence, the cation that is not $Al^{3+}$ or $Mg^{2+}$ is independently selected from $Fe^{3+}$, $Fe^{2+}$, $Ni^{2+}$, or $Co^{2+}$.

the cations intercalated between structural units are selected from monocations.

Aspect 83. The support-activator, the catalyst system, the method of making a support-activator, the method of making a catalyst system, or the process for polymerizing olefins according to any of the preceding Aspects, wherein the smectite clay is monocation exchanged with at least one of lithium, sodium, or potassium.

Aspect 84. The support-activator, the catalyst system, the method of making a support-activator, the method of making a catalyst system, or the process for polymerizing olefins according to any of the preceding Aspects, wherein the smectite heteroadduct comprises both crystalline domains and amorphous domains.

Aspect 85. The support-activator, the catalyst system, the method of making a support-activator, the method of making a catalyst system, or the process for polymerizing olefins according to any of the preceding Aspects, wherein the smectite heteroadduct comprises a minor proportion of crystalline domains and a major proportion of amorphous domains.

Aspect 86. The support-activator, the catalyst system, the method of making a support-activator, the method of making a catalyst system, or the process for polymerizing olefins according to any of the preceding Aspects, wherein the smectite heteroadduct is spray dried and calcined, and the resulting calcined smectite heteroadduct (support-activator) has a particle size distribution parameter (SPAN), calculated as (D90-D10)/(D50), of 10.0 or less, 7.5 or less, 5.0 or less, 3.0 or less, 2.7 or less, 2.5 or less, 2.2 or less, 2.0 or less, 1.8 or less, 1.6 or less, 1.4 or less, 1.2 or less, 1.0 or less, or 0.8 or less.

Aspect 87. The support-activator, the catalyst system, the method of making a support-activator, the method of making a catalyst system, or the process for polymerizing olefins according to any of the preceding Aspects, wherein the smectite heteroadduct is calcined by heating in air, in an inert atmosphere, or under vacuum, and wherein the heating is carried out to a temperature of at least about 100° C.

Aspect 88. The support-activator, the catalyst system, the method of making a support-activator, the method of making a catalyst system, or the process for polymerizing olefins according to any of the preceding Aspects, wherein the smectite heteroadduct is heated or calcined in a fluidized bed.

Aspect 89. The support-activator, the catalyst system, the method of making a support-activator, the method of making a catalyst system, or the process for polymerizing olefins according to any of the preceding Aspects, wherein the smectite heteroadduct is heated or calcined at a temperature of:

(i) from 100° C. to 900° C., from 200° C. to 800° C., from 200° C. to 750° C., from 225° C. to 700° C., from 225° C. to 650° C., from 250° C. to 650° C., from 250° C. to 600° C., from 250° C. to 500° C., from 225° C. to 450° C., or from 200° C. to 400° C.; or (ii) about 100° C., about 125° C., about 150° C., about 175° C., about 200° C., about 225° C., about 250° C., about 275° C., about 300° C., about 325° C., about 350° C., about 375° C., about 400° C., about 425° C., about 450° C., about 475° C., about 500° C., about 525° C., about 550° C., about 575° C., about 600° C., about 625° C., about 650° C., about 675° C., about 700° C., about 725° C., about 750° C., about 775° C., about 800° C., about 825° C., about 850° C., about 875° C., about 900° C., or any ranges between any of these temperatures.

Aspect 90. The support-activator, the catalyst system, the method of making a support-activator, the method of making a catalyst system, or the process for polymerizing olefins according to any of the preceding Aspects, wherein the smectite heteroadduct is heated or calcined at a single temperature or within or over a range of two temperatures separated by at least 10° C., in the range of from 110° C. to 800° C.

Aspect 91. The support-activator, the catalyst system, the method of making a support-activator, the method of making a catalyst system, or the process for polymerizing olefins according to any of the preceding Aspects, wherein the smectite heteroadduct is heated or calcined under conditions which facilitate removal of water and/or removal of surface hydroxyls, such as a carbon monoxide atmosphere.

Aspect 92. The support-activator, the catalyst system, the method of making a support-activator, the method of making a catalyst system, or the process for polymerizing olefins according to any of the preceding Aspects, wherein the smectite heteroadduct is heated or calcined under (a) an ambient atmosphere (air) which is not dried, or (b) a dry ambient atmosphere, wherein the dry ambient atmosphere includes air which has been passed through a drying column, or air which has a relative humidity of from about 0% to about 60%.

Aspect 93. The support-activator, the catalyst system, the method of making a support-activator, the method of making a catalyst system, or the process for polymerizing olefins according to any of the preceding Aspects, wherein the smectite heteroadduct is heated or calcined under an atmosphere of $CO_2$.

Aspect 94. The support-activator, the catalyst system, the method of making a support-activator, the method of making a catalyst system, or the process for polymerizing olefins according to any of the preceding Aspects, wherein the smectite heteroadduct is heated or calcined under the following conditions:

(a) at a temperature of at least 110° C., for example from about 200° C. to about 800° C. and for period of from about 1 minute (min) to about 100 hours (h);

(b) at a temperature of from about 225° C. to about 700° C. and for period of from about 1 hour to about 10 hours; or (c) at a temperature of from about 250° C. to about 500° C. and for period of from about 1 hour to about 10 hours.

Aspect 95. The support-activator, the catalyst system, the method of making a support-activator, the method of making a catalyst system, or the process for polymerizing olefins according to any of the preceding Aspects, wherein the smectite heteroadduct is calcined using any one of the following conditions:

(a) a temperature ranging from about 110° C. to about 600° C. and for a time period ranging from about 1 hour to about 10 hours;

(b) a temperature ranging from about 150° C. to about 500° C. and for a time period ranging from about 1.5 hours to about 8 hours; or (c) a temperature ranging from about 200° C. to about 450° C. and for a time period ranging from about 2 hours to about 7 hours.

Aspect 96. The support-activator, the catalyst system, the method of making a support-activator, the method of making a catalyst system, or the process for polymerizing olefins according to any of the preceding Aspects, wherein the smectite heteroadduct is calcined, and the calcined smectite heteroadduct is characterized by a BJH porosity of:

(i) from 0.1 cc/g to 3.0 cc/g, from 0.15 cc/g to 2.5 cc/g, from 0.25 cc/g to 2.0 cc/g, or from 0.5 cc/g to 1.8 cc/g; or (ii) about 0.10 cc/g, about 0.20 cc/g, about 0.30 cc/g, about 0.50 cc/g, about 0.75 cc/g, about 1.00 cc/g, about 1.25 cc/g, about 1.50 cc/g, about 1.75 cc/g, about 2.00 cc/g, about 2.25 cc/g, about 2.50 cc/g, about 2.75 cc/g, about 3.00 cc/g, about 3.25 cc/g, or about 3.50 cc/g.

Aspect 97. The support-activator, the catalyst system, the method of making a support-activator, the method of making a catalyst system, or the process for polymerizing olefins according to any of the preceding Aspects, wherein the smectite heteroadduct is isolated and calcined, and the calcined smectite heteroadduct is characterized by a BJH porosity which exceeds 200% of a BJH porosity of an analogous calcined smectite which has been analogously prepared as the smectite heteroadduct, but which has not been contacted with the surfactant.

Aspect 98. The support-activator, the catalyst system, the method of making a support-activator, the method of making a catalyst system, or the process for polymerizing olefins according to any of the preceding Aspects, wherein the colloidal smectite clay, the smectite heteroadduct (calcined smectite heteroadduct), the support-activator, or the supported catalyst is characterized by a D50 average particle size of from 1 m (micron) to 250 m, from 2 m to 125 m, from 3 μm to 100 μm, from 5 μm to 150 m, from 5 μm to 80 μm, from 7 μm to 70 μm, from 10 μm to 100 μm, from 10 μm to 60 μm, from 15 μm to 80 μm, from 15 μm to 50 μm, or from 20 μm to 75 μm.

Aspect 99. The support-activator, the catalyst system, the method of making a support-activator, the method of making a catalyst system, or the process for polymerizing olefins according to any of the preceding Aspects, wherein the smectite heteroadduct is calcined and the calcined smectite heteroadduct exhibits a combined cumulative pore volume of pores between 3-10 nm diameter ($V_{3\text{-}10\ nm}$) which is less than 55%, less than 50%, less than 45%, or less than 40% of the combined cumulative pore volume of pores between 3-30 nm ($V_{3\text{-}30\ nm}$).

Aspect 100. The support-activator, the catalyst system, the method of making a support-activator, the method of making a catalyst system, or the process for polymerizing olefins according to any of the preceding Aspects, wherein the smectite heteroadduct is calcined and the calcined smectite heteroadduct exhibits a logarithmic differential pore volume distribution (dV (log D) vs. pore diameter) having a local maximum in a range of from 30 Å (Angstroms) to 40 Å ($D_{VM(30\text{-}40)}$), from 30 Å to 45 Å ($D_{VM(30\text{-}45)}$), or from 30 Å to 50 Å ($D_{VM(30\text{-}50)}$).

Aspect 101. The support-activator, the catalyst system, the method of making a support-activator, the method of making a catalyst system, or the process for polymerizing olefins according to any of the preceding Aspects, wherein:

the smectite heteroadduct comprises the contact product of a colloidal smectite clay and a cationic surfactant, and is calcined and the calcined smectite heteroadduct exhibits a powder X-ray diffraction (XRD) d001 peak from 6 degrees 2 theta to 9 degrees 2 theta.

Aspect 102. The support-activator, the catalyst system, the method of making a support-activator, the method of making a catalyst system, or the process for polymerizing olefins according to any of the preceding Aspects, wherein:

the smectite heteroadduct comprises the contact product of a colloidal smectite clay and a cationic surfactant, and is calcined and the calcined smectite heteroadduct exhibits a powder X-ray diffraction (XRD) d001 peak from 7 degrees 2 theta to 8 degrees 2 theta.

Aspect 103. The support-activator, the catalyst system, the method of making a support-activator, the method of making a catalyst system, or the process for polymerizing olefins according to any of the preceding Aspects, wherein the colloidal smectite clay and the surfactant are provided or contacted in a ratio of from 0.5 millimoles to 5 millimoles of surfactant per gram of colloidal smectite clay.

Aspect 104. The support-activator, the catalyst system, the method of making a support-activator, the method of making a catalyst system, or the process for polymerizing olefins according to any of the preceding Aspects, wherein the colloidal smectite clay and the surfactant are provided or contacted in a ratio of from 0.75 millimoles to 4 millimoles, from 1 millimoles to 3.5 millimoles, from 1.25 millimoles to 3 millimoles, or from 1.5 millimoles to 2.75 millimoles of surfactant per gram of colloidal smectite clay.

Aspect 105. The support-activator, the catalyst system, the method of making a support-activator, the method of making a catalyst system, or the process for polymerizing olefins according to any of the preceding Aspects, wherein the surfactant comprises is absent any one of a cationic surfactant, a nonionic surfactant, or an amphoteric surfactant.

Aspect 106. The support-activator, the catalyst system, the method of making a support-activator, the method of making a catalyst system, or the process for polymerizing olefins according to any of the preceding Aspects, wherein the surfactant comprises is absent any two of a cationic surfactant, a nonionic surfactant, an amphoteric surfactant.

Aspect 107. The support-activator, the catalyst system, the method of making a support-activator, the method of making a catalyst system, or the process for polymerizing olefins according to any of the preceding Aspects, wherein the surfactant is absent a cationic surfactant.

Aspect 108. The support-activator, the catalyst system, the method of making a support-activator, the method of making a catalyst system, or the process for polymerizing olefins according to any of the preceding Aspects, wherein the surfactant is absent a nonionic surfactant.

Aspect 109. The support-activator, the catalyst system, the method of making a support-activator, the method of making a catalyst system, or the process for polymerizing olefins according to any of the preceding Aspects, wherein the surfactant is absent an amphoteric surfactant.

Aspect 110. The support-activator, the catalyst system, the method of making a support-activator, the method of making a catalyst system, or the process for polymerizing olefins according to any of the preceding Aspects, wherein the cationic surfactant comprises or is selected from a primary, a secondary, a tertiary, or a quaternary ammonium compound or phosphonium compound.

Aspect 111. The support-activator, the catalyst system, the method of making a support-activator, the method of making a catalyst system, or the process for polymerizing olefins according to any of the preceding Aspects, wherein the cationic surfactant can comprise or can be selected from an ammonium compound (salt), having the following general formula:

$$[R^1R^2R^3R^4N]^+X^-,$$

wherein each $R^1$, $R^2$, $R^3$, and $R^4$ is selected independently from hydrogen, a substituted or an unsubstituted $C_1$-$C_{25}$ hydrocarbyl group, or a substituted or an unsubstituted $C_1$-$C_{25}$ heterohydrocarbyl group, in which any two of $R^1$, $R^2$, $R^3$, and $R^4$ may be part of a ring structure, and wherein at least one of $R^1$, $R^2$, $R^3$, and $R^4$ is a non-hydrogen moiety; and $X^-$ is selected from an organic or an inorganic monoanion, dianion, or trianion.

Aspect 112. The support-activator, the catalyst system, the method of making a support-activator, the method of making a catalyst system, or the process for polymerizing olefins according to Aspect 111, wherein:

$R^1$, $R^2$, $R^3$, and $R^4$ are selected independently from hydrogen, a substituted or an unsubstituted $C_1$-$C_{25}$ aliphatic group, a substituted or an unsubstituted $C_1$-$C_{25}$ heteroaliphatic group, a substituted or an unsubstituted $C_6$-$C_{25}$ aromatic group, or a substituted or an unsubstituted $C_4$-$C_{25}$ heteroaromatic group, in which any two of $R^1$, $R^2$, $R^3$, and $R^4$ may be part of a ring structure; and $X^-$ is selected from any suitable anion, such as fluoride, chloride, bromide, iodide, formate, acetate, oxalate, nitrate, sulfate, sulfite, perchlorate, carbonate, bromate, chlorate, chlorite, hypochlorite, or phosphate.

Aspect 113. The support-activator, the catalyst system, the method of making a support-activator, the method of making a catalyst system, or the process for polymerizing olefins according to any of the preceding Aspects, wherein the cationic surfactant can comprise or can be selected from a phosphonium compound (salt), having the following general formula:

$$[R^1R^2R^3R^4P]^+X^-,$$

wherein each $R^1$, $R^2$, $R^3$, and $R^4$ is selected independently from hydrogen, a substituted or an unsubstituted $C_1$-$C_{25}$ hydrocarbyl group, or a substituted or an unsubstituted $C_1$-$C_{25}$ heterohydrocarbyl group, in which any two of $R^1$, $R^2$, $R^3$, and $R^4$ may be part of a ring structure, and wherein at least one of $R^1$, $R^2$, $R^3$, and $R^4$ is a non-hydrogen moiety; and $X^-$ is selected from an organic or an inorganic monoanion, dianion, or trianion.

Aspect 114. The support-activator, the catalyst system, the method of making a support-activator, the method of making a catalyst system, or the process for polymerizing olefins according to Aspect 113, wherein:

$R^1$, $R^2$, $R^3$, and $R^4$ are selected independently from hydrogen, a substituted or an unsubstituted $C_1$-$C_{25}$ aliphatic group, a substituted or an unsubstituted $C_1$-$C_{25}$ heteroaliphatic group, a substituted or an unsubstituted $C_6$-$C_{25}$ aromatic group, or a substituted or an unsubstituted $C_4$-$C_{25}$ heteroaromatic group, in which any two of $R^1$, $R^2$, $R^3$, and $R^4$ may be part of a ring structure; and the counterion is selected from any suitable anion, such as fluoride, chloride, bromide, iodide, formate, a carboxylate such as acetate, oxalate, nitrate, sulfate, sulfite, perchlorate, carbonate, bromate, chlorate, chlorite, hypochlorite, or phosphate.

Aspect 115. The support-activator, the catalyst system, the method of making a support-activator, the method of making a catalyst system, or the process for polymerizing olefins according to any of the preceding Aspects, wherein the cationic surfactant comprises a cation selected from lauryltrimethylammonium, stearyltrimethylammonium, trioctylammonium, distearyldimethylammonium, distearyldibenzylammonium, cetyltrimethylammonium, benzylhexadecyldimethylammonium, dimethyldi-(hydrogenated tallow)ammonium, dimethylbenzyl-(hydrogenated tallow)ammonium, or any combination thereof.

Aspect 116. The support-activator, the catalyst system, the method of making a support-activator, the method of making a catalyst system, or the process for polymerizing olefins according to any of the preceding Aspects, wherein the cationic surfactant comprises a cation selected from tetramethylammonium, tetraethylammonium, tetrabutylammonium, tetrapentylammonium, tetrahexylammonium, tetraoctylammonium, tetrabenzylammonium, cetylammonium, decylammonium, dodecylammonium, methyloctadecylammonium, ethyloctadecylammonium, butyloctadecylammonium, dimethyloctadecylammonium, diethyloctadecylammonium, dibutyloctadecylammonium, trimethyloctadecylammonium, triethyloctadecylammonium, tributyloctadecylammonium, methyltridecylammonium, ethyltridecylammonium, butyltridecylammonium, N,N-dimethylanilinium, N,N-diethylanilinium, N,N-2,4,5-pentamethylanilinium, N,N-dimethyloctadecylammonium, N,N-dimethyl-N,N-dipropylammonium, N,N-dimethyl-N,N-dihexyl ammonium, N,N-dipropyl-N,N-dihexyl ammonium, trimethyl phosphonium, triethyl phosphonium, tributyl phosphonium, trihexyl phosphonium, tetramethyl phosphonium, tetraethyl phosphonium, tetrapropyl phosphonium, tetrabutyl phosphonium, tetrahexyl phosphonium, tetrabenzyl phosphonium, trihexyltetradecyl phosphonium, diallyldimethyl ammonium, triethylmethyl ammonium, tributyl ethyl ammonium, trimethylsulfonium ammonium, N,N-diethyl-N-methyl-N-(2-methoxyethyl)-ammonium, glycidyl trimethylammonium, N,N-dimethyl-N-ethyl-N-propylammonium, N,N-dimethyl-N-ethyl-N-butylammonium, N,N-dimethyl-N-ethyl-N-amyl ammonium, N,N-dimethyl-N-ethyl-N-hexylammonium, N,N-dimethyl-N-ethyl-N-heptyl ammonium, N,N-dimethyl-N-ethyl-N-decyl ammonium, N,N-dimethyl-N-propyl-N-butylammonium, N,N-dimethyl-N-propyl-N-amyl ammonium, N,N-dimethyl-N-propyl-N-hexylammonium, N,N-dimethyl-N-propyl-N-heptyl ammonium, N,N-dimethyl-N-butyl-N-hexylammonium, N,N-dimethyl-N-butyl-N-heptyl ammonium, N,N-dimethyl-N-pentyl-N-hexylammonium, trimethylheptyl ammonium, N,N-diethyl-N-methyl-N-propylammonium, N,N-diethyl-N-methyl-N-amyl ammonium, N,N-diethyl-N-methyl-N-heptyl ammonium, N,N-diethyl-N-propyl-N-amyl ammonium, triethylmethylammonium, triethylpropylammonium, triethylammonium ammonium, triethylheptyl ammonium, N,N-dipropyl-N-methyl-N-ethylammonium, N,N-dipropyl-N-methyl-N-amylammonium, N,N-dipropyl-N-butyl-N-hexylammonium, N,N-dibutyl-N-methyl-N-amyl ammonium, N,N-dibutyl-N-methyl-N-hexylammonium, trioctylmethylammonium, N-methyl-N-ethyl-N-propyl-N-amyl ammonium, diethyl dimethyl phosphonium, dibutyl diethyl phosphonium, or any combination thereof.

Aspect 117. The support-activator, the catalyst system, the method of making a support-activator, the method of making a catalyst system, or the process for polymerizing olefins according to any of the preceding Aspects, wherein the cationic surfactant comprises an anion selected from a halide, such as chloride or bromide.

Aspect 118. The support-activator, the catalyst system, the method of making a support-activator, the method of making a catalyst system, or the process for polymerizing olefins according to any of the preceding Aspects, wherein the cationic surfactant comprises or is selected from a chloride or bromide of benzalkonium, benzethonium, methylbenzethonium, cetylpyridinium, alkyl-dimethyl dichlorobenzene ammonium, dequalinium, phenamylinium, cetrimonium, or cethexonium.

Aspect 119. The support-activator, the catalyst system, the method of making a support-activator, the method of making a catalyst system, or the process for polymerizing olefins according to any of the preceding Aspects, wherein the cationic surfactant comprises or is selected from tetrabutylammonium bromide, dioctadecyldimethylammonium chloride, hexadecyltrimethylammonium chloride, octadecylammonium chloride, trimethylstearylammonium chloride, cetyltrimethylammonium bromide, octenidine dihydrochloride, cetyl trimethylammonium bromide (CTAB), cetyl trimethylammonium chloride (CTAC), cetylpyridinium chloride (CPC), benzalkonium chloride (BAC), benzethonium chloride (BZT), dimethyldioctadecylammonium chloride, dioctadecyldimethylammonium bromide (DODAB), octenidine dihydrochloride, cetyl trimethylammonium bromide (CTAB), cetyl trimethylammonium chloride (CTAC), cetylpyridinium chloride (CPC), benzalkonium chloride (BAC), benzethonium chloride (BZT), dimethyldioctadecylammonium chloride, dioctadecyldimethylammonium bromide (DODAB), alkyl dimethyl benzyl ammonium chloride (ADBAC), alkyl ($C_{12}$-$C_{16}$ or $C_{12}$-$C_{14}$) alkyl dimethyl benzyl ammonium chloride, alkyl ($C_{12}$-$C_{14}$) dimethyl (ethylbenzyl) ammonium chloride, or any combination thereof.

Aspect 120. The support-activator, the catalyst system, the method of making a support-activator, the method of making a catalyst system, or the process for polymerizing olefins according to any of the preceding Aspects, wherein the nonionic surfactant comprises, or is selected from a non-amphoteric surfactant.

Aspect 121. The support-activator, the catalyst system, the method of making a support-activator, the method of making a catalyst system, or the process for polymerizing olefins according to any of the preceding Aspects, wherein the nonionic surfactant comprises, further comprises, or is selected from: an ethoxylate, a glycol ether, a fatty alcohol polyglycol ether, or any combinations thereof.

Aspect 122. The support-activator, the catalyst system, the method of making a support-activator, the method of making a catalyst system, or the process for polymerizing olefins according to any of the preceding Aspects, wherein the nonionic surfactant comprises, further comprises, or is selected from:

(a) a polyhydric alcohol containing 2, 3, or more hydroxyl groups, a polyhydric alcohol having the formula $CH_2OH(CHOH)_nCH_2OH$ wherein n is an integer from 2 to 5, a mono-alkyl ether of a polyhydric alcohol, a di-alkyl ether of a polyhydric alcohol, or a polyalkylene glycol of any of these, that is, a polyalkylene glycol of the polyhydric alcohol, the mono-alkyl ether of a polyhydric alcohol, or the di-alkyl ether of a polyhydric alcohol;

(b) glycerol, 1,2,4-butanetriol, erythritol, pentaerythritol, maltitol, xylitol, sorbitol, ethylene glycol, propylene glycol, diethylene glycol, poly(ethylene)glycol, poly(propylene)glycol, or a combination thereof; or (c)(i) a fatty acid comprising or selected from caprylic acid, capric acid, lauric acid, myristic acid, palmitic acid, stearic acid, arachidic acid, ricinoleic acid, behenic acid, lignoceric acid, cerotic acid, myristoleic acid, palmitoleic acid, sapienic acid, oleic acid, elaidic acid, vaccenic acid, linoleic acid, linoelaidic acid, α-linolenic acid, arachidonic acid, eicosapentaenoic acid, erucic acid, docosahexaenoic acid, or any combination thereof, or (ii) a fatty acid such as in (c)(i) condensed with an alcohol having one or multiple hydroxyl groups, such as methanol, ethanol, butanol, hexanol, or glycerol, for example, a monoglyceride, diglyceride, or triglyceride.

Aspect 123. The support-activator, the catalyst system, the method of making a support-activator, the method of making a catalyst system, or the process for polymerizing olefins according to any of the preceding Aspects, wherein the nonionic surfactant comprises, further comprises, or is selected from a hydrocarbyl (hydrocarbon)sulfonate having the formula $R^1SO_2OR^2$, wherein $R^1$ and $R^2$ are selected independently from a substituted or an unsubstituted $C_1$-$C_{25}$ alkyl-, $C_6$-$C_{25}$ aryl-, $C_7$-$C_{25}$ aralkyl-, or $C_7$-$C_{25}$ alkaryl.

Aspect 124. The support-activator, the catalyst system, the method of making a support-activator, the method of making a catalyst system, or the process for polymerizing olefins according to any of the preceding Aspects, wherein the nonionic surfactant comprises, further comprises, or is selected from:

(a) a mono-saccharide, a di-saccharide, an oligosaccharide, or any combination thereof; or (b) glucose, fructose, mannose, maltose, lactose, sucrose, a cyclodextrin, a maltodextrin, an amino-modified saccharides such as glucosamine, an oxidized sugar acid such as glucoronic acid, or any combination thereof.

Aspect 125. The support-activator, the catalyst system, the method of making a support-activator, the method of making a catalyst system, or the process for polymerizing olefins according to any of the preceding Aspects, wherein the nonionic surfactant comprises, further comprises, or is selected from a silane having the formula $R^1SiX_3$, $R^1R^2SiX_2$, or $R^1R^2R^3SiX$, wherein:

$R^1$, $R^2$, and $R^3$ are selected independently from a substituted or an unsubstituted $C_1$-$C_{25}$ hydrocarbyl group, $C_1$-$C_{25}$ heterohydrocarbyl group, or any other group which is hydrolytically stable when bonded to silicon in the nonionic surfactant; and X is selected independently from a hydrolyzable group which is converted to a hydroxyl group (—OH) upon hydrolysis thereby forming a silanol.

Aspect 126. The support-activator, the catalyst system, the method of making a support-activator, the method of making a catalyst system, or the process for polymerizing olefins according to Aspect 125, wherein:

$R^1$, $R^2$, and $R^3$ are selected independently from hydrogen, a substituted or an unsubstituted $C_1$-$C_{25}$ aliphatic group, a substituted or an unsubstituted $C_1$-$C_{25}$ heteroaliphatic group, a substituted or an unsubstituted $C_6$-$C_{25}$ aromatic group, or a substituted or an unsubstituted $C_4$-$C_{25}$ heteroaromatic group.

Aspect 127. The support-activator, the catalyst system, the method of making a support-activator, the method of making a catalyst system, or the process for polymerizing olefins according to any of Aspects 125-126, wherein:

X is selected from a $C_1$-$C_{25}$ alkoxy, a $C_1$-$C_{25}$ acyloxy, a halogen, or a $C_1$-$C_{25}$ amine.

Aspect 128. The support-activator, the catalyst system, the method of making a support-activator, the method of making a catalyst system, or the process for polymerizing olefins according to any of the preceding Aspects, wherein the nonionic surfactant comprises, further comprises, or is selected from a silyl alcohol having the formula $R_{4-n}Si(OH)_n$, wherein n is 1 or 2, and R is selected from a $C_1$ to $C_{20}$ alkyl group or a $C_6$ to $C_{20}$ aryl group.

Aspect 129. The support-activator, the catalyst system, the method of making a support-activator, the method of making a catalyst system, or the process for polymerizing olefins according to any of the preceding Aspects, wherein the nonionic surfactant comprises, further comprises, or is selected from triphenylsilanol, dimethylphenylsilanol, diphenylsilanediol, triisopropylsilanol, or any combination thereof.

Aspect 130. The support-activator, the catalyst system, the method of making a support-activator, the method of making a catalyst system, or the process for polymerizing olefins according to any of the preceding Aspects, wherein the nonionic surfactant comprises or is selected from octylphenol ethoxylate, polyethylene glycol tert-octylphenyl ether, ethylenediamine tetrakis(ethoxylate-block-propoxylate) tetrol, ethylenediamine tetrakis(propoxylate-block-ethoxylate) tetrol, or any combination thereof.

Aspect 131. The support-activator, the catalyst system, the method of making a support-activator, the method of making a catalyst system, or the process for polymerizing olefins according to any of the preceding Aspects, wherein the amphoteric surfactant comprises a cationic moiety and an anionic moiety, wherein the cationic moiety is selected from a primary amine, a secondary amine, a tertiary amine, or a quaternary ammonium cation, and the anionic moiety is selected form a sulfate, a sulfonate, a phosphate, or a carboxylate.

Aspect 132. The support-activator, the catalyst system, the method of making a support-activator, the method of making a catalyst system, or the process for polymerizing olefins according to any of the preceding Aspects, wherein the amphoteric surfactant comprises, further comprises, or is selected from an amino acid, a polypeptide, a protein, or a combination thereof.

Aspect 133. The support-activator, the catalyst system, the method of making a support-activator, the method of making a catalyst system, or the process for polymerizing olefins according to any of the preceding Aspects, wherein the amphoteric surfactant comprises, further comprises, or is selected from an amino acid or a combination of amino acids, and the contacting step is carried out under conditions, including a pH from about 2.5 to 9.5, in which the an amino acid or combination of amino acids are zwitterionic.

Aspect 134. The support-activator, the catalyst system, the method of making a support-activator, the method of making a catalyst system, or the process for polymerizing olefins according to any of the preceding Aspects, wherein the amphoteric surfactant comprises, further comprises, or is selected from an amino acid selected from alanine, arginine, asparagine, aspartic acid (aspartate), cysteine, cystine, glutamic acid (glutamate), glutamine, glycine, histidine, isoleucine, leucine, lysine, methionine, phenylalanine, proline, serine, threonine, tryptophan, tyrosine, valine, or any combination thereof.

Aspect 135. The support-activator, the catalyst system, the method of making a support-activator, the method of making a catalyst system, or the process for polymerizing olefins according to any of the preceding Aspects, wherein the amphoteric surfactant comprises, further comprises, or is selected from a sultaine, a hydroxysultaine, a betaine, an amine N-oxide (such as a tertiary amine N-oxide, a hydrocarbyl amine N-oxide, an alkyl amine N-oxide, or an aryl amine N-oxide), a phospholipid, or a sphingomyelin.

Aspect 136. The support-activator, the catalyst system, the method of making a support-activator, the method of making a catalyst system, or the process for polymerizing olefins according to any of the preceding Aspects, wherein the amphoteric surfactant comprises, further comprises, or is selected from:

(a) lauramidopropyl hydroxysultaine (ISOTAINE LAPHS), cocamidopropyl hydroxysultaine (ISOTAINE CAPHS), oleamidopropyl hydroxysultaine (ISOTAINE OAPHS), tallowamidopropyl hydroxysultaine (ISOTAINE TAPHS), erucamidopropyl hydroxysultaine (ISOTAINE EAPHS), lauryl hydroxysultaine (ISOTAINE LHS), or a combination thereof;

(b) N,N,N-trimethylglycine, cocamidopropyl betaine, a phosphatidylserine, phosphatidylethanolamine, phosphatidylcholine, or a combination thereof;

(c) lauryldimethylamine oxide, myristamine oxide, pyridine-N-oxide, N-methyl-morpholine-N-oxide, or a combination thereof;

(d) CHAPS (3-[(3-cholamidopropyl)dimethylammonio]-1-propanesulfonate); or (e) any combination thereof.

Aspect 137. The support-activator, the catalyst system, the method of making a support-activator, the method of making a catalyst system, or the process for polymerizing olefins according to any of the preceding Aspects, wherein the anionic surfactant comprises, further comprises, or is selected from a sulfate surfactant, a sulfonate surfactant, a phosphate surfactant, carboxylate surfactant, or other anionic surfactants, examples of which include but are not limited to dialkyl sulfocarboxylic acid esters, alkaryl sulfonic acid salts, aralkyl sulfonic acid salts, alkyl sulfonic acid salts, aryl sulfonic acid salts, sulfosuccinic acid esters, fatty acid alkali salts, polycarboxylic acid salts, polyoxyethylene alkyl ether phosphoric acid ester salts, alkylnaphthalene sulfonic acid salts, wherein the salts can be selected from salts of an alkali metal such as lithium, sodium or potassium, an alkaline earth metal such as calcium or magnesium, or ammonium or hydrocarbylammonium.

Aspect 138. The support-activator, the catalyst system, the method of making a support-activator, the method of making a catalyst system, or the process for polymerizing olefins according to any of the preceding Aspects, wherein the anionic surfactant comprises, further comprises, or is selected from an alkyl ether sulfate compound or an alkenyl ether sulfate compound having the formula $[RO(C_2H_4O)_xSO_3]M$ wherein R is a $C_8$ to $C_{20}$ alkyl group or a $C_8$ to $C_{20}$ alkenyl group, x an integer from 1 to 30, inclusive, and M is a cation which imparts water solubility to the alkyl ether sulfate or an alkenyl ether sulfate.

Aspect 139. The support-activator, the catalyst system, the method of making a support-activator, the method of making a catalyst system, or the process for polymerizing olefins according to any of the preceding Aspects, wherein the anionic surfactant comprises, further comprises, or is selected from a carboxylate compound having the formula [RCOO]M, wherein R is a $C_8$ to $C_{21}$ alkyl group and M is a cation selected from sodium, potassium, or ammonium.

Aspect 140. The support-activator, the catalyst system, the method of making a support-activator, the method of making a catalyst system, or the process for polymerizing olefins according to any of the preceding Aspects, wherein the anionic surfactant comprises, further comprises, or is selected from:

(a) a sulfonate compound having the formula $R'SO_3Na$, wherein R' is a $C_8$ to $C_{21}$ alkyl group, a $C_8$ to $C_{21}$ aralkyl group, or a $C_8$ to $C_{21}$ alkaryl group; or (b) an alkyl sulfate having the formula $R''OSO_3M$, wherein R" is a $C_8$ to $C_{21}$ alkyl group, and M is a cation selected from $NH_4^+$, $Na^+$, $K^+$, ½ $Mg^{2+}$, diethanolammonium, or triethanolammonium.

Aspect 141. The support-activator, the catalyst system, the method of making a support-activator, the method of making a catalyst system, or the process for polymerizing olefins according to any of the preceding Aspects, wherein the anionic surfactant comprises, further comprises, or is selected from a sulfated polyoxyethylene alkylphenol with a formula of $R''C_6H_4(OCH_2CH_2)_nOSO_3M$ wherein R" is $C_1$ to $C_9$ alkyl group, M is $NH_4^+$, $Na^+$, or triethanolamine, and n is an integer from 1 to 50, inclusive.

Aspect 142. The support-activator, the catalyst system, the method of making a support-activator, the method of making a catalyst system, or the process for polymerizing olefins according to any of the preceding Aspects, wherein the anionic surfactant comprises, further comprises, or is selected from:

(a) an alkyl sulfate having the formula $[(R^1O)SO_2O]M$;

(b) an alkyl sulfonate having the formula $[R^1SO_2O]M$;

(c) an alkyl sulfinate having the formula $[R^1S(O)O]M$;

(d) sulfated polyoxyalkylene having the formula $[R^1(OCH_2CH_2)_nOSO_2O]M$ or $[R^1(OCH_2C(CH_3)CH_2)_nOSO_2O]M$;

(e) sulfonated polyoxyalkylene having the formula $[R^1(OCH_2CH_2)_nSO_2O]M$ or $[R^1(OCH_2C(CH_3)CH_2)_nSO_2O]M$; wherein:

$R^1$ is selected independently from a substituted or an unsubstituted $C_1$-$C_{25}$ alkyl-, $C_6$-$C_{25}$ aryl-, $C_7$-$C_{25}$ aralkyl-, or $C_7$-$C_{25}$ alkaryl;

M is a cation such as $NH_4^+$, $Na^+$, $K^+$, ½ $Mg^{2+}$, diethanolammonium, or triethanolammonium; and n is an integer from 1 to 50.

Aspect 143. The support-activator, the catalyst system, the method of making a support-activator, the method of making a catalyst system, or the process for polymerizing olefins according to any of the preceding Aspects, wherein the anionic surfactant comprises, further comprises, or is selected from an alkali metal salt of a fatty acid having from about 8 to about 30 carbon atoms.

Aspect 144. The support-activator, the catalyst system, the method of making a support-activator, the method of making a catalyst system, or the process for polymerizing olefins according to any of the preceding Aspects, wherein the anionic surfactant comprises, further comprises, or is selected from an alkali metal salt of a fatty acid selected from caprylic acid, capric acid, lauric acid, myristic acid, palmitic acid, stearic acid, arachidic acid, ricinoleic acid, behenic acid, lignoceric acid, cerotic acid, myristoleic acid, palmitoleic acid, sapienic acid, oleic acid, elaidic acid, vaccenic acid, linoleic acid, linoelaidic acid, α-linolenic acid, arachidonic acid, eicosapentaenoic acid, erucic acid, docosahexaenoic acid, or any combination thereof.

Aspect 145. The support-activator, the catalyst system, the method of making a support-activator, the method of making a catalyst system, or the process for polymerizing olefins according to any of the preceding Aspects, wherein the anionic surfactant comprises or is selected from potassium oleate, dodecyl benzene sulfonate, dioctyl sulfosuccinate, sodium laurylsulfonate, sodium stearate, sodium lauryl sulfate, sodium myristyl sulfate, potassium lauryl sulfate, ammonium lauryl sulfate, triethanolamine lauryl sulfate, sodium cetyl sulfate, sodium stearyl sulfate, polyoxyethylene (POE) lauryl ether sodium sulfate, POE lauryl ether triethanolamine sulfate, POE lauryl ether ammonium sulfate, POE stearyl ether sodium sulfate, sodium stearoylmethyltaurate, triethanolamine dodecylbenzenesulfonate, sodium tetradecenesulfonate, sodium lauryl phosphate, or any combination thereof.

Aspect 146. The support-activator, the catalyst system, the method of making a support-activator, the method of making a catalyst system, or the process for polymerizing olefins according to any of the preceding Aspects, wherein the anionic surfactant comprises, further comprises or is selected from:

(a) a substituted or an unsubstituted alkyl sulfonate selected from methanesulfonate, ethanesulfonate, 1-propanesulfonate, 2-propanesulfonate, 3-methylbutanesulfonate, trifluoromethanesulfonate, trichloromethanesulfonate, chloromethanesulfonate, 1-hydroxyethanesulfonate, 2-hydroxy-2-propanesulfonate, 1-methoxy-2-propanesulfonate, or any combination thereof;

(b) a substituted or an unsubstituted alkyl sulfate selected from methylsulfate, ethylsulfate, 1-propylsulfate, 2-propylsulfate, 3-methylbutylsulfate, trifluoromethanesulfate, trichloromethylsulfate, chloromethylsulfate, 1-hydroxyethylsulfate, 2-hydroxy-2-propylsulfate, 1-methoxy-2-propylsulfate, or any combination thereof;

(c) a substituted or an unsubstituted aryl sulfonate selected from benzenesulfonate, naphthalenesulfonate, p-toluenesulfonate, m-toluenesulfonate, 3,5-xylenesulfonate, trifluoromethoxybenzenesulfonate, trichloro-methoxybenzenesulfonate, trifluoromethylbenzenesulfonate, trichloromethylbenzene-sulfonate, fluorobenzenesulfonate, chlorobenzenesulfonate, 1-hydroxyethane-benzenesulfonate, 3-fluoro-4-methoxybenzenesulfonate, or any combination thereof; or (d) any combination thereof.

Aspect 147. The support-activator, the catalyst system, the method of making a support-activator, the method of making a catalyst system, or the process for polymerizing olefins according to any of the preceding Aspects, wherein the anionic surfactant further comprises a counter ion selected from $NH_4^+$, $Na^+$, $K^+$, ½ $Mg^{2+}$, diethanolammonium, or triethanolammonium.

Aspect 148. The catalyst system, the method of making a catalyst system, or the process for polymerizing olefins according to any of the preceding Aspects, wherein the metallocene compound comprises, further comprises, or is selected from at least one metallocene compound having olefin polymerization activity when activated by an ion-exchanged clay, a protic-acid-treated clay, a pillared clay, an aluminoxane, a borate co-activator, or any combination thereof.

Aspect 149. The catalyst system, the method of making a catalyst system, or the process for polymerizing olefins according to any of the preceding Aspects, wherein the metallocene compound comprises, further comprises, consists of, consists essentially of, or is selected from a non-bridged (non-ansa) metallocene compound or a bridged (ansa) metallocene compound.

Aspect 150. The catalyst system, the method of making a catalyst system, or the process for polymerizing olefins according to any of the preceding Aspects, wherein the metallocene compound comprises, consists of, consists essentially of, or is selected from a compound or a combination of compounds, each independently having the formula:

$(X^1)(X^2)(X^3)(X^4)M$, wherein (a) M is selected from titanium, zirconium, or hafnium;

(b) $X^1$ is selected from a substituted or an unsubstituted cyclopentadienyl, indenyl, fluorenyl, pentadienyl, allyl, boratabenzenyl, 1,2-azaborolyl, or 1,2-diaza-3,5-diborolyl, wherein any substituent is selected independently from a halide, a $C_1$-$C_{20}$ hydrocarbyl, a $C_1$-$C_{20}$ heterohydrocarbyl, a $C_1$-$C_{20}$ organoheteryl, a fused $C_4$-$C_{12}$ carbocyclic moiety, or a fused $C_4$-$C_{11}$ heterocyclic moiety having at least one heteroatom selected independently from nitrogen, oxygen, sulfur, or phosphorus;

(c) $X^2$ is selected from: [1] a substituted or an unsubstituted cyclopentadienyl, indenyl, fluorenyl, pentadienyl, or allyl, wherein any substituent is selected independently from a halide, a $C_1$-$C_{20}$ hydrocarbyl, a $C_1$-$C_{20}$ heterohydrocarbyl, or a $C_1$-$C_{20}$ organoheteryl; or [2] a halide, a hydride, a $C_1$-$C_{20}$ hydrocarbyl, a $C_1$-$C_{20}$ heterohydrocarbyl, a $C_1$-$C_{20}$ organoheteryl, a fused $C_4$-$C_{12}$ carbocyclic moiety, or a fused $C_4$-$C_{11}$ heterocyclic moiety having at least one heteroatom selected independently from nitrogen, oxygen, sulfur, or phosphorus;

(d) wherein $X^1$ and $X^2$ are optionally bridged by at least one linker substituent having from 2 to 4 bridging atoms selected independently from C, Si, N, P, or B, wherein each available non-bridging valence of each bridging atom is unsubstituted (bonded to H) or substituted, wherein any substituent is selected independently from, a halide, a $C_1$-$C_{20}$ hydrocarbyl, a $C_1$-$C_{20}$ heterohydrocarbyl, or a $C_1$-$C_{20}$ organoheteryl, and wherein any hydrocarbyl, heterohydrocarbyl, or organoheteryl substituent can form a saturated or unsaturated cyclic structure with a bridging atom or with $X^1$ or X2

(e) [1] $X^3$ and $X^4$ are selected independently from a halide, a hydride, a $C_1$-$C_{20}$ hydrocarbyl, a $C_1$-$C_{20}$ heterohydrocarbyl, or a $C_1$-$C_{20}$ organoheteryl; [2] $[GX^A{}_kX^B{}_{4-k}]^-$, wherein G is B or Al, k is a number from 1 to 4, and $X^A$ in each occurrence is selected independently from H or a halide, and $X^B$ in each occurrence is selected independently from a $C_1$-$C_{12}$ hydrocarbyl, a $C_1$-$C_{12}$ heterohydrocarbyl, a $C_1$-$C_{12}$ organoheteryl; [3] $X^3$ and $X^4$ together are a $C_4$-$C_{20}$ polyene;

[4] $X^3$ and $X^4$ together with M form a substituted or an unsubstituted, saturated or unsaturated $C_3$-$C_6$ metallacycle moiety, wherein any substituent on the metallacycle moiety is selected independently from a halide, a $C_1$-$C_{20}$ hydrocarbyl, a $C_1$-$C_{20}$ heterohydrocarbyl, or a $C_1$-$C_{20}$ organoheteryl; or [5] one of $X^3$ and $X^4$ is selected from ½ O thereby forming a bridge to another metallocene selected according to this Aspect, while the other of $X^3$ and $X^4$ is selected from any of the moieties set out in (e)[1]-(e)[4] of this Aspect.

Aspect 151. The catalyst system, the method of making a catalyst system, or the process for polymerizing olefins according to Aspect 150, wherein $X^1$ and $X^2$ are bridged by a linker substituent selected from:

(a) $>EX^5{}_2$, $-EX^5{}_2EX^5{}_2—$, $-EX^5{}_2EX^5EX^5{}_2—$, or $>C{=}CX^5{}_2$, wherein E in each occurrence is independently selected from C or Si;

(b) $—BX^5—$, $—NX^5—$, or $—PX^5—$; or (c) $[—SiX^5{}_2(1,2\text{-}C_6H_4)SiX^5{}_2—]$, $[—CX^5{}_2(1,2\text{-}C_6H_4)CX^5{}_2—]$, $[—SiX^5{}_2(1,2\text{-}C_6H_4)CX^5{}_2—]$, $[—SiX^5{}_2(1,2\text{-}C_2H_2)SiX^5{}_2—]$, $[—CX^5{}_2(1,2\text{-}C_6H_4)CX^5{}_2—]$, or $[—SiX^5{}_2(1,2\text{-}C_6H_4)CX^5{}_2—]$;

wherein $X^5$ in each occurrence is selected independently from H, a halide, a $C_1$-$C_{20}$ hydrocarbyl, a $C_1$-$C_{20}$ heterohydrocarbyl, or a $C_1$-$C_{20}$ organoheteryl;

and wherein any $X^5$ substituents selected from hydrocarbyl, heterohydrocarbyl, or organoheteryl substituent can form a saturated or unsaturated cyclic structure with a bridging atom, another $X^5$ substituent, $X^1$, or $X^2$.

Aspect 152. The catalyst system, the method of making a catalyst system, or the process for polymerizing olefins according to any of Aspects 150-151, wherein $X^1$ and $X^2$ are bridged by a linker substituent selected from a $C_1$-$C_{20}$ hydrocarbylene group, a $C_1$-$C_{20}$ hydrocarbylidene group, a $C_1$-$C_{20}$ heterohydrocarbyl group, a $C_1$-$C_{20}$ heterohydrocarbylidene group, a $C_1$-$C_{20}$ heterohydrocarbylene group, or a $C_1$-$C_{20}$ heterohydrocarbylidene group.

Aspect 153. The catalyst system, the method of making a catalyst system, or the process for polymerizing olefins according to any of Aspects 150-152, wherein $X^1$ and $X^2$ are bridged by at least one substituent having the formula $>EX^5{}_2$, $-EX^5{}_2EX^5{}_2—$, or $—BX^5—$, wherein E is independently C or Si, $X^5$ in each occurrence is selected independently from a halide, a $C_1$-$C_{20}$ aliphatic group, a $C_6$-$C_{20}$ aromatic group, a $C_1$-$C_{20}$ heteroaliphatic group, a $C_4$-$C_{20}$ heteroaromatic group, or a $C_1$-$C_{20}$ organoheteryl group.

Aspect 154. The catalyst system, the method of making a catalyst system, or the process for polymerizing olefins according to any of Aspects 150-153, wherein $X^5$ in each occurrence is selected independently from a halide, a $C_1$-$C_{18}$ or $C_1$-$C_{12}$ alkyl group, a $C_2$-$C_{18}$ or $C_2$-$C_{12}$ alkenyl group, a $C_6$-$C_{18}$ or $C_6$-$C_{12}$ aromatic group, a $C_4$-$C_8$ or $C_4$-$C_{12}$ heteroaromatic group, a $C_1$-$C_{18}$ or $C_1$-$C_{12}$ heterohydrocarbyl group, a $C_1$-$C_{21}$ or $C_1$-$C_{15}$ organosilyl group, a $C_1$-$C_{18}$ or $C_1$-$C_{12}$ alkyl halide (haloalkyl) group, a $C_1$-$C_{85}$ or $C_1$-$C_{12}$ organophosphorus group, or a $C_1$-$C_{18}$ or $C_1$-$C_{12}$ organonitrogen group.

Aspect 155. The catalyst system, the method of making a catalyst system, or the process for polymerizing olefins according to any of Aspects 150-154, wherein $X^1$ and $X^2$ are bridged by a linker substituent selected from silylene, methylsilylene, dimethylsilylene, diisopropylsilylene, dibutylsilylene, methylbutylsilylene, methyl-t-butylsilylene, dicyclohexylsilylene, methylcyclohexylsilylene, methylphenylsilylene, diphenylsilylene, ditolylsilylene, methylnaphthylsilylene, dinaphthylsilylene, cyclodimethylenesilylene, cyclotrimethylenesilylene, cyclotetramethylenesilylene, cyclopentamethylenesilylene, cyclohexamethylenesilylene, or cycloheptamethylenesilylene.

Aspect 156. The catalyst system, the method of making a catalyst system, or the process for polymerizing olefins according to any of Aspects 150-155, wherein $X^1$ is selected from a substituted or an unsubstituted cyclopentadienyl, indenyl, or fluorenyl, wherein any substituent is selected independently from a halide, a $C_1$-$C_{20}$ aliphatic group, a $C_6$-$C_{20}$ aromatic group, a $C_1$-$C_{20}$ heteroaliphatic group, a $C_4$-$C_{20}$ heteroaromatic group, or a $C_1$-$C_{20}$ organoheteryl group.

Aspect 157. The catalyst system, the method of making a catalyst system, or the process for polymerizing olefins according to any of Aspects 150-156, wherein $X^1$ is selected from a substituted or an unsubstituted cyclopentadienyl, indenyl, or fluorenyl, wherein any substituent is selected independently from a halide, a $C_1$-$C_{15}$ or $C_1$-$C_{12}$ alkyl group, a $C_2$-$C_{18}$ or $C_2$-$C_{12}$ alkenyl group, a $C_6$-$C_{18}$ or $C_6$-$C_{12}$ aromatic group, a $C_4$-$C_{18}$ or $C_4$-$C_{12}$ heteroaromatic group, a $C_1$-$C_{21}$ or $C_1$-$C_{15}$ organosilyl group, a $C_1$-$C_{18}$ or $C_1$-$C_{12}$ alkyl halide (haloalkyl) group, a $C_1$-$C_{18}$ or $C_1$-$C_{12}$ organophosphorus group, or a $C_1$-$C_{18}$ or $C_1$-$C_{12}$ organonitrogen group.

Aspect 158. The catalyst system, the method of making a catalyst system, or the process for polymerizing olefins according to any of Aspects 150-157, wherein $X^1$, $X^2$, or both $X^1$ and $X^2$ are selected independently from a substituted or an unsubstituted cyclopentadienyl, indenyl, or fluorenyl, wherein any substituent is selected independently from:

(a) a silicon group having the formula $—SiH_3$, $—SiH_2R$, $—SiHR_2$, $—SiR_3$, $—SiR_2(OR)$, $—SiR(OR)_2$, or $—Si(OR)_3$;

(b) a phosphorus group having the formula $—PHR$, $—PR_2$, $—P(O)R_2$, $—P(OR)_2$, $—P(O)(OR)_2$, $—P(NR_2)_2$, or $—P(O)(NR_2)_2$;

(c) a boron group having the formula $—BH_2$, $—BHR$, $—BR_2$, $—BR(OR)$, or $—B(OR)_2$;

(d) a germanium group having the formula $—GeH_3$, $—GeH_2R$, $—GeHR_2$, $—GeR_3$, $—GeR_2(OR)$, $—GeR(OR)_2$, or $—Ge(OR)_3$; or (e) any combination thereof;

wherein R in each occurrence is selected independently from a $C_1$-$C_{20}$ hydrocarbyl group.

Aspect 159. The catalyst system, the method of making a catalyst system, or the process for polymerizing olefins according to any of Aspects 150-158, wherein $X^1$, $X^2$, or $X^1$ and X2 are substituted with a fused carbocyclic or heterocyclic moiety selected from pyrrole, furan, thiophene, phosphole, imidazole, imidazoline, pyrazole, pyrazoline, oxazole, oxazoline, isoxazole, isoxazoline, thiazole, thiazoline, isothiozoline, or a partially saturated analogs thereof.

Aspect 160. The catalyst system, the method of making a catalyst system, or the process for polymerizing olefins according to any of Aspects 150-159, wherein $X^2$ is selected from: [1] a substituted or an unsubstituted cyclopentadienyl, indenyl, or fluorenyl, wherein any substituent is selected independently from a halide, a $C_1$-$C_{20}$ aliphatic group, a $C_6$-$C_{20}$ aromatic group, a $C_1$-$C_{20}$ heteroaliphatic group, a $C_4$-$C_{20}$ heteroaromatic group, or a $C_1$-$C_{20}$ organoheteryl group; or [2] a halide, a $C_1$-$C_{20}$ aliphatic group, a $C_6$-$C_{20}$ aromatic group, a $C_1$-$C_{20}$ heteroaliphatic group, a $C_4$-$C_{20}$ heteroaromatic group, or a $C_1$-$C_{20}$ organoheteryl group.

Aspect 161. The catalyst system, the method of making a catalyst system, or the process for polymerizing olefins according to any of Aspects 150-160, wherein $X^2$ is selected from: [1] a substituted or an unsubstituted cyclopentadienyl, indenyl, or fluorenyl, wherein any substituent is selected independently from a halide, a $C_1$-$C_{18}$ or $C_1$-$C_{12}$ alkyl group, a $C_2$-$C_{18}$ or $C_2$-$C_{12}$ alkenyl group, a $C_6$-$C_{18}$ or $C_6$-$C_{12}$ aromatic group, a $C_4$-$C_{18}$ or $C_4$-$C_{12}$ heteroaromatic group, a $C_1$-$C_{21}$ or $C_1$-$C_{15}$ organosilyl group, a $C_1$-$C_{18}$ or $C_1$-$C_{12}$ alkyl halide (haloalkyl) group, a $C_1$-$C_{18}$ or $C_1$-$C_{12}$ organophosphorus group, or a $C_1$-$C_{18}$ or $C_1$-$C_{12}$ organonitrogen group; or [2] a halide, a $C_1$-$C_{18}$ or $C_1$-$C_{12}$ alkyl group, a $C_2$-$C_{18}$ or $C_2$-$C_{12}$ alkenyl group, a $C_6$-$C_{18}$ or $C_6$-$C_{12}$ aromatic group, a $C_4$-$C_{18}$ or $C_4$-$C_{12}$ heteroaromatic group, a $C_1$-$C_{21}$ or $C_1$-$C_{15}$ organosilyl group, a $C_1$-$C_{18}$ or $C_1$-$C_{12}$ alkyl halide (haloalkyl) group, a $C_1$-$C_{18}$ or $C_1$-$C_{12}$ organophosphorus group, or a $C_1$-$C_{18}$ or $C_1$-$C_{12}$ organonitrogen group.

Aspect 162. The catalyst system, the method of making a catalyst system, or the process for polymerizing olefins according to any of Aspects 150-161, wherein at least one of $X^1$, $X^2$, or the linking substituent between $X^1$ and $X^2$ is substituted with a $C_3$-$C_{12}$ olefinic group having the formula $—(CH_2)_nCH═CH_2$, wherein n is from 1-10.

Aspect 163. The catalyst system, the method of making a catalyst system, or the process for polymerizing olefins according to any of Aspects 150-162, wherein: [1] $X^3$ and $X^4$ are selected independently from a halide, a hydride, a $C_1$-$C_{20}$ aliphatic group, a $C_6$-$C_{20}$ aromatic group, a $C_1$-$C_{20}$ heteroaliphatic group, a $C_4$-$C_{20}$ heteroaromatic group, or a $C_1$-$C_{20}$ organoheteryl group; [2] $X^3$ and $X^4$ together are a substituted or an unsubstituted 1,3-butadiene having from 4 to 20 carbon atoms; or [3] $X^3$ and $X^4$ together with M form a substituted or an unsubstituted, saturated or unsaturated $C_4$-$C_5$ metallacycle moiety, wherein any substituent on the metallacycle moiety is selected independently from a halide, a $C_1$-$C_{20}$ aliphatic group, a $C_6$-$C_{20}$ aromatic group, a $C_1$-$C_{20}$ heteroaliphatic group, a $C_4$-$C_{20}$ heteroaromatic group, or a $C_1$-$C_{20}$ organoheteryl group.

Aspect 164. The catalyst system, the method of making a catalyst system, or the process for polymerizing olefins according to any of Aspects 150-163, wherein: [1] $X^3$ and $X^4$ are selected independently from a halide, a hydride, a $C_1$-$C_{18}$ or $C_1$-$C_{12}$ alkyl group, a $C_2$-$C_{18}$ or $C_2$-$C_{12}$ alkenyl group, a $C_6$-$C_{18}$ or $C_6$-$C_{12}$ aromatic group, a $C_4$-$C_{18}$ or $C_4$-$C_{12}$ heteroaromatic group, a $C_1$-$C_{21}$ or $C_1$-$C_{15}$ organosilyl group, a $C_1$-$C_{18}$ or $C_1$-$C_{12}$ alkyl halide (haloalkyl) group, a $C_1$-$C_{18}$ or $C_1$-$C_{12}$ organophosphorus group, or a $C_1$-$C_{18}$ or $C_1$-$C_{12}$ organonitrogen group; or [2] $X^3$ and $X^4$ together are a substituted or an unsubstituted 1,3-butadiene having from 4 to 18 carbon atoms; or [3] $X^3$ and $X^4$ together with M form a substituted or an unsubstituted, saturated or unsaturated $C_4$-$C_5$ metallacycle moiety, wherein any substituent on the metallacycle moiety is selected independently from a halide, a $C_1$-$C_{18}$ or $C_1$-$C_{12}$ alkyl group, a $C_2$-$C_{18}$ or $C_2$-$C_{12}$ alkenyl group, a $C_6$-$C_{18}$ or $C_6$-$C_{12}$ aromatic group, a $C_4$-$C_{18}$ or $C_4$-$C_{12}$ heteroaromatic group, a $C_1$-$C_{21}$ or $C_1$-$C_{15}$ organosilyl group, a $C_1$-$C_{18}$ or $C_1$-$C_{12}$ alkyl halide (haloalkyl) group, a $C_1$-$C_{18}$ or $C_1$-$C_{12}$ organophosphorus group, or a $C_1$-$C_{18}$ or $C_1$-$C_{12}$ organonitrogen group.

Aspect 165. The catalyst system, the method of making a catalyst system, or the process for polymerizing olefins according to any of Aspects 150-164, wherein $X^3$ and $X^4$ are selected independently from [1] a halide, a hydride, a borohydride, an aluminum hydride; or [2] a substituted or an unsubstituted $C_1$-$C_{18}$ aliphatic group, $C_1$-$C_{12}$ alkoxide group, $C_6$-$C_{10}$ aryloxide group, $C_1$-$C_{12}$ alkylsulfide group, $C_6$-$C_{10}$ arylsulfide group, wherein any substituent is selected independently from a halide, a $C_1$-$C_{10}$ alkyl, or a $C_6$-$C_{10}$ aryl; or [3] an amido group or a phosphido group, wherein any substituent is selected independently from a $C_1$-$C_{10}$ alkyl or a $C_6$-$C_{10}$ aryl.

Aspect 166. The catalyst system, the method of making a catalyst system, or the process for polymerizing olefins according to any of Aspects 148-150, wherein the metallocene compound comprises, further comprises, consists of, consists essentially of, or is selected from a metallocene compound having the formula $(X^1)(X^2)(X^3)(X^4)M$, wherein:

(i) M is zirconium or hafnium;

(ii) $X^1$ is a substituted or unsubstituted indenyl, fluorenyl, or cyclopentadienyl wherein any substituent is selected independently from a $C_1$-$C_{20}$ hydrocarbyl, a $C_1$-$C_{20}$ heterohydrocarbyl, or a fused $C_4$-$C_{12}$ carbocyclic moiety;

(iii) $X^2$ is a substituted or unsubstituted indenyl or cyclopentadienyl, wherein any substituent is selected independently from a $C_1$-$C_{20}$ hydrocarbyl or a $C_1$-$C_{20}$ heterohydrocarbyl;

(iv) $X^3$ and $X^4$ are selected independently from a halide, a $C_1$-$C_{20}$ hydrocarbyl, a $C_1$-$C_{20}$ heterohydrocarbyl, or a $C_1$-$C_{20}$ organoheteryl; and (v) $X^1$ and $X^2$ are optionally bridged by a linking substituent $>EX^5_2$, wherein E is selected from C or Si, and each $X^5$ is selected independently from a $C_1$-$C_{20}$ hydrocarbyl.

Aspect 167. The catalyst system, the method of making a catalyst system, or the process for polymerizing olefins according to any of the preceding Aspects, wherein the metallocene compound comprises, further comprises, consists of, consists essentially of, or is selected from

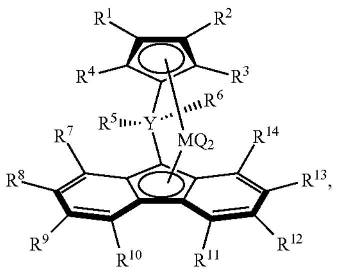

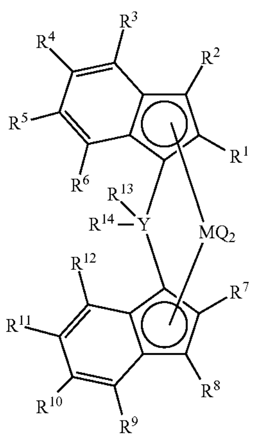

and its rac-isomer,

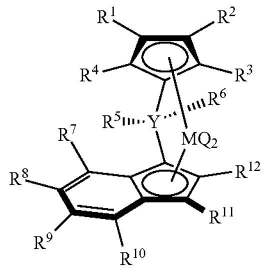

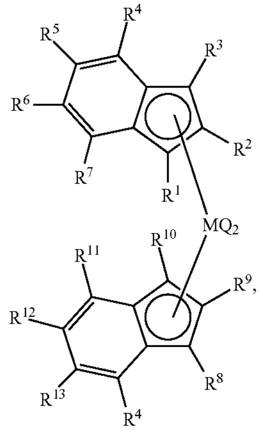

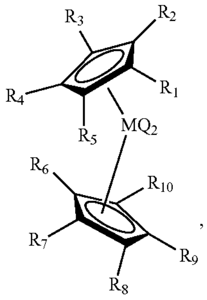

or a combination thereof, wherein:

(a) M is zirconium or hafnium;

(b) $R^1$ though $R^4$, in each occurrence, are selected independently from H, a $C_1$-$C_{12}$ hydrocarbyl group, or a $C_1$-$C_{12}$ heterohydrocarbyl group;

(c) Y is carbon or silicon; and (d) Q is selected independently Cl, Br, a $C_1$-$C_{12}$ hydrocarbyl group, or a $C_1$-$C_{12}$ heterohydrocarbyl group.

Aspect 168. The catalyst system, the method of making a catalyst system, or the process for polymerizing olefins according to any of the preceding Aspects, wherein the metallocene compound comprises, further comprises, consists of, consists essentially of, or is selected from bis(1-butyl-3-methylcyclopentadienyl)zirconium dichloride, bis(1,2,3-trimethylcyclopentadienyl)zirconium dichloride, bis(1,2,4-trimethylcyclopentadienyl)zirconium dichloride, bis-(1,2,3,4-tetramethylcyclopentadienyl)zirconium dichloride, bis(pentamethylcyclopentadienyl)zirconium dichloride, bis(1,3-diethylcyclopentadienyl)-zirconium dichloride, bis(indenyl)zirconium dichloride, bis(4-methyl-1-indenyl)zirconium dichloride, bis(5-methyl-1-indenyl)zirconium) zirconium dichloride, bis(6-methyl-1-indenyl)zirconium dichloride, bis(7-methyl-1-indenyl)zirconium dichloride, bis(5-methoxy-1-indenyl)-zirconium dichloride, bis(2,3-dimethyl-1-indenyl)zirconium dichloride, bis(4,7-dimethyl-1-indenyl)zirconium dichloride, bis(4,7-dimethoxy-1-indenyl) zirconium dichloride, (indenyl)(fluorenyl)zirconium dichloride, bis(trimethylsilylcyclopentadienyl)zirconium dichloride, (cyclopentadienyl)(dimethylcyclopentadienyl) zirconium dichloride, (cyclopentadienyl)(trimethylcyclopentadienyl)zirconium dichloride, (cyclopentadienyl)(tetramethylcyclopentadienyl)zirconium dichloride, (cyclopentadienyl)(pentamethylcyclopentadienyl)zirconium dichloride, (cyclopentadienyl)(ethylcyclopentadienyl)zirconium dichloride, (cyclopentadienyl)(diethylcyclopentadienyl)zirconium dichloride, (cyclopentadienyl)(triethylcyclopentadienyl)zirconium dichloride, (cyclopentadienyl)(tetraethylcyclopentadienyl)zirconium dichloride, (cyclopentadienyl)(pentaethylcyclopentadienyl)-zirconium dichloride, (cyclopentadienyl)(2,7-di-t-butylfluorenyl)-zirconium dichloride, (cyclopentadienyl)(octahydrofluorenyl) zirconium dichloride, (methylcyclopentadienyl)-(t-butylcyclopentadienyl)zirconium dichloride, (methylcyclopentadienyl)(2,7-di-t-butylfluorenyl)zirconium dichloride, (methylcyclopentadienyl)(octahydrofluorenyl) zirconium dichloride, (dimethylcyclopentadienyl)(2,7-di-t-butylfluorenyl)zirconium dichloride, (dimethylcyclopentadienyl)(octahydrofluorenyl)zirconium dichloride, (ethylcyclopentadienyl)(2,7-di-t-butylfluorenyl)zirconium dichloride, (ethylcyclopentadienyl)(octahydrofluorenyl)zirconium dichloride, (diethylcyclopentadienyl)(2,7-di-t-butylfluorenyl)zirconium dichloride, (diethylcyclopentadienyl)(octahydrofluorenyl)-zirconium dichloride, bis(1-butyl-3-methylcyclopentadienyl) zirconium dichloride, rac-dimethylsilylene bis(2-methyl-4-phenylindenyl)zirconium dichloride, or any combination thereof.

Aspect 169. The catalyst system, the method of making a catalyst system, or the process for polymerizing olefins according to any of the preceding Aspects, wherein the catalyst system further comprises a co-catalyst.

Aspect 170. The method of making a catalyst system according to any of the preceding Aspects, wherein the contacting step further comprises contacting, in any order, the metallocene compound and the support-activator with a co-catalyst.

Aspect 171. The catalyst system, the method of making a catalyst system, or the process for polymerizing olefins according to any of the preceding Aspects, wherein the co-catalyst comprises an alkylating agent, a hydriding agent, or a silylating agent.

Aspect 172. The catalyst system, the method of making a catalyst system, or the process for polymerizing olefins according to any of the preceding Aspects, wherein the co-catalyst comprises, further comprises, consists of, consists essentially of, or is selected from an organoaluminum compound, an organoboron compound, an organozinc compound, an organomagnesium compound, an organolithium compound, or any combination thereof.

Aspect 173. The catalyst system, the method of making a catalyst system, or the process for polymerizing olefins according to any of the preceding Aspects, wherein the co-catalyst comprises, further comprises, consists of, consists essentially of, or is selected from an organoaluminum compound or a combination of organoaluminum compounds, each independently having the formula:

$Al(X^A)_n(X^B)_m$ or $M^x[AlX^A{}_4]$, wherein n+m=3, wherein n and m are not limited to integers;

$X^A$ is selected independently from: [1] a hydride, a $C_1$-$C_{20}$ hydrocarbyl, or a $C_1$-$C_{20}$ heterohydrocarbyl; [2] a hydride, a $C_1$-$C_{20}$ aliphatic group, a $C_6$-$C_{20}$ aromatic group, a $C_1$-$C_{20}$ heteroaliphatic group, or a $C_4$-$C_{20}$ heteroaromatic group; or [3] two $X^A$ together comprise a $C_4$-$C_5$ hydrocarbylene group and the remaining $X^A$ is/are selected independently from a hydride, a $C_1$-$C_{20}$ hydrocarbyl, or a $C_1$-$C_{20}$ heterohydrocarbyl;

$X^B$ is selected independently from: [1] a halide or a $C_1$-$C_{20}$ organoheteryl; or [2] a halide, a $C_1$-$C_{12}$ alkoxide group, or a $C_6$-$C_{10}$ aryloxide group; and $M^x$ is selected from Li, Na, or K.

Aspect 174. The catalyst system, the method of making a catalyst system, or the process for polymerizing olefins according to any of the preceding Aspects, wherein the co-catalyst comprises, further comprises, consists of, consists essentially of, or is selected from an organoaluminum compound or a combination of organoaluminum compounds, each independently having the formula:

$Al(X^C)_n(X^D)_{3-n}$ or $M^x[AlX^C{}_4]$, wherein n is a number from 1 to 3, inclusive;

$X^C$ is selected independently from a hydride or a $C_1$-$C_{20}$ hydrocarbyl;

$X^D$ is a formal anionic species selected independently from: fluoride; chloride; bromide; iodide; bromate; chlorate; perchlorate; hydrocarbylsulfate; hydrocarbylsulfite; sulfamate; hydrocarbylsulfide, hydrocarbylcarbonate; hydrogen-carbonate (bicarbonate); carbamate; nitrite; nitrate; hydrocarbyloxalate; dihydrocarbylphosphate; hydrocarbylselenite; sulfate; sulfite; carbonate; oxalate; phosphate; phosphite; selenite; selenide; sulfide; oxide; sulfamate; azide; alkoxide; amido; hydrocarbylamido; dihydrocarbylamido; $R^A[CON(R)]_q$; wherein $R^A$ in each occurrence is independently H or a substituted or unsubstituted $C_1$-$C_{20}$ hydrocarbyl group and q is an integer from 1 to 4, inclusive; and $R^B[CO_2]_r$, wherein $R^B$ in each occurrence is independently H or a substituted or unsubstituted $C_1$-$C_{20}$ hydrocarbyl group and r is an integer from 1 to 3, inclusive; and $M^x$ is selected from Li, Na, or K.

Aspect 175. The catalyst system, the method of making a catalyst system, or the process for polymerizing olefins according to any of the preceding Aspects, wherein the co-catalyst comprises, further comprises, consists of, consists essentially of, or is selected from: [1]trimethylaluminum, triethylaluminum (TEA), tripropylaluminum, tributylaluminum, trihexylaluminum, trioctylaluminum, ethyl-(3-alkylcyclopentadiyl)aluminum, diethylaluminum ethoxide, diisobutylaluminum hydride, triisobutylaluminum (TIBAl), diethylaluminum chloride, or any combination or mixture thereof; or [2] ethyl-(3-alkylcyclopentadiyl)aluminum, triisobutylaluminum (TIBAl), trioctylaluminum, or any combination or mixture thereof; or [3] any combination of mixture of any one or more co-catalyst [1] and any one or more co-catalyst [2].

Aspect 176. The catalyst system, the method of making a catalyst system, or the process for polymerizing olefins according to any of the preceding Aspects, wherein the co-catalyst comprises, further comprises, consists of, consists essentially of, or is selected from an organoboron compound or a combination of organoboron compounds, each independently having the formula:

$B(X^E)_q(X^F)_{3-q}$, $B(X^E)_3$, or $M^y[BX^E{}_4]$, wherein q is from 1 to 3, inclusive;

$X^E$ is selected independently from: [1] a hydride, a $C_1$-$C_{20}$ hydrocarbyl, or a $C_1$-$C_{20}$ heterohydrocarbyl; [2] a hydride, a $C_1$-$C_{20}$ aliphatic group, a $C_6$-$C_{20}$ aromatic group, a $C_1$-$C_{20}$ heteroaliphatic group, or a $C_4$-$C_{20}$ heteroaromatic group; [3] a fluorinated $C_1$-$C_{20}$ hydrocarbyl, or a fluorinated $C_1$-$C_{20}$ heterohydrocarbyl; or [4] a fluorinated $C_1$-$C_{20}$ aliphatic group, a fluorinated $C_6$-$C_{20}$ aromatic group, a fluorinated $C_1$-$C_{20}$ heteroaliphatic group, or a fluorinated $C_4$-$C_{20}$ heteroaromatic group;

$X^F$ is selected independently from: [1] a halide or a $C_1$-$C_{20}$ organoheteryl; or [2] a halide, a $C_1$-$C_{12}$ alkoxide group, or a $C_6$-$C_{10}$ aryloxide group; and $M^y$ is selected from Li, Na, or K.

Aspect 177. The catalyst system, the method of making a catalyst system, or the process for polymerizing olefins according to any of the preceding Aspects, wherein the co-catalyst comprises, further comprises, consists of, consists essentially of, or is selected from

[1] trimethylboron, triethylboron, tripropylboron, tributylboron, trihexylboron, trioctylboron, diethylboron ethoxide, diisobutylboron hydride, triisobutylboron, diethylboron chloride, di-3-pinanylborane, pinacolborane, catecholborane, lithium borohydride, lithium triethylborohydride, a Lewis base adduct thereof, or any combination or mixture thereof; or

[2] tris(pentafluorophenyl)boron, tris[3,5-bis(trifluoromethyl)phenyl]boron, N,N-dimethylanilinium tetrakis (pentafluorophenyl)borate, triphenylcarbenium tetrakis (pentafluorophenyl)borate, lithium tetrakis-(pentafluorophenyl)borate, N,N-dimethylanilinium tetrakis [3,5-bis(trifluoro-methyl)phenyl]borate, triphenylcarbenium tetrakis[3,5-bis(trifluoromethyl)-phenyl]borate, and any combination or mixture thereof.

Aspect 178. The catalyst system, the method of making a catalyst system, or the process for polymerizing olefins according to any of the preceding Aspects, wherein the co-catalyst comprises, further comprises, consists of, consists essentially of, or is selected from an organozinc or organomagnesium compound or a combination of organozinc and/or organomagnesium compounds, each independently having the formula:

$M^C(X^G)_r(X^H)_{2-r}$, wherein $M^C$ is zinc or magnesium;

r is a number from 1 to 2, inclusive;

$X^G$ is selected independently from: [1] a hydride, a $C_1$-$C_{20}$ hydrocarbyl, or a $C_1$-$C_{20}$ heterohydrocarbyl; or [2] a hydride, a $C_1$-$C_{20}$ aliphatic group, a $C_6$-$C_{20}$ aromatic group, a $C_1$-$C_{20}$ heteroaliphatic group, or a $C_4$-$C_{20}$ heteroaromatic group; and $X^H$ is selected independently from: [1] a halide or a $C_1$-$C_{20}$ organoheteryl; or [2] a halide, a $C_1$-$C_{12}$ alkoxide group, or a $C_6$-$C_{10}$ aryloxide group.

Aspect 179. The catalyst system, the method of making a catalyst system, or the process for polymerizing olefins according to any of the preceding Aspects, wherein the co-catalyst comprises, further comprises, consists of, consists essentially of, or is selected from: [1] dimethylzinc, diethylzinc, diisopropylzinc, dicyclohexylzinc, diphenylzinc, or any combination thereof; [2] butylethylmagnesium, dibutylmagnesium, n-butyl-sec-butylmagnesium, dicyclopentadienylmagnesium, or any combination thereof; or [3] any combination of any organozinc co-catalyst from group [1] and any organomagnesium co-catalyst from group [2].

Aspect 180. The catalyst system, the method of making a catalyst system, or the process for polymerizing olefins according to any of the preceding Aspects, wherein the co-catalyst comprises, further comprises, consists of, consists essentially of, or is selected from an organolithium compound having the formula:

$Li(X^J)$, wherein $X^J$ is selected independently from: [1] a hydride, a $C_1$-$C_{20}$ hydrocarbyl, or a $C_1$-$C_{20}$ heterohydrocarbyl; or [2] a hydride, a $C_1$-$C_{20}$ aliphatic group, a $C_6$-$C_{20}$ aromatic group, a $C_1$-$C_{20}$ heteroaliphatic group, or a $C_4$-$C_{20}$ heteroaromatic group.

Aspect 181. The catalyst system, the method of making a catalyst system, or the process for polymerizing olefins according to any of the preceding Aspects, wherein the co-catalyst comprises, further comprises, consists of, consists essentially of, or is selected from methyllithium, ethyllithium, propyllithium, butyllithium (including n-butyllithium and t-butyllithium), hexyllithium, iso-butyllithium, or any combination thereof.

Aspect 182. The catalyst system, the method of making a catalyst system, or the process for polymerizing olefins according to any of the preceding Aspects, wherein the catalyst system further comprises a co-activator which comprises or is selected from an ion-exchanged clay, a protic-acid-treated clay, a pillared clay, an aluminoxane, a borate compound, an aluminate compound, an ionizing ionic compound, a solid oxide treated with an electron withdrawing anion, or any combination thereof.

Aspect 183. The catalyst system, the method of making a catalyst system, or the process for polymerizing olefins according to any of the preceding Aspects, wherein the catalyst system further comprises a co-activator which comprises or is selected from an ionic ionizing compound.

Aspect 184. The catalyst system, the method of making a catalyst system, or the process for polymerizing olefins according to Aspect 182, wherein the ionic ionizing compound comprises, consists of, consists essentially of, or is selected from tri(n-butyl)ammonium tetrakis(p-tolyl)borate, trimethylammonium tetraphenylborate, triethylammonium tetraphenylborate, tripropylammonium tetraphenylborate, tri(n-butyl)ammonium tetraphenylborate, tri(t-butyl)ammonium tetraphenylborate, N,N-dimethylanilinium tetraphenylborate, N,N-diethylanilinium tetraphenylborate, N,N-dimethyl-(2,4,6-trimethylanilinium) tetraphenylborate, tropillium tetraphenylborate, triphenylcarbenium tetraphenylborate, triphenylphosphonium tetraphenylborate triethylsilylium tetraphenylborate, benzene(diazonium)tetraphenylborate, trimethylammonium tetrakis(pentafluorophenyl) borate, triethylammonium tetrakis(pentafluorophenyl) borate, tripropylammonium tetrakis(pentafluorophenyl) borate, tri(n-butyl)ammonium tetrakis(pentafluorophenyl) borate, tri(sec-butyl)ammonium tetrakis(pentafluorophenyl) borate, N,N-dimethylanilinium tetrakis(pentafluorophenyl) borate, N,N-diethylanilinium tetrakis(pentafluorophenyl) borate, N,N-dimethyl-(2,4,6-trimethylanilinium) tetrakis (pentafluorophenyl)borate, tropillium tetrakis (pentafluorophenyl)borate, triphenylcarbenium tetrakis (pentafluorophenyl)borate, triphenylphosphonium tetrakis (pentafluorophenyl)borate, triethylsilylium tetrakis (pentafluorophenyl)borate, benzene(diazonium) tetrakis (pentafluorophenyl)borate, trimethylammonium tetrakis-(2,3,4,6-tetrafluorophenyl) borate, triethylammonium tetrakis-(2,3,4,6-tetrafluorophenyl)borate, tripropylammonium tetrakis-(2,3,4,6-tetrafluorophenyl)borate, tri(n-butyl)ammonium tetrakis-(2,3,4,6-tetrafluoro-phenyl)borate, dimethyl(t-butyl)ammonium tetrakis-(2,3,4,6-tetrafluorophenyl)borate, N,N-dimethylanilinium tetrakis-(2,3,4,6-tetrafluorophenyl)borate, N,N-diethylanilinium tetrakis-(2,3,4,6-tetrafluorophenyl)borate, N,N-dimethyl-(2,4,6-trimethylanilinium) tetrakis-(2,3,4,6-tetrafluorophenyl) borate, tropillium tetrakis-(2,3,4,6-tetrafluorophenyl)borate, triphenylcarbenium tetrakis-(2,3,4,6-tetrafluorophenyl)borate, triphenylphosphonium tetrakis-(2,3,4,6-tetrafluorophenyl)borate, triethylsilylium tetrakis-(2,3,4,6-tetrafluorophenyl)borate, benzene(diazonium) tetrakis-(2,3,4,6-tetrafluorophenyl)borate, trimethylammonium tetrakis (perfluoronapthyl)borate, triethylammonium tetrakis (perfluoronapthyl)borate, tripropylammonium tetrakis (perfluoronapthyl)borate, tri(n-butyl)ammonium tetrakis (perfluoronapthyl)borate, tri(t-butyl)ammonium tetrakis (perfluoronapthyl)borate, N,N-dimethylanilinium tetrakis (perfluoronapthyl)borate, N,N-diethylanilinium tetrakis(perfluoronapthyl)borate, N,N-dimethyl-(2,4,6-trimethylanilinium) tetrakis(perfluoronapthyl)borate, tropillium tetrakis(perfluoronapthyl)borate, triphenylcarbenium tetrakis(perfluoronapthyl)borate, triphenylphosphonium tetrakis(perfluoronapthyl)borate, triethylsilylium tetrakis(perfluoronapthyl)borate, benzene(diazonium) tetrakis (perfluoronapthyl)borate, trimethylammonium tetrakis (perfluorobiphenyl)borate, triethylammonium tetrakis (perfluorobiphenyl)borate, tripropylammonium tetrakis (perfluorobiphenyl)borate, tri(n-butyl)ammonium tetrakis (perfluorobiphenyl)borate, tri(t-butyl)ammonium tetrakis (perfluorobiphenyl)borate, N,N-dimethylanilinium tetrakis (perfluorobiphenyl)borate, N,N-diethylanilinium tetrakis (perfluorobiphenyl)borate, N,N-dimethyl-(2,4,6-trimethylanilinium) tetrakis(perfluorobiphenyl)borate, tropillium tetrakis(perfluorobiphenyl)borate, triphenylcarbenium tetrakis(perfluorobiphenyl)borate, triphenylphosphonium tetrakis(perfluorobiphenyl)borate, triethylsilylium tetrakis(perfluorobiphenyl)borate, benzene(diazonium) tetrakis(perfluorobiphenyl)borate, trimethylammonium tetrakis(3,5-bis(trifluoromethyl)phenyl)borate, triethylammonium tetrakis(3,5-bis(trifluoromethyl)phenyl)borate, tripropylammonium tetrakis(3,5-bis(trifluoromethyl)phenyl)borate, tri(n-butyl)ammonium tetrakis(3,5-bis(trifluoromethyl)phenyl)borate, tri(t-butyl)ammonium tetrakis(3,5-bis(trifluoromethyl)phenyl)borate, N,N-dimethylanilinium tetrakis(3,5-bis(trifluoromethyl)phenyl)borate, N,N-diethylanilinium tetrakis(3,5-bis(trifluoromethyl)phenyl)borate, N,N-dimethyl-(2,4,6-trimethylanilinium) tetrakis(3,5-bis (trifluoromethyl)phenyl)borate, tropillium tetrakis(3,5-bis (trifluoromethyl)phenyl)borate, triphenylcarbenium tetrakis (3,5-bis(trifluoromethyl)phenyl)borate, triphenylphosphonium tetrakis(3,5-bis(trifluoromethyl)phenyl)borate, triethylsilylium tetrakis(3,5-bis(trifluoromethyl) phenyl)borate, benzene(diazonium) tetrakis(3,5-bis(trifluoromethyl)phenyl)borate, and dialkyl ammonium salts such as: di-(i-propyl)ammonium tetrakis(pentafluorophenyl)borate, and dicyclohexylammonium tetrakis(pentafluorophenyl)borate; and additional tri-substituted phosphonium salts such as tri(o-tolyl)phosphonium tetrakis(pentafluorophenyl) borate, tri(2,6-dimethylphenyl)phosphonium tetrakis(pentafluorophenyl)borate, or any combination thereof.

Aspect 185. The catalyst system, the method of making a catalyst system, or the process for polymerizing olefins according to any of the preceding Aspects, wherein the catalyst system further comprises a co-activator which comprises or is selected from a solid oxide treated with an electron withdrawing anion.

Aspect 186. The catalyst system, the method of making a catalyst system, or the process for polymerizing olefins according Aspect 185, wherein:

(a) the solid oxide comprises, consists of, consists essentially of, or is selected from silica, alumina, silica-alumina, silica-coated alumina, silica-zirconia, silica-titania, aluminum phosphate, heteropolytungstates, titania, zirconia, magnesia, boria, zinc oxide, mixed oxides thereof, or any combination thereof; and (b) the electron-withdrawing anion comprises, consists of, consists essentially of, or is selected from fluoride, chloride, bromide, phosphate, triflate, bisulfate, sulfate, fluorophosphate, fluorosulfate, or any combination thereof.

Aspect 187. The catalyst system, the method of making a catalyst system, or the process for polymerizing olefins according Aspect 187, wherein the co-activator comprises, consists of, consists essentially of, or is selected from fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, or any combinations thereof.

Aspect 188. The process for polymerizing olefins according to any of the preceding Aspects, wherein the polyolefin comprises, consists of, consists essentially of, or is selected from an olefin homopolymer or an olefin copolymer.

Aspect 189. The process for polymerizing olefins according to any of the preceding Aspects, wherein the polyolefin comprises, consists of, consists essentially of, or is selected from an olefin homopolymer, the homopolymer comprising olefin monomer residues having from 2 to about 20 carbon atoms per monomer molecule.

Aspect 190. The process for polymerizing olefins according to any of the preceding Aspects, wherein the olefin monomer comprises, consists of, consists essentially of, or is selected from ethylene, propylene, 1-butene, 3-methyl-1-butene, 1-pentene, 3-methyl-1-pentene, 4-methyl-1-pentene, 1-hexene, 3-ethyl-1-hexene, 1-heptene, 1-octene, 1-nonene, or 1-decene.

Aspect 191. The process for polymerizing olefins according to any of the preceding Aspects, wherein the polyolefin comprises, consists of, consists essentially of, or is selected from an ethylene-olefin comonomer copolymer, the copolymer comprising α-olefin comonomer residues having from 3 to about 20 carbon atoms per monomer molecule.

Aspect 192. The process for polymerizing olefins according to Aspect 191, wherein the olefin comonomer is selected from an aliphatic $C_3$ to $C_{20}$ olefin, a conjugated or nonconjugated $C_3$ to $C_{20}$ diolefin, or any mixture thereof.

Aspect 193. The process for polymerizing olefins according to any of the preceding Aspects, wherein the olefin comonomer is selected from propylene, 1-butene, 2-butene, 3-methyl-1-butene, 1-pentene, 2-pentene, 3-methyl-1-pentene, 4-methyl-1-pentene, 1-hexene, 3-ethyl-1-hexene, 1-heptene, 1-octene, 1-nonene, 1-decene, 1,3-butadiene, isoprene, piperylene, 2,3-dimethyl-1,3-butadiene, 1,4-pentadiene, 1,7-hexadiene, vinylcyclohexane, or any combination thereof.

Aspect 194. The process for polymerizing olefins according to any of the preceding Aspects, wherein the catalyst system exhibits an ethylene polymerization activity of greater than or equal to 250 g/g/hr (grams of polyethylene per gram of the support-activator per hour), greater than or equal to 300 g/g/hr (grams of polyethylene per gram of the support-activator per hour), greater than or equal to 500 g/g/hr (grams of polyethylene per gram of the support-activator per hour), greater than or equal to 1000 g/g/hr (grams of polyethylene per gram of the support-activator per hour), greater than or equal to 1500 g/g/hr, greater than or equal to 2000 g/g/hr, or greater than or equal to 2500 g/g/hr.

Aspect 195. The process for polymerizing olefins according to any of the preceding Aspects, wherein the polymerization conditions comprise [a] a metallocene compound to calcined smectite heteroadduct ratio of about $7\times10^{-5}$ mmol metallocene compound/mg calcined smectite heteroadduct, and [b] other standard conditions as described in the specification.

Aspect 196. The process for polymerizing olefins according to any of the preceding Aspects, wherein the catalyst system comprises an organoaluminum compound and a calcined smectite heteroadduct in a relative concentration expressed in moles of organoaluminum compound per gram of calcined smectite heteroadduct in a range of from about 0.5 to about 0.000005, from about 0.1 to about 0.00001, or from about 0.01 to about 0.0001.

Aspect 197. The process for polymerizing olefins according to any of the preceding Aspects, wherein the process comprises at least one slurry polymerization, at least one gas phase polymerization, at least one solution polymerization, or any multi-reactor combinations thereof.

Aspect 198. The process for polymerizing olefins according to any of the preceding Aspects, wherein the process comprises polymerization in a gas phase reactor, a slurry loop, dual slurry loops in series, multiple slurry tanks in series, a slurry loop combined with a gas phase reactor, a continuous stirred reactor in a batch process, or combinations thereof.

Aspect 199. The method of making a catalyst system according to any of the preceding Aspects, wherein:

(a) the metallocene compound and the co-catalyst are contacted [1] for a time period from about 1 minute to about 24 hours or from about 1 minute to about 1 hour and [2] at a temperature from about 10° C. to about 200° C. or from about 15° C. to about 80° C., to form a first mixture;

followed by (b) contacting the first mixture with the support-activator comprising a calcined smectite heteroadduct to form the catalyst system.

Aspect 200. The method of making a catalyst system according to any of the preceding Aspects, wherein the metallocene compound, the co-catalyst, and the support-activator comprising a calcined smectite heteroadduct are contacted [1] for a time period from about 1 minute to about 6 months or from about 1 minute to about 1 week and [2] at a temperature from about 10° C. to about 200° C. or from about 15° C. to about 80° C., to form the catalyst system.

Aspect 201. The catalyst system prepared according to any of the preceding methods of making a catalyst system.

Aspect 202. The process for polymerizing olefins comprising contacting at least one olefin monomer and a catalyst system under polymerization conditions to form a polyolefin, wherein the catalyst system is prepared according to Aspect 201.

Aspect 203. The support-activator or the catalyst system when used for polymerizing olefins or the process for polymerizing olefins according to any of the preceding Aspects, which produces a polyolefin having a particle size distribution parameter (SPAN), calculated as (D90-D10)/(D50), of 10.0 or less, 7.5 or less, 5.0 or less, 3.0 or less, 2.7 or less, 2.5 or less, 2.2 or less, 2.0 or less, 1.8 or less, 1.6 or less, 1.4 or less, 1.2 or less, 1.0 or less, or 0.8 or less.

Aspect 204. The support-activator or the catalyst system when used for polymerizing olefins or the process for polymerizing olefins according to any of the preceding Aspects, wherein:

the smectite clay or the smectite heteroadduct is sieved to provide at least one size fraction having an average particle size (d50) of from 15 m (micron) to 80 m; and the support-activator, the catalyst system, or the process for polymerizing olefins produces a polyolefin having a particle size distribution parameter (SPAN), calculated as (D90-D10)/(D50), of 10.0 or less, 7.5 or less, 5.0 or less, 3.0 or less, 2.7 or less, 2.5 or less, 2.2 or less, 2.0 or less, 1.8 or less, 1.6 or less, 1.4 or less, 1.2 or less, 1.0 or less, or 0.8 or less.

Aspect 205. The support-activator or the catalyst system when used for polymerizing olefins or the process for polymerizing olefins according to any of the preceding Aspects, which produces a polyolefin having a volume-weighted mean sphericity (SPHT3) of 0.65 or greater, 0.70 or greater, 0.75 or greater, 0.80 or greater, 0.85 or greater, 0.87 or greater, 0.90 or greater, 0.92 or greater, or 0.95 or greater.

Aspect 206. The support-activator or the catalyst system when used for polymerizing olefins or the process for polymerizing olefins according to any of the preceding Aspects, wherein:

the smectite clay or the smectite heteroadduct is sieved to provide at least one size fraction having an average particle size (d50) of from 15 μm (micron) to 80 m; and the support-activator, the catalyst system, or the process for polymerizing olefins produces a polyolefin having a volume-weighted mean sphericity (SPHT3) of 0.65 or greater, 0.70 or greater, 0.75 or greater, 0.80 or greater, 0.85 or greater, 0.87 or greater, 0.90 or greater, 0.92 or greater, or 0.95 or greater;

Aspect 207. The support-activator, the catalyst system, the method of making a support-activator, the method of making a catalyst system, or the process for polymerizing olefins according to any of the preceding Aspects, wherein the cationic polymetallate comprises, consists of, consists essentially of, or is selected from:

fumed silica, fumed alumina, fumed silica-alumina, fumed magnesia, fumed zinc oxide, fumed titania, fumed zirconia, fumed ceria, or any combination thereof, which is chemically-treated with polyaluminum chloride, aluminum chlorhydrate, aluminum sesquichlorohydrate, polyaluminum oxyhydroxychloride, or any combination thereof.

Aspect 208. The support-activator, the catalyst system, the method of making a support-activator, the method of making a catalyst system, or the process for polymerizing olefins according to any of the preceding Aspects, wherein:

a) the colloidal smectite clay comprises colloidal montmorillonite, such as HPM-20 Volclay; and b) the cationic polymetallate comprises aluminum chlorhydrate, polyaluminum chloride, or aluminum sesquichlorohydrate.

Aspect 209. The support-activator, the catalyst system, the method of making a support-activator, the method of making a catalyst system, or the process for polymerizing olefins according to any of the preceding Aspects, wherein the cationic polymetallate comprises, consists of, consists essentially of, or is selected from boehmite, fumed silica-alumina, colloidal ceria, colloidal zirconia, magnetite, ferrihydrite, any positively charged colloidal metal oxide, or any combination thereof.

Aspect 210. The support-activator, the catalyst system, the method of making a support-activator, the method of making a catalyst system, or the process for polymerizing olefins according to any of the preceding Aspects, wherein the cationic polymetallate comprises, consists of, consists essentially of, or is selected from aluminum chlorhydrate-treated fumed silica, aluminum chlorhydrate-treated fumed alumina, aluminum chlorhydrate-treated fumed silica-alumina, or any combination thereof.

Aspect 211. The support-activator, the catalyst system, the method of making a support-activator, the method of making a catalyst system, or the process for polymerizing olefins according to any of the preceding Aspects, wherein the cationic polymetallate comprises, consists of, consists essentially of, or is selected from an aluminum species or any combinations of species having the empirical formula:

$$Al_2(OH)_nCl_m(H_2O)_x,$$

wherein n+m=6, and x is a number from 0 to about 4.

Aspect 212. The support-activator, the catalyst system, the method of making a support-activator, the method of making a catalyst system, or the process for polymerizing olefins according to any of the preceding Aspects, wherein the cationic polymetallate comprises, consists of, consists essentially of, or is selected from aluminum species having the empirical formula $0.5[Al_2(OH)_5Cl(H_2O)_2]$ or $[AlO_4(Al_{12}(OH)_{24}(H_2O)_{20}]^{7+}$ ("$Al_{13}$-mer") polycation.

Aspect 213. The support-activator, the catalyst system, the method of making a support-activator, the method of making a catalyst system, or the process for polymerizing olefins according to any of the preceding Aspects, wherein the cationic polymetallate comprises, consists of, consists essentially of, or is selected from an oligomer prepared by copolymerizing soluble rare earth salts with a cationic metal complex of at least one additional metal selected from aluminum, zirconium, chromium, iron, or a combination thereof, according to U.S. Pat. No. 5,059,568.

Aspect 214. The support-activator, the catalyst system, the method of making a support-activator, the method of making a catalyst system, or the process for polymerizing olefins according to Aspect 213, wherein the at least one rare earth metal is selected from cerium, lanthanum, or a combination thereof.

Aspect 215. The support-activator, the catalyst system, the method of making a support-activator, the method of making a catalyst system, or the process for polymerizing olefins according to any of the preceding Aspects, wherein the cationic polymetallate comprises, consists of, consists essentially of, or is selected from a complex of Formula I or Formula II or any combination of complexes of Formula I or Formula II, according to the following formulas:

$$[M(II)_{1-x}M(III)_x(OH)_2]A_{x/n}\cdot mL \quad (I)$$

$$[LiAl_2(OH)_6]A_{1/n}\cdot mL \quad (II)$$

wherein:

- M(II) is at least one divalent metal ion;
- M(III) is at least one trivalent metal ion;
- A is at least one inorganic anion;
- L is an organic solvent or water;
- n is the valence of the inorganic anion A or, in the case of a plurality of anions A, is their mean valence; and
- x is a number from 0.1 to 1; and
- m is a number from 0 to 10.

Aspect 216. The support-activator, the catalyst system, the method of making a support-activator, the method of making a catalyst system, or the process for polymerizing olefins according to Aspect 215, wherein:

- M(II) comprises, consists of, consists essentially of, or is selected from zinc, calcium, strontium, barium, iron, cobalt, nickel, cadmium, manganese, copper, or magnesium;
- M(III) comprises, consists of, consists essentially of, or is selected from iron, chromium, manganese, bismuth, cerium, or aluminum; A comprises, consists of, consists essentially of, or is selected from hydrogencarbonate (bicarbonate), sulfate, nitrate, nitrite, phosphate, chloride, bromide, fluoride, hydroxide, or carbonate.
- n is a number from 1 to 3; and
- L comprises, consists of, consists essentially of, or is selected from methanol, ethanol or isopropanol, or water.

Aspect 217. A catalyst composition, a process for polymerizing olefins, a method of making an olefin polymerization catalyst, a support-activator, or a method of making a support-activator according to Aspect 215, wherein the cationic polymetallate is selected from a complex of Formula I, wherein M(II) is magnesium, M(III) is aluminum, and A is carbonate.

Aspect 218. The support-activator, the catalyst system, the method of making a support-activator, the method of making a catalyst system, or the process for polymerizing olefins according to any of the preceding Aspects, wherein the cationic polymetallate comprises, consists of, consists essentially of, or is selected from a layered double hydroxide or a mixed metal layered hydroxide.

Aspect 219. A catalyst composition, a process for polymerizing olefins, a method of making an olefin polymerization catalyst, a support-activator, or a method of making a support-activator according to Aspect 218, wherein the mixed metal layered hydroxide is selected from a Ni—Al, Mg—Al, or Zn—Cr—Al type having a positive layer charge.

Aspect 220. A catalyst composition, a process for polymerizing olefins, a method of making an olefin polymerization catalyst, a support-activator, or a method of making a support-activator according to Aspect 218, wherein the layered double hydroxide or mixed metal layered hydroxide comprises, consists of, consists essentially of, or is selected from magnesium aluminum hydroxide nitrate, magnesium aluminum hydroxide sulfate, magnesium aluminum hydroxide chloride, $Mg_x(Mg,Fe)_3(Si,Al)_4O_{10}(OH)_2(H_2O)_4$ (x is a number from 0 to 1, for example, about 0.33 for ferrosaponite), $(Al,Mg)_2Si_4O_{10}(OH)_2(H_2O)_s$, synthetic hematite, hydrozincite (basic zinc carbonate) $Zn_5(OH)_6(CO_3)_2$, hydrotalcite $[Mg_6Al_2(OH)_{16}]CO_3\cdot 4H_2O$, tacovite $[Ni_6Al_2(OH)_6]CO_3\cdot 4H_2O$, hydrocalumite $[Ca_2Al(OH)_6]OH\cdot 6H_2O$, magaldrate $[Mg_{10}Al_5(OH)_{31}](SO_4)_2\cdot mH_2O$, pyroaurite $[Mg_6Fe_2(OH)_{16}]CO_3\cdot 4.5H_2O$, ettringite $[Ca_6Al_2(OH)_{12}](SO_4)_3\cdot 26H_2O$, or any combination thereof.

Aspect 221. The support-activator, the catalyst system, the method of making a support-activator, the method of making a catalyst system, or the process for polymerizing olefins according to any of the preceding Aspects, wherein the cationic polymetallate comprises, consists of, consists essentially of, or is selected from an iron polycation having an empirical formula $FeO_x(OH)_y(H_2O)_z]^{n+}$, wherein 2x+y is less than (<) 3, z is a number from 0 to about 4, and n is a number from 1 to 3.

Aspect 222. A catalyst system, a process for polymerizing olefins, a method of making an catalyst system, a support-activator, or a method of making a support-activator according to any one of Aspects 1-221, wherein the catalyst system, processes, methods, and support-activators are any catalyst system, processes, methods, and support-activators disclosed herein.

We claim:

1. A support-activator comprising a smectite heteroadduct, the smectite heteroadduct comprising a contact product in a first liquid carrier and in the absence of any other reactant, of:

- (a) a colloidal smectite clay; and
- (b) a surfactant selected from a cationic surfactant, a nonionic surfactant, an amphoteric surfactant, or any combination thereof;

wherein the smectite heteroadduct is subjected to a granulation process; and wherein the granulation process comprises a stirring granulation process, a spray-drying granulation process, a tumbling granulation process, a bricketing granulation process, a compacting granulation process, an extruding granulation process, a fluidized layer granulation process, an emulsifying granulation process, a suspending granulation process, or a press-molding granulation process.

2. The support-activator according to claim 1, wherein the colloidal smectite clay and the surfactant are contacted in a ratio of from 0.5-5 millimoles of surfactant per gram of colloidal smectite clay.

3. The support-activator according to claim 1, wherein the smectite heteroadduct is isolated from the first liquid carrier.

4. The support-activator according to claim 1, wherein the smectite clay comprises montmorillonite, sauconite, nontronite, hectorite, beidellite, saponite, bentonite, or any combination thereof.

5. The support-activator according to claim 1, wherein the surfactant comprises a cationic surfactant.

6. The support-activator according to claim 1, wherein the surfactant comprises a cationic surfactant selected from a primary, a secondary, a tertiary, or a quaternary ammonium compound or phosphonium compound having the formula:

$$[R^1R^2R^3R^4N]^+X^- \text{ or } [R^1R^2R^3R^4P]^+X^-, \text{ wherein}$$

each $R^1$, $R^2$, $R^3$, and $R^4$ is selected independently from hydrogen, a substituted or an unsubstituted $C_1$-$C_{25}$ hydrocarbyl group, or a substituted or an unsubstituted $C_1$-$C_{25}$ heterohydrocarbyl group, in which any two of $R^1$, $R^2$, $R^3$, and $R^4$ may be part of a ring structure, and wherein at least one of $R^1$, $R^2$, $R^3$, and $R^4$ is a non-hydrogen moiety; and $X^-$ is selected from an organic or an inorganic monoanion.

7. The support-activator according to claim 1, wherein the surfactant comprises a nonionic surfactant.

8. The support-activator according to claim 1, wherein the surfactant comprising a nonionic surfactant selected from: an ethoxylate, a glycol ether, a fatty alcohol polyglycol ether, or any combinations thereof; an amphoteric surfactant comprising an anionic surfactant moiety and a cationic surfactant in the same molecule; or a combination thereof.

9. The support-activator according to claim 1, wherein the surfactant comprises a nonionic surfactant selected from:

(a) a polyhydric alcohol containing 2, 3, or more hydroxyl groups, a polyhydric alcohol having the formula $CH_2OH(CHOH)_nCH_2OH$ wherein n is an integer from 2 to 5, a mono-alkyl ether of a polyhydric alcohol, a di-alkyl ether of a polyhydric alcohol, or a polyalkylene glycol of any of these, that is, a polyalkylene glycol of the polyhydric alcohol, the mono-alkyl ether of a polyhydric alcohol, or the di-alkyl ether of a polyhydric alcohol;

(b) glycerol, 1,2,4-butanetriol, erythritol, pentaerythritol, maltitol, xylitol, sorbitol, ethylene glycol, propylene glycol, diethylene glycol, poly(ethylene)glycol, poly(propylene)glycol, or a combination thereof;

(c)(i) a fatty acid comprising or selected from caprylic acid, capric acid, lauric acid, myristic acid, palmitic acid, stearic acid, arachidic acid, ricinoleic acid, behenic acid, lignoceric acid, cerotic acid, myristoleic acid, palmitoleic acid, sapienic acid, oleic acid, elaidic acid, vaccenic acid, linoleic acid, linoelaidic acid, a-linolenic acid, arachidonic acid, eicosapentaenoic acid, erucic acid, docosahexaenoic acid, or any combination thereof, or (ii) a fatty acid of (c)(i) condensed with an alcohol having one or multiple hydroxyl groups;

(d) hydrocarbyl (hydrocarbon) sulfonate having the formula $R^1SO_2OR^2$, wherein $R^1$ and $R^2$ are selected independently from a substituted or an unsubstituted $C_1$-$C_{25}$ alkyl-, $C_6$-$C_{25}$ aryl-, $C_7$-$C_{25}$ aralkyl-, or $C_7$-$C_{25}$ alkaryl;

(e) glucose, fructose, mannose, maltose, lactose, sucrose, a cyclodextrin, a maltodextrin, glucosamine, glucoronic acid, or any combination thereof, (f) a silane having the formula $R^1SiX_3$, $R^1R^2SiX_2$, or $R^1R^2R^3SiX$, wherein: (i) $R^1$, $R^2$, and $R^3$ are selected independently from a substituted or an unsubstituted $C_1$-$C_{25}$ hydrocarbyl group, $C_1$-$C_{25}$ heterohydrocarbyl group, or any other group which is hydrolytically stable when bonded to silicon in the nonionic surfactant; and (ii) X is selected independently from a $C_1$-$C_{25}$ alkoxy, a $C_1$-$C_{25}$ acyloxy, a halogen, or a $C_1$-$C_{25}$ amine, or another hydrolyzable group which is converted to a hydroxyl group (—OH) upon hydrolysis; or (g) an amino acid.

10. A support-activator comprising a smectite heteroadduct, the smectite heteroadduct comprising a contact product in a first liquid carrier and in the absence of any other reactant, of:

(a) a colloidal smectite clay; and (b) a surfactant selected from an amphoteric surfactant.

11. The support-activator according to claim 10, wherein the amphoteric surfactant comprises a cationic moiety and an anionic moiety, wherein the cationic moiety is selected from a primary amine, a secondary amine, a tertiary amine, or a quaternary ammonium cation, and the anionic moiety is selected from a sulfate, a sulfonate, a phosphate, or a carboxylate.

12. The support-activator according to claim 10, wherein the amphoteric surfactant is selected from an amino acid, a polypeptide, a protein, a sultaine, a hydroxysultaine, a betaine, an amine N-oxide, a phospholipid, or a sphingomyelin, or a combination thereof.

13. The support-activator according to claim 10, wherein the amphoteric surfactant is selected from lauramidopropyl hydroxysultaine, cocamidopropyl hydroxysultaine, oleamidopropyl hydroxysultaine, tallowamidopropyl hydroxysultaine, erucamidopropyl hydroxysultaine, lauryl hydroxysultaine, N,N,N-trimethylglycine, cocamidopropyl betaine, phosphatidylserine, a phosphatidylethanolamine, a phosphatidylcholine, lauryldimethylamine oxide, myristamine oxide, pyridine-N-oxide, N-methylmorpholine-N-oxide, 3-[(3-cholamidopropyl)dimethylammonio]-1-propanesulfonate, or a combination thereof.

14. The support-activator according to claim 1, wherein the smectite heteroadduct is characterized by any one of, or any combination of, the following properties:

(i) the smectite heteroadduct has an average particle sphericity (SPHT3) of 0.65 or greater;

(ii) the smectite heteroadduct has an average particle roundness of 0.65 or greater; and (iii) the smectite heteroadduct has an average particle circularity of 0.65 or greater.

15. The support-activator according to claim 1, wherein the smectite heteroadduct is characterized by an average particle sphericity (SPHT3) of 0.75 or greater or an average particle circularity of 0.75 or greater.

16. A catalyst composition for olefin polymerization, the catalyst composition comprising:

a) at least one metallocene compound; and b) at least one support-activator comprising a calcined smectite heteroadduct, the smectite heteroadduct comprising a contact product in a first liquid carrier and in the absence of any other reactant, of [i] a colloidal smectite clay and [ii] a surfactant selected from a cationic surfactant, a nonionic surfactant, an amphoteric surfactant, or any combination thereof.

17. The catalyst composition according to claim 16, wherein the colloidal smectite clay and the surfactant are contacted in a ratio of from 0.5 millimoles to 5 millimoles of surfactant per gram of colloidal smectite clay.

18. The catalyst composition according to claim 16, wherein the catalyst composition further comprises:

(c) at least one co-catalyst;

(d) a fluid carrier; or a combination thereof.

19. The catalyst composition according to claim 18, wherein the at least one co-catalyst is selected from an organoaluminum compound, an organoboron compound, an organozinc compound, an organomagnesium compound, an organolithium compound, or any combination thereof.

20. The catalyst composition according to claim 16, wherein the at least one metallocene compound has the following formula:

$$(X^1)(X^2)(X^3)(X^4)M, \text{ wherein}$$

(i) M is zirconium or hafnium;

(ii) $X^1$ is a substituted or unsubstituted indenyl, fluorenyl, or cyclopentadienyl wherein any substituent is selected independently from a $C_1$-$C_{20}$ hydrocarbyl, a $C_1$-$C_{20}$ heterohydrocarbyl, or a fused $C_4$-$C_{12}$ carbocyclic moiety;

(iii) $X^2$ is a substituted or unsubstituted indenyl or cyclopentadienyl, wherein any substituent is selected independently from a $C_1$-$C_{20}$ hydrocarbyl or a $C_1$-$C_{20}$ heterohydrocarbyl;

(iv) $X^3$ and $X^4$ are selected independently from a halide, a $C_1$-$C_{20}$ hydrocarbyl, a $C_1$-$C_{20}$ heterohydrocarbyl, or a $C_1$-$C_{20}$ organoheteryl; and (v) $X^1$ and $X^2$ are optionally bridged by a linking substituent $>EX^5_2$, wherein E is selected from C or Si, and each $X^5$ is selected independently from a $C_1$-$C_{20}$ hydrocarbyl.

21. The catalyst composition according to claim 16, wherein the smectite clay comprises montmorillonite, sauconite, nontronite, hectorite, beidellite, saponite, bentonite, or any combination thereof.

22. The catalyst composition according to claim 16, wherein the surfactant comprises a cationic surfactant.

23. The catalyst composition according to claim 16, wherein the surfactant comprises a cationic surfactant selected from a primary, a secondary, a tertiary, or a quaternary ammonium compound or phosphonium compound having the formula:

$$[R^1R^2R^3R^4N]^+X^- \text{ or } [R^1R^2R^3R^4P]^+X^-, \text{ wherein}$$

each $R^1$, $R^2$, $R^3$, and $R^4$ is selected independently from hydrogen, a substituted or an unsubstituted $C_1$-$C_{25}$ hydrocarbyl group, or a substituted or an unsubstituted $C_1$-$C_{25}$ heterohydrocarbyl group, in which any two of $R^1$, $R^2$, $R^3$, and $R^4$ may be part of a ring structure, and wherein at least one of $R^1$, $R^2$, $R^3$, and $R^4$ is a non-hydrogen moiety; and $X^-$ is selected from an organic or an inorganic monoanion.

24. The catalyst composition according to claim 16, wherein the surfactant comprises a nonionic surfactant.

25. The catalyst composition according to claim 16, wherein the surfactant comprising a nonionic surfactant selected from: an ethoxylate, a glycol ether, a fatty alcohol polyglycol ether, or any combinations thereof; an amphoteric surfactant comprising an anionic surfactant moiety and a cationic surfactant in the same molecule; or a combination thereof.

26. The catalyst composition according to claim 16, wherein the surfactant comprises a nonionic surfactant selected from:

(a) a polyhydric alcohol containing 2, 3, or more hydroxyl groups, a polyhydric alcohol having the formula $CH_2OH(CHOH)_nCH_2OH$ wherein n is an integer from 2 to 5, a mono-alkyl ether of a polyhydric alcohol, a di-alkyl ether of a polyhydric alcohol, or a polyalkylene glycol of any of these, that is, a polyalkylene glycol of the polyhydric alcohol, the mono-alkyl ether of a polyhydric alcohol, or the di-alkyl ether of a polyhydric alcohol;

(b) glycerol, 1,2,4-butanetriol, erythritol, pentaerythritol, maltitol, xylitol, sorbitol, ethylene glycol, propylene glycol, diethylene glycol, poly(ethylene)glycol, poly(propylene)glycol, or a combination thereof;

(c)(i) a fatty acid comprising or selected from caprylic acid, capric acid, lauric acid, myristic acid, palmitic acid, stearic acid, arachidic acid, ricinoleic acid, behenic acid, lignoceric acid, cerotic acid, myristoleic acid, palmitoleic acid, sapienic acid, oleic acid, elaidic acid, vaccenic acid, linoleic acid, linoelaidic acid, a-linolenic acid, arachidonic acid, eicosapentaenoic acid, erucic acid, docosahexaenoic acid, or any combination thereof, or (ii) a fatty acid of (c)(i) condensed with an alcohol having one or multiple hydroxyl groups;

(d) hydrocarbyl (hydrocarbon) sulfonate having the formula $R^1SO_2OR^2$, wherein $R^1$ and $R^2$ are selected independently from a substituted or an unsubstituted $C_1$-$C_{25}$ alkyl-, $C_6$-$C_{25}$ aryl-, $C_7$-$C_{25}$ aralkyl-, or $C_7$-$C_{25}$ alkaryl;

(e) glucose, fructose, mannose, maltose, lactose, sucrose, a cyclodextrin, a maltodextrins, glucosamine, glucoronic acid, or any combination thereof, (f) a silane having the formula $R^1SiX_3$, $R^1R^2SiX_2$, or $R^1R^2R^3SiX$, wherein: (i) $R^1$, $R^2$, and $R^3$ are selected independently from a substituted or an unsubstituted $C_1$-$C_{25}$ hydrocarbyl group, $C_1$-$C_{25}$ heterohydrocarbyl group, or any other group which is hydrolytically stable when bonded to silicon in the nonionic surfactant; and (ii) X is selected independently from a $C_1$-$C_{25}$ alkoxy, a $C_1$-$C_{25}$ acyloxy, a halogen, or a $C_1$-$C_{25}$ amine, or another hydrolyzable group which is converted to a hydroxyl group (—OH) upon hydrolysis; or (g) an amino acid.

27. The catalyst composition according to claim 16, wherein the surfactant comprises an amphoteric surfactant.

28. The catalyst composition according to claim 16, wherein the surfactant comprises an amphoteric surfactant and the amphoteric surfactant comprises a cationic moiety and an anionic moiety, wherein the cationic moiety is selected from a primary amine, a secondary amine, a tertiary amine, or a quaternary ammonium cation, and the anionic moiety is selected from a sulfate, a sulfonate, a phosphate, or a carboxylate.

29. The catalyst composition according to claim 16, wherein the surfactant comprises an amphoteric surfactant selected from an amino acid, a polypeptide, a protein, a sultaine, a hydroxysultaine, a betaine, an amine N-oxide, a phospholipid, or a sphingomyelin, or a combination thereof.

30. The catalyst composition according to claim 16, wherein the surfactant comprises an amphoteric surfactant selected from lauramidopropyl hydroxysultaine, cocamidopropyl hydroxysultaine, oleamidopropyl hydroxysultaine, tallowamidopropyl hydroxysultaine, erucamidopropyl hydroxysultaine, lauryl hydroxysultaine, N,N,N-trimethylglycine, cocamidopropyl betaine, phosphatidylserine, a phosphatidylethanolamine, a phosphatidylcholine, lauryldimethylamine oxide, myristamine oxide, pyridine-N-oxide, N-methylmorpholine-N-oxide, 3-[(3-cholamidopropyl)dimethylammonio]-1-propanesulfonate, or a combination thereof.

31. The catalyst composition according to claim 16, wherein the smectite heteroadduct is characterized by any one of, or any combination of, the following properties:

(i) the smectite heteroadduct has an average particle sphericity (SPHT3) of 0.65 or greater;

(ii) the smectite heteroadduct has an average particle roundness of 0.65 or greater; and (iii) the smectite heteroadduct has an average particle circularity of 0.65 or greater.

32. The catalyst composition according to claim 16, wherein the smectite heteroadduct is characterized by an average particle sphericity (SPHT3) of 0.75 or greater or an average particle circularity of 0.75 or greater.

33. A process for polymerizing olefins comprising contacting at least one olefin monomer and a catalyst composition under polymerization conditions to form a polyolefin, wherein the catalyst composition comprises:

a) at least one metallocene compound;

b) at least one support-activator comprising a calcined smectite heteroadduct, the smectite heteroadduct comprising a contact product in a first liquid carrier and in the absence of any other reactant, of [1] a colloidal smectite clay and [ii] a surfactant selected from a cationic surfactant, a nonionic surfactant, an amphoteric surfactant, or any combination thereof.

34. A process for polymerizing olefins according to claim 33, wherein the at least one olefin monomer is selected from [a] ethylene or propylene, or [b] ethylene in combination with at least one comonomer selected from propylene, 1-butene, 2-butene, 3-methyl-1-butene, 1-pentene, 2-pentene, 3-methyl-1-pentene, 4-methyl-1-pentene, 1-hexene, 3-ethyl-1-hexene, 1-heptene, 1-octene, 1-nonene, 1-decene, 1,3-butadiene, isoprene, piperylene, 2,3-dimethyl-1,3-butadiene, 1,4-pentadiene, 1,7-hexadiene, vinylcyclohexane, or any combination thereof.

35. A process for polymerizing olefins according to claim 33, wherein the process comprises polymerization in a gas phase reactor, a slurry loop, dual slurry loops in series, multiple slurry tanks in series, a slurry loop combined with a gas phase reactor, a continuous stirred reactor in a batch process, or combinations thereof.

36. A method of making a support-activator comprising a smectite heteroadduct, the method comprising contacting in a first liquid carrier:

(a) a colloidal smectite clay; and (b) a surfactant selected from a cationic surfactant, a nonionic surfactant, an amphoteric surfactant, or any combination thereof to provide a slurry of the smectite heteroadduct in the first liquid carrier;

wherein the contacting step occurs in the absence of any other reactant; and wherein the smectite heteroadduct is subjected to a granulation process comprising a stirring granulation process, a spray-drying granulation process, a tumbling granulation process, a bricketing granulation process, a compacting granulation process, an extruding granulation process, a fluidized layer granulation process, an emulsifying granulation process, a suspending granulation process, or a press-molding granulation process.

37. The method of making a support-activator according to claim 36, further comprising the step of:

(c) isolating the smectite heteroadduct from the slurry.

38. The method of making a support-activator according to claim 37, further comprising the steps of:

(d) suspending the isolated smectite heteroadduct in a dispersion medium comprising water, to provide a suspension of the smectite heteroadduct in the dispersion medium; and (e) spray-drying the smectite heteroadduct from the suspension to provide the support-activator in particulate form.

39. The support-activator according to claim 1, wherein the smectite heteroadduct is subjected to a granulation process comprising a stirring granulation process, a spray-drying granulation process, a bricketing granulation process, a compacting granulation process, an extruding granulation process, a fluidized layer granulation process, an emulsifying granulation process, a suspending granulation process, or a press-molding granulation process.

40. The support-activator according to claim 1, wherein the smectite heteroadduct is subjected to a spray-drying granulation process.

41. The support-activator according to claim 40, wherein the smectite heteroadduct is isolated from the first liquid carrier and suspended in a dispersion medium prior to being spray-dried.

42. The support-activator according to claim 1, wherein the smectite heteroadduct is calcined.

43. The support-activator according to claim 1, wherein the surfactant comprises a cationic surfactant selected from a primary, a secondary, a tertiary, or a quaternary ammonium compound having the formula:

$$[R^1R^2R^3R^4N]^+X^-, \text{ wherein}$$

each $R^1$, $R^2$, $R^3$, and $R^4$ is selected independently from hydrogen, a substituted or an unsubstituted $C_2$-$C_{25}$ hydrocarbyl group, or a substituted or an unsubstituted $C_1$-$C_{25}$ heterohydrocarbyl group, in which any two of $R^1$, $R^2$, $R^3$, and $R^4$ may be part of a ring structure, and wherein at least one of $R^1$, $R^2$, $R^3$, and $R^4$ is a non-hydrogen moiety; and $X^-$ is selected from an organic or an inorganic monoanion.

44. The catalyst composition according to claim 16, wherein the smectite heteroadduct is subjected to a granulation process comprising a stirring granulation process, a spray-drying granulation process, a tumbling granulation process, a grinding granulation process, a bricketing granulation process, a compacting granulation process, an extruding granulation process, a fluidized layer granulation process, an emulsifying granulation process, a suspending granulation process, or a press-molding granulation process.

45. The catalyst composition according to claim 16, wherein the smectite heteroadduct is subjected to a spray-drying granulation process.

46. The catalyst composition according to claim 16, wherein the smectite heteroadduct is isolated from the first liquid carrier and suspended in a dispersion medium prior to being spray-dried.

47. The catalyst composition according to claim 16, wherein the surfactant comprises a cationic surfactant selected from a primary, a secondary, a tertiary, or a quaternary ammonium compound having the formula:

$$[R^1R^2R^3R^4N]^+X^-, \text{ wherein}$$

each $R^1$, $R^2$, $R^3$, and $R^4$ is selected independently from hydrogen, a substituted or an unsubstituted $C_2$-$C_{25}$ hydrocarbyl group, or a substituted or an unsubstituted $C_1$-$C_{25}$ heterohydrocarbyl group, in which any two of $R^1$, $R^2$, $R^3$, and $R^4$ may be part of a ring structure, and wherein at least one of $R^1$, $R^2$, $R^3$, and $R^4$ is a non-hydrogen moiety; and $X^-$ is selected from an organic or an inorganic monoanion.

48. The process for polymerizing olefins according to claim 33, wherein the smectite heteroadduct is subjected to a granulation process comprising a stirring granulation process, a spray-drying granulation process, a tumbling granulation process, a grinding granulation process, a bricketing granulation process, a compacting granulation process, an extruding granulation process, a fluidized layer granulation process, an emulsifying granulation process, a suspending granulation process, or a press-molding granulation process.

49. The process for polymerizing olefins according to claim 33, wherein the smectite heteroadduct is subjected to a spray-drying granulation process.

50. The method of making a support-activator according to claim 36, wherein the smectite heteroadduct is subjected to a granulation process comprising a stirring granulation process, a spray-drying granulation process, a bricketing granulation process, a compacting granulation process, an extruding granulation process, a fluidized layer granulation process, an emulsifying granulation process, a suspending granulation process, or a press-molding granulation process.

51. The method of making a support-activator according to claim 36, wherein the smectite heteroadduct is subjected to a spray-drying granulation process.

52. The method of making a support-activator according to claim 36, wherein the smectite heteroadduct is calcined.

53. The method of making a support-activator according to claim 36, wherein the smectite heteroadduct is characterized by any one of, or any combination of, the following properties:

(i) the smectite heteroadduct has an average particle sphericity (SPHT3) of 0.65 or greater;

(ii) the smectite heteroadduct has an average particle roundness of 0.65 or greater; and (iii) the smectite heteroadduct has an average particle circularity of 0.65 or greater.

54. A support-activator comprising a smectite heteroadduct, the smectite heteroadduct comprising a contact product in a first liquid carrier and in the absence of any other reactant, of:

(a) a colloidal smectite clay; and (b) a surfactant selected from a cationic surfactant, a nonionic surfactant, an amphoteric surfactant, or any combination thereof;

wherein the smectite heteroadduct is subjected to a granulation process; and wherein the colloidal smectite clay and the surfactant are contacted in a ratio of from 0.5-5 millimoles of surfactant per gram of colloidal smectite clay.

55. The support-activator according to claim 54, wherein the smectite heteroadduct is subjected to a spray-drying granulation process.

56. The support-activator according to claim 54, wherein the smectite heteroadduct is characterized by any one of, or any combination of, the following properties:

(i) the smectite heteroadduct has an average particle sphericity (SPHT3) of 0.65 or greater;

(ii) the smectite heteroadduct has an average particle roundness of 0.65 or greater; and (iii) the smectite heteroadduct has an average particle circularity of 0.65 or greater.

57. A support-activator comprising a smectite heteroadduct, the smectite heteroadduct comprising a contact product in a first liquid carrier and in the absence of any other reactant, of:

(a) a colloidal smectite clay; and (b) a surfactant selected from a cationic surfactant, a nonionic surfactant, an amphoteric surfactant, or any combination thereof;

wherein the smectite heteroadduct is subjected to a granulation process; and wherein the surfactant comprises a cationic surfactant selected from a primary, a secondary, a tertiary, or a quaternary ammonium compound or phosphonium compound having the formula:

$$[R^1R^2R^3R^4N]^+X^- \text{ or } [R^1R^2R^3R^4P]^+X^-, \text{ wherein}$$

each $R^1$, $R^2$, $R^3$, and $R^4$ is selected independently from hydrogen, a substituted or an unsubstituted $C_1$-$C_{25}$ hydrocarbyl group, or a substituted or an unsubstituted $C_1$-$C_{25}$ heterohydrocarbyl group, in which any two of $R^1$, $R^2$, $R^3$, and $R^4$ may be part of a ring structure, and wherein at least one of $R^1$, $R^2$, $R^3$, and $R^4$ is a non-hydrogen moiety; and $X^-$ is selected from an organic or an inorganic monoanion.

58. The support-activator according to claim 57, wherein the smectite heteroadduct is subjected to a spray-drying granulation process.

59. The support-activator according to claim 57, wherein the smectite heteroadduct is characterized by any one of, or any combination of, the following properties:

(i) the smectite heteroadduct has an average particle sphericity (SPHT3) of 0.65 or greater;

(ii) the smectite heteroadduct has an average particle roundness of 0.65 or greater; and (iii) the smectite heteroadduct has an average particle circularity of 0.65 or greater.

* * * * *